July 15, 1947.    E. BUHLER    2,424,076
ALPHABETIC INTERPRETER
Filed Dec. 27, 1943    62 Sheets-Sheet 1

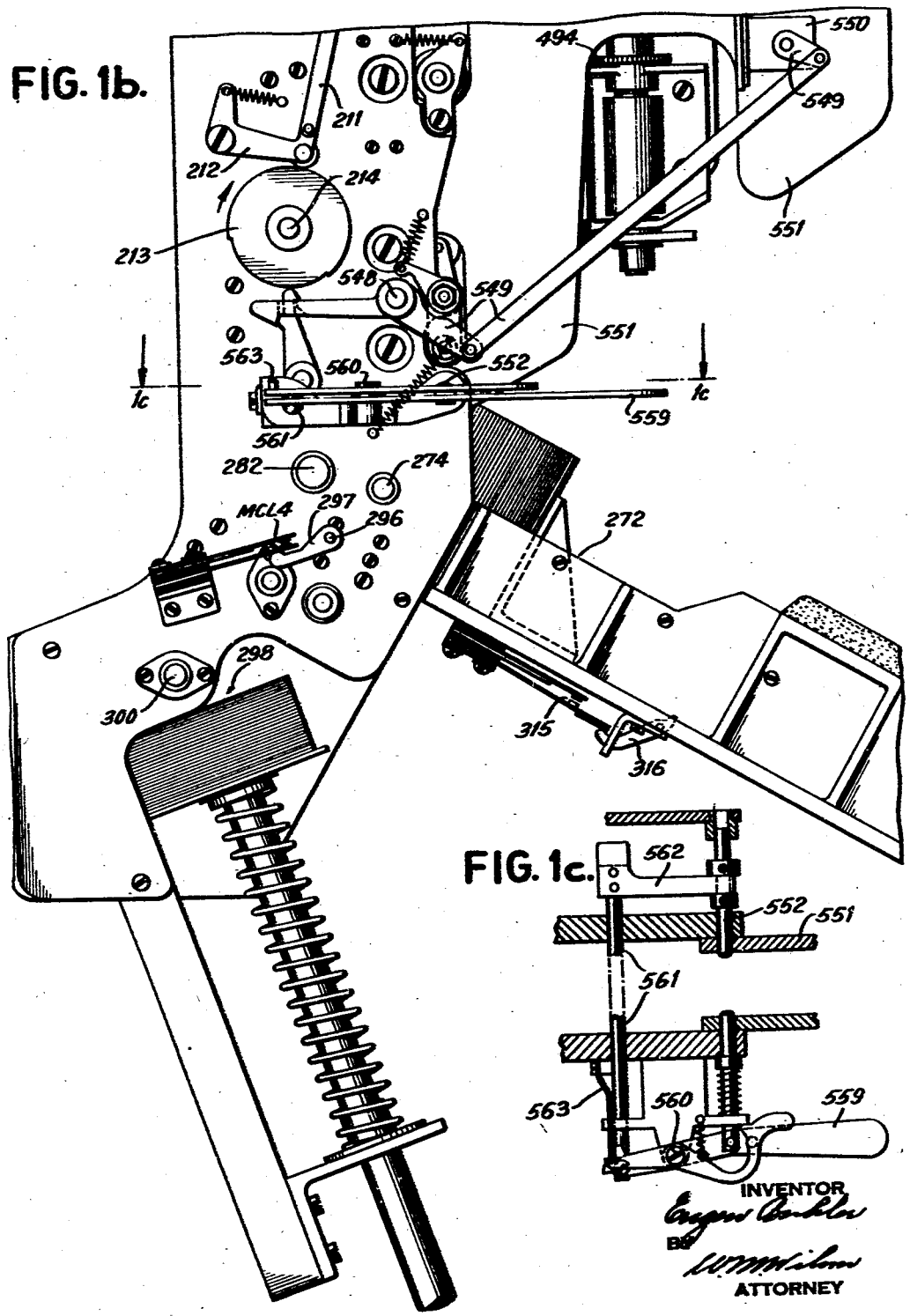

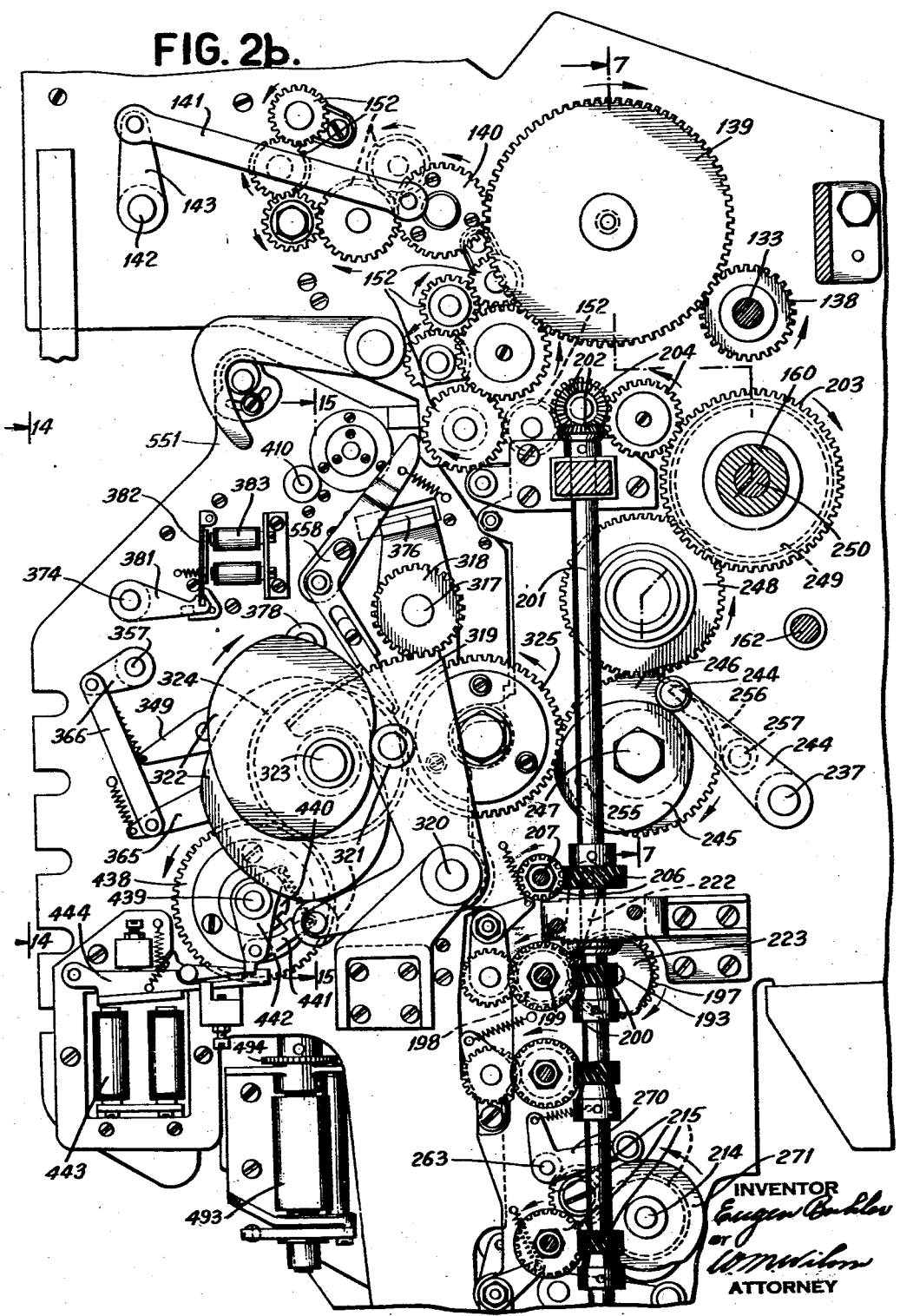

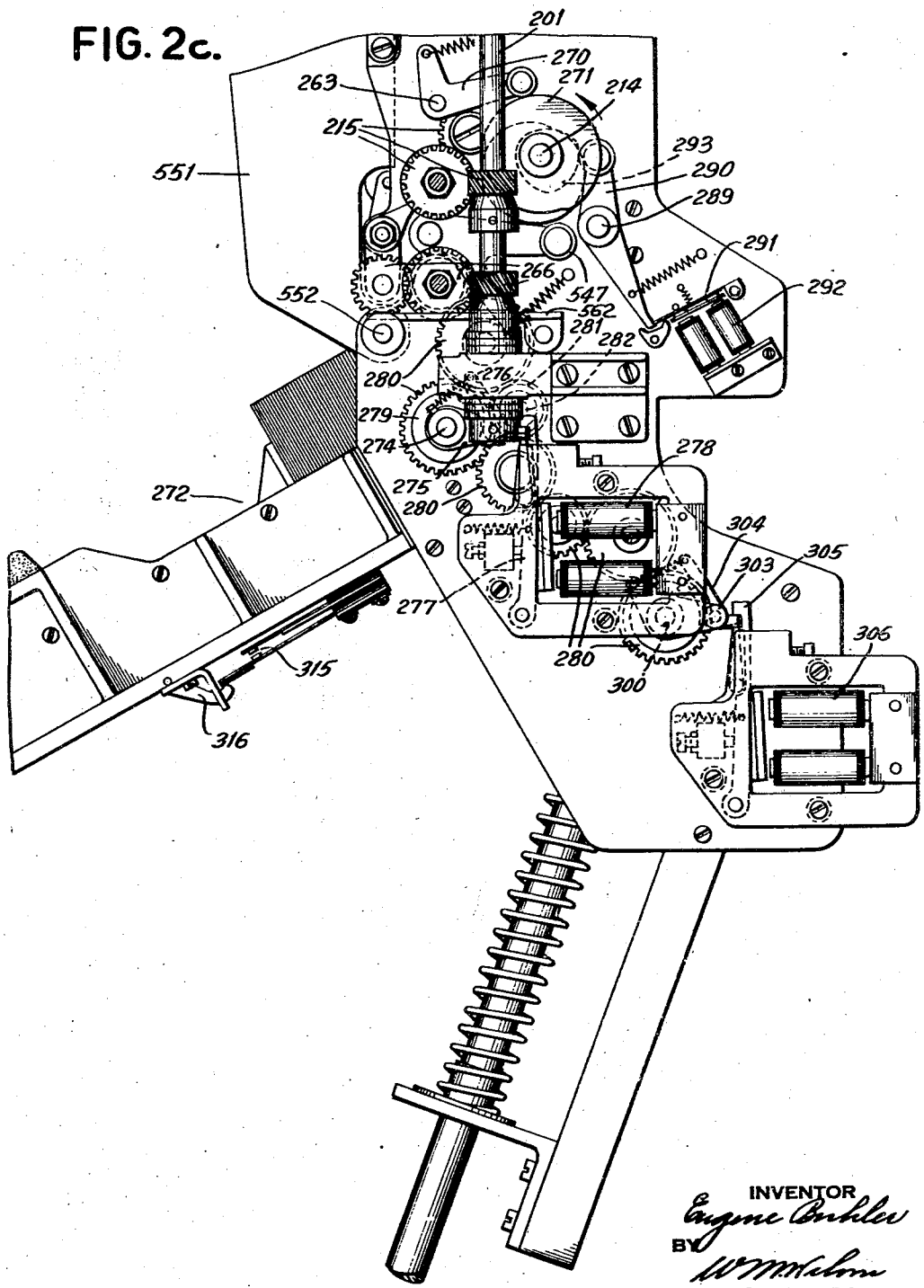

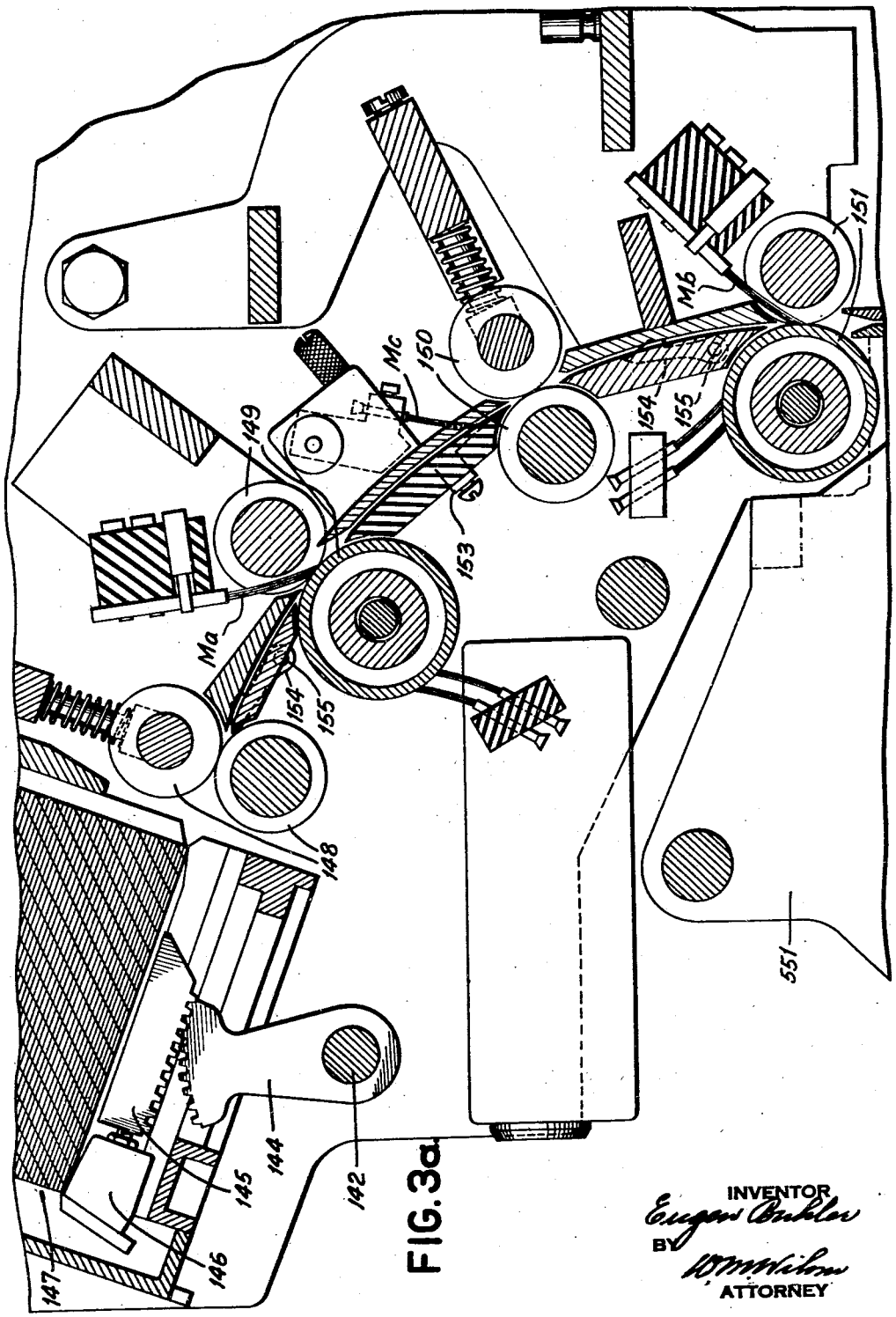

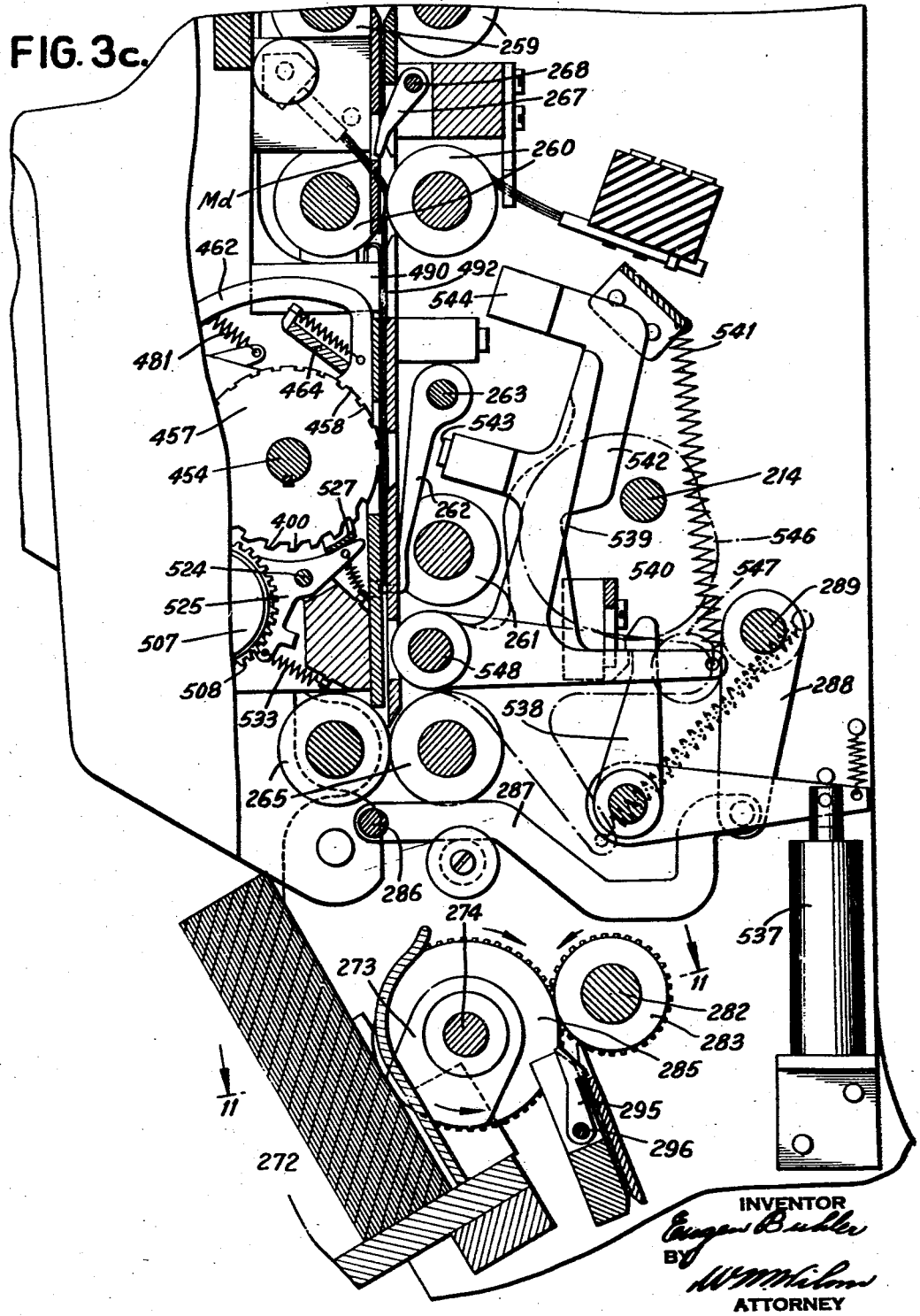

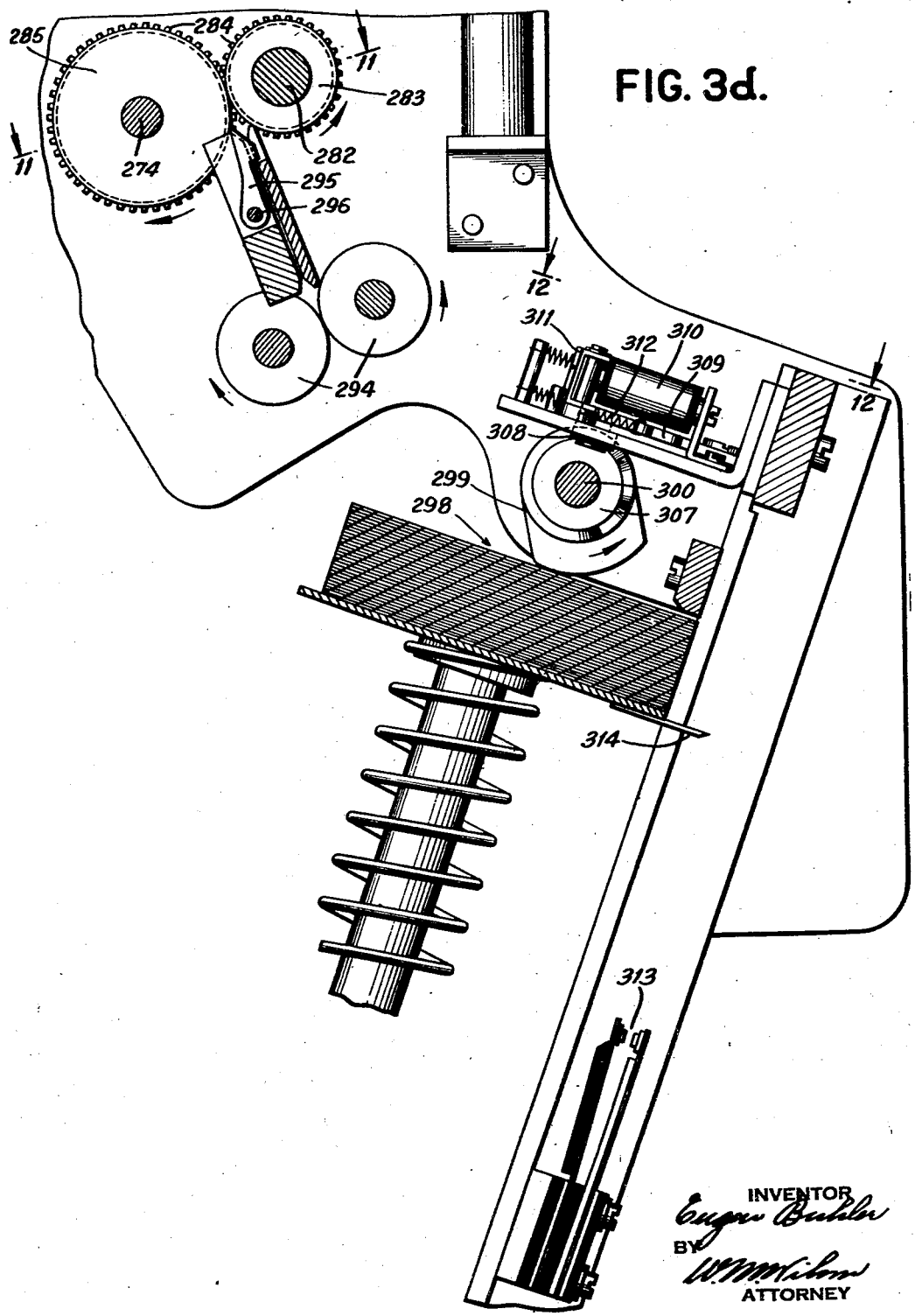

July 15, 1947.  E. BUHLER  2,424,076
ALPHABETIC INTERPRETER
Filed Dec. 27, 1943  62 Sheets-Sheet 13

July 15, 1947.  E. BUHLER  2,424,076
ALPHABETIC INTERPRETER
Filed Dec. 27, 1943  62 Sheets-Sheet 15
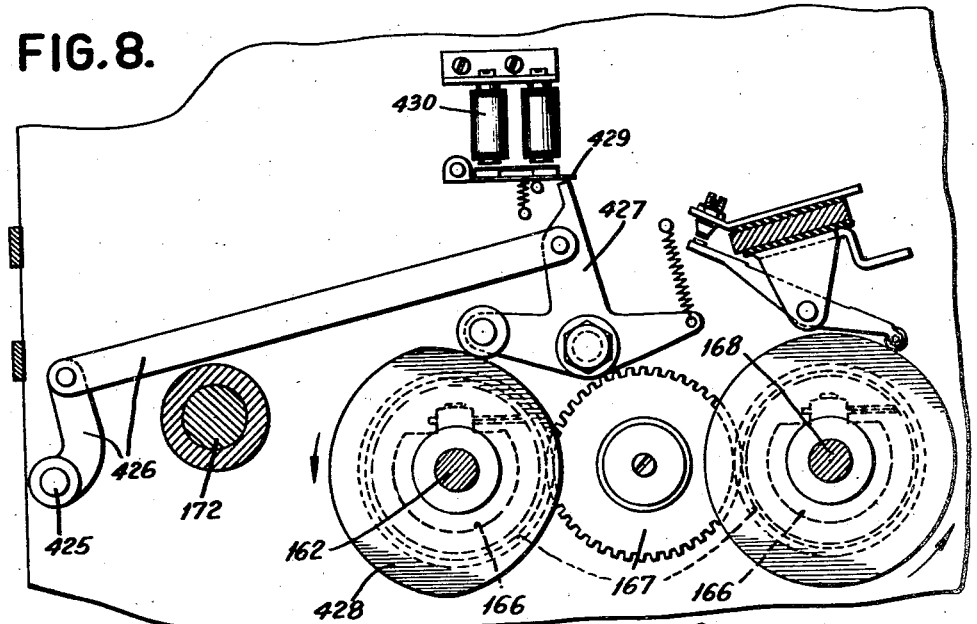
FIG. 8.
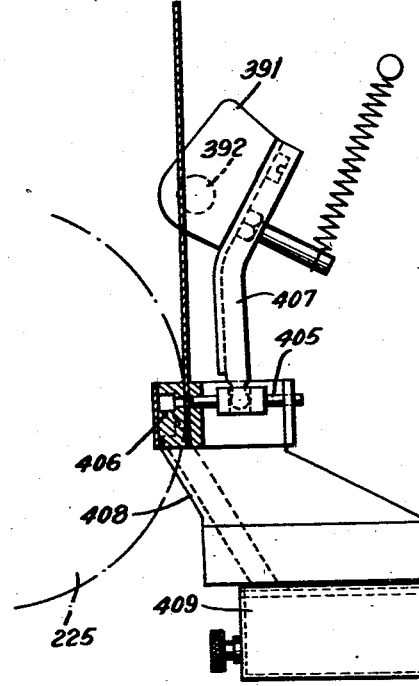
FIG. 9.
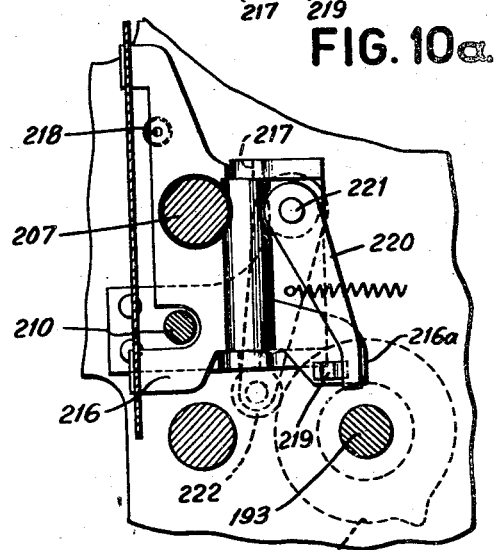
FIG. 10a.
FIG. 10.

July 15, 1947.  E. BUHLER  2,424,076
ALPHABETIC INTERPRETER
Filed Dec. 27, 1943   62 Sheets-Sheet 16
FIG. 12.
FIG. 11.
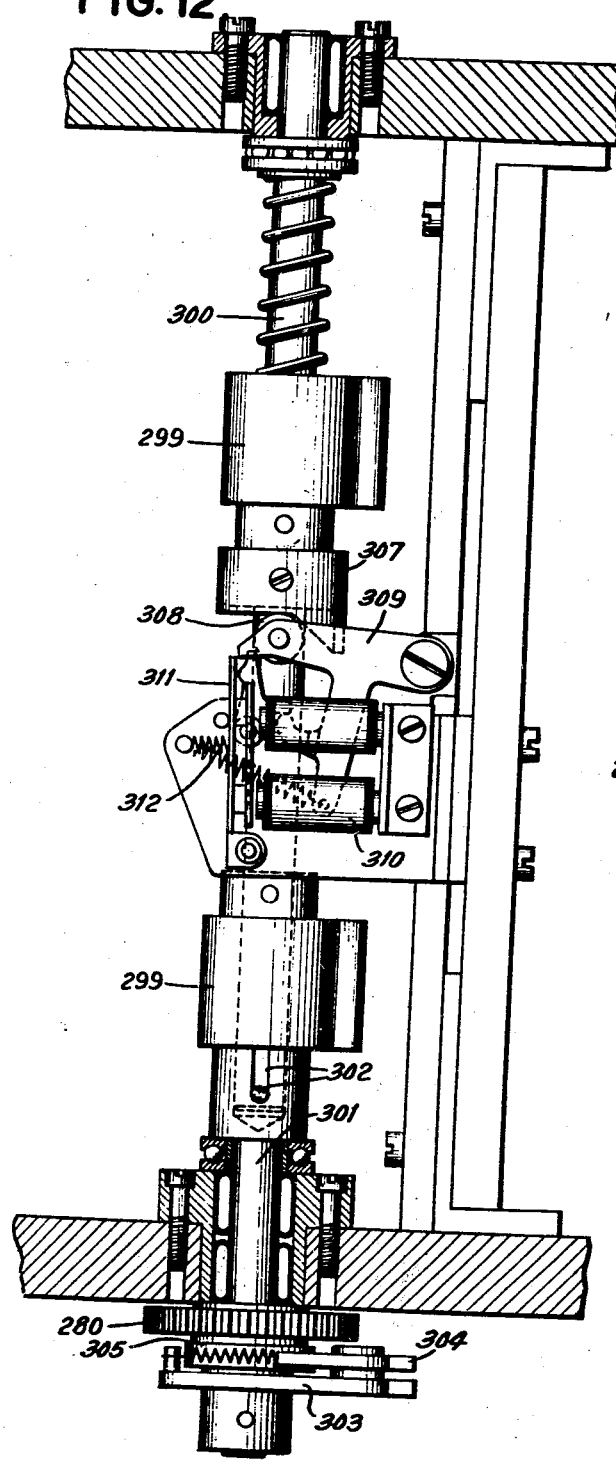
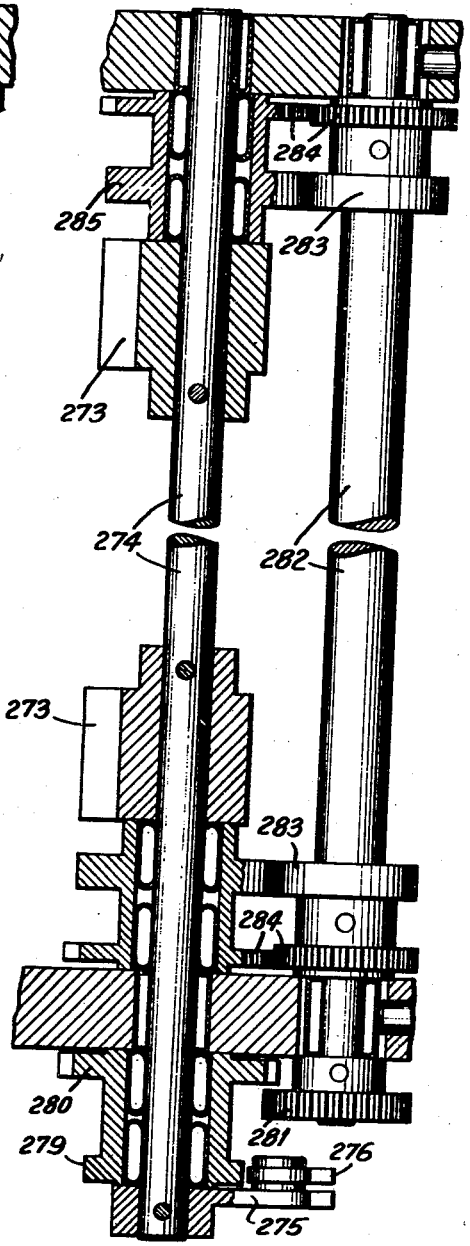
INVENTOR
Eugene Buhler
BY
ATTORNEY July 15, 1947.   E. BUHLER   2,424,076
ALPHABETIC INTERPRETER
Filed Dec. 27, 1943   62 Sheets-Sheet 21

INVENTOR
Eugen Buhler
ATTORNEY

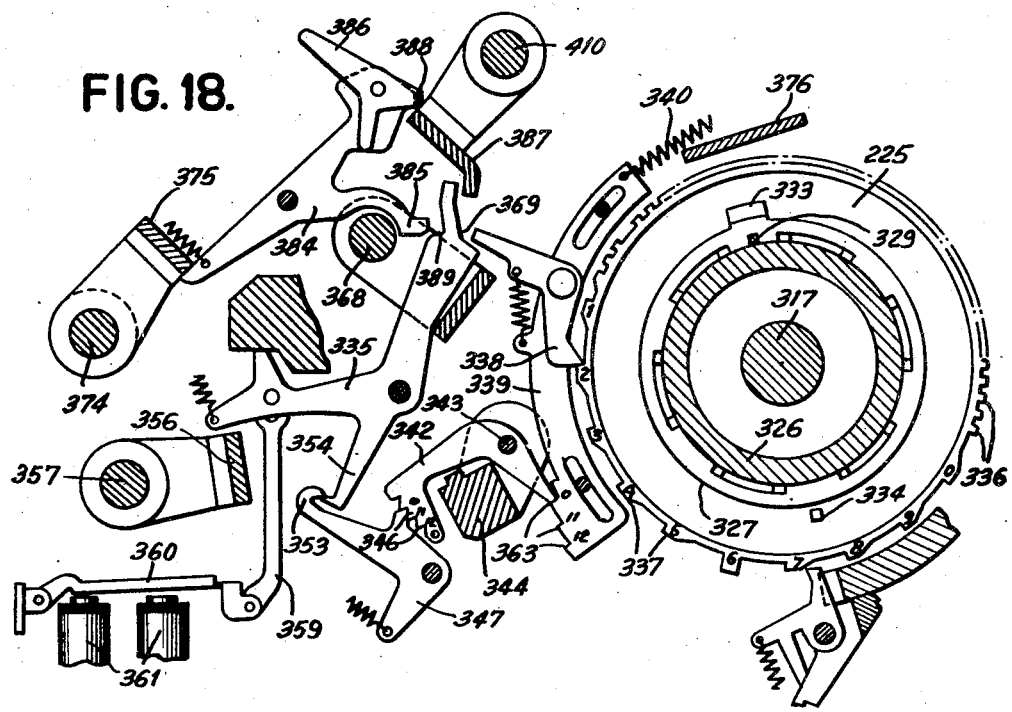
FIG. 18.
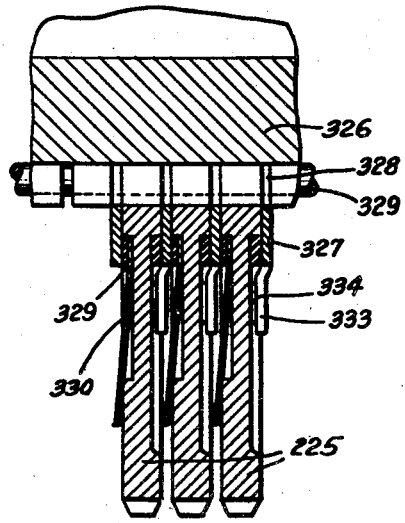
FIG. 19.
FIG. 19a.
| | | CENTER | CENTER | CENTER | DOWN | | CENTER | CENTER |
|---|---|---|---|---|---|---|---|---|
| 386— | UP | UP | | | | | | |
| 5 | 4 | 6 | 0 | 0 | 0 | | 7 | 0 |
| | | | 3 | 2 | 0 | | | 4 |
| | 8 | | | | 9 | | 1 0 | |

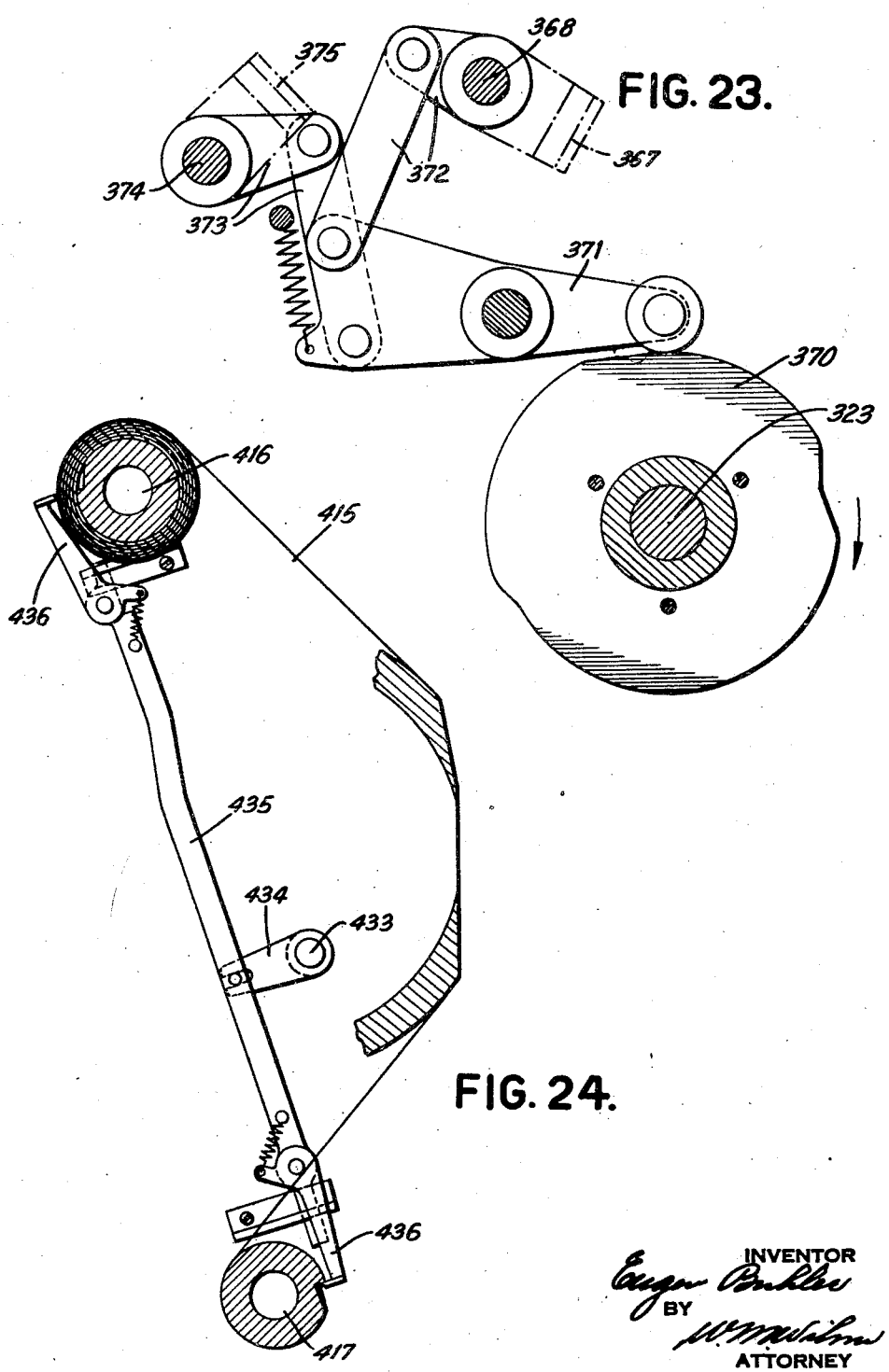

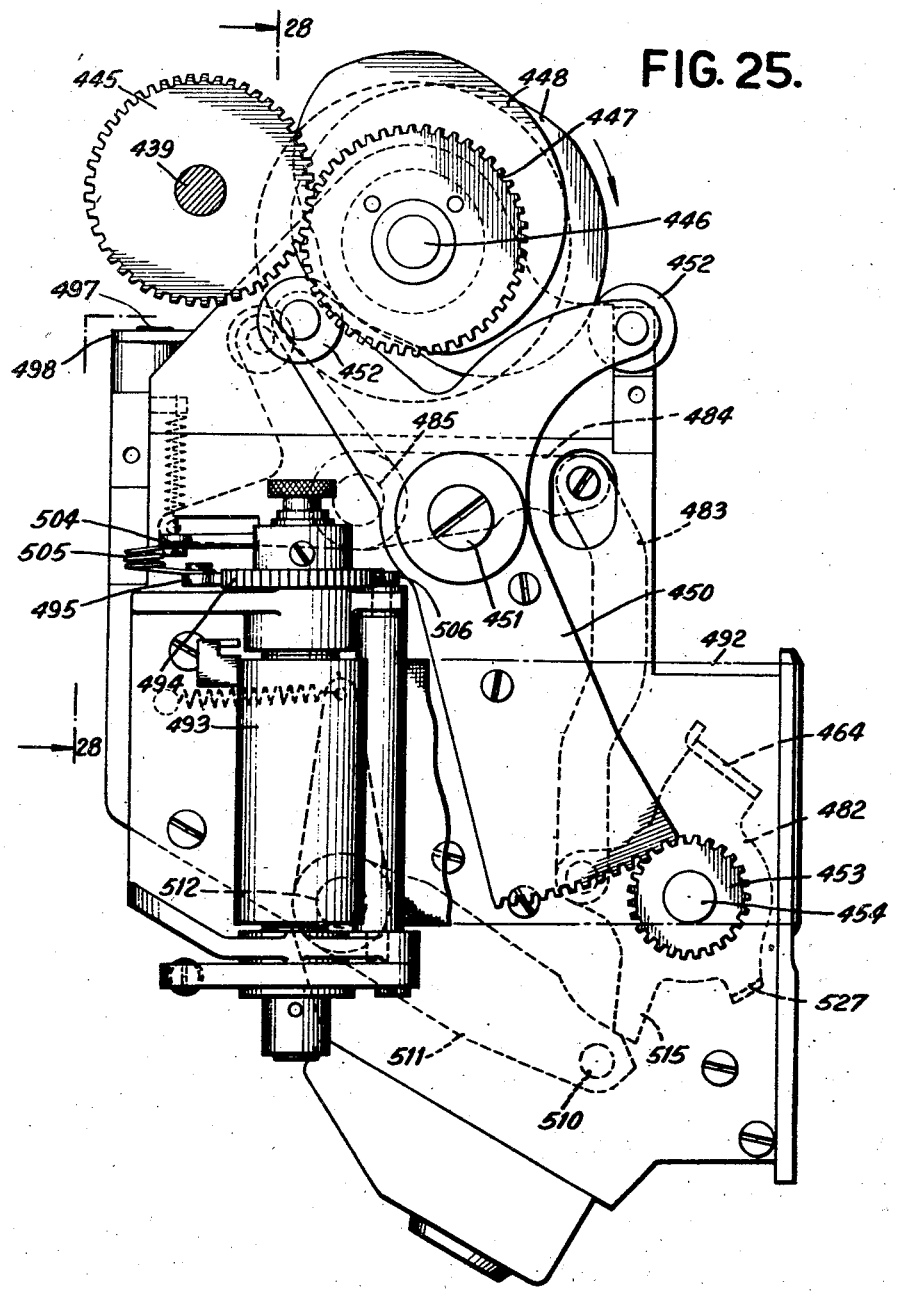

July 15, 1947. E. BUHLER 2,424,076
ALPHABETIC INTERPRETER
Filed Dec. 27, 1943 62 Sheets-Sheet 26

INVENTOR.
Eugen Buhler
BY
ATTORNEY.

July 15, 1947.    E. BUHLER    2,424,076
ALPHABETIC INTERPRETER
Filed Dec. 27, 1943    62 Sheets-Sheet 28

INVENTOR
Eugen Buhler
BY
ATTORNEY

July 15, 1947.  E. BUHLER  2,424,076
ALPHABETIC INTERPRETER
Filed Dec. 27, 1943  62 Sheets-Sheet 30
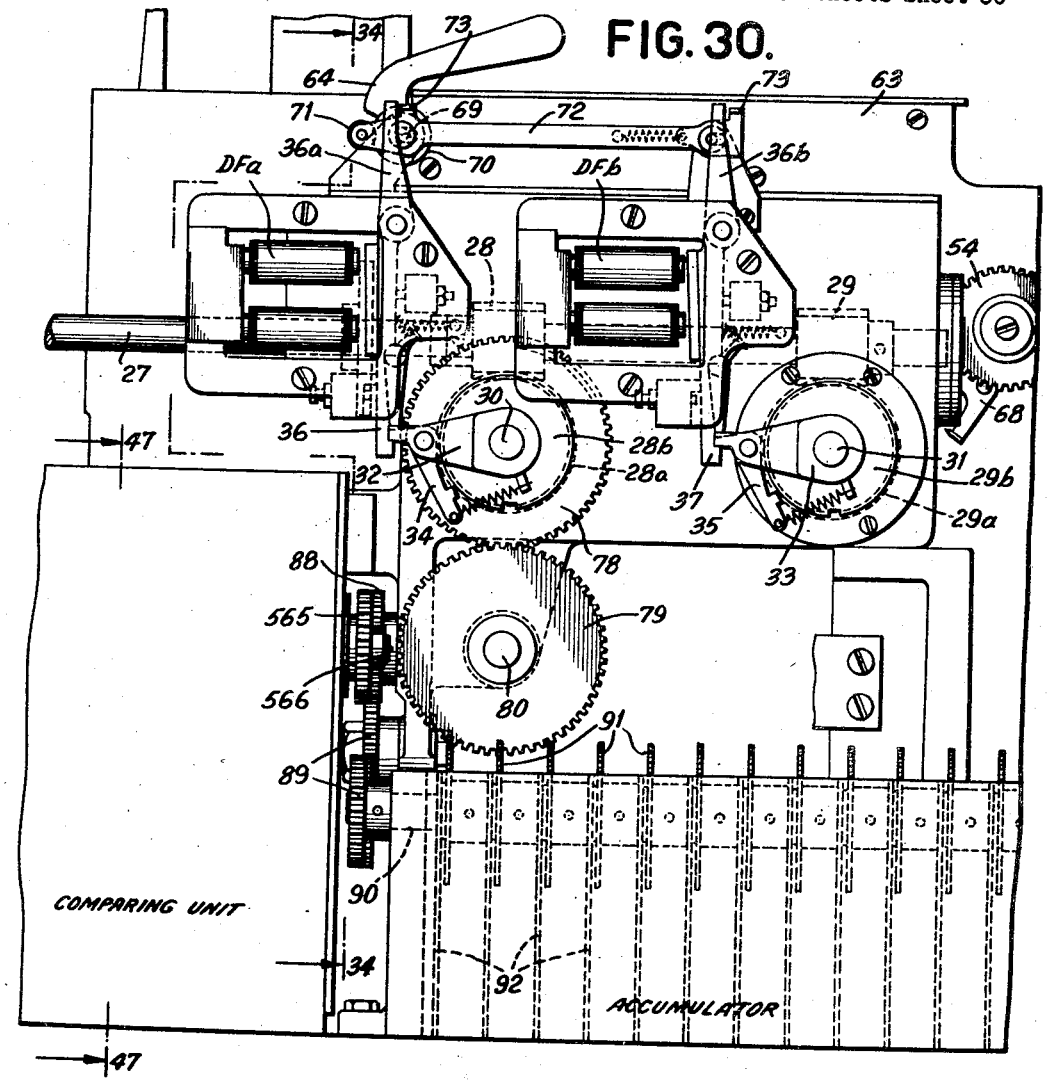
FIG. 30.
FIG. 31.
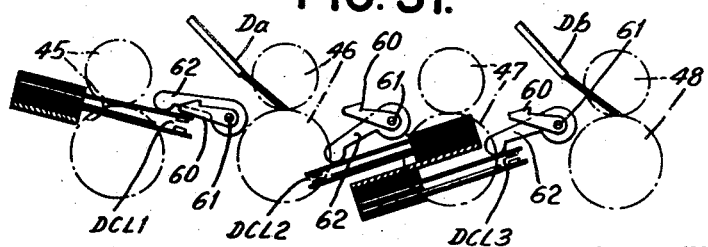
INVENTOR
Eugen Buhler
BY
ATTORNEY July 15, 1947.  E. BUHLER  2,424,076
ALPHABETIC INTERPRETER
Filed Dec. 27, 1943  62 Sheets-Sheet 31

INVENTOR
Eugene Buhler
BY
ATTORNEY

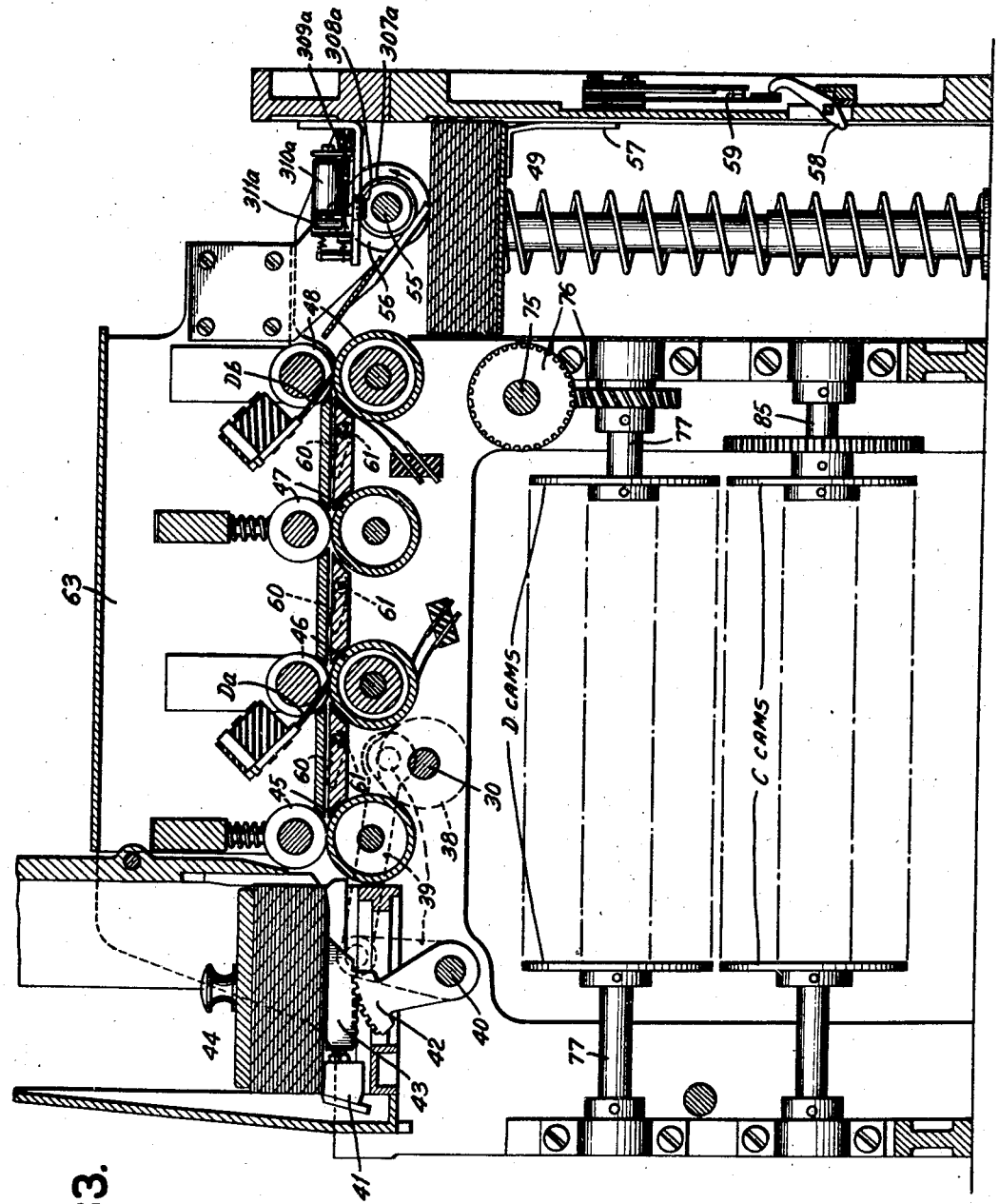

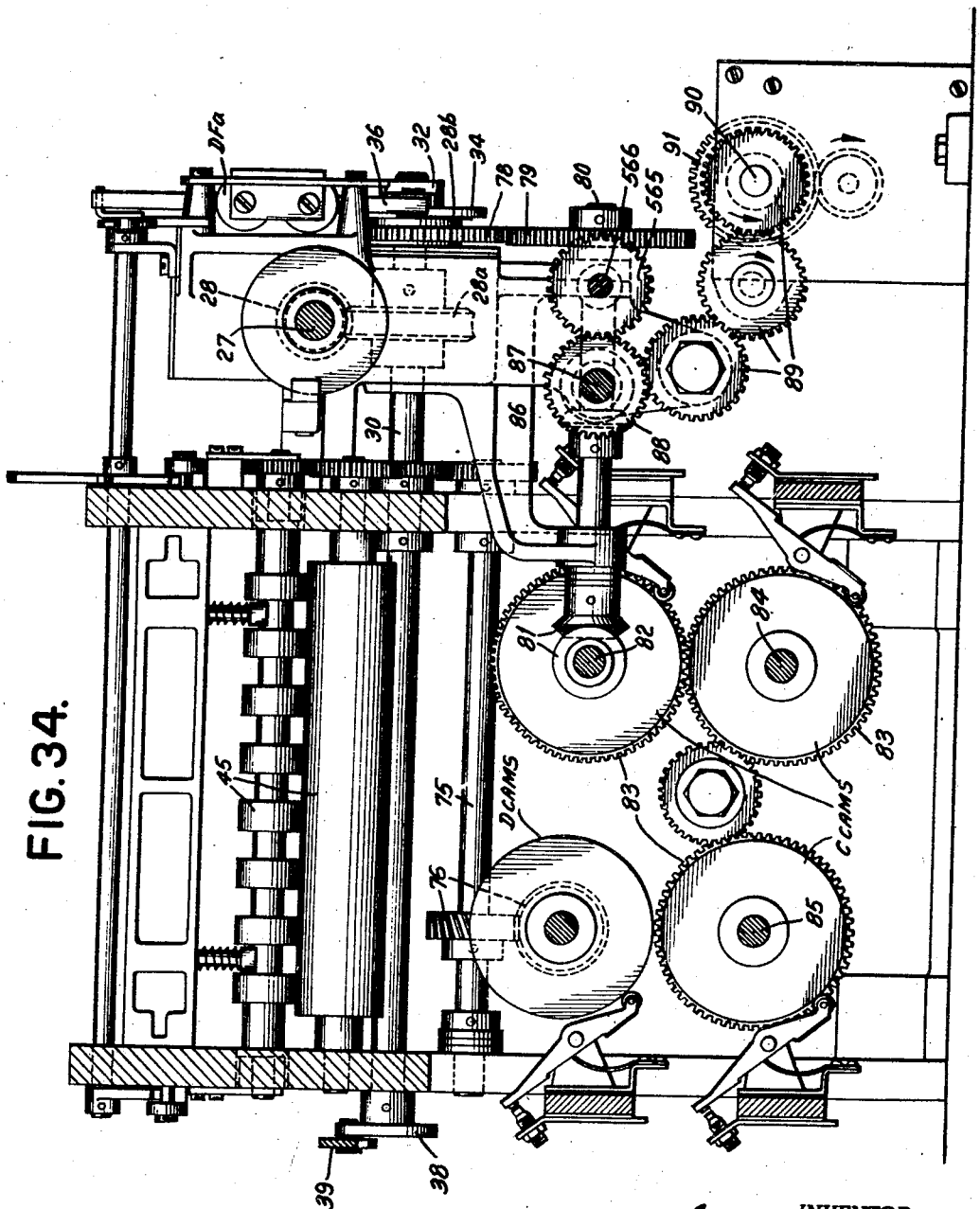

July 15, 1947.  E. BUHLER  2,424,076
ALPHABETIC INTERPRETER
Filed Dec. 27, 1943  62 Sheets-Sheet 34
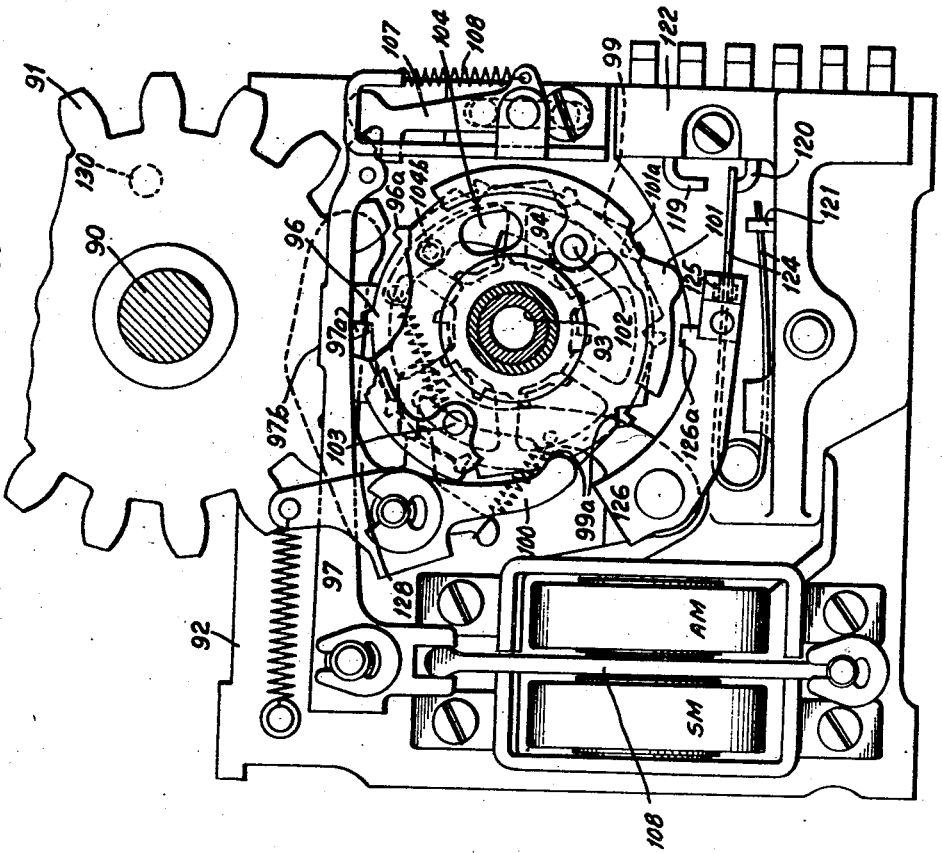
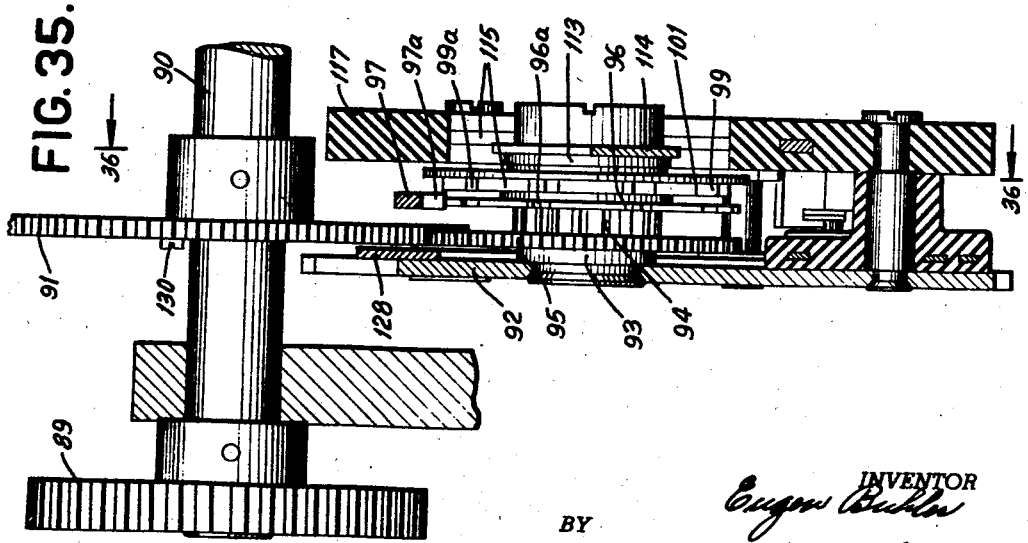
INVENTOR
Eugen Buhler
BY
ATTORNEY July 15, 1947.     E. BUHLER     2,424,076
ALPHABETIC INTERPRETER
Filed Dec. 27, 1943     62 Sheets-Sheet 35

INVENTOR
Edgar Buhler
BY
ATTORNEY

July 15, 1947.  E. BUHLER  2,424,076
ALPHABETIC INTERPRETER
Filed Dec. 27, 1943  62 Sheets-Sheet 37

July 15, 1947.  E. BUHLER  2,424,076
ALPHABETIC INTERPRETER
Filed Dec. 27, 1943  62 Sheets-Sheet 38

INVENTOR
Eugen Buhler
BY
ATTORNEY

FIG. 45.

July 15, 1947.  E. BUHLER  2,424,076
ALPHABETIC INTERPRETER
Filed Dec. 27, 1943   62 Sheets-Sheet 42

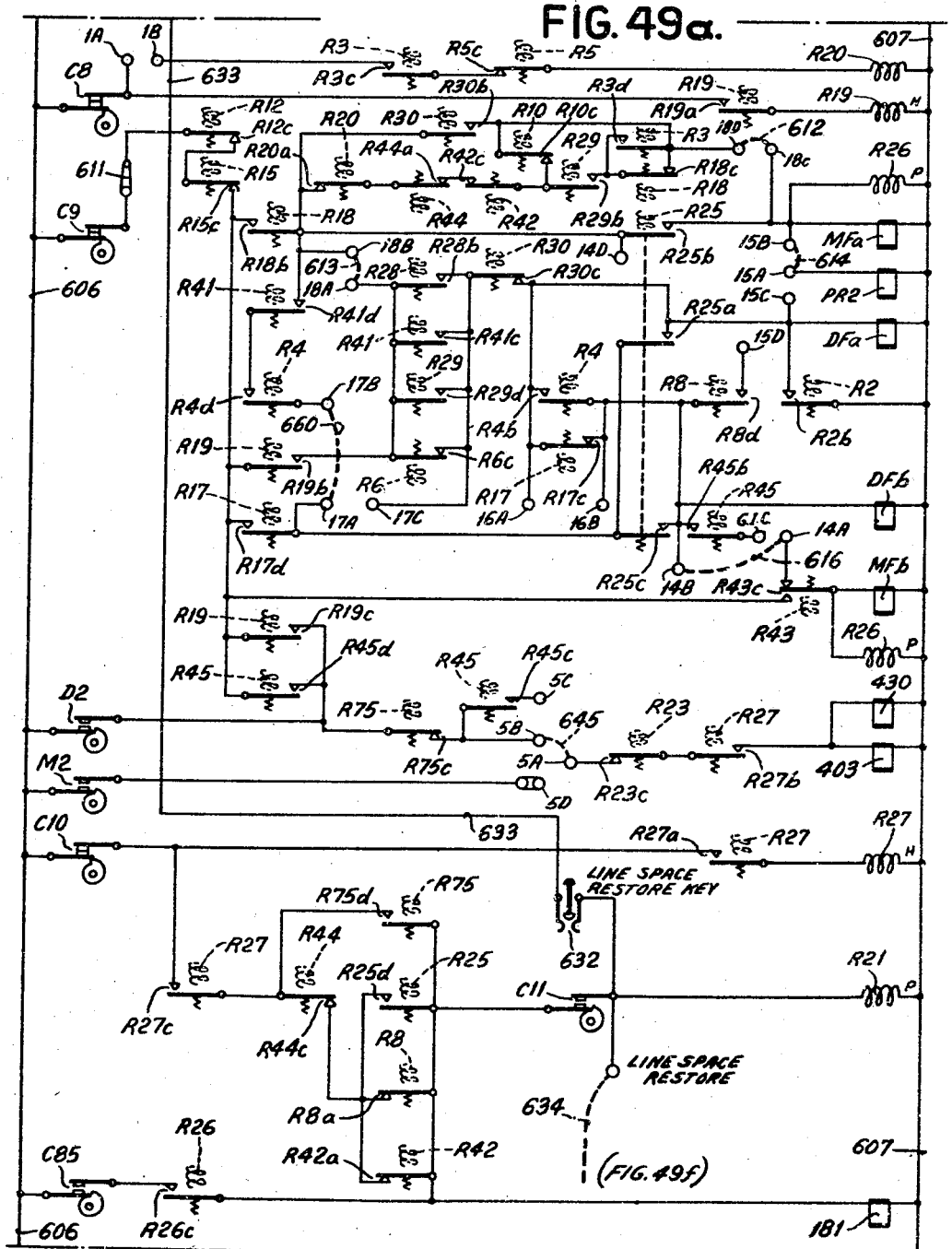

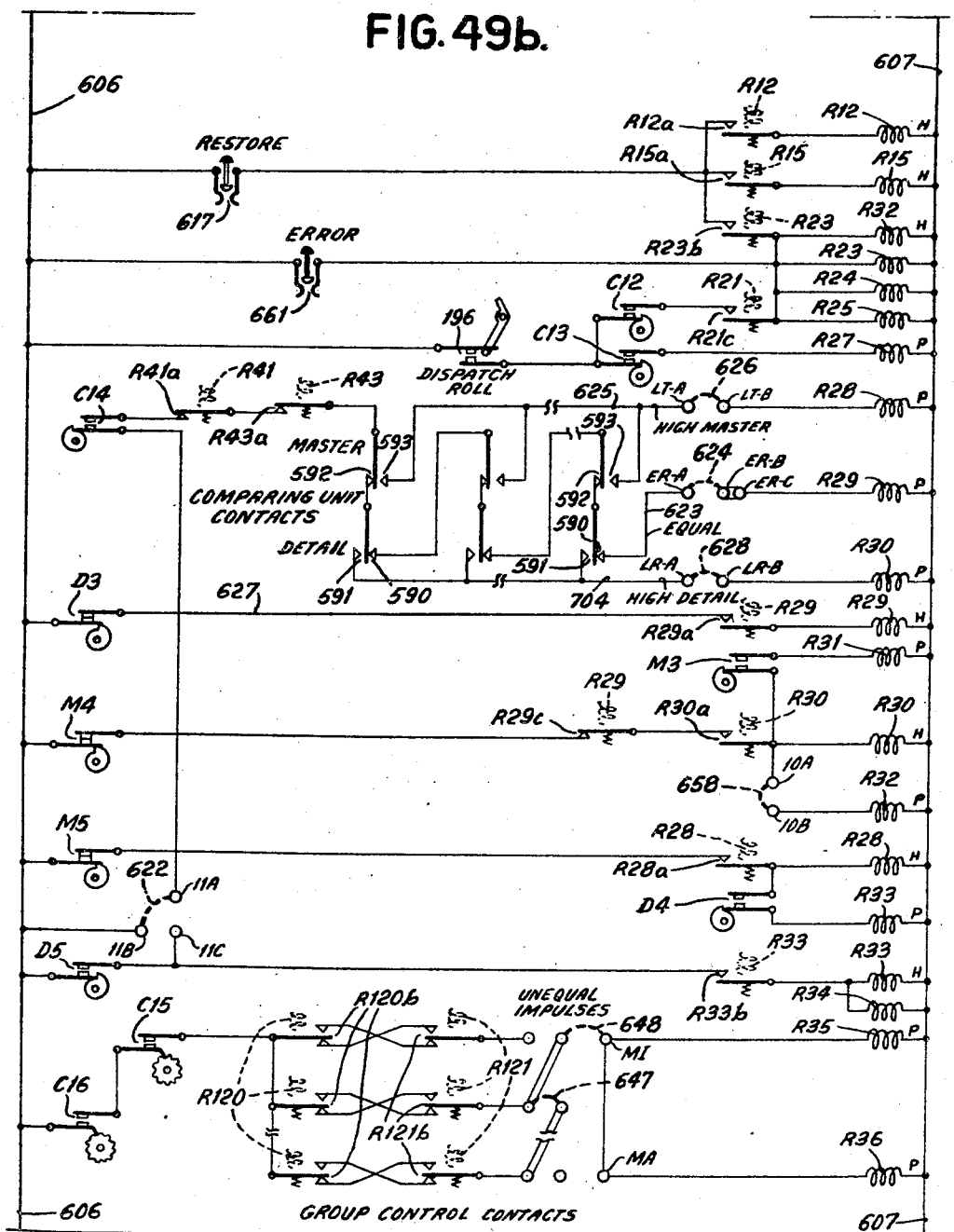

July 15, 1947.     E. BUHLER     2,424,076

ALPHABETIC INTERPRETER

Filed Dec. 27, 1943     62 Sheets-Sheet 48

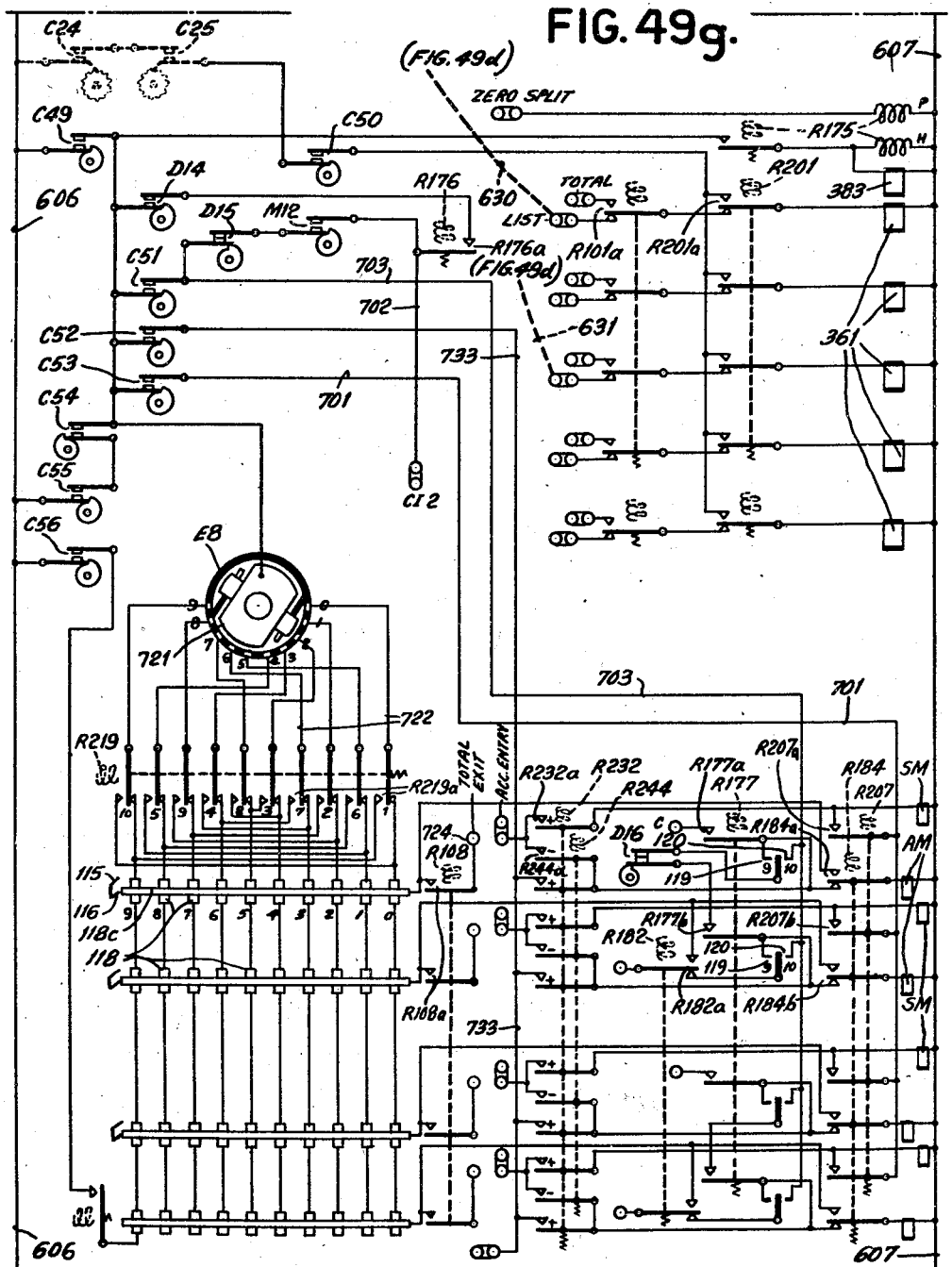

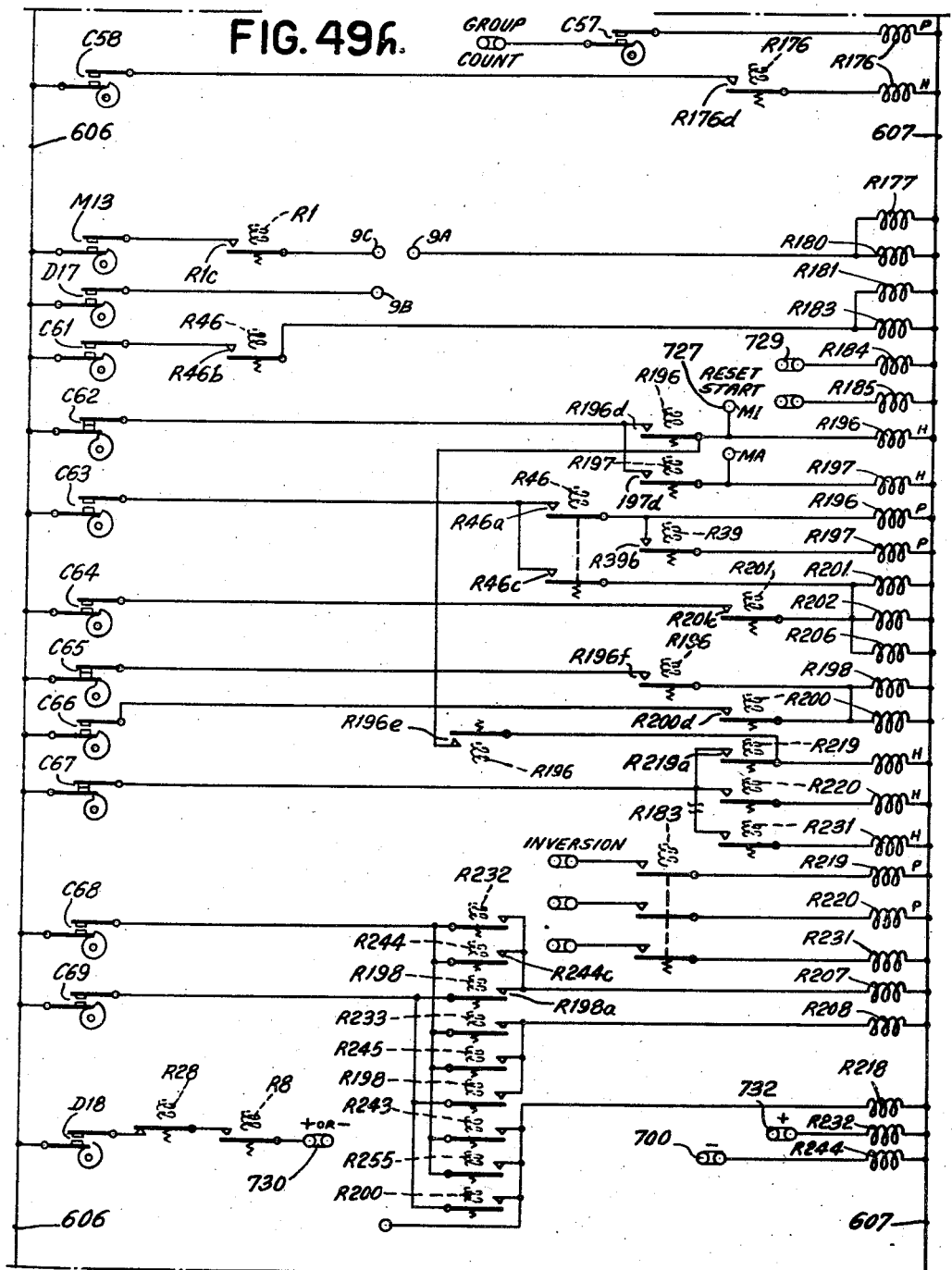

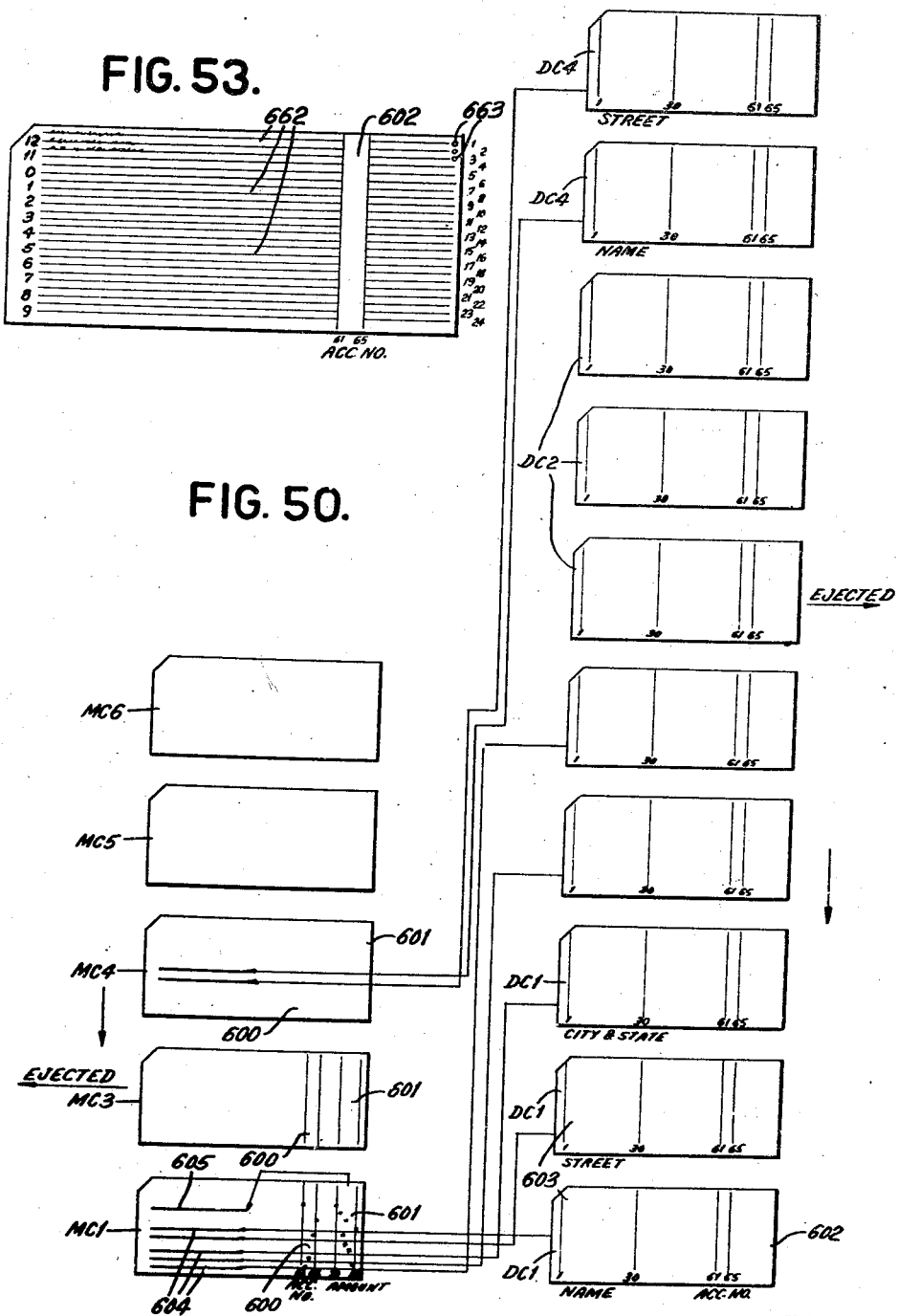

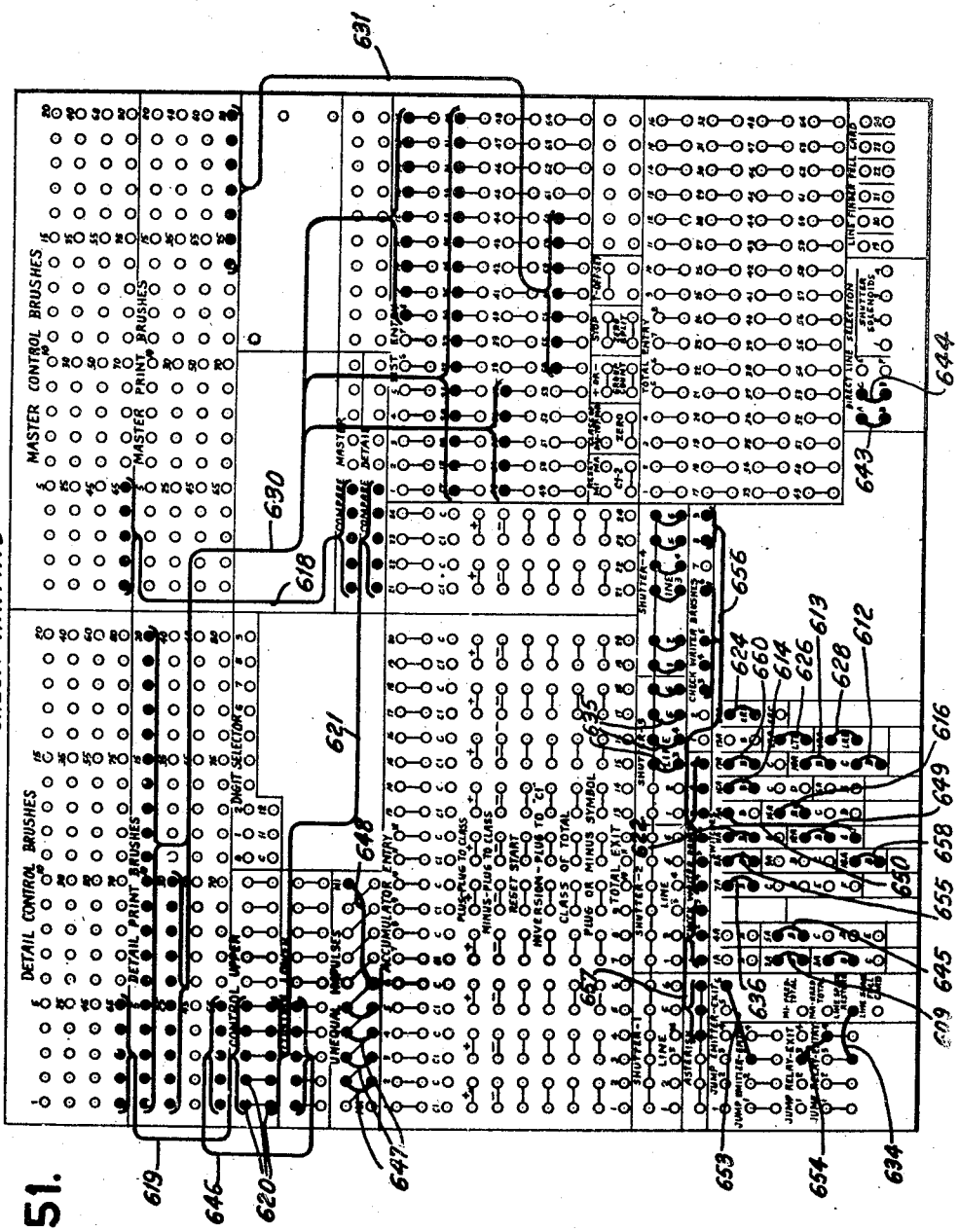

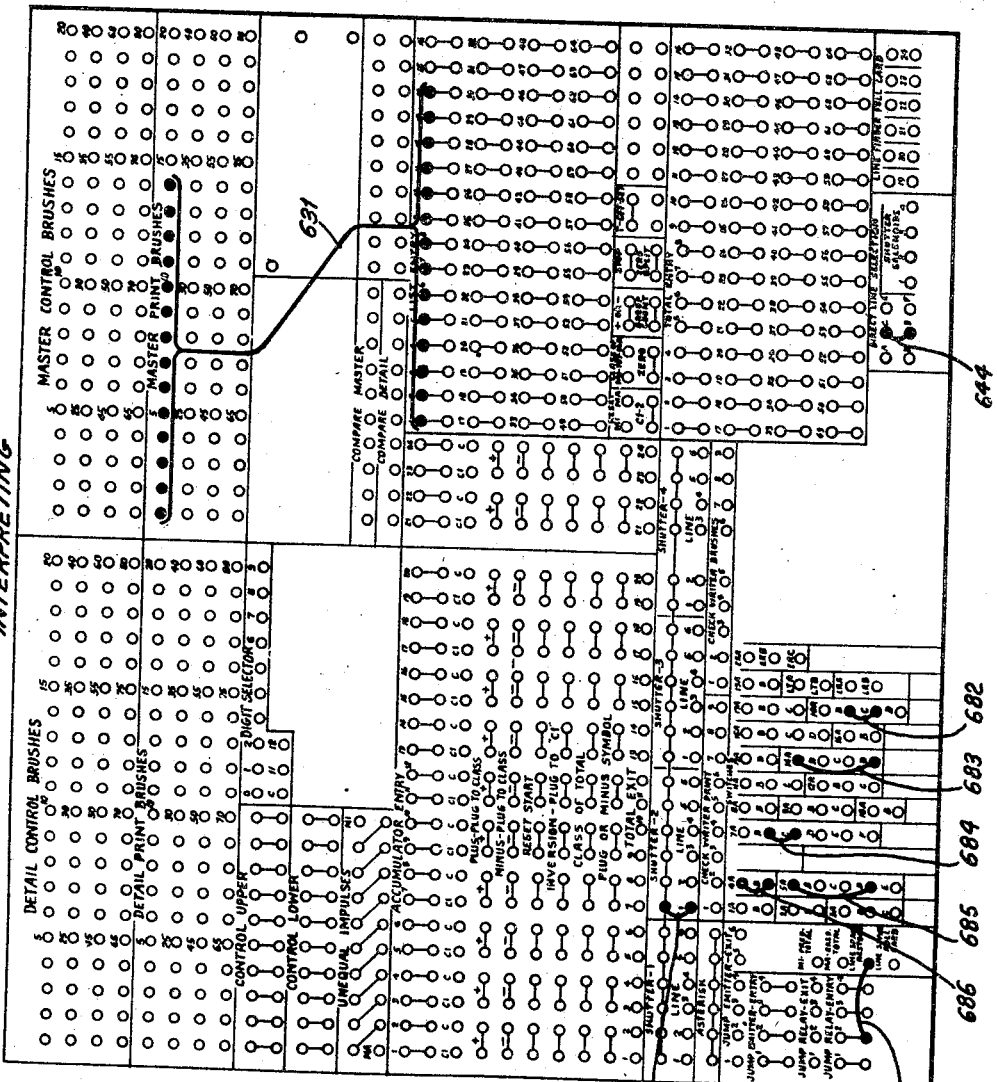

Patented July 15, 1947

2,424,076

UNITED STATES PATENT OFFICE 2,424,076

ALPHABETIC INTERPRETER

Eugen Buhler, Cedar Grove, N. J., assignor to International Business Machines Corporation, New York, N. Y., a corporation of New York Application December 27, 1943, Serial No. 515,720

38 Claims. (Cl. 101—93)

This invention relates to printing machines of the type controlled by perforated record cards and has for its principal object the provision of an improved mechanism for preparing a check upon which is printed requisite data under control of perforations present in the check itself and in supplemental detail cards, to form a negotiable instrument.

To this end there is provided a check feeding and sensing mechanism through which preperforated checks are fed singly to an alphabetic printing device and then to a numerical printing device. A second detail card feeding and sensing mechanism is provided through which detail cards containing perforated name and address data are fed singly. These detail cards effect an adjustment of the alphabet printing device to print the name and address on the check, and at the same time account number data is sensed in the check, and another part of the alphabetic printing device is controlled to print such data on the check. Provision is made for effecting a comparison between the check and the detail cards, so that such printing will occur only where there is an agreement in the account number designations on the two types of cards.

The location of the first line of the check to receive printing is preset, so that printing from the first agreeing detail card occurs on such line and thereafter the check is stepped to present successive lines, one for each subsequently agreeing detail card, with the number of such detail cards determining the number of address lines printed.

It is accordingly a more specific object of the invention to provide novel line finding and advancing mechanism for presenting a record to a recording mechanism wherein a first line may be preselected and subsequent lines automatically presented.

A further object is to provide a novel alphabetic printing device in which oscillating type wheels are differentially positioned to print any desired data.

Provision is made for automatically advancing the check to the numerical printing device when all related detail cards have effected alphabetic printing. The numerical printing device is adjusted under control of perforations in the check for printing the money value on a further line and concurrently with such printing a signature plate and preset dating devices are operated to sign the check and print a data thereon. Thereafter, the check is advanced to a discharge hopper.

A further object resides in the provision of improved numerical printing devices in which novel mechanism is provided for printing asterisks to the left of the highest order significant figure. A further feature resides in the provision of an accumulator coupled to the numeral printing device and operable to display a running or accumulative total of the several amounts printed on the checks that are issued by the machine.

A still further object resides in the provision of devices for comparing a check with the first of a group of detail cards and for comparing successive detail cards with one another to determine, first, which of such detail cards are to print on the check, and, secondly, how many are to successively control such printing.

In another use of the machine known as a ledger posting operation, individual ledger or master cards are fed through the check feeding and sensing mechanism and presented to the alphabetic printing devices. These cards are provided with a plurality of printing lines, and it is an object of the invention to provide mechanism for ascertaining the next available line of such cards and present it to the printing device. Detail cards, of which there may be one or more for each master card, are sensed and control the adjustment of the printing device to print on the selected line for the first detail card and on subsequent lines for further detail cards. In this operation, also, the comparing mechanism makes comparison between the master card and the first detail card to determine whether printing is to be effected at all, and makes further comparison between successive detail cards to determine the number of lines of printing to be effected. Each line printed on the master card is accompanied by a line finding perforation or designation made concurrently with the printing on such line, and sensing of any previously made designations controls the line finding mechanism to locate the master card at the next available line.

Another object of the invention is to provide improved devices for ascertaining when the last line on the master card has received printing and to cause such card to be separated from the file of cards. Where it happens that there are present more detail cards than there are available lines on the master card, the master card is ejected when all available lines are utilized, and any remaining detail cards that have not printed on the master card are also ejected.

In a further use of the machine, a single file of cards is fed through the feeding, sensing and alphabetic printing mechanism and the preperforated data on each card is interpreted and printed on a preselected one of any of twenty-four lines of the same card.

A still further operation of the machine provides for sensing a detail card for data representing information to be printed and data representing a quantity. A succession of master cards are also fed through the machine, and for each detail card the information thereon will be repeatedly printed on a succession of master cards equal in number to the quantity on the detail card. An object of the invention, therefore, is the provision of improved devices for setting up printing mechanism for repetition printing and causing the feeding and printing of a succession of cards in accordance with a selected quantity.

A still further object resides in the provision of a mechanism for printing data on a master card under control of a series of detail cards in which each detail card selects the line on the master card upon which printing of the related data is to be effected.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1b is a downward continuation of the mechanism shown in Fig. 1a.

Fig. 1c is a detail taken on line 1c—1c of Fig. 1b.

Fig. 2b is a view similar to Fig. 2a showing the mechanism underlying the devices of Fig. 2a.

Fig. 2c is a downward continuation of the mechanism of Fig. 2b.

Figure 3B:
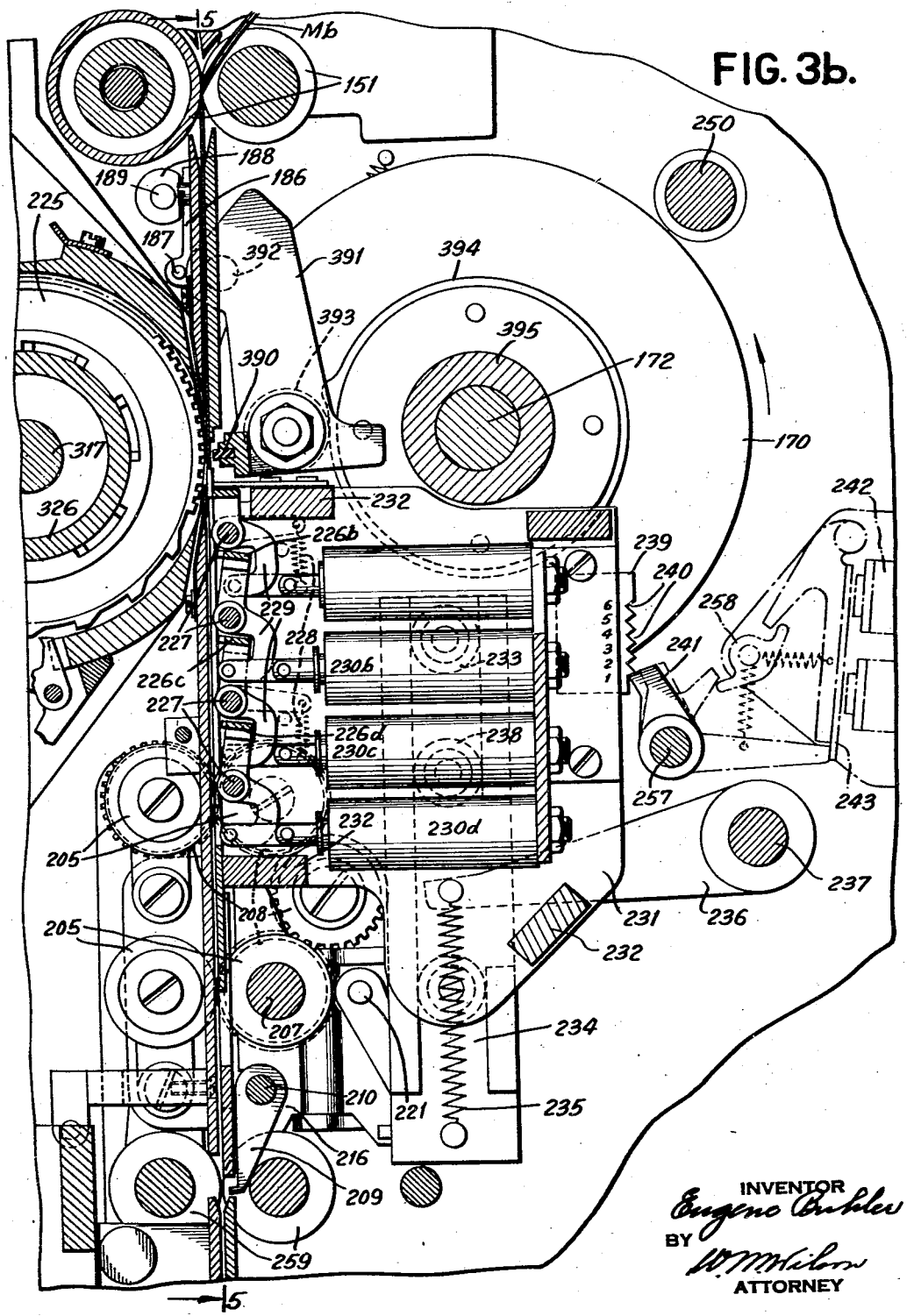

Figs. 3a, 3b, 3c and 3d, arranged vertically in the order named, constitute a central section through the master card feeding mechanism. Fig. 3a shows the card stacker and sensing device, Fig. 3b shows the alphabetic printing mechanism and the card locating device, Fig. 3c shows the check writing device and the normal card discharge hopper, and Fig. 3d shows the auxiliary card stacker.

Figure 4:
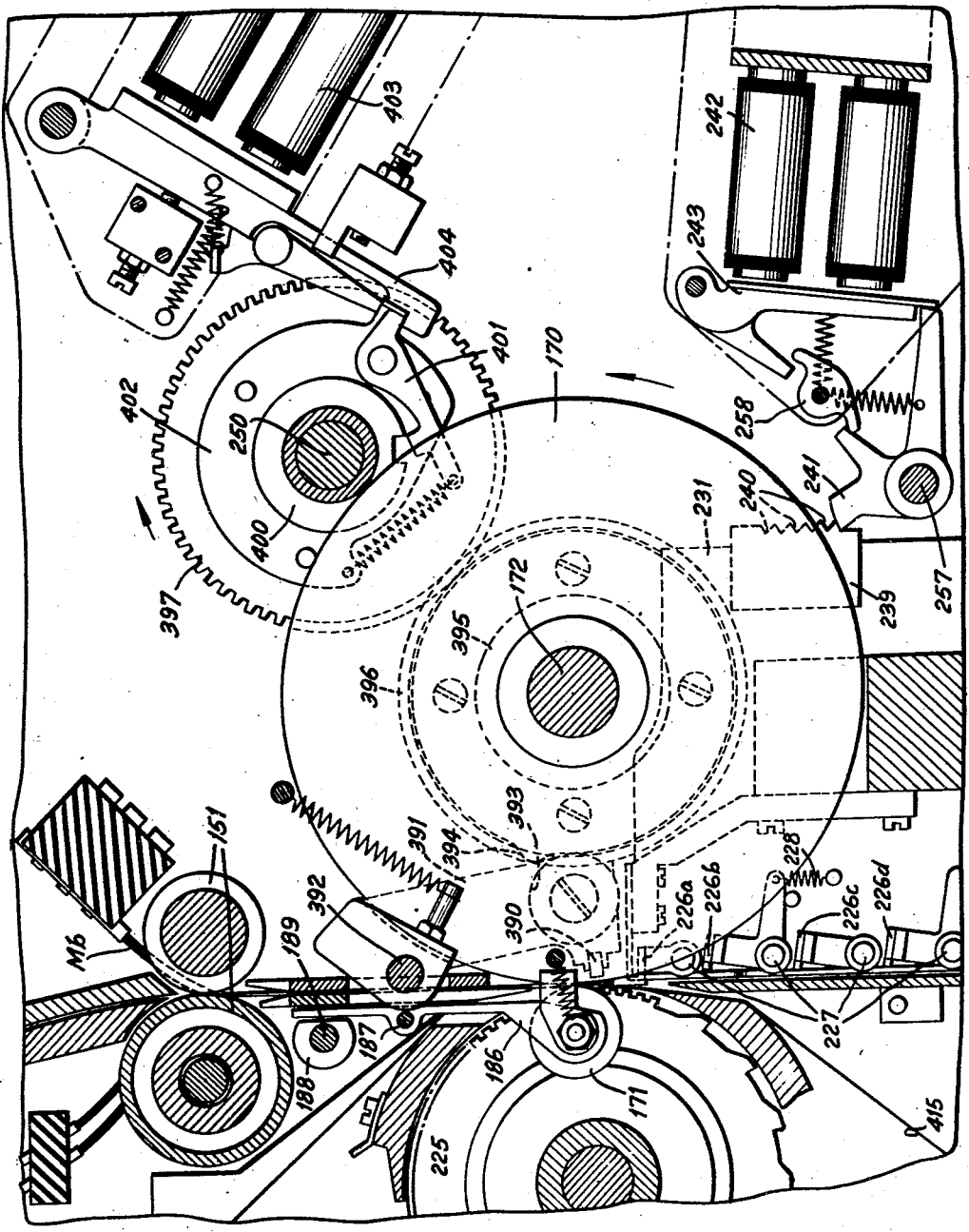

Fig. 4 is a sectional view similar to Fig. 3b taken in a different vertical plane, showing the card dispatch rollers and the clutching mechanism.

Figure 5:
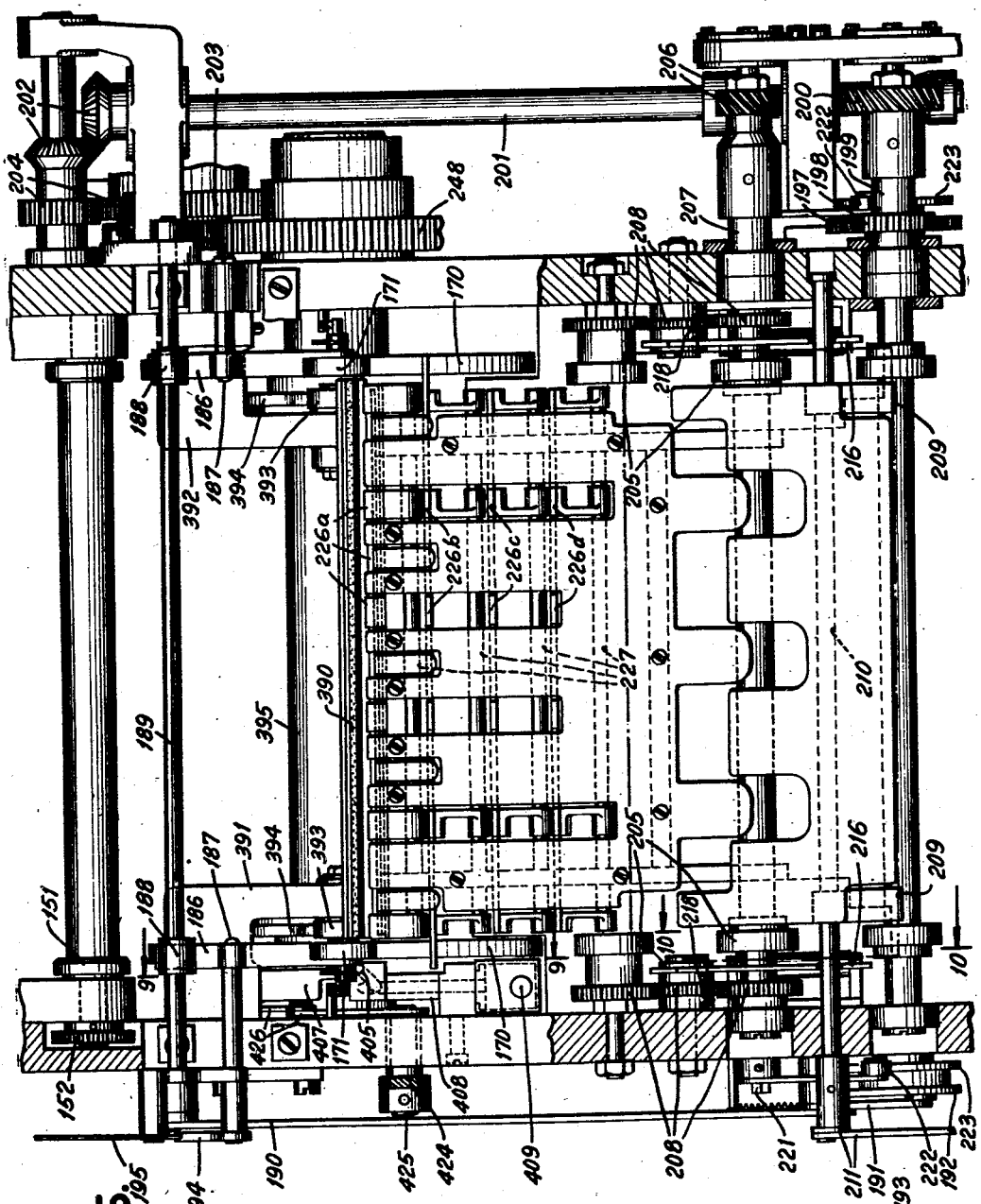

Fig. 5 is a transverse section taken along line 5—5 of Fig. 3b showing the arrangement of the card locating mechanism and printing hammer.

Figure 2A:
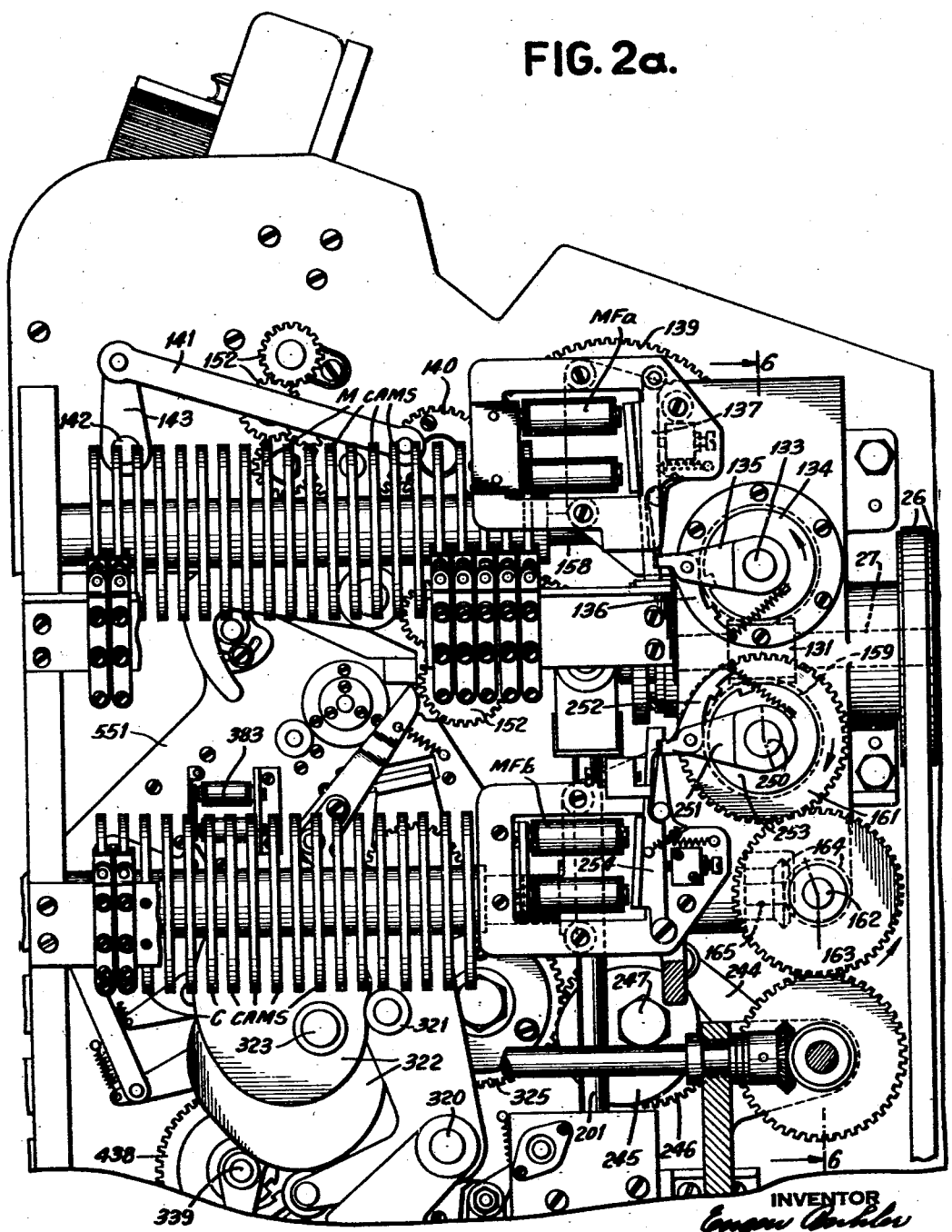
Fig. 2a is an enlarged view of the mechanism shown in the upper left hand part of Fig. 1 and shows the clutching mechanism for the master card feed.
Figure 6:
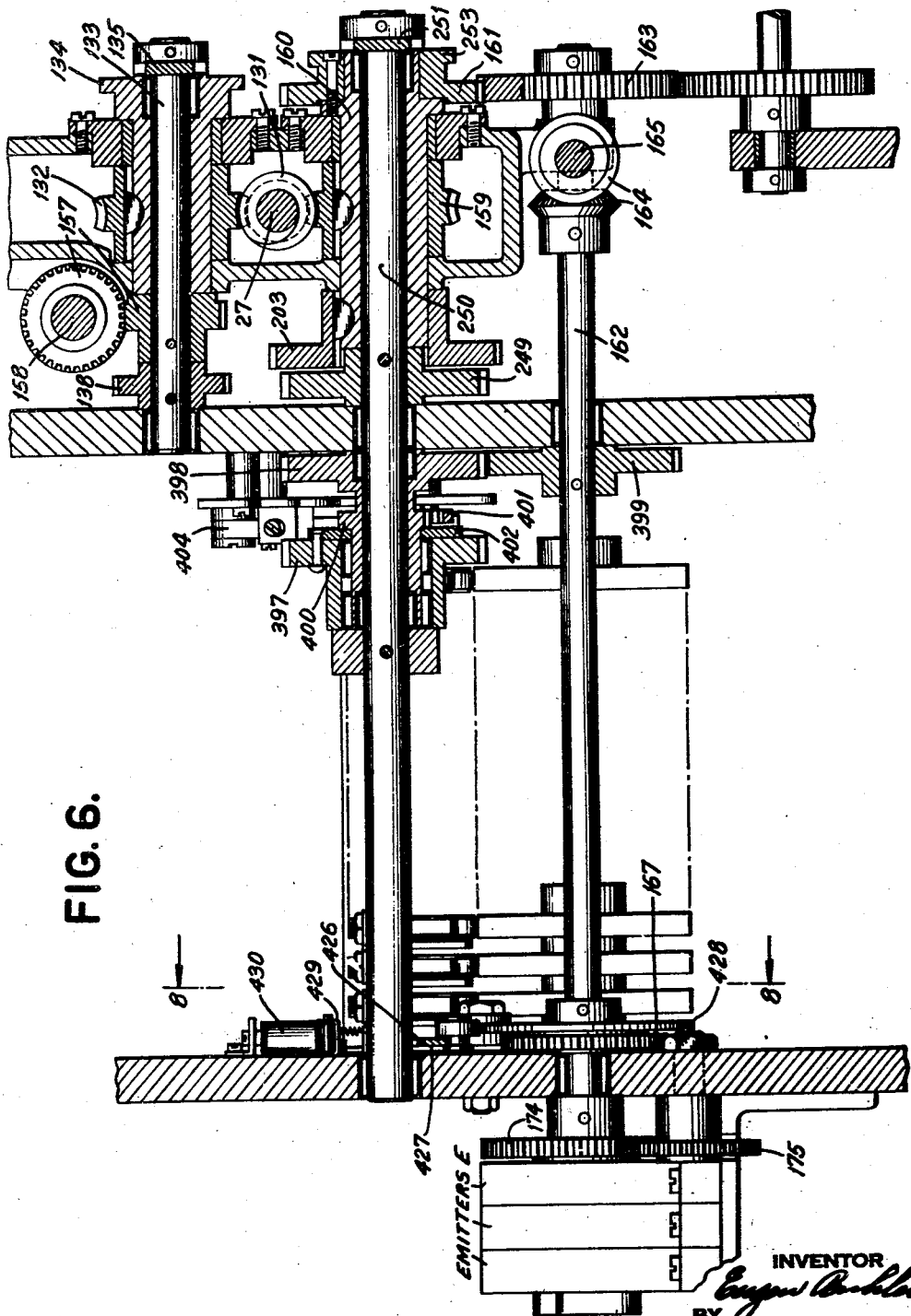

Fig. 6 is a sectional view taken on line 6—6 of Fig. 2a showing the clutch and gear connections of the master card feeding mechanism.

Figure 7:
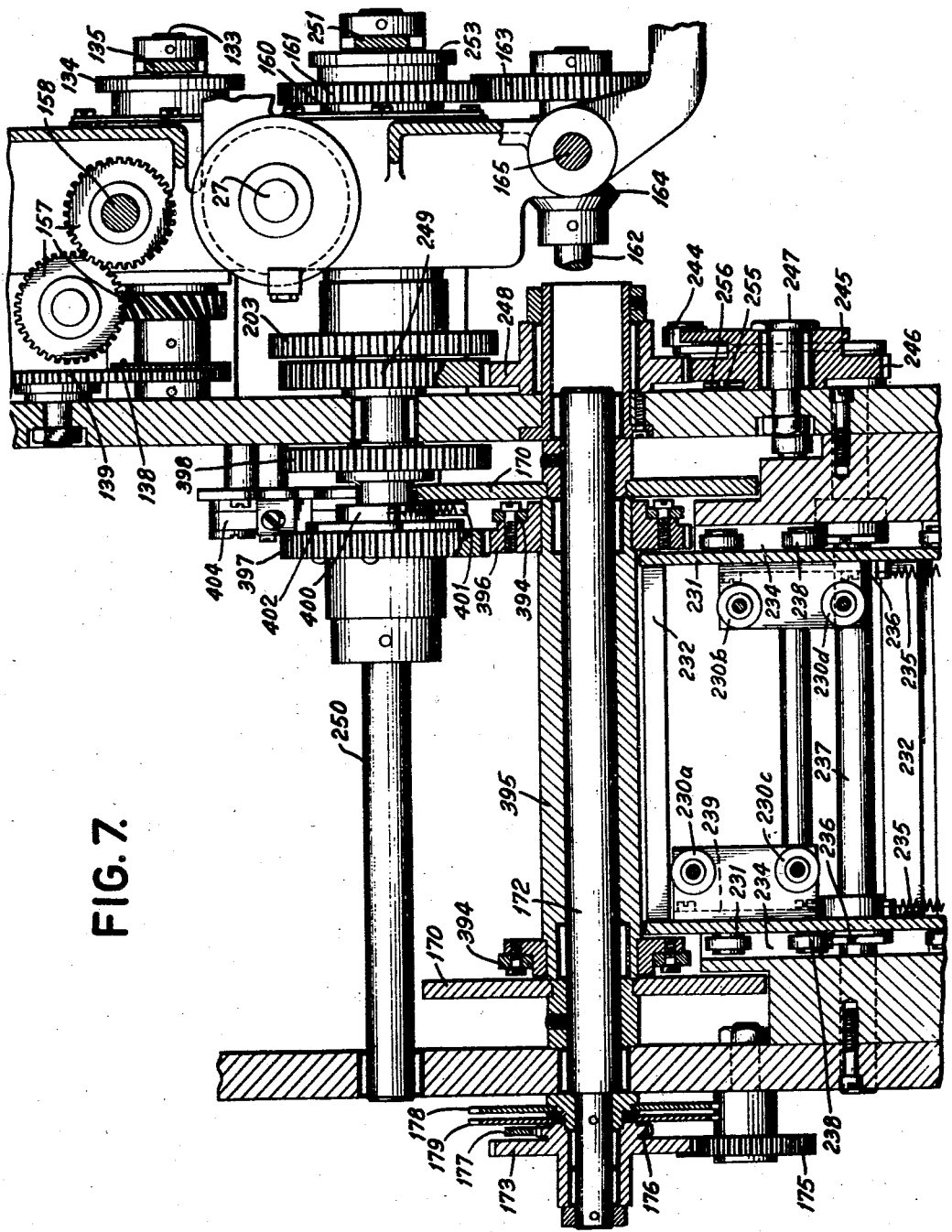

Fig. 7 is a section taken along line 7—7 of Fig. 2b showing further transverse driving connections.

Fig. 8 is a view taken along lines 8—8 of Fig. 6.

Fig. 9 is a detail of the punch operating device, the section being taken along the line 9—9 of Fig. 5.

Fig. 10 is a detail view taken along lines 10—10 of Fig. 5 showing the card aligning devices.

Fig. 10a is a further detail of the device shown in Fig. 10.

Fig. 11 is a transverse section taken on line 11—11 of Figs. 3c and 3d showing the stacker roll mechanism.

Fig. 12 is a view looking in the direction of lines 12—12 of Fig. 3d showing the master card offsetting mechanism.

Figure 13:
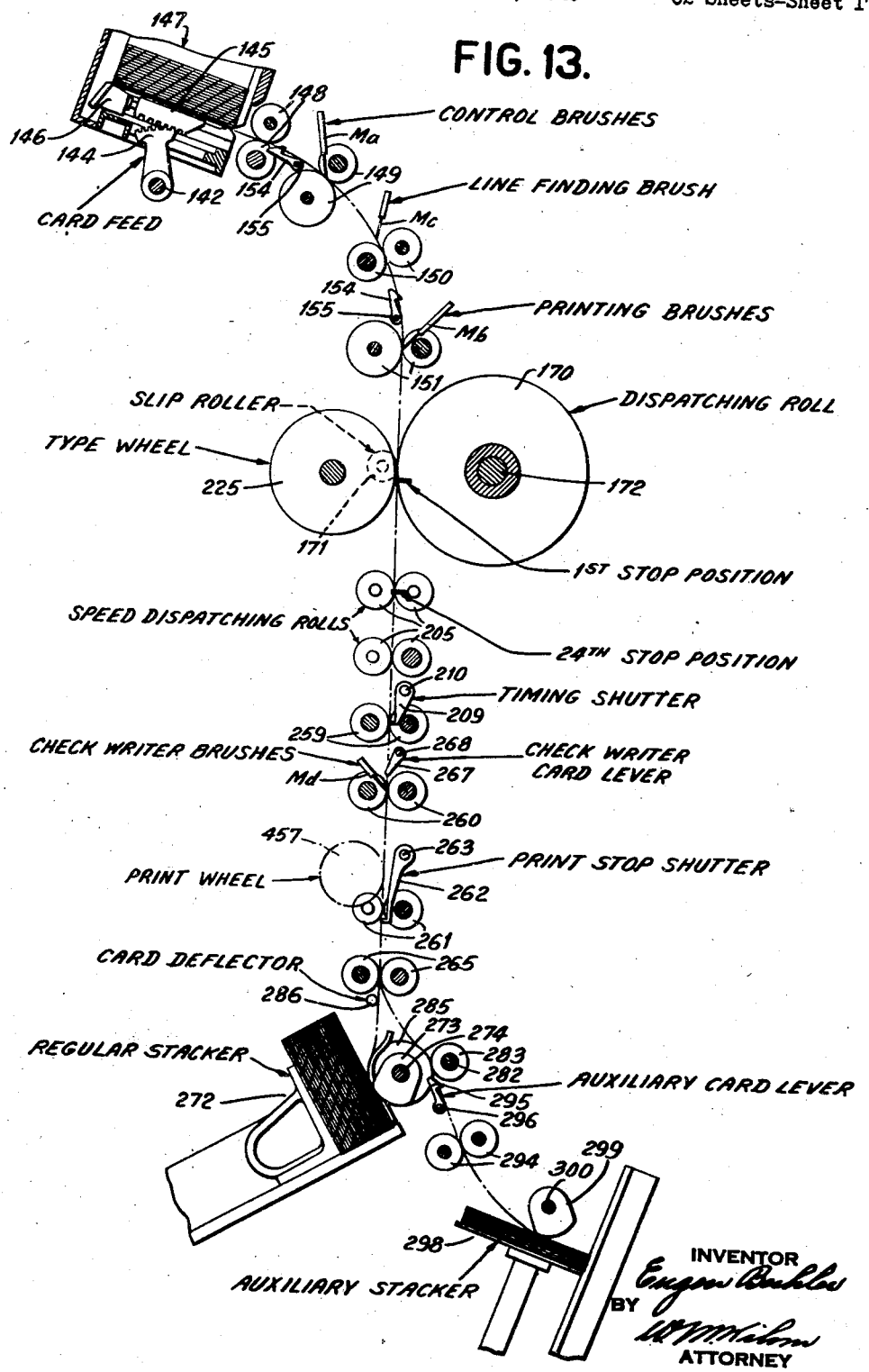

Fig. 13 is a diagrammatic view showing the path of travel of the master card and the relative location of the several mechanisms.

Figure 14:
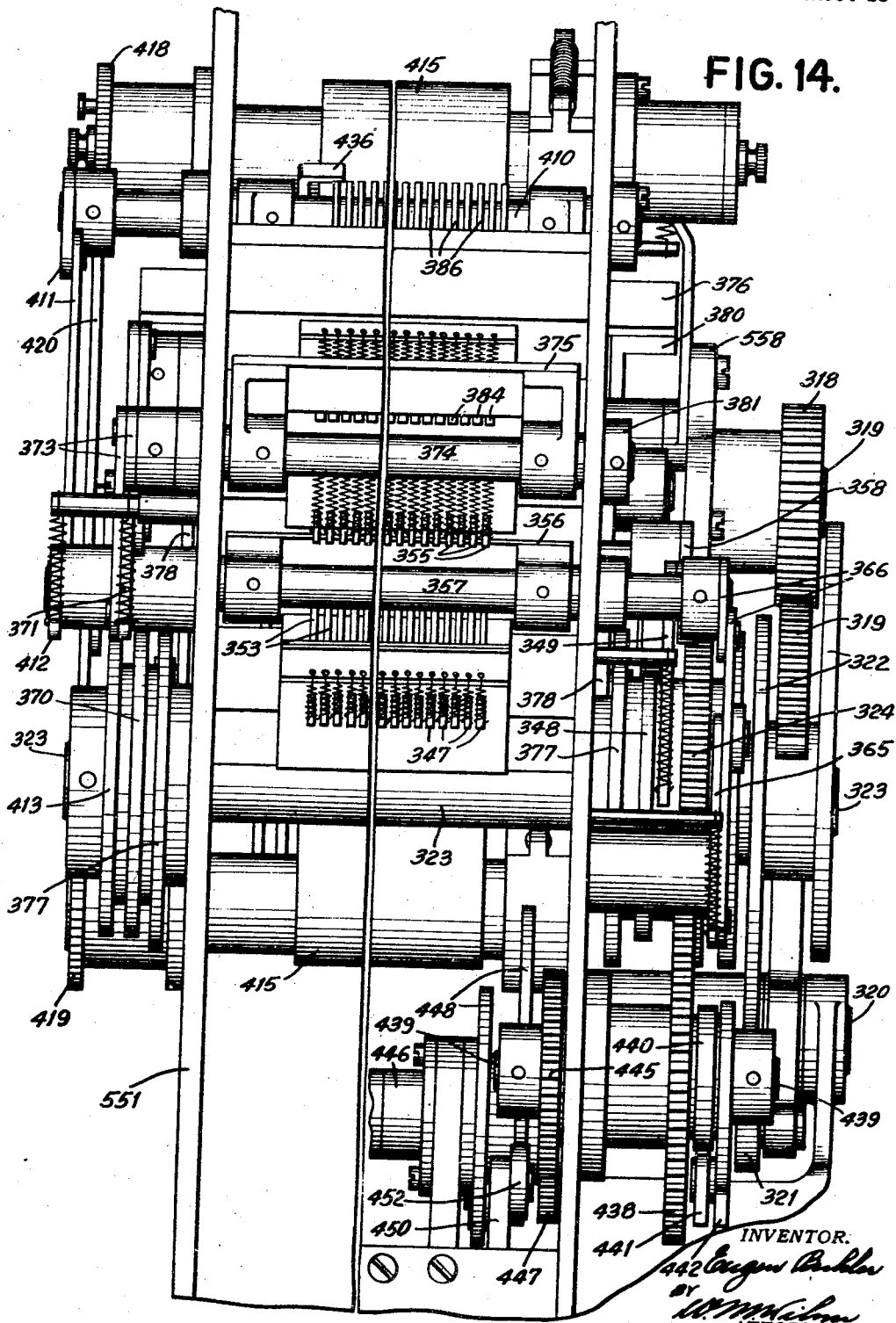

Fig. 14 is a sectional view taken along line 14—14 of Fig. 2b.

Figure 15:
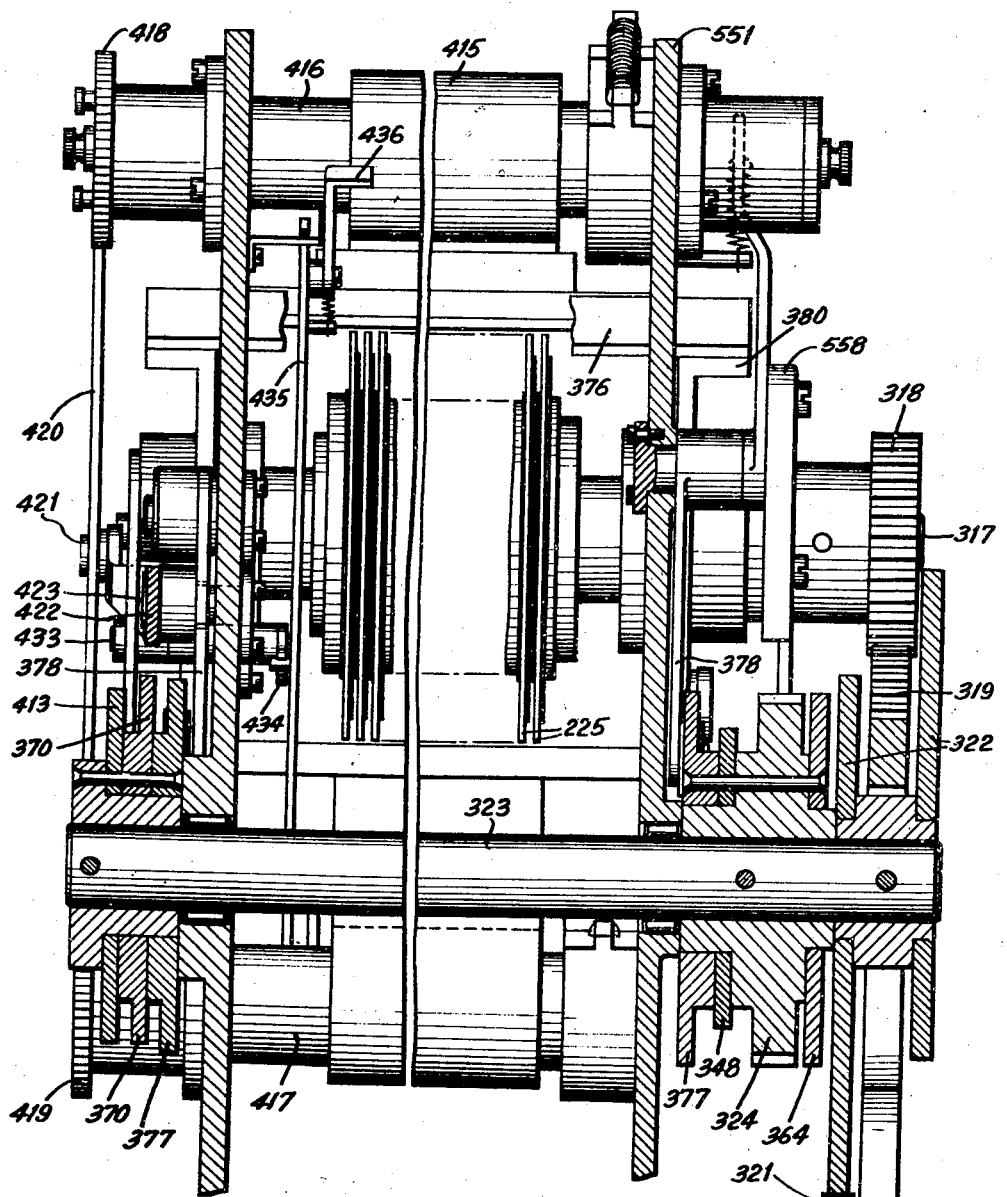

Fig. 15 is a sectional view through the alphabet printing mechanism taken along the line 15—15 of Fig. 2b.

Figure 16:
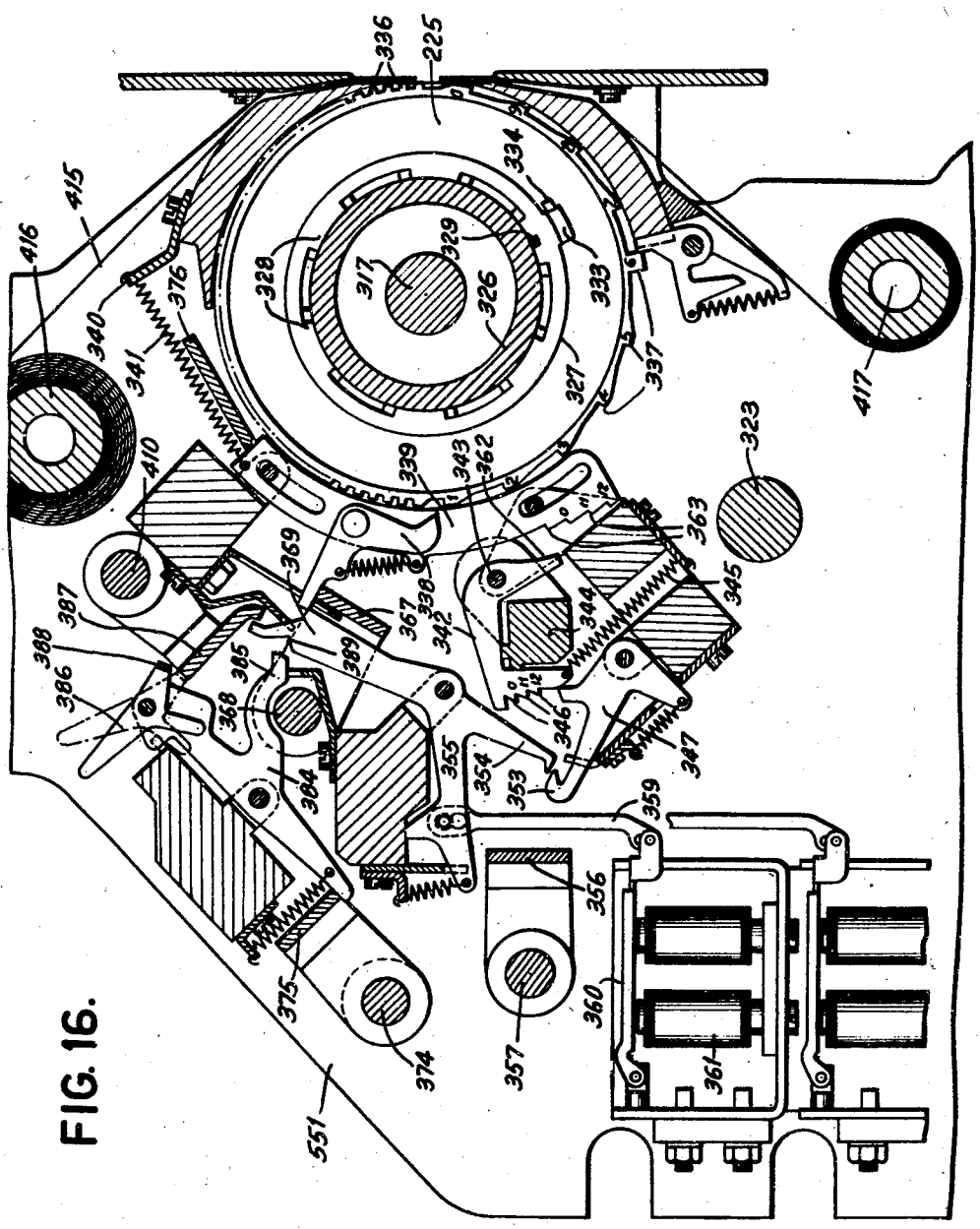

Fig. 16 is a transverse section of the alphabet printing mechanism.

Figure 17:
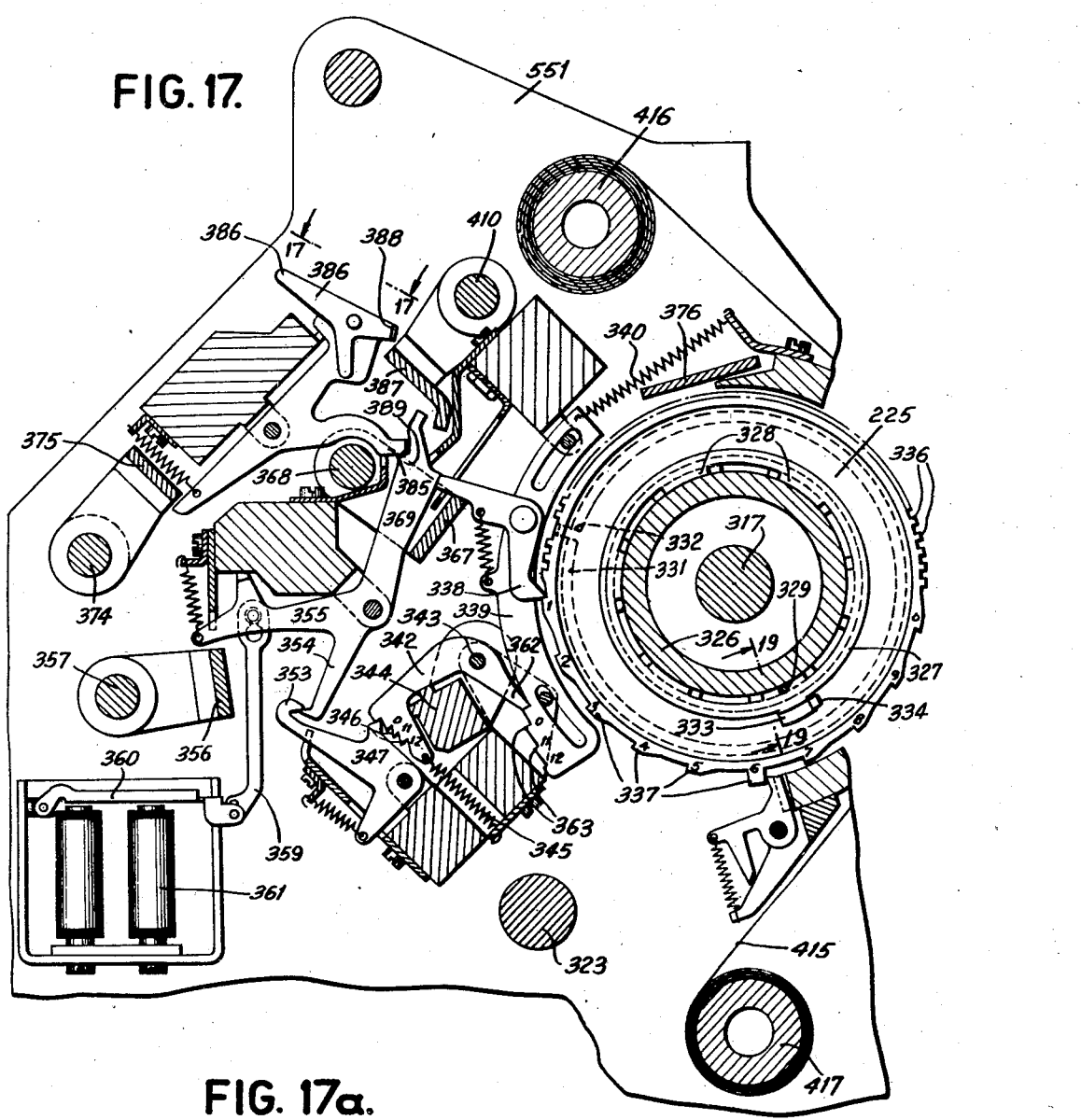

Fig. 17 is a view similar to Fig. 16 with the parts in moved position.

Figure 17A:
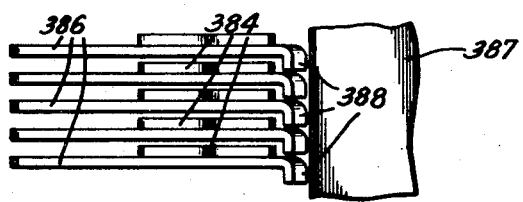
Figure 20:
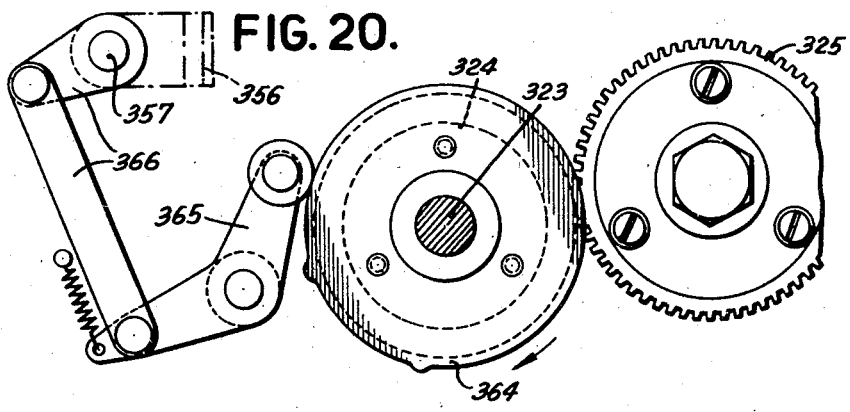
Figure 21:
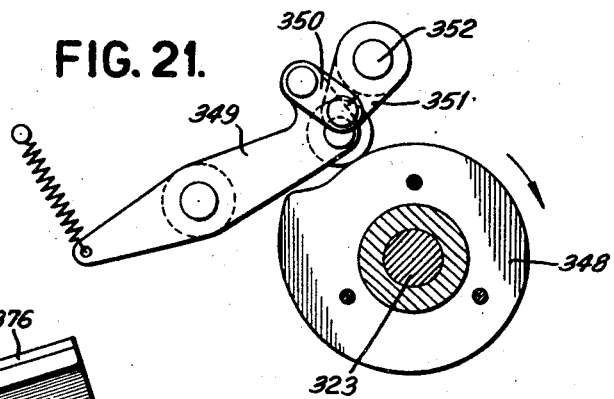
Figure 22:
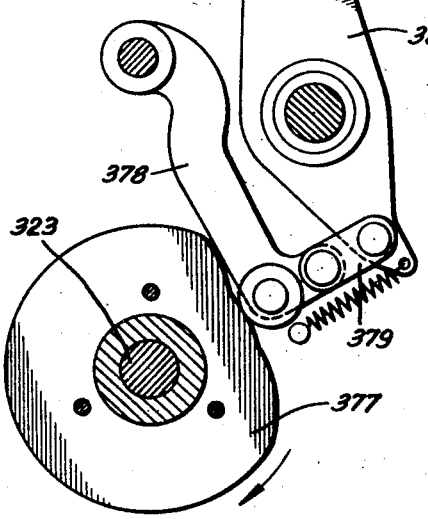

Fig. 17a is a detail view showing the print hammer split lever construction.

Fig. 18 is a further view showing a different position of the parts in Fig. 16.

Fig. 19 is an enlarged section through the print wheels taken along line 19—19 of Fig. 17.

Fig. 19a is a diagrammatic view showing the result of a particular setting of the levers of Fig. 17a.

Figs. 20, 21, 22 and 23 are details showing several cams and linkage operated by each.

Fig. 24 is a detail of the ribbon feeding mechanism for the alphabet printing mechanism.

Fig. 25 is an outside view of the check writing mechanism.

Figure 26:
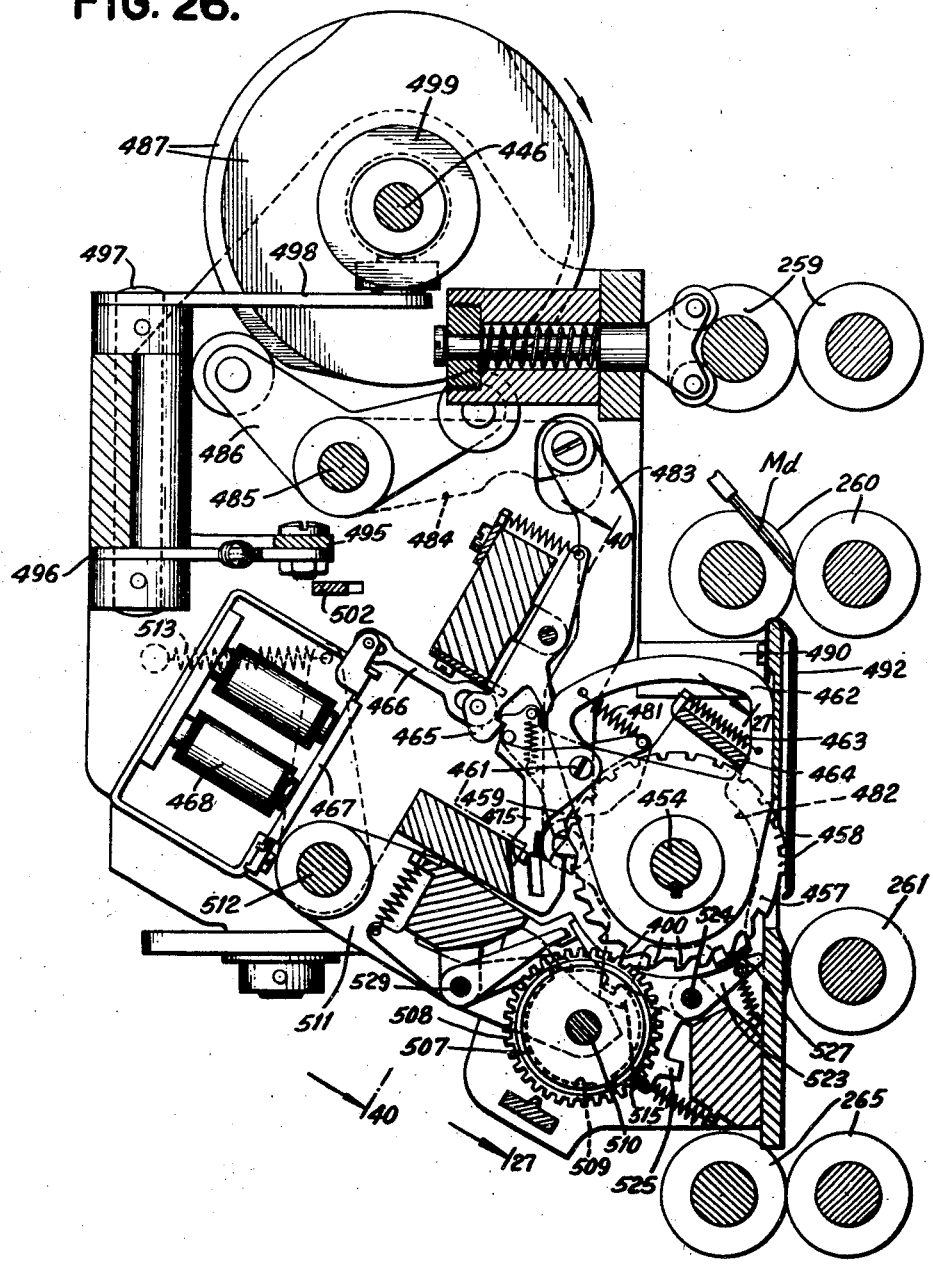

Fig. 26 is a central section of the check writing mechanism.

Figure 27:
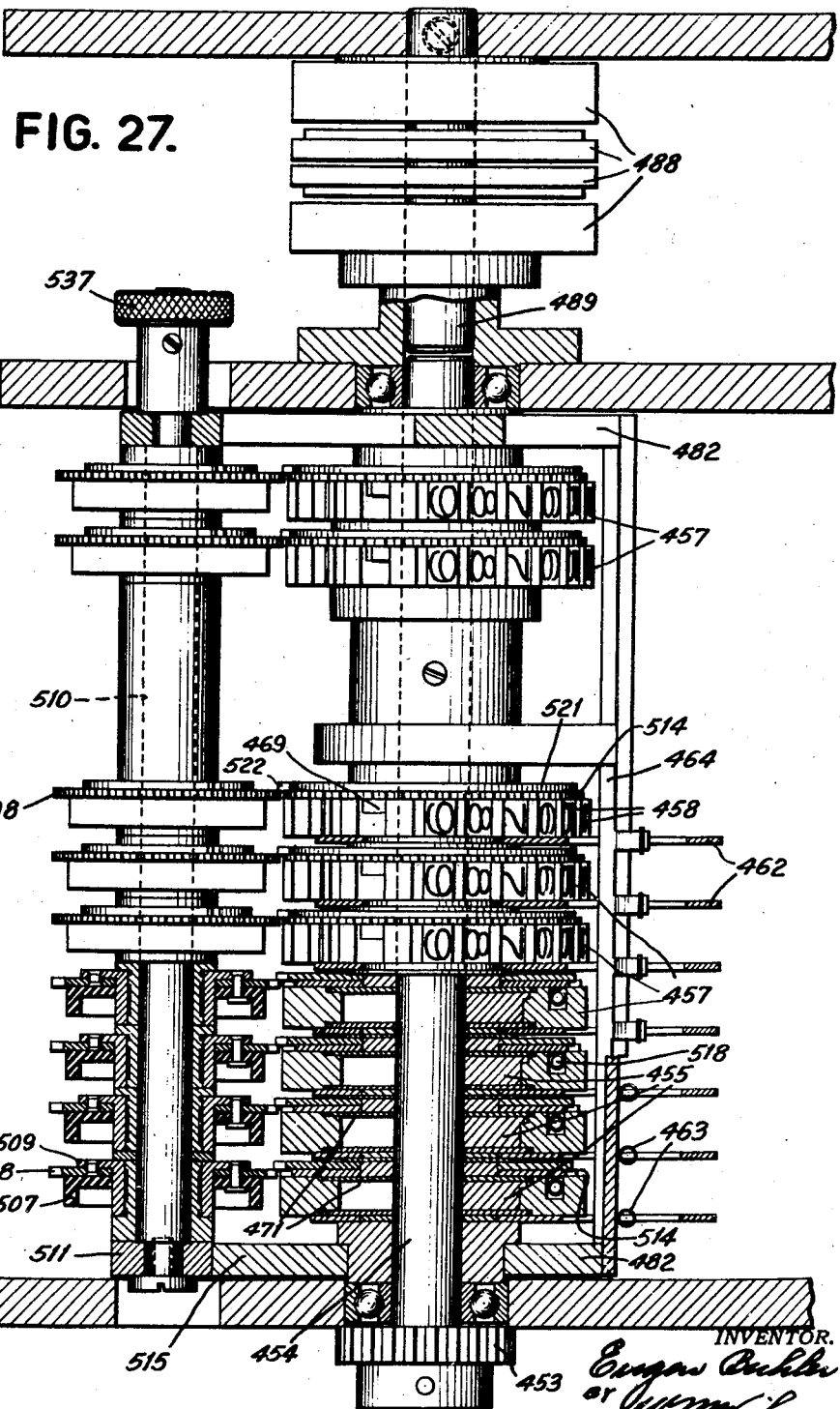

Fig. 27 is a sectional view taken on line 27—27 of Fig. 26.

Figure 28:
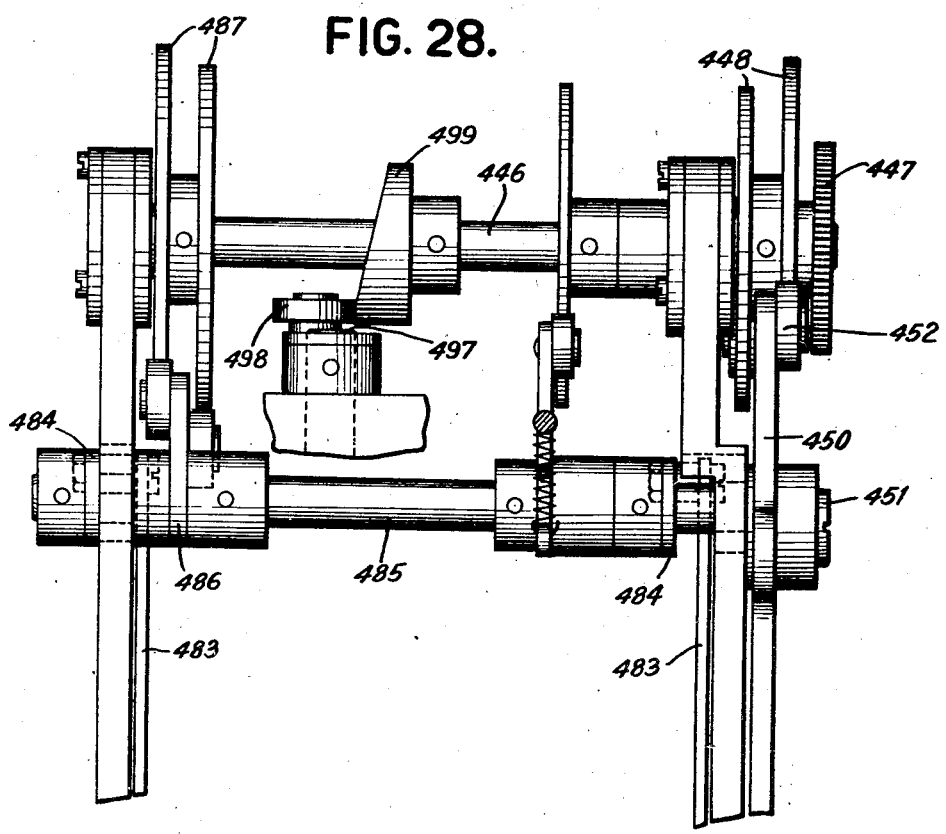

Fig. 28 is a section taken along line 28—28 of Fig. 25.

Figure 28A:
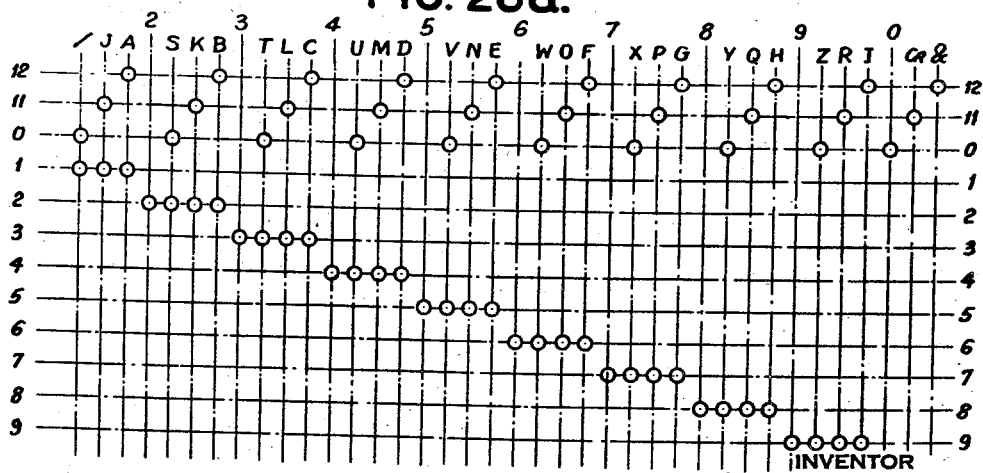

Fig. 28a is a diagram showing the coding arrangement for the data perforated in the record cards.

Figure 29:
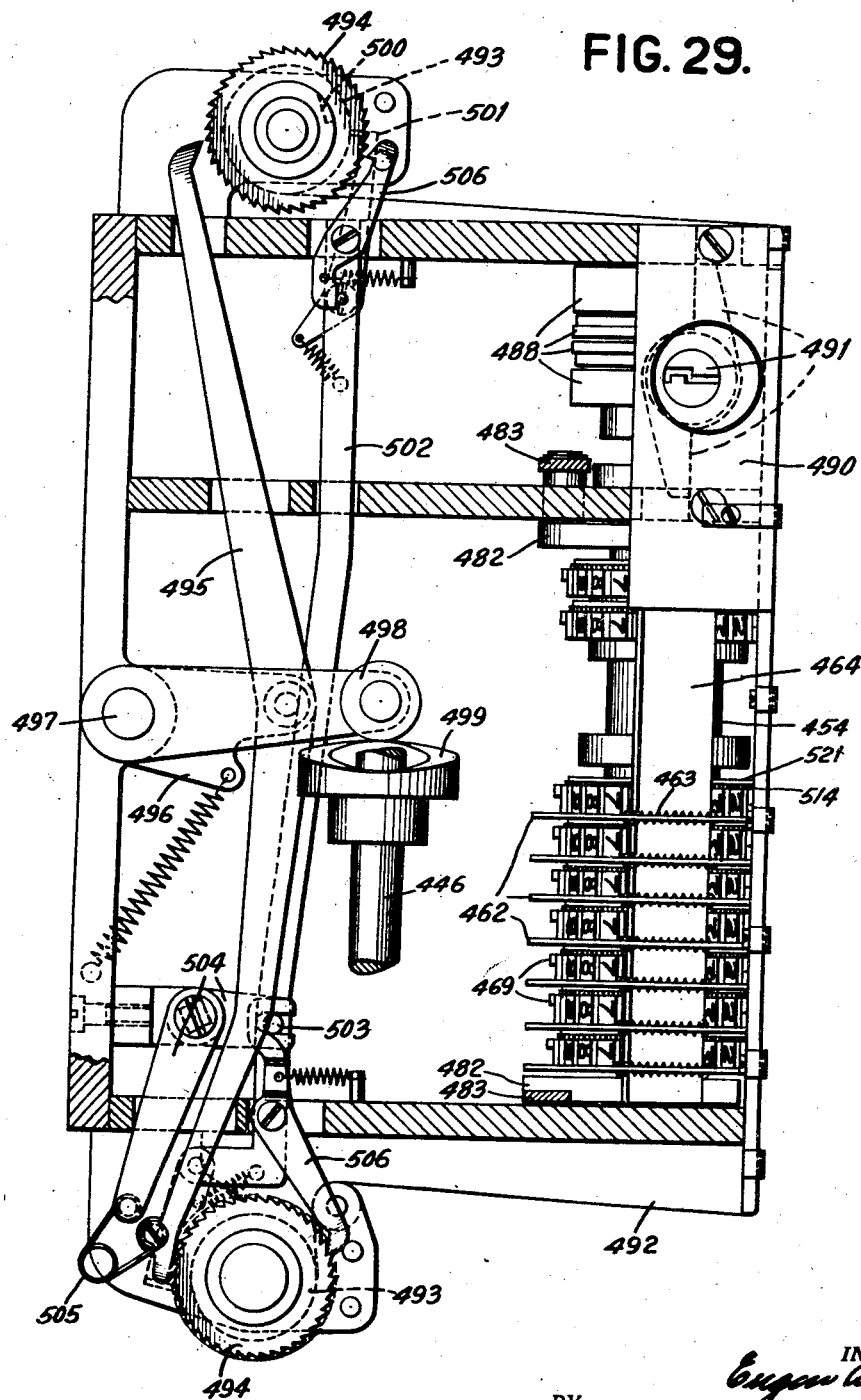

Fig. 29 is a plan view of the check writing mechanism showing the ribbon feeding devices.

Figure 1:
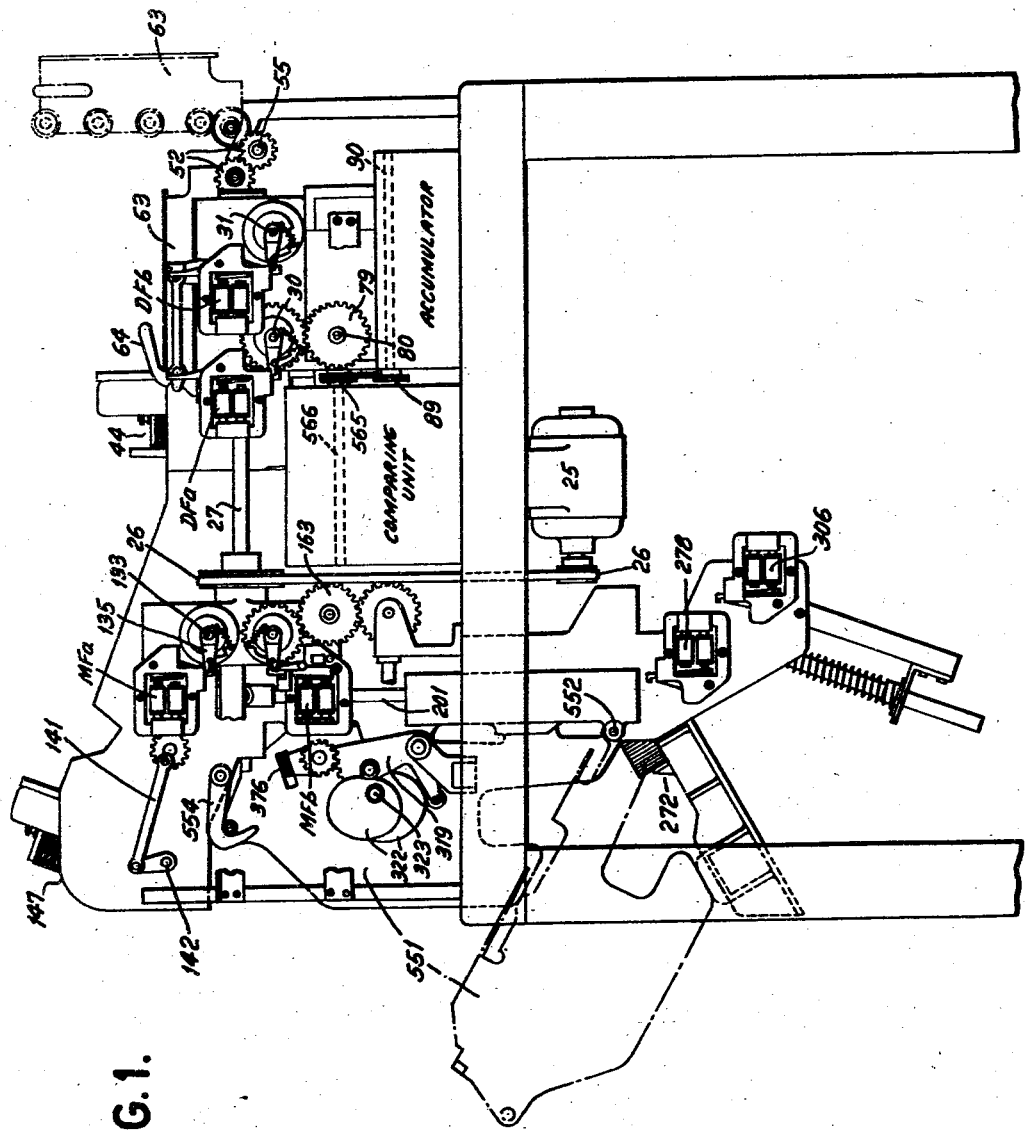
Fig. 1 is a front elevation of the complete machine showing the relative location of the various units.

Fig. 30 is a view on an enlarged scale of the upper right hand portion of Fig. 1 showing the outside of the detail card feeding mechanism.

Fig. 31 is a view showing the arrangement of the card lever contacts of the detail card feeding mechanism.

Figure 32:
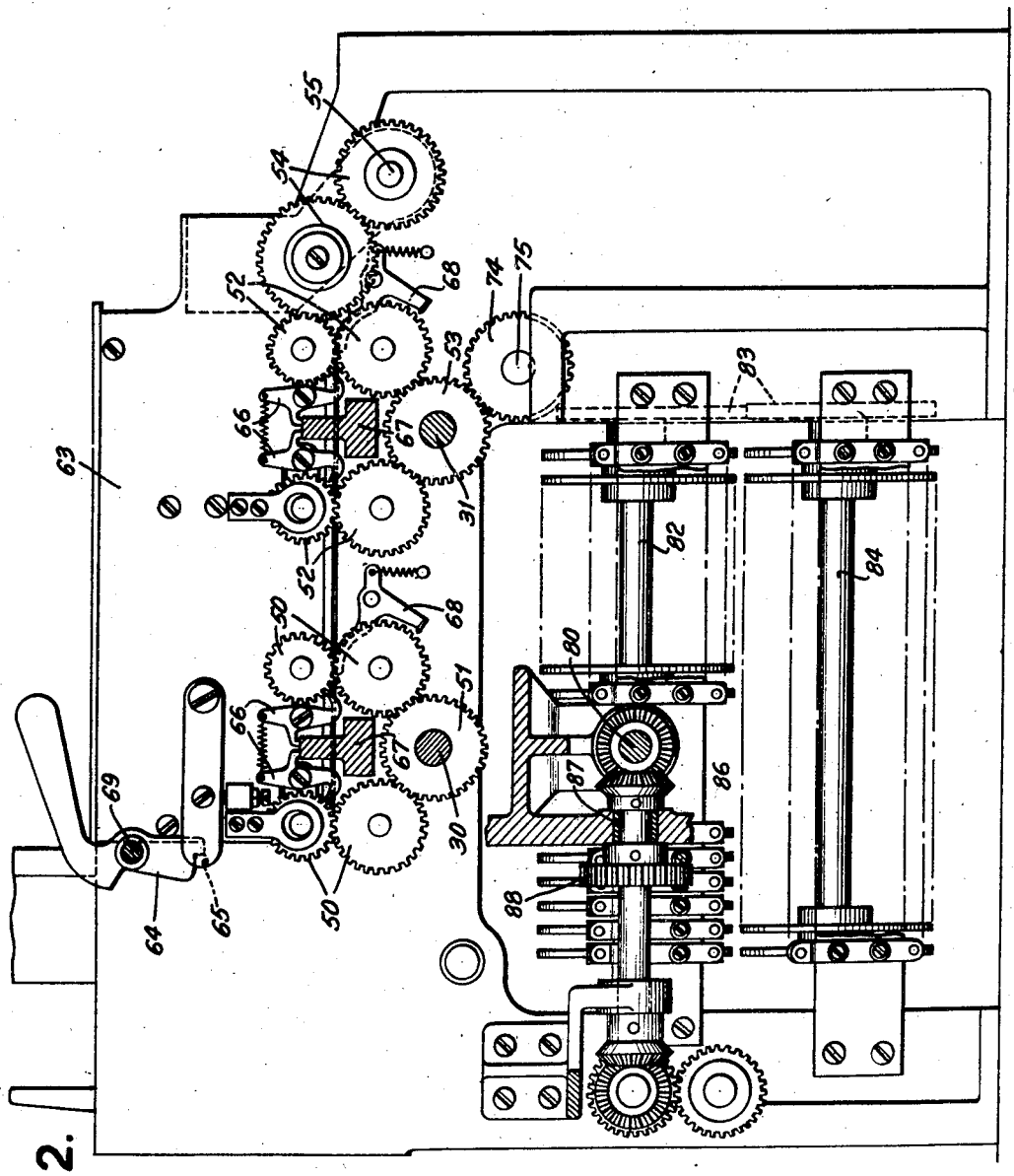

Fig. 32 is a view of the detail card feeding mechanism showing the driving mechanism for the feed rolls.

Fig. 33 is a central section through the detail card feeding and sensing mechanism.

Fig. 34 is a transverse section taken along line 34—34 of Fig. 30, showing the drive connections to various cam shafts.

Fig. 35 is a sectional view through a denominational order of the accumulator.

Fig. 36 is a view showing the accumulating mechanism, the view being taken on line 36—36 of Fig. 35.

Figure 37:
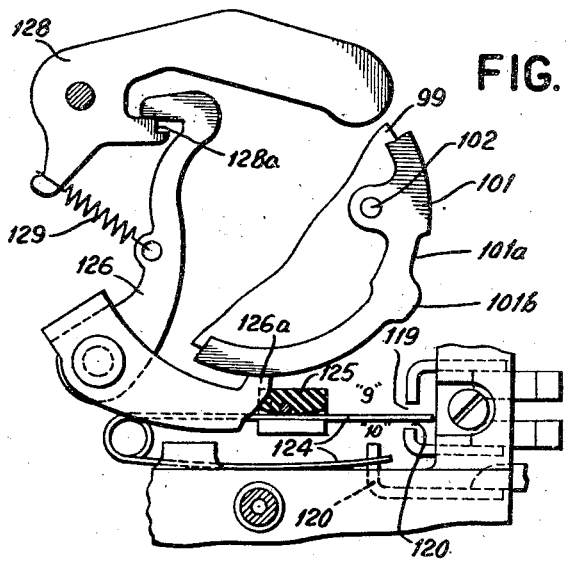

Fig. 37 is a detail showing the tens carry mechanism of the accumulator.

Figure 38:
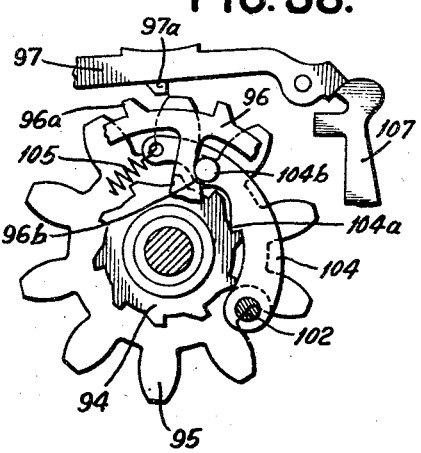

Fig. 38 is a detail showing the accumulator clutch mechanism.

Figure 39:
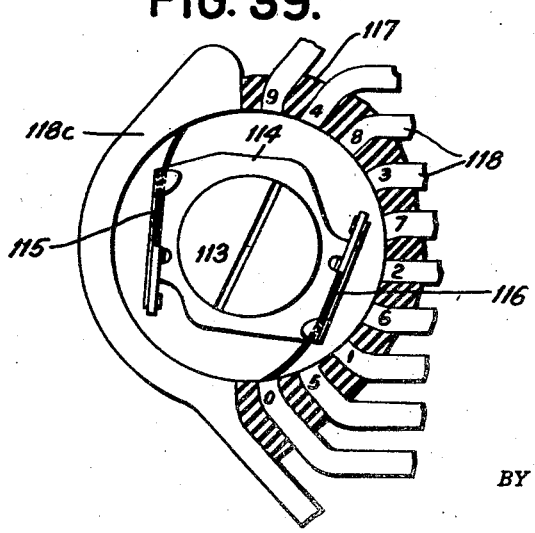

Fig. 39 is a detail showing the readout mechanism of the accumulator.

Figure 40:
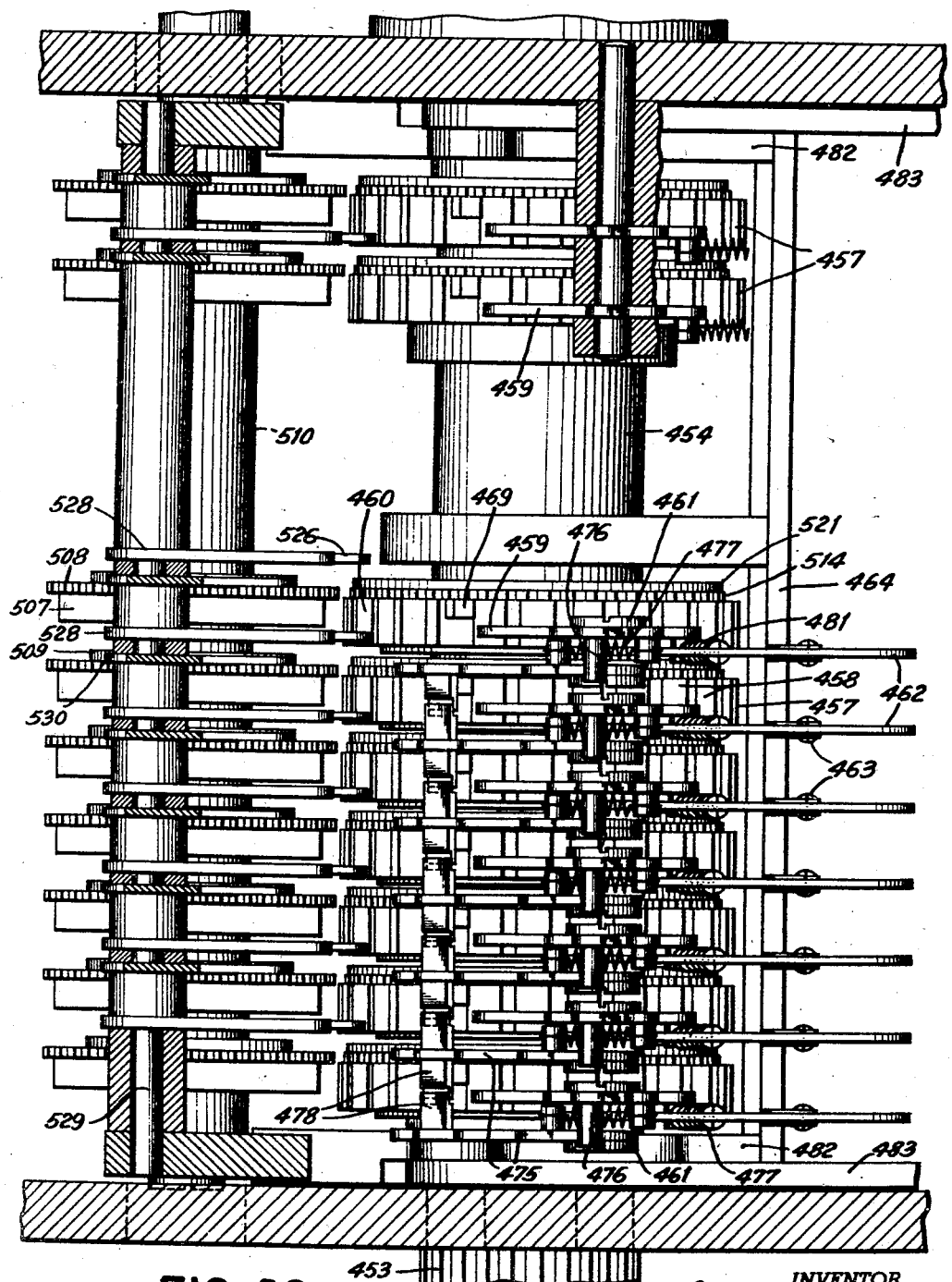

Fig. 40 is an enlarged sectional view of the check writing mechanism taken on line 40—40 of Fig. 26.

Figure 41:
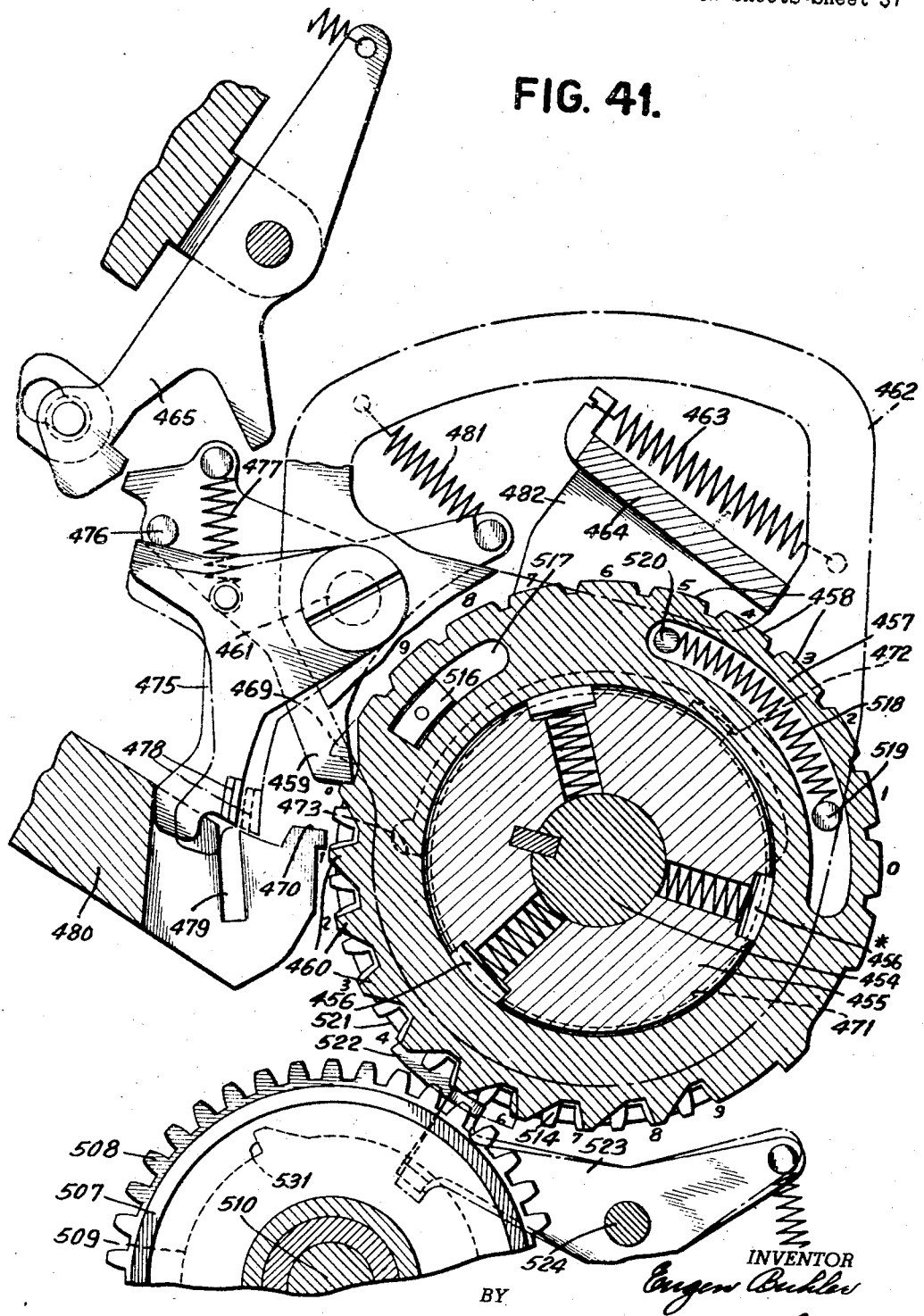

Fig. 41 is an enlarged sectional view of the check writing print wheels with the parts in moved position.

Figure 42:
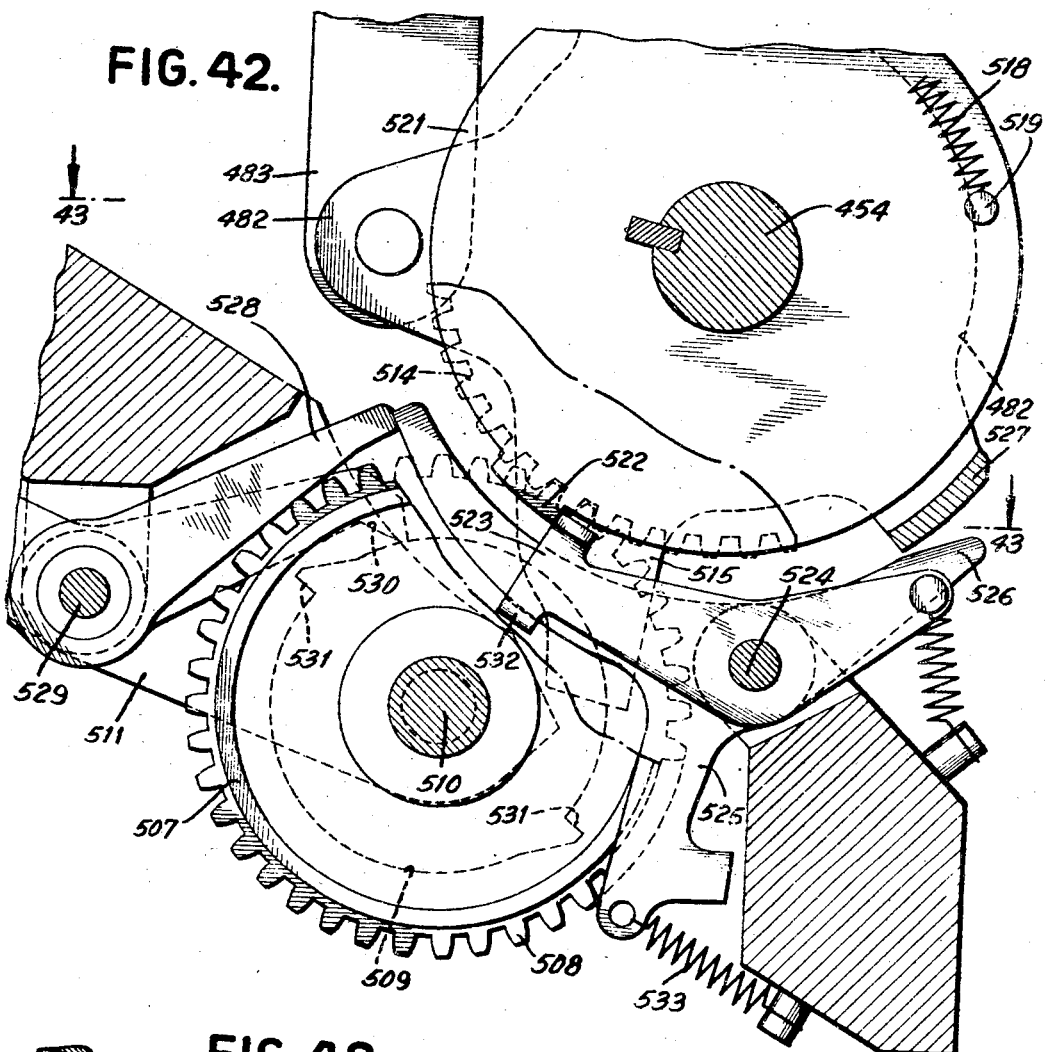

Fig. 42 is a further enlarged view of the check writing mechanism showing the relationship therewith of a total register.

Figure 43:
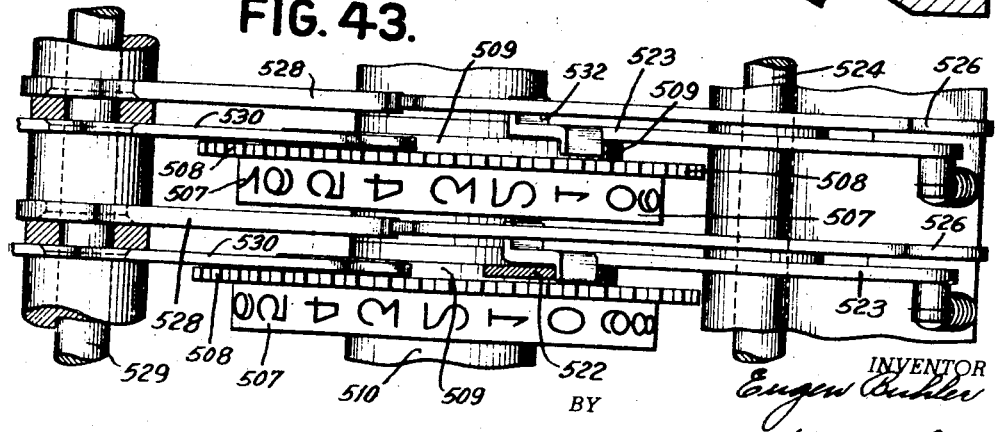

Fig. 43 is a view looking in the direction of line 43—43 of Fig. 42.

Figure 44A:
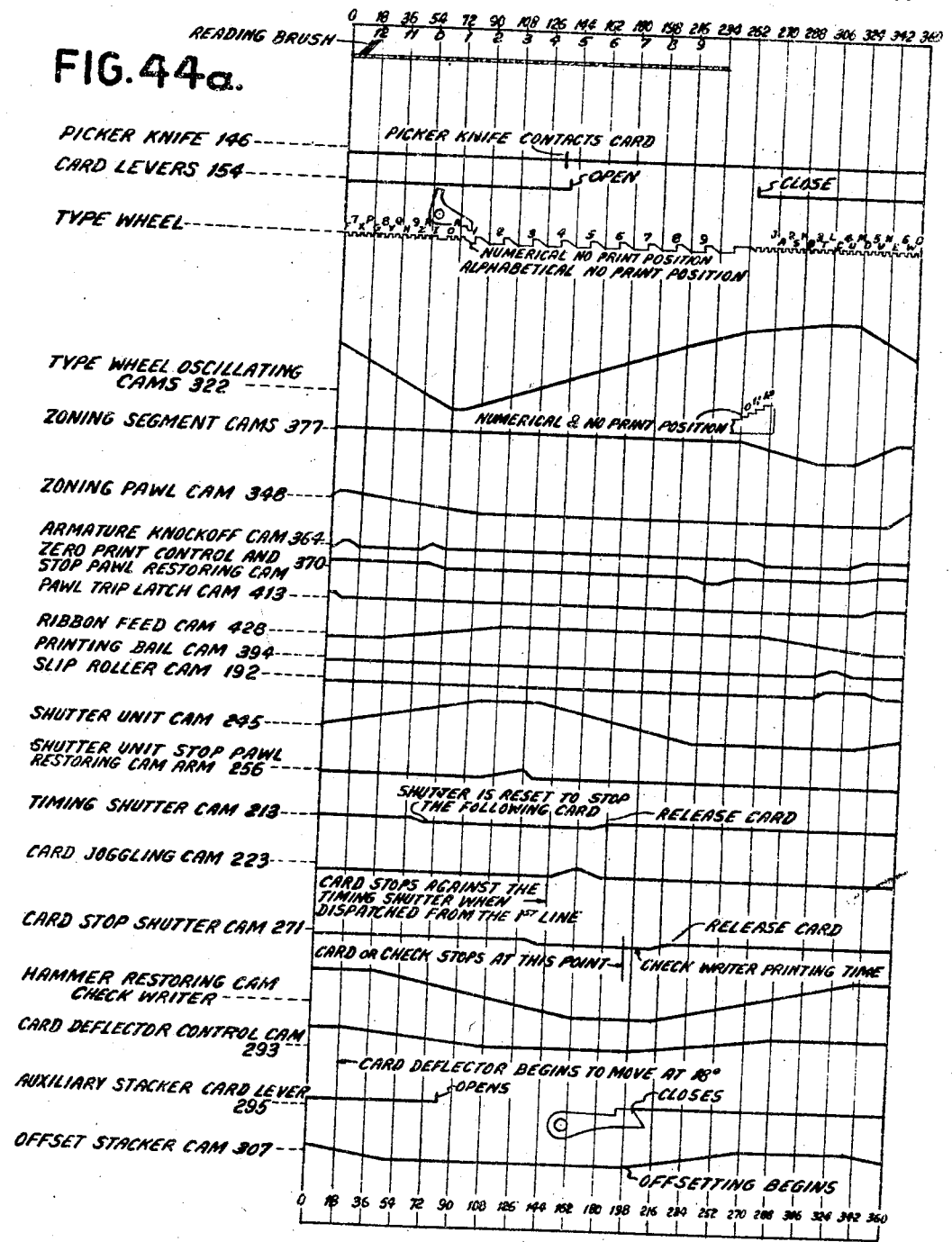
Figure 44B:
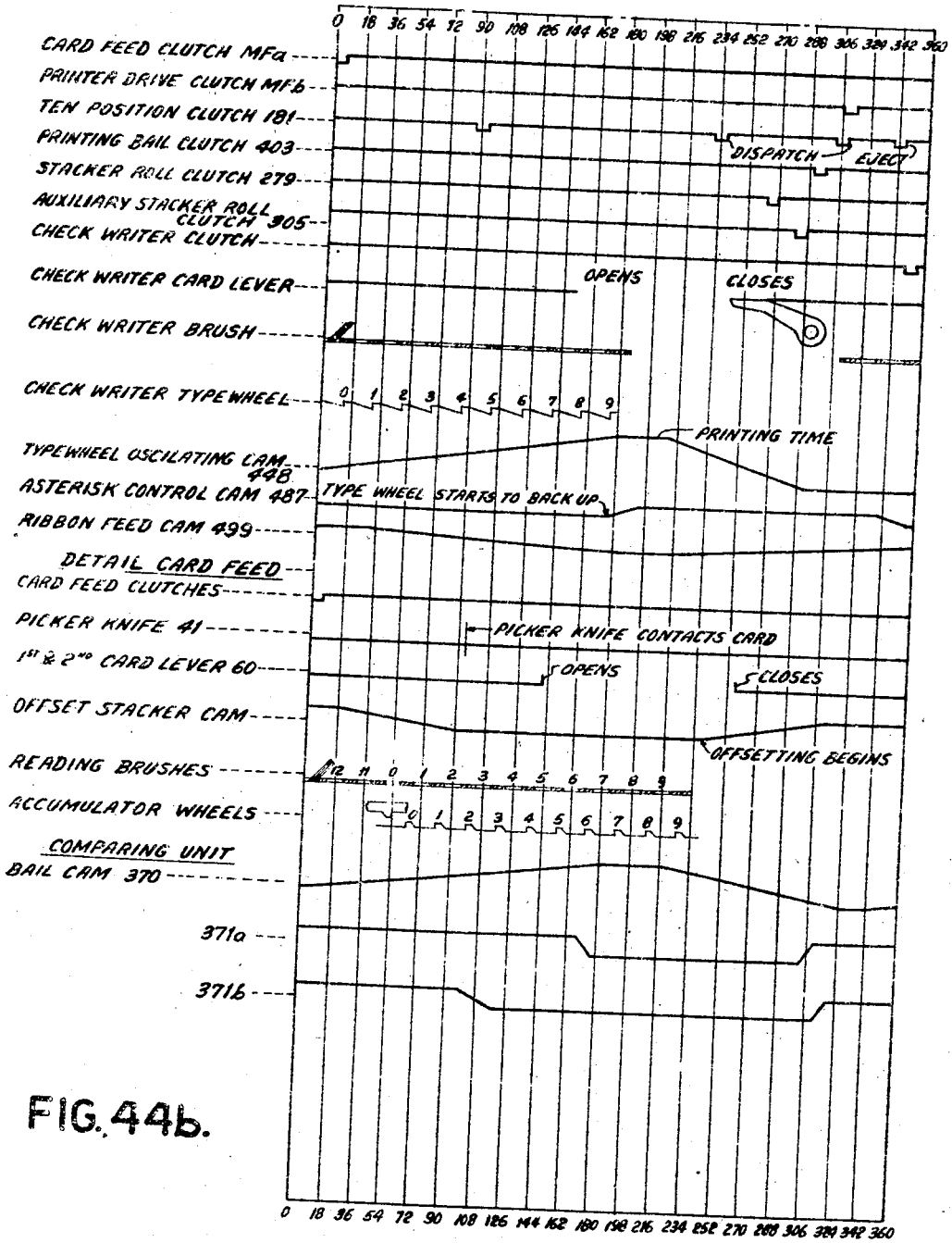

Figs. 44a and 44b are timing charts of the mechanical devices.

Figure 45:
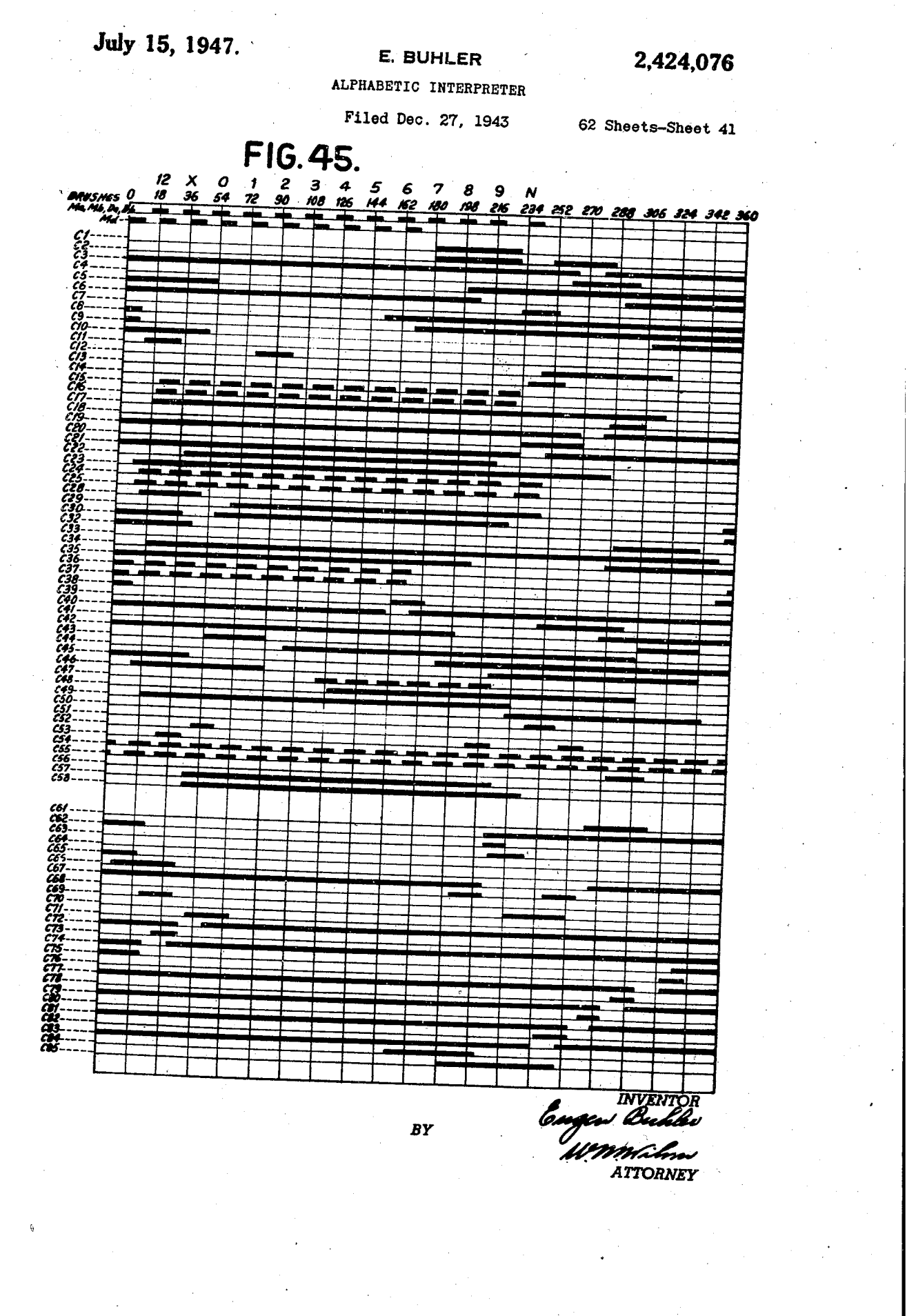

Fig. 45 is a timing chart of the constantly running circuit closing cam contacts.

Figure 46:
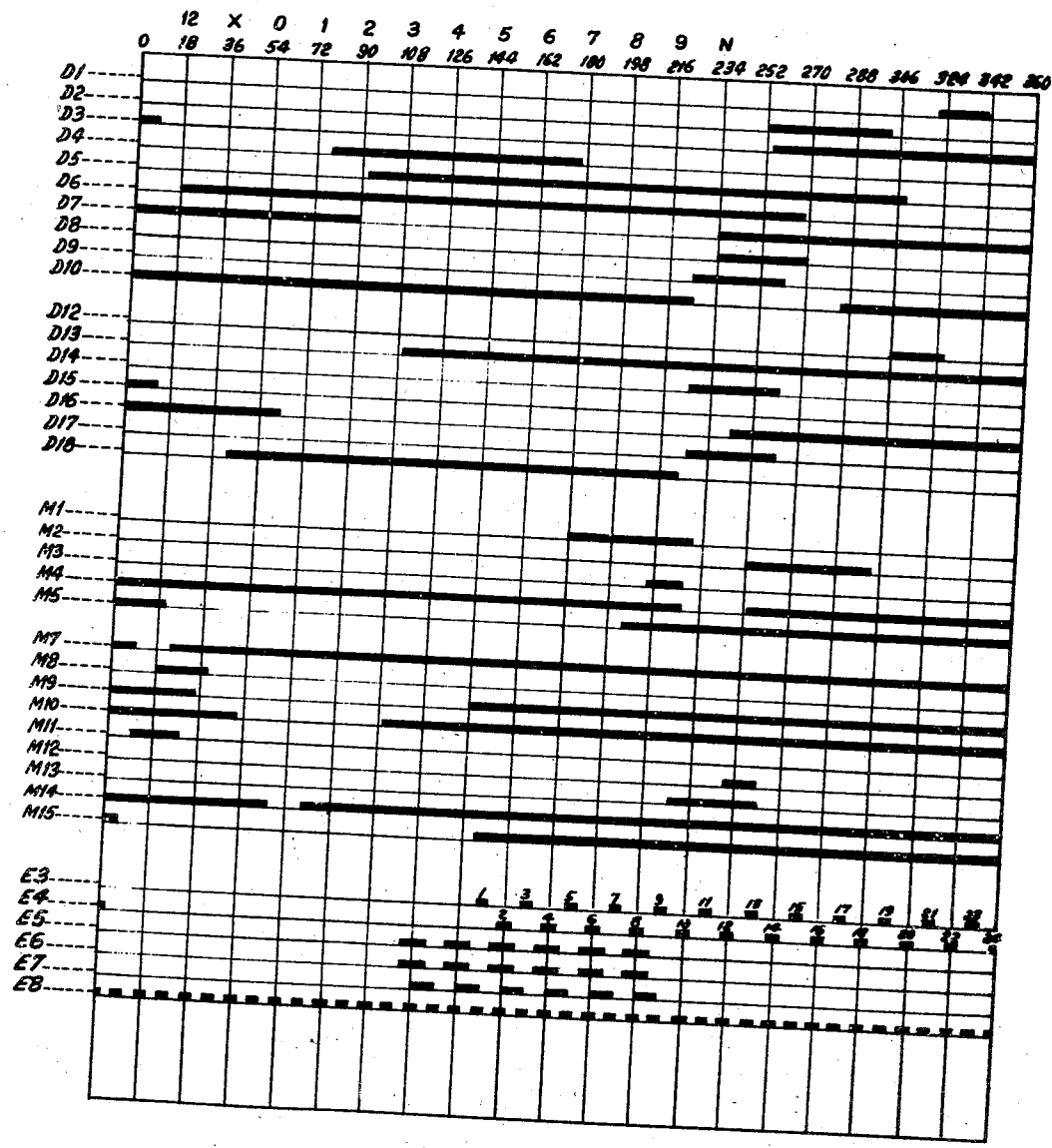

Fig. 46 is a timing diagram showing the timing of contact devices controlled by the detail and master card feeding mechanisms and also the timing of certain emitters.

Figure 47:
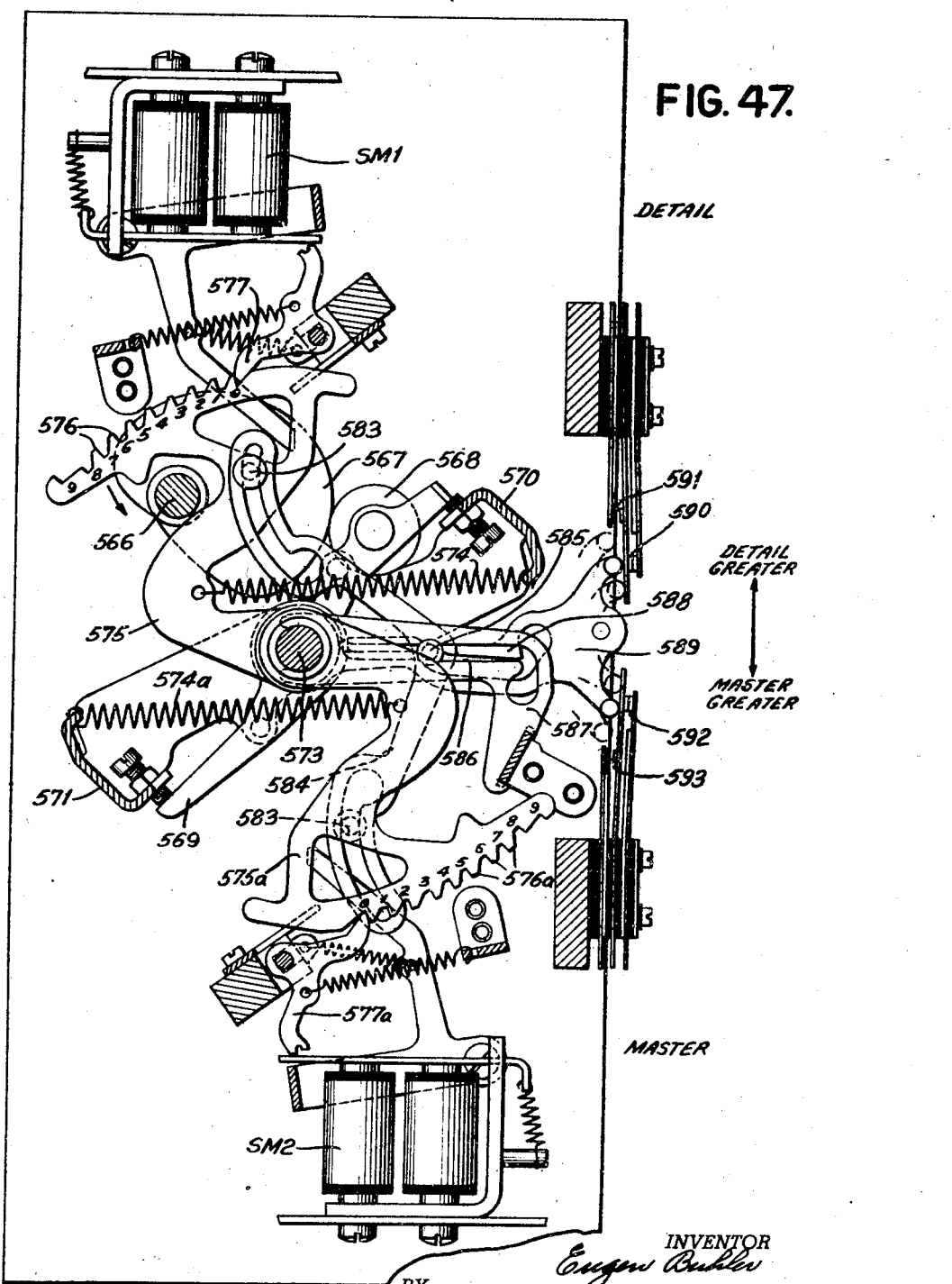

Fig. 47 is a central section of the comparing mechanism, the section being taken along line 47—47 of Fig. 30.

Figure 48:
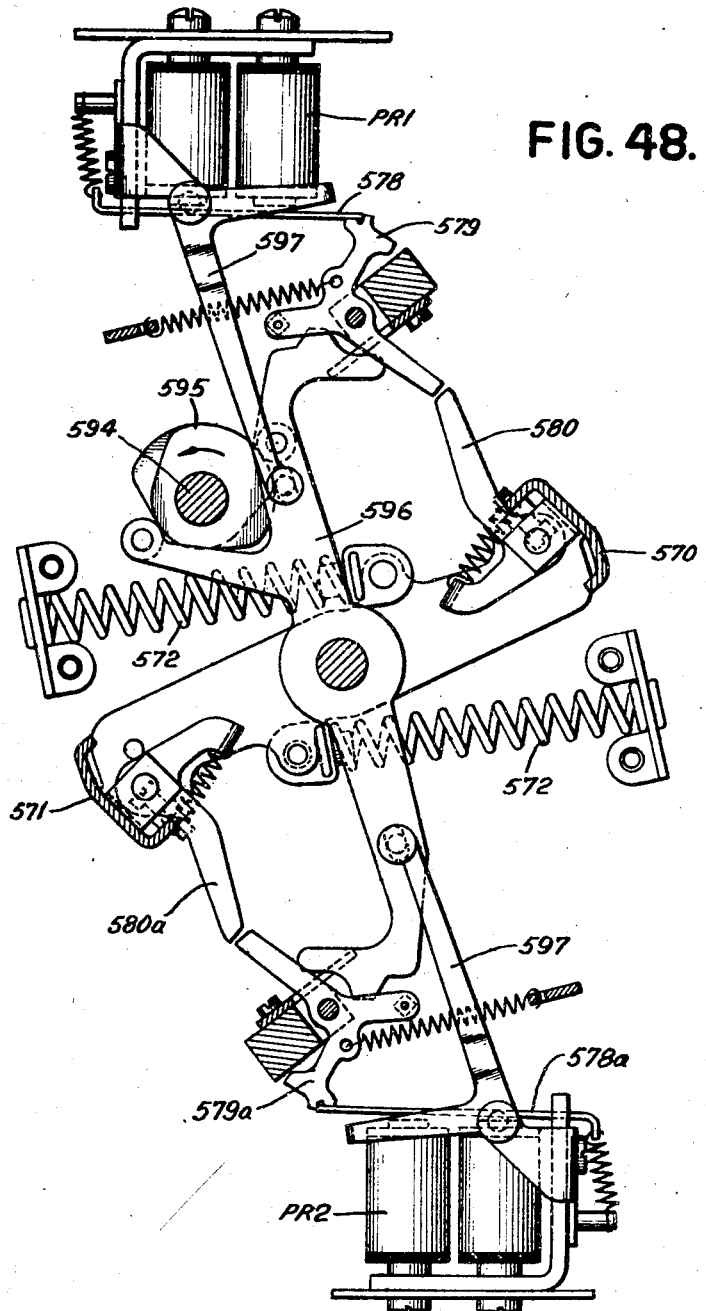

Fig. 48 is a detail showing the restoring mechanism for the comparing unit.

Figs. 49, 49a, 49b, 49c 49d, 49e, 49f, 49g, 49h and 49i, taken together and arranged vertically in the order named, constitute a wiring diagram of the electric circuits of the machine.

Fig. 50 is a diagrammatic representation of a check writing operation of the machine.

Figs. 51, 52, 54, 55, 56, 57 and 58 each represents a plugboard arrangement for enabling the machine to perform a different operation.

Fig. 53 is a view showing the master card upon which posting is effected under control of a group of detail cards.

Detail card feed

*Drive and conveying mechanism.*—Referring to Fig. 1, the main drive motor 25, through belt and pulley connection 26, rotates the main drive shaft 27 continuously throughout the operation of the machine. Shaft 27 has secured thereto two helical gears 28 and 29 (see Fig. 30) which drive gears 28a and 29a respectively, loosely mounted on cross shafts 30 and 31 (see also Fig. 34). Integral with gears 28a and 29a are notched clutch driving disks 28b and 29b respectively, and secured to the shafts 30 and 31 are arms 32 and 33 respectively to which are pivoted clutching dogs 34 and 35 lying in the plane of disks 28b, 29b.

Dog 34 and arm 32 are normally held in disengaged position by armature latch 36 of magnet DFa and the dog 35 and arm 33 are similarly held by armature latch 37 of magnet DFb. When magnet DFa is energized, shaft 30 will be coupled to main shaft 27 for rotation therewith and, when magnet DFb is energized, shaft 31 will be driven.

Referring to Figs. 33 and 34, shaft 30 carries a disk 38 which, through an eccentric pin and link connection 39 oscillates a shaft 40 which in turn through gear sector 42 and toothed slide 43 reciprocates card picker 41. The picker 41 advances the lowermost card in magazine 44 through the usual throat to a first pair of feed rollers 45, through which the card is conveyed to succeeding pairs of rollers 46, 47 and 48 to hopper 49. The lower rollers 46 and 48 are conducting rollers which cooperate with the usual rows of sensing brushes Da and Db respectively to sense perforations in the passing record cards, with the brushes being so spaced that they concurrently sense corresponding points or lines on two successive record cards.

The ends of the shafts carrying rollers 45 and 46 have secured thereto gears generally designated 50 in Fig. 32, and these are driven by a gear 51 on shaft 30. Similarly, the ends of the shafts carrying rollers 47 and 48 have secured thereto gears generally designated 52 in Fig. 32, which are driven by a gear 53 on shaft 31. Accordingly, the picker 41 (Fig. 33) and rollers 45, 46 operate only when clutch magnet DFa (Fig. 30) is energized and the rollers 47, 48 operate only when clutch magnet DFb is energized. One of the gears 52 (Fig. 32) through gears 54 drives a shaft 55 which in Fig. 33 has a frictional cam 56 thereon for engaging the upper surface of the cards as they are fed into hopper 49 to assist in advancing them into stacked position. A finger 57 depending from the spring supported hopper tray serves to rock a lever 58 and open a pair of contacts 59 when the hopper is filled to a predetermined capacity.

*Card lever contact mechanism.*—Between the successive pairs of rollers 45 to 48 (Figs. 31 and 33) are located three card levers 60, in the path of travel of the cards, so that as a card is fed it will rock the levers 60 and their supporting rods 61 to similarly rock arms 62 and close card lever contacts separately designated DCL1, DCL2 and DCL3 in Fig. 31.

*Card removal arrangement.*—For purposes of accessibility to the cards for removal of a possibly damaged card, the upper of each pair of rollers 45 to 48 and brushes Da and Db are supported in a frame designated 63 which is pivoted on shaft 55 about which it may be rocked to the dotted line position of Fig. 1. When the frame 63 is in its down or operative position, a hand lever operated camming member 64 (Fig. 32) engages a pin 65 in an extending part of the frame to hold and lock the frame in position. Pivotally mounted on the frame are several spring pressed detenting fingers 66, which normally engage stops 67 secured to the main framework to hold the fingers out of engagement with adjacent gears 50 and 52. The lower edge of frame 63 also engages and holds a pair of spring urged detenting fingers 68 out of engagement with lower gears 50 and 52, when the frame 63 is locked in position. When the frame is unlocked by counterclockwise rocking of cam 64 and swung to its dotted line position, fingers 66 move away from stops 67 and swing into engagement with gears 50 to prevent their displacement while the frame 63 is up. At the same time fingers 68 are released to engage and lock the lower gears 50 and 52 to prevent their displacement.

The shaft 69 upon which cam 64 is secured has a notched disk 70 at one end (see Figs. 30 and 34) which acts upon a roller 71 in a spring urged link 72 to slide the link to the left when cam 64 is rocked to its unlocking position. The link has a pair of lateral projections 73 which engage vertical extensions 36a and 36b of armature latches 36 and 37 respectively to block the armatures against clockwise or clutch unlatching movement, when the frame 63 is in unlocked condition.

*Drive for D cams.*—In Fig. 32 gear 53 drives a gear 74 and a shaft 75, which shaft (Figs. 33 and 34) through gears 76 drives a shaft 77 upon which are mounted contact operating cams called D cams. These cams, according to the connections traced, rotate only when the clutch magnet DFb is energized and in the circuit diagram (Figs. 49 to 49i) the contacts controlled by the cams are all designated by the prefix D.

*Drive for C cams.*—Referring to Figs. 30 and 34, continually running clutch element 28b has integral therewith a gear 78, which drives a shaft 80 through gear 79. At its inner extremity shaft 80, through bevel gears 81, drives a shaft 82 which, through gears designated 83, drives parallel shafts 84 and 85. Mounted on the shafts 82, 84 and 85 are a number of contact operating cams designated as C cams, which are thus in constant operation as long as the machine is running. In the circuit diagram the contacts controlled by these cams are prefixed with the letter C.

Accumulating mechanism

Referring to Figs. 32 and 34, the shaft 80 has bevel gear connection 86 with a shaft 87 from which a gear 88 through a train of gears generally designated 89 drives the accumulator drive shaft 90 continually (see Fig. 30). Along the length of shaft 90 are a number of gears 91, one for each order or unit of the accumulating mechanism. Figs. 35 to 39 show the details of one such order and the same will now be briefly explained to point out its manner of operation.

Each accumulator unit, which is of well known construction and will, therefore, be but briefly described, comprises a plate 92 which is slidably insertible in the framework of the machine and has fixed to it a sleeve 93 rotatably carrying a drive device comprising rigidly united ratchet 94 and gear 95. Gear 95 is continuously driven by a gear 91 on shaft 90 and makes one revolution for each revolution of the gear 78 (Fig. 30) from which it is driven.

Rotatably carried by a hub of ratchet 94 is a disk 96 having ten teeth 96a adapted to be engaged by a tooth 97a on the long arm of a clutch lever 97 to hold the disk against rotation in a counterclockwise direction. At the side of disk 96 is a register wheel 99 rotatable on sleeve 93 and provided with ten peripheral notches 99a. Wheel 99 may take any of ten rotative positions corresponding to values 0 to 9. A spring pressed lever 100 engages with a notch 99a of the register wheel to hold the wheel impositively and to center it in the value position to which it has been rotated. A tens carry cam 101 is fixed to the side of wheel 99 by a pair of studs 102 and 103. These studs extend through openings of disk 96 to positions adjacent ratchet 94, where stud 102 pivotally carries a clutch dog 104 and stud 103 anchors one end of a spring 105. The other end of the spring is connected to the free end of dog 104 to urge a tooth 104a of the clutch dog to engage ratchet 94. In the position shown in Fig. 36, the clutch lever 97 is in declutching position, its tooth 97a is restraining rotation of disk 96 counterclockwise, and clutch dog 104 is clear of ratchet 94. The clutch dog is being held clear of ratchet 94 by coaction of a pin 104b on the dog with the upper portion of a cam edge 96b of disk 96. When the clutch lever 97 is rocked to cause its tooth 97a to release the disk 96 for counterclockwise movement, the spring 105 is effective to rock the clutch dog 104 into engagement with ratchet 94. During this movement of the clutch dog, its pin 104b rides down the cam edge 96b of disk 96 and cams the disk counterclockwise until its tooth 96a, previously engaged by tooth 97a, is to the right of the latter tooth. The parts are then in clutching positions, shown in Fig. 38, and the register wheel 99 is coupled to the drive device 94—95 for rotation. Through engagement of the pin 104b of the clutch dog with cam edge 96b, the disk 96 is forced to rotate counterclockwise together with the register wheel.

When the clutch lever 97 is returned to lower declutching position, its tooth 97a intercepts a tooth 96a of disk 96 and stops the disk. The register wheel and clutch dog continue rotating while cam edge 96b of disk 96 cams the pin 104b of the clutch dog upwardly until it is again in its outer position. As the pin 104b is cammed outwardly, clutch dog 104 moves clear of the ratchet 94 and declutches the register wheel from the driving means. The register wheel is then held and centered in its new value position by lever 100.

The clutch lever 97 is held in either clutching or declutching position by a latch 107. With the clutch lever 97 in lower declutching position, the wedge-shaped tip of the lever is seated firmly in a slot of latch 107. When the clutch lever is moved up to clutching position, its wedge-shaped tip cams against the inclined wall of the notch and forces the latch clockwise until the lever tip is above and clear of the notch. The spring 108 then snaps the latch back in a counterclockwise direction, placing an inclined edge thereof below the tip of lever 97 to retain the lever in upper clutching position.

The clutch lever 97 has a short arm swiveled to the upper end of an armature 108. The armature is disposed between an advance magnet AM and a stop magnet SM mounted on plate 92. Energization of magnet AM rocks armature 108 clockwise to raise the lever 97. Energization of magnet SM rocks armature 108 counterclockwise to lower the lever 97.

A readout commutator is provided to read out the register values and comprises a rotor including an insulating collar 113 fixed to the hub of register wheel 99. Collar 113 carries a conductive plate 114 (see Fig. 39) mounting the opposite brushes 115 and 116. A moulding 117 of insulating material is secured to plate 92 and carries conductive inserts 118. The conductive inserts extend at their right ends beyond the moulding, while their inner ends form commutator segments for engagement by brushes 115 and 116. Ten of the inserts 118 form the value segments 118—0 to 9, while another insert forms the common segment 118C. Drive gear 91 makes one revolution a cycle and gear 95 driven thereby has ten teeth and makes one revolution in one-half of a cycle. When gear 95 is clutched to the register wheel 99, it rotates the wheel one-tenth of a revolution to advance it one value step. The register wheel covers ten value positions in one revolution and brushes 115 and 116 have a corresponding coverage. The value segments 118—0 to 9 are disposed within half the circle of travel of the brushes, and the segment 118C is disposed at the opposite half. Since the ten value segments must be connected in progressive value order during a revolution of the brushes to the common segment, the value segments are disposed in the order 0, 5, 1, 6, 2, 7, 3, 8, 4 and 9 and spaced apart half a value step. Thus, with brush 116 engaged with segment 118—0, brush 115 is on common segment 118C and, if the register wheel advances one value step, brush 116 moves across segment 118—5 to engage segment 118—1. Were the register to advance five value steps from zero position, brush 116 would engage common segment 118C while brush 115 would pass the segment 118—0 and engage segment 118—5.

When a register order moves from 9 to or past 0 during a cycle, a carry must be effected to the next higher order. If the latter order is in 9 position at the carry time, a further carry must take place to the second higher order. The latter carry is known as the long carry while the other carry is known as the short carry. The long carry is controlled by a "9" carry contact 119 (see Fig. 37), short carry by a "10" carry contact 120. Below contact 120 is the common carry contact 121. These carry contacts are inserts set in an insulating moulding 122 fastened to plate 92. A hair-pin type of contact spring 124 has its lower leg anchored to contact 121 while the upper leg is movable between contacts 119 and 120. The upper leg of the spring passes through a slot in an insulating element 125 fixed to the free end of the lower arm of a carry lever 126. This lever is pivoted to plate 92 and a lug 126a on its arm coacts with the periphery of the carry cam 101, which is fixed to register wheel 99. When the register wheel is in any value positions 1 to 8, a circular portion of the cam 101 lies over lug 126a and keeps the lever 126 in neutral position, in which contact spring 124 has its upper leg half-way between contacts 119 and 120 (see Fig. 37). At this time, the upper arm of lever 126 has its tip above the corner notch 128a of a latch lever 128. The lever is pivotally mounted on plate 92 and connected by a spring 129 to lever 126. When the register wheel moves to value position 9, a notch 101a in the carry cam 101 is in line with lug 126a of lever 126, permitting the lever to rock counterclockwise. As the lever 126 rocks in this direction, it brings the upper leg of contact spring 124 into engagement with "9" carry contact 119. When the register wheel 99 advances to or past the 0 value position during a cycle, a projection 101b of cam 101 rides past lug 126a, rocking lever 126 clockwise to the position shown in Fig. 36. As the lever 126 rocks clockwise, it brings the upper leg of contact spring 124 into engagement with "10" carry contact 120. To retain the lever 126 and contact spring 124 in "10" carry position until after carry operation has taken place in the cycle, the lever 126 as it rocks clockwise is latched in position by engagement of the tip of its upper arm with the corner notch 128a of latch lever 128. After the carry period of a cycle has terminated, a pin 130 on drive gear 91 (Fig. 36) rides past latch lever 128 and cams it clockwise to release its corner notch 128a from lever 126 which thereupon returns counterclockwise either to normal position, if the register wheel is in a position 1 to 8, or to "9" carry position of the register wheel has been advanced to the 9 value position.

*Master card feed*

*Drive and conveying mechanism.*—Referring to Figs. 1, 2a and 6, the main drive shaft 27 has secured thereto a helical gear 131 which drives a gear 132 loose on shaft 133. Integral with gear 132 is a notched clutch driving disk 134 and secured to shaft 133 is an arm 135 to which is pivoted clutching dog 136 lying in the plane of disk 134. Dog 136 and arm 135 are normally held in disengaged position by armature latch 137 of magnet MFa which, when energized, will release dog 136 for engagement in the notch of disk 134 so that shaft 133 will be coupled for driving by main shaft 27.

At its inner end, shaft 133 has a gear 138 secured thereto (Figs. 6 and 2b) which drives a gear 139 in mesh with a gear 140. Concentrically pivoted on gear 140 is a link 141 which oscillates rod 142 through an arm 143. In Figs. 3a and 13, rod 142 carries toothed arm 144 which reciprocates slide 145 and card picker 146 to advance a card from magazine 147 to feed rollers 148, which convey the card to successive pairs of feed rollers designated 149, 150 and 151. The ends of the shafts which support these several pairs of feed rollers carry gears designated 152 generally which are so arranged, as shown in Fig. 2b, that they are driven from shaft 133 through gear 129 and turn only when shaft 133 is coupled to the main drive shaft 27 by energization of magnet MFa.

The inner feed rollers 149 and 151 are conductig rollers with which rows of sensing brushes Ma and Mb cooperate to sense perforations in the card as it passes, and these rows of brushes are so spaced that they concurrently sense corresponding positions or lines of two successively fed cards. Intermediate rollers 149 and 150 is located a single so-called line finding brush Mc, which traverses a predetermined column of the card and through a perforation therein contacts an insulated block 153.

*Card lever contact mechanism.*—Between rollers 148—149 and between rollers 150 and 151 and lying in the plane of travel of the cards are card levers 154 secured to rods 155 (Figs. 3a and 13). Passage of cards will rock rods 155 counterclockwise, or as viewed from the opposite direction in Fig. 1a clockwise to cause arms 156 thereon to close card lever contacts designated MCL1 and MCL2.

*Drive for M cams.*—In Figs. 6 and 7 the shaft 133 through gears 157 drives a shaft 158 (Fig. 2a) upon which are mounted a number of so-called M cams which accordingly rotate only when magnet MFa is energized. These cams control contacts designated in the circuit diagram with the prefix M.

*Drive for C cams and emitters.*—In Fig. 6 the gear 131 on main drive shaft 27 drives a gear 159 keyed to a sleeve 160 to which is secured a gear 161. This gear drives a shaft 162 through a gear 163 (see Fig. 2a), and through bevel gears 164 drives a horizontal shaft 165 upon which are mounted contact operating cams designated as C cams, which are in constant rotation through the connections traced. Shaft 162 (Figs. 6 and 1a) carries several wiping brushes 166 which cooperate with contact segments of commutators designated as emitters E, and the shaft through gears 167 (Fig. 8) also drives a shaft 168 which carries further wiping brushes 166 of additional emitters. From the connections traced, these brushes 166 are in constant rotation. The shaft 168 also carries additional C cams.

*Dispatching roller drive.*—Referring to Figs. 4 and 13, the master card after it passes brushes Mb and rollers 151 is engaged by a pair of dispatching rolls 170 and a coacting slip roller 171. Rollers 170 are secured to a shaft 172 (see Fig. 7) which at one end has loosely mounted thereon a gear 173 which is constantly rotated by gear 174 on shaft 162 (Fig. 1a) through an idler 175. Integral with gear 173 is a clutch driving element 176 in the plane of which lies a dog 177 pivoted on a disk 178 secured to shaft 172. This structure constitutes a so-called ten-position clutch and is generally similar to the accumulator clutch of Figs. 36 and 38. Between disk 178 and element 176 (Fig. 7) is a ratchet 179, one of whose teeth is normally engaged by armature latch 180 of magnet 181. Dog 177 carries a pin 182 which bears against a camming surface 183 of ratchet 179 and a spring urged detent 184 normally holds disk 178 so that the parts are normally in the position shown in Fig. 1a. When magnet 181 is energized, spring 185 causes pin 182 to act on cam surface 183 and effect a slight clockwise movement of ratchet 179, during which dog 177 engages a notch in driving element 176. If magnet 181 is immediately deenergized, the armature 180 will engage the next ratchet tooth to hold the ratchet while element 176 continues to drive dog 177. As a result, pin 182 driving against cam 183 will disengage itself and detent 184 will hold the parts in disengaged position after one step or a tenth of a revolution of shaft 172. Thus, by successive energization of magnet 181, the dispatching rolls 170 are driven to advance the card step by step, the interval of advance being determined by the length of time magnet 181 is held energized.

Figure 1A:
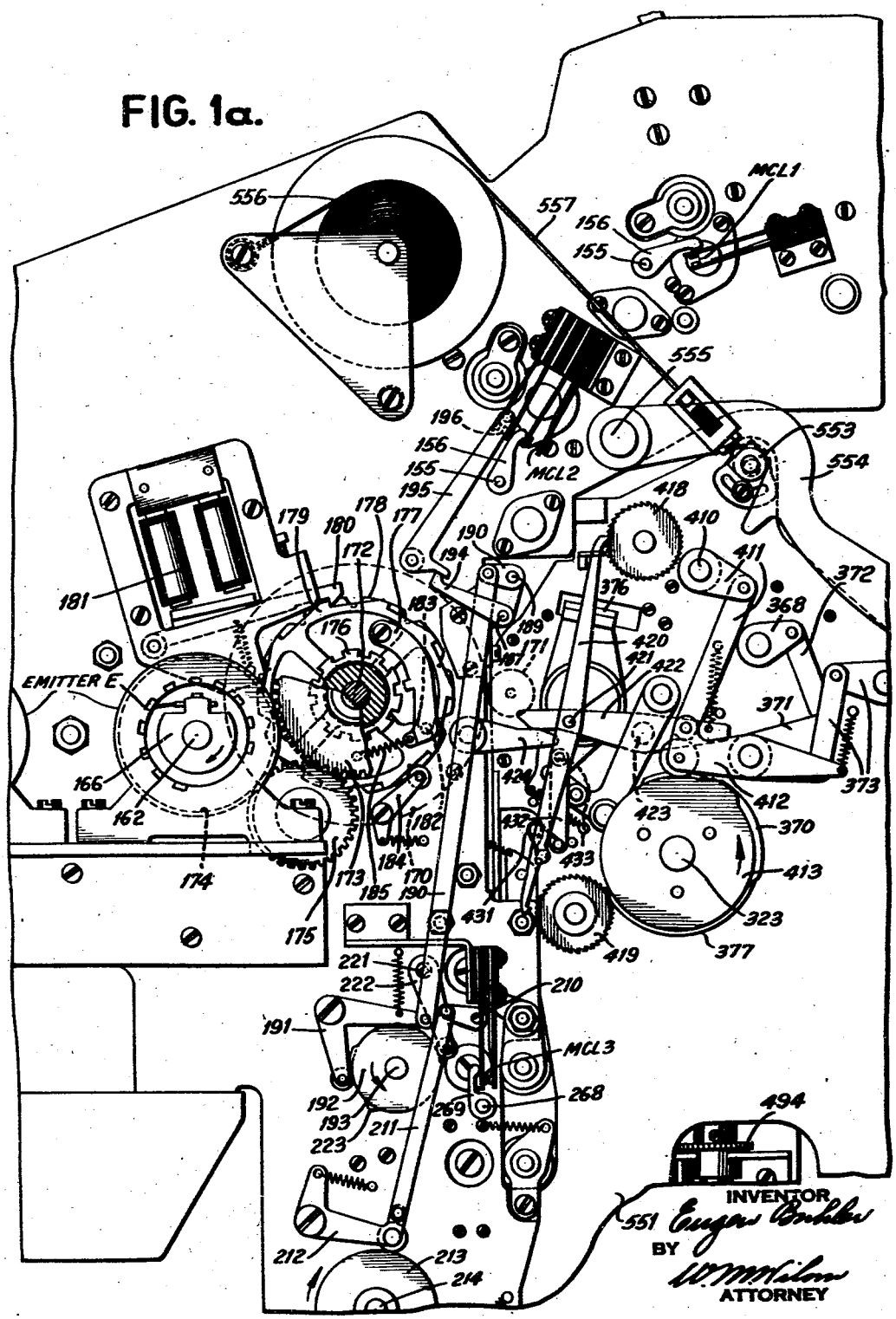
Fig. 1a is a view of the upper part of the outside of the master card feeding section looking from the opposite direction of Fig. 1.

The cooperating slip rollers 171 are carried by spring pressed arms 186 (Figs. 4 and 5) pivoted at 187 and they bear against rollers 170 to grip the card therebetween. Arms 186 have upwardly extending fingers lying adjacent to flattened disks 188 on a rod 189, so that when the rod is rocked slightly disks 188 will rock arms 186 to move rollers 171 away from contact with the card and rollers 170. The mechanism for rocking rod 189 is shown in Fig. 1a, where the rod 189 has arm and link connection 190 with a spring urged follower bell crank 191 which is rocked by a cam 129 on shaft 193. When the left hand roller 171 in Fig. 5 is rocked away from roller 170, it turns its pivot rod 187 to which it is secured. The outer end of this rod has a finger 194 (Fig. 1a) which will rock bell crank lever 195 to close a pair of contacts 196.

The shaft 193 is in constant rotation through the following drive connections. At its opposite end in Fig. 2b the shaft 193 has secured thereto a gear 197 (see also Fig. 5) meshing with a gear 198 on a shaft 199 which in turn through helical gears 200 is driven from vertical shaft 201. At its upper end shaft 201 through bevel gears 202 has connection with a gear 203 through gears 204. Referring now to Fig. 6, gear 203 is keyed to sleeve 160 which, as already explained, is in constant rotation and through the mechanism just traced the dispatching rollers 170 are driven to advance the card under control of the clutch mechanism operated by magnet 181. Rollers 171 are moved out of engagement with rollers 170 periodically and close contacts 196, which remain closed if a card has been advanced between rollers 170—171, so that roller 171 fails to rock back the full distance to engage roller 170. In other words, the presence of a card between the rollers will keep contacts 196 closed.

*Speed dispatching rolls.*—Rollers 170, 171 advance the card to two so-called pairs of speed dispatching rollers 205 (Fig. 13) which are driven as follows: In Figs. 2b and 5, constantly running shaft 201 has helical gear connection 206 with a shaft 207, which carries one of the lower pair of rollers 205 and this shaft 207 has gear connections generally designated 208 (see also Fig. 3b) for driving the other rollers 205, so that all turn constantly and in unison to advance the card against a pair of stop fingers 209 secured on a rod 210 (Figs. 3b and 5).

*Timing shutter operating mechanism.*—The fingers 209 are called a timing shutter in that they intercept the card and then release it for further advance at a definite time, so that if in its journey to this point there has been some slight slippage, it will be brought back into correct time relationship with the machine. The rod 210 (Fig. 1a) has arm and link connection 211 with a spring pressed follower lever 212, cooperating with a cam 213 on a shaft 214 (see also Fig. 1b). This shaft extends across the machine and in Figs. 2b and 2c is shown as being driven from the constantly rotating shaft 201 through a chain of gears generally designated 215.

*Card joggling device.*—When the card is stopped by fingers 209, a pair of plates 216 (Figs. 5 and 10) are moved toward each other and in doing so they engage opposite edges of the card and centralize it in its path of travel. Each plate is pivotally mounted on a pin 217 (see Fig. 10a) and normally urged away from the card edge by a spring 218. An extension 216a of the plate carries a camming surface 219 adjacent to which lies the free end of an arm 220, secured to rod 211. The rod has a cam follower 222 in cooperation with a cam 223 on constantly rotating shaft 193. As the cam 223 rotates, it will rock follower 222 and thereby cause the end of arm 220 to engage surface 219 and rock plate 216 against the card edge.

*Card positioning stop mechanism.*—Between the dispatching rollers 170 (Figs. 3b and 13) and the rollers 205 is a mechanism which functions to stop the card in any one of twenty-four positions to present any one of twenty-four lines of the card to receive printing from a row of type wheels 225. This mechanism comprises four stops or shutters designated 226a, 226b, 226c and 226d, each on a separate rod 227 normally rocked out of the card path by a spring 228. Each rod has a link connection 229 with the plunger of one of four solenoids designated 230a, 230b, 230c and 230d. Energization of any solenoid (as 230a in Fig. 3b) will rock its related stop 226 into card intercepting position and, when the card is so stopped, the dispatching rollers 170 simply slip on the surface of the card. By selectively energizing the solenoids 230a to 230d, when they are located as in Fig. 3b, it is apparent that the card may be stopped in any of four main stopping positions.

The solenoids and stops are mounted in a frame comprising side plates 231 and tie bars 232, which frame has rollers 233 guided for vertical movement in fixed channels 234 (Fig. 7). The frame is urged downwardly by springs 235 and is moved upwardly by engagement of arms 236 secured to a shaft 237, with rollers 238 in the side plates 231. Attached to one of the side plates 231 is a plate 239 having six notches 240 in any one of which a pawl 241 may engage.

To select one of the twenty-four stopping positions for the card, the frame 231, 232 is moved downwardly under control of arm 236, with all the stops in retracted position and pawl 241 in its latched or dotted line position of Fig. 3b. As the notches 240 move down past pawl 241, magnet 242 is energized to rock its armature 243 and release pawl 241 for engagement with a selected one of the six notches 240. The energization of magnet 242 is, of course, timed to coincide with the arrival of the desired notch opposite the nose of pawl 241. This action stops frame 231, 232, with the stops 226a to 226d in one of their six positions, and energization of one of the solenoids 230a to 230d will rock a selected one of the stops into the path of the card to present a desired one of twenty-four lines of the card to type wheels 225.

The manner in which arms 236 are controlled will now be set forth. Referring to Fig. 2b, shaft 237 upon which arms 236 are secured has a cam follower 244 in engagement with a cam 245 integrally rotatable with a gear 246 on a stud 247.

Gear 246 is driven through an idler 248 by a gear 249 (Figs. 2b, 6 and 7) which is coaxial with gear 203. Gear 249 is pinned to shaft 250 which at its outer end has secured thereto an arm 251 (Fig. 2a) to which there is pivoted a spring urged dog 252 in the plane of clutch driving element 253 which is integral with constantly rotating gear 161 (see Fig. 6). Upon energization of magnet MFb, latch armature 254 is attracted to release dog 252 for engagement with element 253, whereby the stop frame 231, 232 will be operated only when magnet MFb is first energized.

Referring to Figs. 2b and 7, gear 246 carries a pin 255 which at the proper time strikes a lever 256 on rod 257 on which the frame stop pawl 241 (Figs. 3b and 4) is mounted to effect relatching of the pawl. A finger extending from the pawl serves to effect positive restoration of armature 243 through a pivoted lever 258 as shown.

*Check writer sensing brushes.*—Upon release of the card by stops 209, it is advanced by further pairs of rollers 259, 260 and 261 (Fig. 13) to a stop 262 which is carried by a rod 263 (see also Fig. 3c). When the card is in position against stop 262, it is opposite a set of printing wheels 457 and, as the card passes to such position, it traverses a row of sensing brushes designated Md which contact one of the rollers 260 of conducting material.

The rollers 259, 260, 261 and a further pair of rollers 265 are in constant rotation, being driven from the constantly rotating vertical shaft 201 (Figs. 3c and 2b), through the gear connections 215 and 266.

In advance of brushes Md is a card lever 267 on a rod 268 (Figs. 3c and 13) which in Fig. 1a through a finger 269 closes a pair of contacts MCL3. In Figs. 3b and 3c the rod 263 carrying stop 262 has a follower 270 thereon which is operated by a cam 271 on constantly running shaft 214, so that the stop 262 is retracted at the time indicated in the timing chart (Fig. 44).

*Stacker mechanisms.*—From the last pair of rollers 265 (Fig. 3c) the card passes normally to the regular stacker 272 into which it is urged by a friction cam 273 secured to shaft 274. Referring to Figs. 2c and 11, shaft 274 has secured thereto an arm 275 carrying a pivoted clutch dog 276, which is released by latching armature 277 when magnet 278 is energized. This couples shaft 274 to a clutch disk 279 integral with one of a chain of gears designated 280 driven from constantly running shaft 201, through gears 266. Meshing with one of the chain of gears 280 (Fig. 2c) is a gear 281 at the end of shaft 282 (see Fig. 11). This shaft carries rollers 283 and through gears 284 drives rollers 285 loose on shaft 274. The gear connections are such that roller 285 on shaft 274 drives constantly in a clockwise direction as viewed in Fig. 3c in which the shaft 274 and cam 273 thereon are driven counterclockwise when magnet 278 is energized.

The card is deflected from its normal straight line path to stacker 272 by a rod 286 (Fig. 3c) which is carried by a link 287 mounted for horizontal movement and connected to an arm 288 on a shaft 289. In Fig. 2c shaft 289 carries a spring pressed cam follower 290, normally latched by armature 291 of a magnet 292, which when energized enables follower 290 to follow a cam 293 on constantly running shaft 214, which cam will shift bar 286 (Fig. 3c) to deflect the card from its normal path and into engagement with rollers 283, 285 which advance the card to a pair of constantly running rollers 294. In passing rollers 283, 285, the card engages and rocks a card lever 295 on a rod 296, which in Fig. 1b carries a finger 297 for closing card lever contacts MCL4.

Rollers 294 advance the card to stacker 298 where friction cam 299 engages the card to urge it into stacked position. This cam (see Fig. 12) is secured on a rod 300 which is mounted for sliding in an axial direction away from a shaft 301 with which it has driving pin and slot connection 302. Shaft 301 has an arm 303 secured thereto (Fig. 3c) carrying a spring pressed dog 304 normally held out of engagement with a constantly running clutch element by armature 305 of a magnet 306. Accordingly, cams 299 rotate only when magnet 306 is energized.

The shaft 300 (Fig. 12) carries a cam 307 which cooperates with a roller 308 so that, if the roller is held in the position of Fig. 12, the shaft will be forced upwardly as it rotates, and as a result cams 299 will slide the topmost card in Fig. 3d endwise to offset such card in stacker 298. Roller 308 is pivoted on an arm 309 and, when a magnet 310 is energized, armature 311 is swung into position to block counterclockwise rocking of arm 309. If magnet 310 remains deenergized, cam 307 will cause arm 309 to rock against the tension of its spring 312. The stacker 49 (Fig. 33) for the detail cards is provided with an identical offsetting device controlled by a magnet 310a which, when energized, will cause its armature 311a to engage arm 309a to hold roller 308a in the path of cam 307a, whereby the shaft 55 and cam 56 will be shifted laterally.

Stacker 298 is provided with a pair of contacts 313 (Fig. 3d) which close when a sufficient number of cards has accumulated to lower finger 314 into engagement with the contacts. Stacker 272 (Fig. 1b) likewise has a pair of contacts 315 closed by finger 316 when sufficient cards are stacked to cause rocking of the finger.

*Alphabetic printing mechanism*

During the explanation of the master card feeding mechanism it was pointed out that the card was stopped in one of twenty-four printing positions opposite type wheels 225 (Figs. 4 and 13). The manner in which these wheels are adjusted will now be set forth.

*Oscillating drive for the type wheels.*—The wheels 225 are frictionally supported on a shaft 317 (Figs. 16 and 17) which has a gear 318 secured to one end thereof (Figs. 15 and 2b) which meshes with a bell crank sector 319 pivoted at 320. A pair of rollers 321 cooperate with complementary cams 322 on a shaft 323 which also has a gear 324 driven from gear 246 through an idler 325. This gear 246 as explained above is driven only when magnet MFb (Fig. 2a) is energized. Referring to Figs. 17 and 19, each wheel 225 is in the form of a ring spaced along a cylinder 326 integral with shaft 317. Adjacent to both sides of each wheel is a ring 327 which is secured to the cylinder for oscillation therewith.

The cylinder 326 is provided with longitudinal slots and circumferential grooves, and in assembling the parts internally extending tongues 328 of rings 327 are slid along the slots into alignment with the grooves and then rotated in the grooves. Thereafter, a wire 329 is inserted through the tongues and a hole through the cylinder to lock the parts in spaced relationship. Between each wheel 225 and its adjacent rings 327 are fiber washers 329 and 330, and between washer 329 and the wheel is a spring steel disk 331 having a tongue 332 fitted into a slot in the ring 225, so that the two are locked against relative rotation. When the parts are assembled as shown in Fig. 19, the disk 331 is squeezed between washer 329 and ring 225 causing a slight "dishing" of the disk, whereby spring pressure is exerted between the faces of the several parts. As the cylinder is rotated in either direction, rings 327 acting on fiber washers 329 and 330 will cause ring 225 to follow. Each ring 327 has an extension 333 which, on the restoring or counterclockwise rotation of cylinder 326, engages a pin 324 in wheel 225 to insure restoration of the wheel.

One half the periphery of wheel 225 has type elements 336 thereon and the other half has ratchet teeth 337. There is a type element 336 for each of the characters shown in the perforation code of Fig. 28a and as the wheels are oscillated clockwise in Fig. 16, the type elements pass the printing line in the order in which they are arranged in Fig. 28a reading from left to right.

Lying in the plane of wheel 225 is a pawl 338 pivoted on an arcuate slide 339. The slide and pawl are normally retained in the position of Fig. 16 against the tension of spring 340 by a bail 341 and, while the parts are in such position, wheel 225 is rocked clockwise to cause the teeth 337 to pass pawl 338 in the order 1, 2, 3, etc. Lying in the plane of slide 339 is a pawl 342 pivoted at 343 upon which center is also pivoted a bar 344. Bar 344 is oscillated about its pivot 343 and spring 345 moves pawl 342 likewise to cause teeth 346 therein to pass a pawl 347 in the order 12, 11, 0 as the corresponding zone positions of a card are sensed. Bar 344 is rocked as follows: A cam 348 (Figs. 21 and 15) on shaft 323 rocks a spring pressed follower lever 349 which through a link 350 and arm 351 rocks a stud 352 which is integral with bar 344.

Pawl 347 is normally held in the position of Fig. 16 by the tail of pawl 342 and, when bar 344 rocks counterclockwise, hook 353 of pawl 347 engages a finger 354 of a three armed lever 355, which holds the pawl out of the path of teeth 346. Arm 358 of lever 355 has a link connection 359 with armature 360 of magnet 361. In the operation of the machine, teeth 346 of pawl 342 pass the nose of pawl 347 as the index point positions 12, 11 and 0 of the card are successively sensed and if, for example, magnet 361 is energized as the result of sensing a 0 perforation in a card column, lever 355 will be rocked counterclockwise to release pawl 347 whose nose will thereupon engage the 0 tooth 346 of pawl 342 and interrupt its movement in the position shown in Fig. 18.

This so-called zoning movement takes place while the slide 339 is in the position of Fig. 16 and the result is to position finger 362 of pawl 342 in the path of one of the ledges 363 of the slide for subsequent engagement of the finger with a selected ledge, when the slide moves clockwise. If the magnet 361 is not energized during the movement of bar 344, pawl 342 rocks to its extreme position where its last tooth 346 contacts the nose of pawl 347 and finger 362 is positioned in the path of the lowermost ledge 363 of slide 339.

A shaft 357 (Figs. 16 and 18) is now rocked and a bail 356 thereon restores lever 355, so that the extremity of finger 354 swings under hook 353, if the pawl 347 had been tripped. Rocking of shaft 357, is effected by a cam 364 (Fig. 20a) on shaft 323 through a spring pressed follower 365 and link and arm connection 366. At the same time, a bail 367 (Fig. 16) on shaft 368 is rocked to enable pawl 338 to rest on an arm 369 of lever 355. Such rocking is effected by a cam 370 (Figs. 23 and 1a) on shaft 323 through a follower 371 and link and arm connection 372. Concurrently through a further link and arm connection 373, cam 370 rocks a shaft 374 to which is secured a bail 375 (Fig. 16).

Wheels 225 now rock in a clockwise direction (Fig. 16) and the teeth 337 thereon pass pawl 338 in succession as the corresponding hole positions in the card are sensed. If magnet 361 is now again energized when any tooth 337 is opposite pawl 338, the consequent rocking of lever 355 will release the pawl 338 to engage the selected tooth and interrupt further advance of wheel 225. In Fig. 17 is shown the relative positions of the parts after magnet 361 has been energized to trip pawl 338 for engagement with the 1 tooth 337.

After a time sufficient for all the teeth 337 to pass pawl 338, bail 376 is rocked clockwise in accompaniment with the continued rocking of shaft 317 and, as a result, slide 339 and pawl 338 will rock with the bail 376 until the slide is interrupted by engagement of one of its ledges 363 with the previously set stop 362. At such moment the type element 366 corresponding to the character represented by the combined setting of zone pawl 362 and pawl 336 will be presented at the printing line. Bail 396 is rocked under control of a cam 377 (Figs. 22 and 15) on shaft 323 through a follower 378 having link connection 379 with arm 380 to which the bail is secured. Fig. 18 shows the ultimate positions of the parts with pawl 338 engaging the 1 tooth 337 and pawl 342 engaging the 0 ledge 363. Fig. 17 shows the ultimate positions of the parts with pawl 338 engaging the 1 tooth 337 and pawl 342 engaging the first ledge 363 to position the 1 type element for printing.

Referring to Fig. 23, when cam 370 enables bail 367 to rock, bail 375 rocks therewith as explained. Later, cam 370 permits further rocking in the same direction at the time the 0 tooth 337 of wheel 225 is opposite pawl 338. In Fig. 2b, shaft 374 of bail 375 has an arm 381 which is blocked against such further rocking by armature 382 of magnet 383. At this time all the print magnets 361 receive an impulse and, if magnet 383 remains deenergized so that bail 375 (Fig. 16) remains in the position shown, all pawls 338 not already tripped will be released to engage their 0 teeth 337 to position the related wheels at 0. If magnet 383 is energized at this time, however, arm 381 and bail 375 are free to rock counterclockwise and in doing so, levers 384 will rock clockwise to bring their interposing fingers 385 into a position behind levers 369 to prevent their tripping in columns where levers 384 are so rocked, and the pawl 338 will not be tripped to engage the 0 tooth 337. Levers 384 may be individually blocked against rocking by positionable finger pieces 386 pivoted at the upper ends of the levers which pieces 386 when rocked to the dotted line position of Fig. 16 will intercept a bail 387. This is the so-called "inoperative" position of finger piece 386.

Each finger piece has a lateral extension 388 (see Fig. 17a) which reaches across the next adjacent lever 384 as shown. Each lever 369 has a shoulder 389 (Fig. 17) which, when the lever is tripped during the type selecting operation, rocks under the end of finger 385 and will block the related lever 384 against subsequent rocking. If such lever has its finger piece 386 in the full line position of Fig. 17, the extension 388 thereof will block the next lever 384 and it in turn will block the second lever, and so on, for as many positions as have their finger pieces in the full line position. This continuity of blocking is broken at the first position in which finger piece 386 is rocked to the dotted line position of Fig. 17, since in such dotted line position the extension 388 is out of the path of the next lever 384. The finger pieces thus determine the extent of 0 printing in the columns to the right of positions in which significant digits are printed. Fig. 19a shows diagrammatically a series of positions in which the finger pieces 386 are variously set in up, down and center positions and on the first line it will be noted that the zeros to the right of digit 6 will be printed, because the piece 386 in the 6 position blocks levers 384 in the next three positions. The zero to the right of 7 will be printed, because the piece 386 in the 7 position blocks the next lever 384. On the second line, since levers 355 in the 3, 2 and 4 positions were tripped, zero printing in all remaining positions is prevented except in the position to the right of 2.

Briefly, recapitulating the sequence of events involved in setting the type wheels 225—as the 12, 11 and 0 positions of the card are sensed, pawls 347 (Fig. 16) are tripped to selectively position members 342 each in one of its four zone positions. Thereafter, magnet armatures are reset and the teeth 337 pass pawl 338 as the card positions 1 to 9 are successively sensed and, after the 9 tooth 337 has passed pawl 338, the zero selecting mechanism functions to trip pawls 338 into the 0 teeth 337 in positions determined by the setting of finger pieces 386. Thereafter, bail 376 moves to allow pawls 338 and wheels 225 to move an amount determined by the setting of stops 362.

*Print bail operating mechanism.*—With the type wheels thus positioned, the printing platen is actuated to take an impression therefrom. This platen is shown at 390 (Fig. 4) and is supported by side arms 391 pivoted at 392. Rollers 393 carried by arms 391 are engaged by cams 394 (Fig. 7) which are mounted on a sleeve 395 loose on shaft 172. A gear 396 on the sleeve meshes with gear 397 loose on shaft 250 (Fig. 6). Also loose on this shaft is a gear 398 which is constantly driven by a gear 399 on the constantly running shaft 162. Integral with gear 398 is a clutch element 400 (see Fig. 4) and in the plane thereof is a dog 401 pivoted to a disk 402 integral with gear 397. Upon energization of magnet 403, its armature latch 404 will release dog 401 for engagement with element 400 and the printing bail will be actuated as a result.

*Punch operating mechanism.*—Positioned along the printing line to the left of platen 390, as viewed in Fig. 5 (see also Fig. 9), is a punch 405 and die 406. The punch is mounted for horizontal reciprocation by a finger 407 integral with one of the platen actuating arms 391, so that whenever the platen is operated there will be an accompanying punch operation to perforate a hole along the printed line and to one side thereof. A suitable punch chip chute 408 and receptacle 409 are provided as shown.

*Latch trip lever restoration.*—Referring to Fig. 16, bail 387 is rocked clockwise after the printing action to rock all levers 369 so that any that have their fingers 354 engaged in hook 353 will release pawls 347. Bail 387 is secured to shaft 410 which in Fig. 1a has arm and link connection 411 with the follower lever 412 of a cam 413 on shaft 323.

*Ink ribbon feeding mechanism.*—Extending across all the type wheels 225 (Fig. 16) is an ink ribbon 415 suitably guided between spools 416 and 417 on the ends of which are ratchets 418 and 419 (Fig. 1a), respectively. A double pawl 420 is pivoted at 421 to a lever 422 which is rocked about its pivot 423 by a arm 424 on a shaft 425. In Fig. 8, shaft 425 has arm and link connection 426 with a follower 427 of cam 428 on constantly running shaft 162 (see also Fig. 6). The follower 427 is normally restrained against following cam 428 by armature 429 of magnet 430, so that ribbon feed action is not effected until the magnet is energized, when as a result shaft 425 is rocked to in turn rock lever 422 and reciprocate pawl 420 to advance the ribbon in a direction determined by the position of the pawl 420, which has toggle spring connection 431 with a lever 432 on a rod 433. In Fig. 24, rod 433 has slotted arm connection 434 with a link 435 whose extremities carry spring pressed latches 436 that ride on the ribbon spools. The latches are engaged by the usual slots in spools 416 and 417 to reverse the pawl action in the usual manner.

Check printing mechanism

Referring to Figs. 2b and 14, the gear 324 on print shaft 323 drives a gear 438 free on a shaft 439. A clutch element 440 integral with gear 438 is arranged to engage a dog 441 pivoted to an arm 442 secured to shaft 439. Energization of magnet 443 will attract its armature 444 to release dog 441 so that the shaft 439 will be driven by gear 438. A gear 445 on shaft 439 (see also Fig. 25) drives a shaft 446 through gear 447. This shaft carries a pair of complementary cams 448 which oscillate a gear sector 450 pivoted at 451, through rollers 452. The sector 450 in turn through gear 453 oscillates the print wheel shaft 454.

*Print wheel setting mechanism.*—Keyed to shaft 454 (Figs. 27 and 41) are a plurality of disks 455 supporting spring pressed friction shoes 456 through which print wheels 457 are oscillated. When disk 455 is rocked clockwise as viewed in Fig. 41, the shoes 456 turn wheel 457 in the same direction and during such movement the wheel may be intercepted with any one of type elements 458 representing the digits 0 to 9 in printing position by engagement of a pawl 459 in one of the teeth 460 of the wheel. Pawl 459 is pivoted at 461 on plate 462 which is free on shaft 454 and held in the position shown in Figs. 26 and 41 by spring connection 463 with a bar 464. Pawl 459 is latched out of the path of teeth 460 by a latch 465 which has link connection 466 with armature 467 of a magnet 468. Clockwise rotation of wheel 457 is synchronized with the sensing of the card by brushes Md, so that as the hole positions are sensed in the order 0, 1, 2, 3, etc., the 0, 1, 2, 3, etc., teeth 460 pass the nose of pawl 459 in succession, and if magnet 468 is energized in response to the sensing of a digit hole in the card, it will release pawl 459 for engagement with the related tooth 460 to interrupt the movement of the wheel with the related type element 458 in printing position. Thus, in Fig. 41 pawl 459 is shown as having been tripped to engage the 0 tooth 460 to present the 0 type element 458.

After the wheels have all been positioned, an impression is taken therefrom and the friction drive returns the wheels to home position where a tooth 469 engages a fixed stop 470. To insure restoration, a disk 471 keyed to shaft 454 is provided with a projection 472 which will engage a shoulder 473 of the wheel to positively restore it if the friction drive does not effectively do so.

*Asterisk setting mechanism.*—For purposes of check protection, provision is made for presenting the asterisk type element 458 to the printing line in all positions of the dollars value to the left of the highest significant figure. As viewed in Fig. 27, the group of seven type wheels 457 are those which print the dollars amount with the units position being set on the uppermost wheel of this group. In the initial setting of the wheels all the related pawls 459 are tripped so that there is an initial setting in which zeros are presented for printing in the higher order positions. Through the mechanism now to be explained, the wheels in orders to the left of the highest significant position will be given a retrograde movement of one step to bring their asterisk type element into printing position and move the initially set zero elements out of printing position.

To do this, there is provided a lever 475 for each pawl 459 also pivoted at 461 of the related plate 462 (see also Fig. 40). This lever is normally urged against a pin 476 of pawl 469 by a light spring 477 and, when the pawl is tripped, the lever rocks therewith. It is to be particularly noted in Fig. 41 that the 0 tooth 460 of the type wheel has a lesser depth than the 1 to 9 teeth, so that if the pawl is tripped to engage one of such deeper teeth, it will rock further than for the 0 setting shown in Fig. 41 and will carry the lever 475 therewith to the dotted line position.

Each lever 475 has a cross arm 478 (see Fig. 40) which for the 0 setting is positioned above a slot 479 in a fixed bar 480, and for a significant digit setting is positioned above a solid portion of the bar. The cross arms 478 of adjacent levers overlap in such a manner that, when any lever is rocked to its dotted line position, it will cause rocking of all levers in lower denominational positions of the dollar amount group to such dotted line position, so that any such lower levers that may be in their full line or 0 position will be so rocked. This rocking is effected by the pawl spring 481 which is strong enough to overcome the light springs 477.

Bar 464 is now rocked counterclockwise (Fig. 41) about shaft 424 and through springs 463 will tend to rock plates 462 in the same direction. In positions in which lever 475 is in its full line position plate 462 will rock and carry with it pawl 459 and lever 475 whose cross arm 478 will descend into slot 479. The pawl 459 will in turn effect counterclockwise rotation of its wheel 457 to bring the asterisk type element 458 into printing position. In positions where the lever 475 is in its dotted line position, movement of the lever and consequently of the pawl 459 and plate 462 will be blocked by engagement of cross arm 478 with the solid portion of bar 480 and the print wheel in such position will not be disturbed.

Bar 464 is carried by side members 482 (see Fig. 25) which have link connection 483 (Fig. 28) with arms 484 secured to a shaft 485 to which is also secured follower lever 486 cooperating with complementary cams 487 on shaft 446. Referring to Fig. 27, the pair of uppermost wheels 457 which print the cents value do not have the asterisks setting mechcanism since in check printing, zeros are printed when no significant value is called for. In these two positions the related stop pawls 459 have their pivots 461 (Fig. 41) fixed to a stationary part of the machine.

In Fig. 27 are shown four print wheels 488 on a fixed rod 489 upon which the wheels may be manually adjusted to present a selected year, day and month to the printing line. Suitable detenting devices (not shown) will hold the wheels in set position.

Referring to Figs. 26 and 29, a signature block 490 is removably positioned in the framework of the printing mechanism and held therein by a lock and bolt generally designated at 491. Extending across the signature block and type wheels is the ink ribbon 492 wound on spools 493, each of which is driven through a ratchet 494 by pawl lever 495 pivoted to an arm 496. Arm 496 is secured to rod 497 to which is also secured a follower arm 498 having a roller in engagement with a face cam 499 on shaft 446. With the parts in the position shown in Fig. 29, the lower spool 493 is driven clockwise to draw a ribbon 492 and turn the upper spool counterclockwise. When the upper spool is sufficiently unwound to expose slot 500, a pawl 501 rocks into the slot and will be drawn upwardly thereby to shift link 502 upon which it is pivoted. Through pin and slot connection 503 bell crank 504 will then be rocked and will through toggle spring 505 rock lever 495 out of engagement with lower ratchet 494 and into engagement with the upper ratchet, so that subsequent ribbon feeding will be in the reverse direction. On link 502 are pivoted detenting pawls 506 to hold the respective ratchets against retrograde movement when driven to thereby keep the ribbon taut.

Check total accumulator

Located beneath the check money value printing wheels 457 and operated thereby during the restoring movement of the wheels is an accumulating mechanism comprising for each denominational order thereof (Figs. 26, 42, 40 and 43) an indicating wheel 507, a gear 508 and a carry cam 509 rotatable on a rod 510 journaled in a frame 511 pivoted on rod 512 and biased counterclockwise by a spring 513 (see Fig. 25).

Each gear 508 lies in the plane of a gear 514 but is normally out of mesh therewith as shown in Figs. 26 and 41 during the setting operation of the print wheels. During such period a camming finger 515 integral with plate 482 (Fig. 25) engages and holds frame 511 in the position shown against the tension of spring 513. Gear 514 is adjacent to related wheel 457 and carries a block 516 (Fig. 41) extending into an opening 517 in the wheel. A spring 518 anchored at 519 to the gear and at 520 to the wheel tends to urge the gear counterclockwise and keeps blocks 516 seated in slot 517 as shown so that, when the wheel is turned clockwise to a selected printing position, the gear 514 is driven therewith the same extent. When plate 482 rocks counterclockwise just prior to restoration of the wheels, cam finger 515 releases frame 511 so that gear 508 will be rocked into mesh with gear 514 and the gear 508 will be rotated in a clockwise direction an amount proportional to the digital value set upon the associated print wheel.

It will be observed in Fig. 41 that in positioning the print wheel it is advanced one step more than the value setup, thus, for a 0 setting the wheel advances one step, for a 1 setting the wheel advances two steps, for a 2 setting the wheel advances three steps. On the return of the wheel, however, the gear 514 is returned one step short of the amount of advance so that the accumulator gear 508 does not receive the extra step, except in cases of tens carry as will be explained. To gear 514 there is secured a disk 521 having a projection 522 which in the extreme home position of both wheel 457 and gear 514 occupies the dotted line position of Fig. 41, where it is engaged by a spring urged latch 523 pivoted at 524 and holds the latch in the dotted line position shown. When wheel 457 is advanced, the projection 522 moves clockwise and latch 523 snaps behind it, so that during the restoration of the wheel and gear the wheel will be freely restored but the gear 514 will be intercepted one step short of its home position with spring 518 yielding to permit the relative displacement of wheel and gear.

If, now, it is required that a tens carry unit be entered into a particular ordered gear 508, the related latch 523 is rocked counterclockwise while the gears are still in mesh. As a result, spring 518 will advance the retarded gear 514 to home position and will incidentally advance the accumulator gear 508 an additional step. The manner in which latch 523 is tripped might best be explained by reference to Figs. 40 and 42. Adjacent to each latch 523 and also pivoted on rod 523 is a three armed, spring urged lever 525 across the tails 526 of which there extends a cross bar 527 secured to side plates 482. During the advance movement of the print wheels, this bar 527 occupies the position shown in Fig. 26, where it holds the levers 525 in the position shown. In line with the left end of lever 525 is a latch 528 rotatable on a rod 529 in movable frame 511. Each latch 528 is integral with a carry finger 530 which rides on the carry cam 509 of the next lower denominational accumulator gear 508. The action is such that, when plate 482 is rocked counterclockwise (Fig. 42) cam 515 first rides off frame 511 enabling engagement of the gears. Shortly thereafter bar 527 moves out of contact with tails 526 so the latter may rock against the ends of latches 528. With the parts in such position, the print wheels are restored and the accumulator gears 508 together with their carry disks are rotated. Whenever a gear 508 passes from a 9 to a 0 position, a projection 531 rocks finger 530 and the latch 528 of the next higher order. As a result, lever 525 of such next higher order is released to rock counterclockwise against a lateral extension 532 of latch 523 under the influence of a strong spring 533, to withdraw latch 523 from the path of projection 522, so that the related gear 514 may advance the additional step and add an extra unit.

When the accumulating gears 508 (Fig. 26) are retracted, they engage detenting teeth 534 to hold the gears against displacement. The teeth 534 are on a bar 535 which is manually slidable to shift the teeth out of the plane of gears 508, so the latter may be reset by rotation of hand wheel 536 (Fig. 27) on shaft 510, whereby the gears will be frictionally rotated against the ends of carry levers 530 to their zero positions. A tamperproof lock may be provided to prevent unauthorized shifting of the locking teeth 534. Referring to Fig. 3c, after the print wheels 457 have been set, solenoid 537 is energized and will rock latch 538 clockwise. The latch normally engages a shoulder 540 on hammer 539 secured to shaft 548 which, when released, will be rocked counterclockwise by spring 541 together with hammer 542. Platen 543 will thereupon strike the card opposite wheels 457 and platen 544 will strike the signature block 490. Cam 546 on shaft 214 thereafter engages roller 547 on an arm secured to shaft 548 to restore the hammers to latched position.

Shaft 548 in Fig. 1b has arm and link connection 549 with a unit counter 550, so that a unit is counted for each operation of the check printing hammer.

Referring to Figs. 1, 1a, 1b, 2b, 2c, the alphabetic printing mechanism and the check printing mechanism together with their control mechanisms are mounted on a pair of side frames 551 which are pivoted at their lower ends on pins 552 and the entire frame may be rocked as indicated in dotted outline in Fig. 1, so that access may be had to the path of travel of the cards and also to the ribbon mechanism and signature block. At their upper ends, frames 551 are provided with rollers 553 (Fig. 1a) which are engaged by cam lock levers 554 pivoted at 555 to lock the frames in operative position. When the frames are swung into open position, the weight thereof is borne by a spring drum 556 connected to the frames by a cable 557. Also, when the frames are open a spring pressed detent 558 (Fig. 2b) rocks into engagement with the teeth of gear 324 to lock the shaft 323 against accidental displacement while the parts mounted on the frame are disconnected from the mechanism on the stationary framework of the machine.

For purposes of entirely removing frames 551, the pins 552 (Fig. 1c) are retractable through a lever 559 pivoted at 560 which directly retracts the lower pin 552, and through a rod 561 and arm 562 retracts the upper pin. A latch 563 serves to engage the end of lever 559 to hold it in retracting position and a release lever 564 is provided to cam the latch 563 out of latching position when it is desired to release the pins for engagement with the frames 551.

Comparing mechanism

Referring to Figs. 34 and 30, the constantly running gear 88 drives a gear 565 secured to shaft 566 which is the operating shaft of the comparing unit shown in Figs. 47 and 48. This comparing unit is of well known construction so that it will be only briefly described herein.

Secured to shaft 566 is a cam 567 which through roller 568 oscillates a lever 569 free on a shaft 573. Cooperating with opposite ends of lever 569 are bails 570 and 571, each urged by a spring 572 (Fig. 48) in a counterclockwise direction into engagement with lever 569, so that the bails oscillate with the lever. The bail 570 through a spring 574 rocks a lever 575 clockwise, so that teeth 576 in the lever pass a stopping pawl 577 in the order 0, 1, 2, 3, etc., as the corresponding hole positions of the cards pass the sensing brushes. Bail 571 through spring 574a effects similar rocking of lever 575a in the opposite direction to move teeth 576a past pawl 577a. Pawl 577 is tripped by a magnet SM1 and pawl 577a is tripped by a magnet SM2, and in Fig. 47 the parts are shown in the position they occupy after both magnets SM1 and SM2 have been energized in response to the sensing of 0 holes in the cards, thus tripping their pawls 577 and 577a into engagement with the 0 teeth 576 and 576a respectively, to interrupt the levers while the bails 570 and 571 continue their clockwise advance. In this way, a setting is made to represent two digits to be compared.

Figure 49:
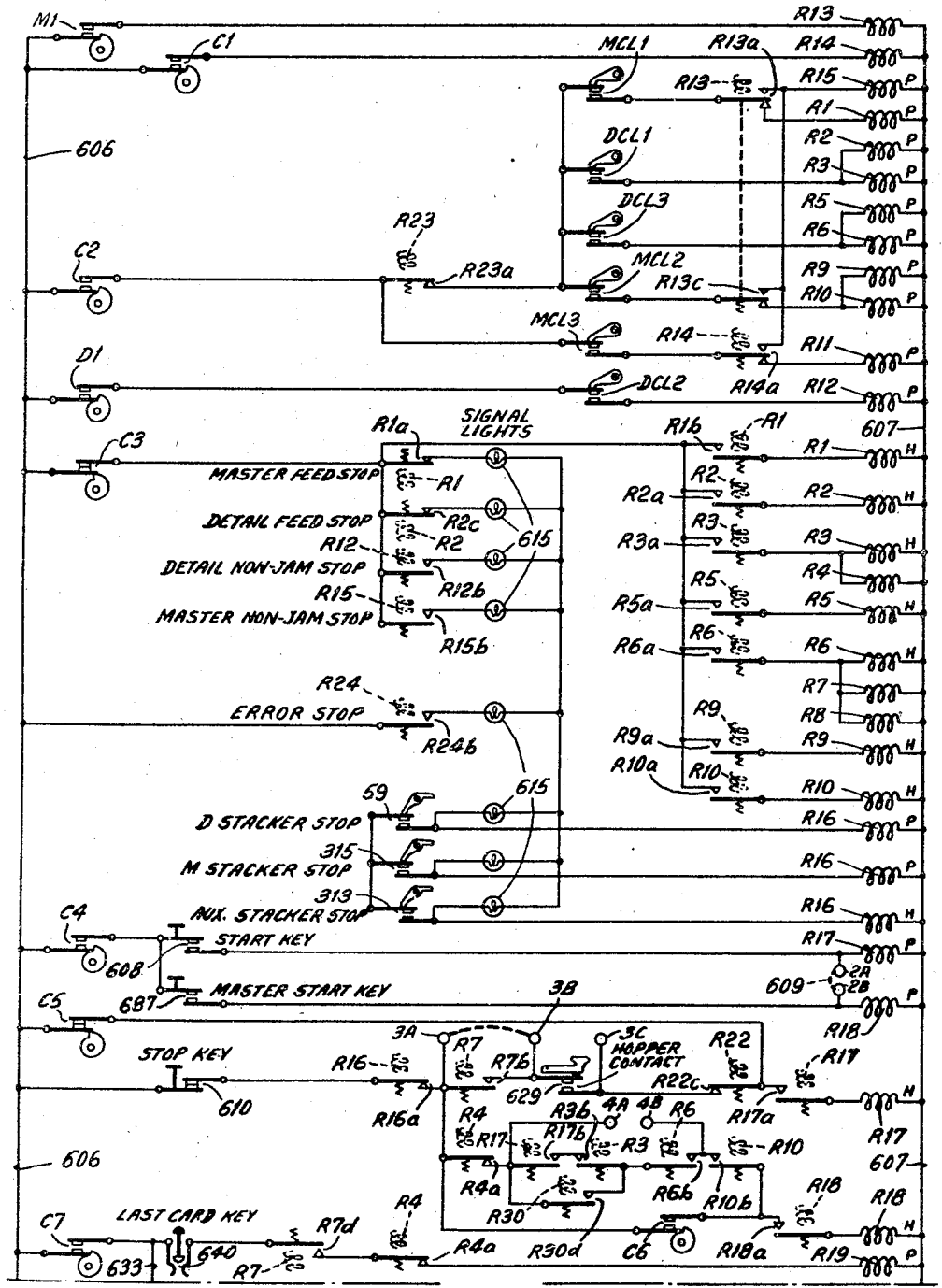

Normally, movement of the bails 570 and 571 is prevented by mechanism controlled by restoring magnets designated PR1 and PR2 in Fig. 49. Armature 578 of magnet PR1 normally holds a spring pressed latch 579 in the path of a stop 580 pivoted to bail 570 while armature 578 of magnet PR2 holds a spring pressed latch 579 in the path of a stop 580a pivoted to bail 571, so that both bails are blocked against counterclockwise movement. Obviously, when either or both magnets PR1 and PR2 are energized, latch 579 or 579a or both rock out of the path of their related stops to enable rocking of the bails. Since the bails act to restore their levers 575, 575a, it will be apparent that by locking the bails against a counterclockwise rotation the levers 575, 575a will retain their settings. In Fig. 47 bail 570 strikes a lever 581 at the limit of its counterclockwise stroke to cause a bar 582 to restore the armature of magnet SM1, so that if the bail is blocked the armature will also not be restored. Bail 571 acts similarly on a lever 581a to rock a bar 582a.

Briefly then, levers 575, 575a are differentially positioned by magnets SM1, SM2 while the bails 570, 571 rock clockwise during the sensing of the hole positions in the cards and the settings are thereafter restored, provided magnets PR1 and PR2 are energized. Failure to energize either magnet PR1 or PR2 will result in the retention of the setting of the related lever 575 or 575a. The controlling devices for the several magnets will be explained in connection with the description of the circuit diagram hereinafter.

There is a plurality of pairs of levers 575, 575a disposed along shaft 573 for each pair of digits to be compared. Each pair of levers 575, 575a in moving to various positions under control of their magnets will also move relative to each other different extents angularly about shaft 573, according to whether the digit represented on one lever is higher or lower in value than the other, but will not move relative to each other when both levers of a pair are set to represent the same digit. Both levers are provided with pins 583 located equal distances from shaft 573 which ride in curved slots formed in a differential link 584, which link has a pin 585 at its center riding in a horizontal slot 586 of a fixed plate 587. Pin 585 also extends through a cam slot 588 in a control arm 589 loosely pivoted on shaft 573.

With this construction, link 584 may rotate on pin 585 and the pin may also slide in slot 588. The curved slots in link 584 are so configured that, when both levers 575, 575a move equal distances, both ends of the link receive equal and opposite angular displacements and consequently pin 385 will remain stationary. On the other hand, if lever 575 receives a setting higher in value than the setting of lever 575a, the upper end of link 584 will be moved through a greater distance than its lower end, thus causing pin 585 to move to the right. Likewise, if lever 575a receives a setting higher in value than the setting of lever 575, the lower end of link 584 will be moved through a greater distance than its upper end, causing pin 585 to move to the left.

Assuming that lever 575 is set under control of a hole in a detail card and lever 575a is set under control of a hole in a master card, then if both holes are equal in value, pin 585 remains in the position of Fig. 47. If the master card value is greater, pin 585 moves to the left, and if the detail value is greater, pin 585 moves to the right. The effect of this is to cause rocking of arm 589 clockwise by coaction of pin 585 with cam slot 588, when the master card value is greater, and to cause rocking of the arm counterclockwise when the detail card value is greater.

The arm 589 coacts with upper pairs of contacts 590 and 591 to cause opening of 590 and closure of 591 when the arm is rocked counterclockwise to represent the condition of detail card greater than master card or, as it is called, a high detail condition. The arm also coacts with lower pairs of contacts 592 and 593 to cause opening of 592 and closure of 593 when the arm is rocked clockwise to represent a high master condition. The manner in which the manifestation of conditions of comparison control the machine will be explained in connection with the circuit diagram. In Fig. 48 cams 594 and 595 on shaft 566 serve to restore pawls 579 and 579a through follower lever 596 which also rocks bell cranks 597 to restore armatures 578, 578a.

The circuit diagram

The circuit diagram (Figs. 49 to 49i) electrically coordinates the various mechanisms described hereinabove, and the manner in which several representative problems are handled in the machine will now be explained in connection with the circuit diagram. The several cam controlled contacts prefixed C, M and D are shown generally along the left margin of the diagram, and their timing is given in charts (Figs. 45 and 46) to which reference may be made when tracing circuit paths. A great many relays are shown on the diagram and in each case they are identified by the letter R. The contacts controlled by the relays are given the same reference character as the relays, followed by a lower case letter. Thus, R1 represents a relay and R1a, R1b, etc., represent contacts operated thereby. To avoid involved cross wiring, the contacts are in many cases located on the diagram at points remote from their controlling relays, and in such cases the system of designation will serve to identify the related elements. In addition, the relays are shown dotted adjacent to such remotely located contacts.

Certain of the relays are of the type having multiple windings on a common core, and here again to simplify the connections the individual windings are shown separated. In such cases the like reference characters will identify the related elements and the letter P or H in parenthesis is placed adjacent to the winding to denote whether it is a so-called pickup or holding winding. Such relays, as is well known, are initially energized by a circuit through the pickup winding and thereupon close contacts which complete a circuit through the holding winding to maintain the contacts closed.

Several so-called latch type relays are also utilized in which two windings are provided, one of which is designated (P) and when energized operates contacts which become latched in operated position. The second winding upon energization releases the latch to allow the contacts to return to their initial position, and this second winding is designated as (DO) to indicate that it drops out the contact setting.

A great many wires in the circuit diagram terminate in plug sockets indicated by small circles between which connections are made in accordance with the particular requirements of the problem being handled by the machine. In the actual machine the plug sockets are extended to the rear of a so-called plugboard shown in Fig. 51 on which they are grouped and identified as shown. On this board connections are made as represented by heavy lines, and in tracing circuits hereinafter such plugging diagram is to be considered in connection with the circuit diagram.

Check printing operation

Fig. 50 shows diagrammatically the functions to be performed for this operation of the machine and Fig. 51 shows the plug connections necessary to bring about the correct sequence of events. A group of checks designated MC1, MC3, MC4, etc., are each provided with perforations in a card field designated 600 to represent an account number different for each check, and further perforations in card field designated 601 to represent a money value. These cards are arranged in numerical order by account number and placed in the master card magazine 147 (Fig. 1) of the machine. A group of detail cards each having account number perforations in a field designated 602 are also arranged in order and placed in the detail card hopper 44 (Fig. 1). For each master card or check there may be one or more detail cards identified by like numerals, as for example for card MC1 there are five cards DC1 all having the same account number, and for card MC4 there are two cards DC4. Each detail card has a field 603 in which the name, street, etc., data are perforated.

In the operation of the machine, the data in field 603 of the detail cards causes printing on successive lines 604 of the related master card, and the data in field 601 of the master card controls printing of such data on the uppermost line 604 and also on a line 605 of the same card. The line 604 upon which the first detail card is to print is preselected by a plug connection. This connection and others incidental to the operation will be explained more fully hereinafter as the separate steps are individually described.

*Start circuits.*—Referring to the circuit diagram (Figs. 49 to 49i), current is supplied to main lines 606 and 607 which places the main driving motor 25 (Fig. 1) in operation and causes the C cams to operate continuously. With the two files of cards placed in the magazines as explained, start key contacts 608 (Fig. 49) are closed and, when contacts C4 close, the pickup winding P of relay R17 will be energized. By means of a plug connection 609, the pickup winding P of relay R18 is also energized concurrently. This connection 609 is shown in Fig. 51 in the lower part in the block headed "Switches" and indicates that sockets 2A and 2B are connected. The sockets correspond to the sockets 2A and 2B in Fig. 49. Relay R17 closes its contacts R17a to establish a holding circuit directly through contacts C5 and the holding winding H of the relay. Relay R18 closes its contacts R18a to establish a holding circuit from line 607, winding H of relay R18, contacts R18a, C6, R16a and stop key contacts 610 to line 606. The timing of contacts C5 and C6 in Fig. 45 gives the duration of these holding circuits.

*Master clutch circuit.*—Relay R18 closes its contacts R18b which complete a circuit traceable from line 606 (Fig. 49a) contacts C9, switch 611, contacts R12c, R15c, R18b, R20a, R44a, R42c, R10c, connection 612 across switch sockets 18D and 18C (Fig. 51), clutch magnet MFa to line 607. As a result, the mechanism controlled by clutch magnet MFa (Fig. 2a) will function to operate the master card feeding mechanism for one cycle, during which the first master card MC1 of Fig. 50 will be advanced to close card lever contacts MCL1 (Fig. 1a).

*First detail clutch circuit.*—Relay R18 also completes a circuit through its contacts R18b traceable from line 606 (Fig. 49a), contacts C9, switch 611, contacts R12c, R15c, R18b, connection 613 across switch sockets 18B and 18A (Fig. 51), contacts R6c, R30c, clutch magnet DFa to line 607. As a result, the mechanism controlled by clutch DFa (Fig. 30) will function to operate the detail card feeding mechanism for one cycle, during which the first detail card DC1 of Fig. 50 will be advanced to close card lever contacts DCL1 (Fig. 31). At the end of the cycle the detail card will be in position about to pass brushes Da (Fig. 31), and the master card will be in position about to pass brushes Ma (Fig. 3a).

*Restore master side of comparing mechanism.*—In Fig. 49a, a plug connection 614 is made between switch sockets 15A and 15B (Fig. 51) so that magnet PR2 is energized concurrently with magnet MFa and, as a result, the comparing unit set-up levers (Fig. 47) are restored if at this time there happens to be a setting thereon.

*Card lever circuits.*—Referring to Fig. 49, the closure of card lever contacts MCL1 and DCL1 will complete circuits from line 606, contacts C2, R23a, MCL1, R13a (lower), pickup winding of relay R1 to line 607. This circuit branches at contacts R23a, through contacts DCL1 and pickup windings of relays R2 and R3 to line 607. These three relays close their contacts R1b, R2a and R3a to provide holding circuits through contacts C3 and through contacts R3a a fourth relay R4 is energized. Opening of contacts R1a and R2c will break the normally closed circuit to the two uppermost signal lights 615 designated "Master feed stop" and "Detail feed stop."

In starting the machine, start key contacts 608 are held closed for two cycles or alternatively closed a second time, so that the clutch magnets MFa and DFa are operated to feed their respective cards past the first sets of sensing brushes Ma and Da, respectively, and up to the sensing brushes Mb and Db. With relay R18 energized, its contacts R18b (Fig. 49a) are closed to complete the clutch magnet circuits and in addition a further circuit is now traceable from line 606, contacts C9, switch 611, contacts R12c, R15c, R18b, connection 613, contacts R6c, R30c, R2b (now closed), magnet PR1 to line 607. As a result, the set of levers related to the detail card in the comparing unit is restored and the comparing unit is in readiness to receive entries from the cards as they pass the brushes Ma and Da.

*Second detail clutch circuit.*—In order to advance the detail card to brushes Db, it is necessary to energize the second detail clutch magnet DFb (Fig. 30) and this is effected through a circuit from line 606, contacts C9, switch 611, contacts R12c, R15c, R18b, connection 613, contacts R6c, R30c, R4b (now closed), and clutch magnet DFb to line 607.

*Print unit clutch circuit.*—A branch circuit is concurrently traceable from contacts R4b, through connection 616 between switch sockets 14B and 14A (Fig. 51), upper contacts R43c, and clutch magnet MFb to line 607. This will bring about an idle operation of the print mechanism.

*Further card lever circuits.*—It will be understood that as the leading master and detail cards advance past brushes Ma and Da, a second card is advanced from each magazine and will close the card lever contacts MCL1 and DCL1 as explained. At the same time the leading cards cause closure of their respective card lever contacts MCL2 (Fig. 1a) and DCL3 (Fig. 30). In Fig. 49 these contacts cause energization of the pickup windings of relays R9, R10, R5 and R6 whose contacts (suffixed *a*) provide parallel holding circuits through contacts C3, with contacts R6a also energizing relays R7 and R8. Thus, the relays R1, R2, R3, R5, R6, R9, and R10 are energized while cards are passing the several card levers, and due to the overlap in timing of contacts C3 (Figs. 44 and 45) these relays will remain energized as long as cards continue to feed uninterruptedly. Relays R4, R7, and R8 will be energized solely through contacts C3 and will therefore be repeatedly energized and deenergized each cycle.

*Detail non-jam stop.*—With the master and detail clutches in operation, the M and D cams now function together with the constantly running C cams. Card lever contacts DCL2 (Fig. 30) positioned intermediate contacts DCL1 and DCL3 will, if the detail cards follow one another in proper order, close and open again when cam contacts D1 (Figs. 46, 49) close near the end of the cycle. If, due to malformation of the card, its advance has been retarded, it will hold contacts DCL2 closed so that, when contacts D1 close, a circuit is completed to energize the pickup winding of relay R12 whose contacts R12a (Fig. 49b) provide a holding circuit through restoring key contacts 617 and the holding winding H of the relay R12. The relay also closes contacts R12b (Fig. 49) to cause lighting of lamp 615 designated "Detail non-jam stop." The third pair of contacts R12c (Fig. 49a) will also be opened and held, to break the several clutch magnet circuits traced therethrough, resulting in stopping of the machine with the lamp 615 indicating the reason therefor.

*Comparing setup circuits.*—As the master card passes brushes Ma, the hole positions are sensed in the order 12, 11, 0, 1, 2, 3, etc., and the levers 575 (Fig. 47) move to pass corresponding teeth 576 past the pawl 577 in the same order. The brushes Ma are wired to sockets on the plugboard (Fig. 51) designated "Master control brushes" and from these sockets in columns 61 to 65 connections indicated by a line 618 are individually made to sockets designated "Compare-master." The sockets selected are those related to the brushes traversing the account number field of the card (Fig. 50). Similar connections are made for the detail card from sockets 61 to 65 of the section of the plugboard designated "Detail control brushes," through connections designated by line 619 (Fig. 51) to double sockets 620 in a field headed "Control upper," and from these sockets through connections 621 to sockets in the field designated "Compare-detail."

Figure 49C:
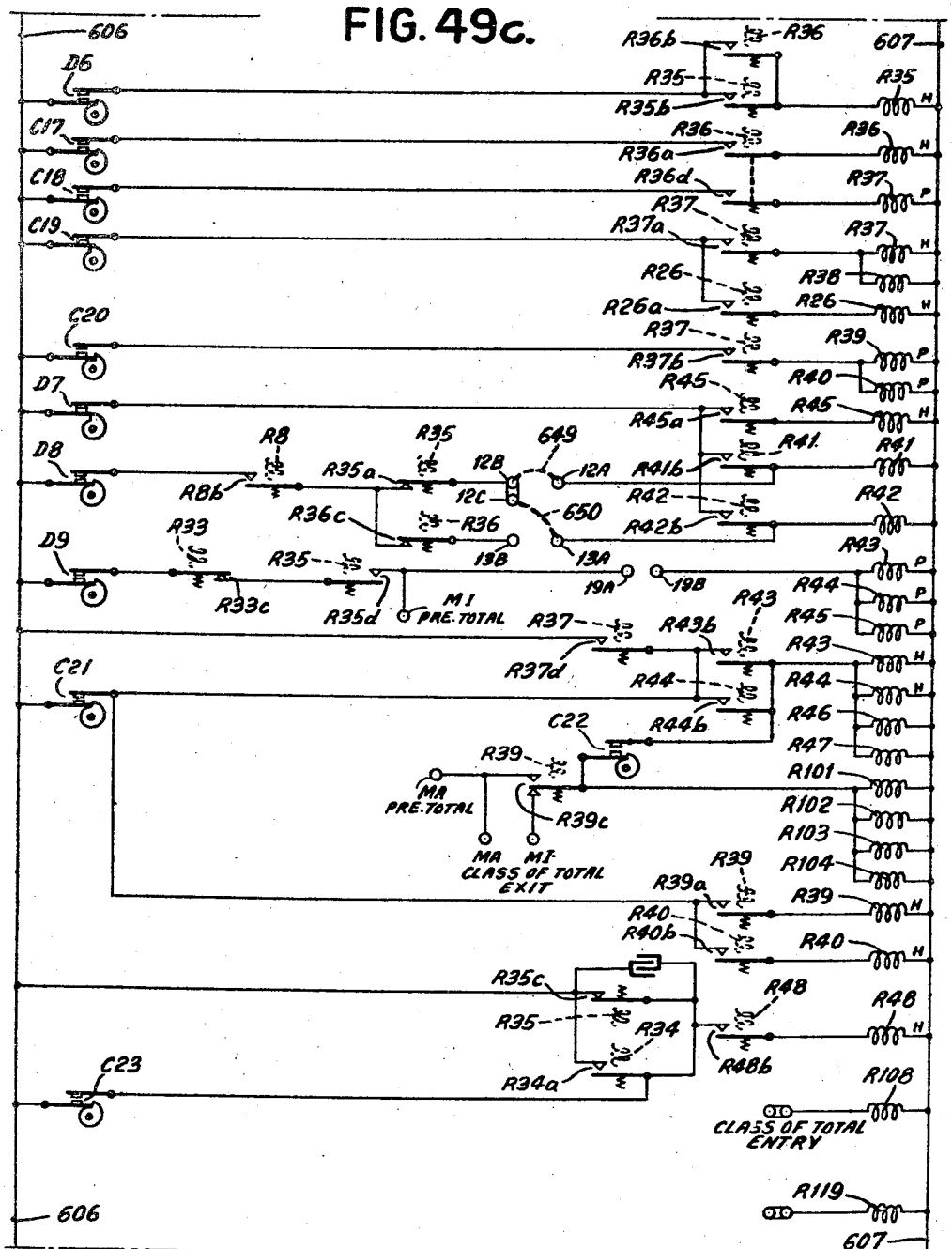
Figure 49D:
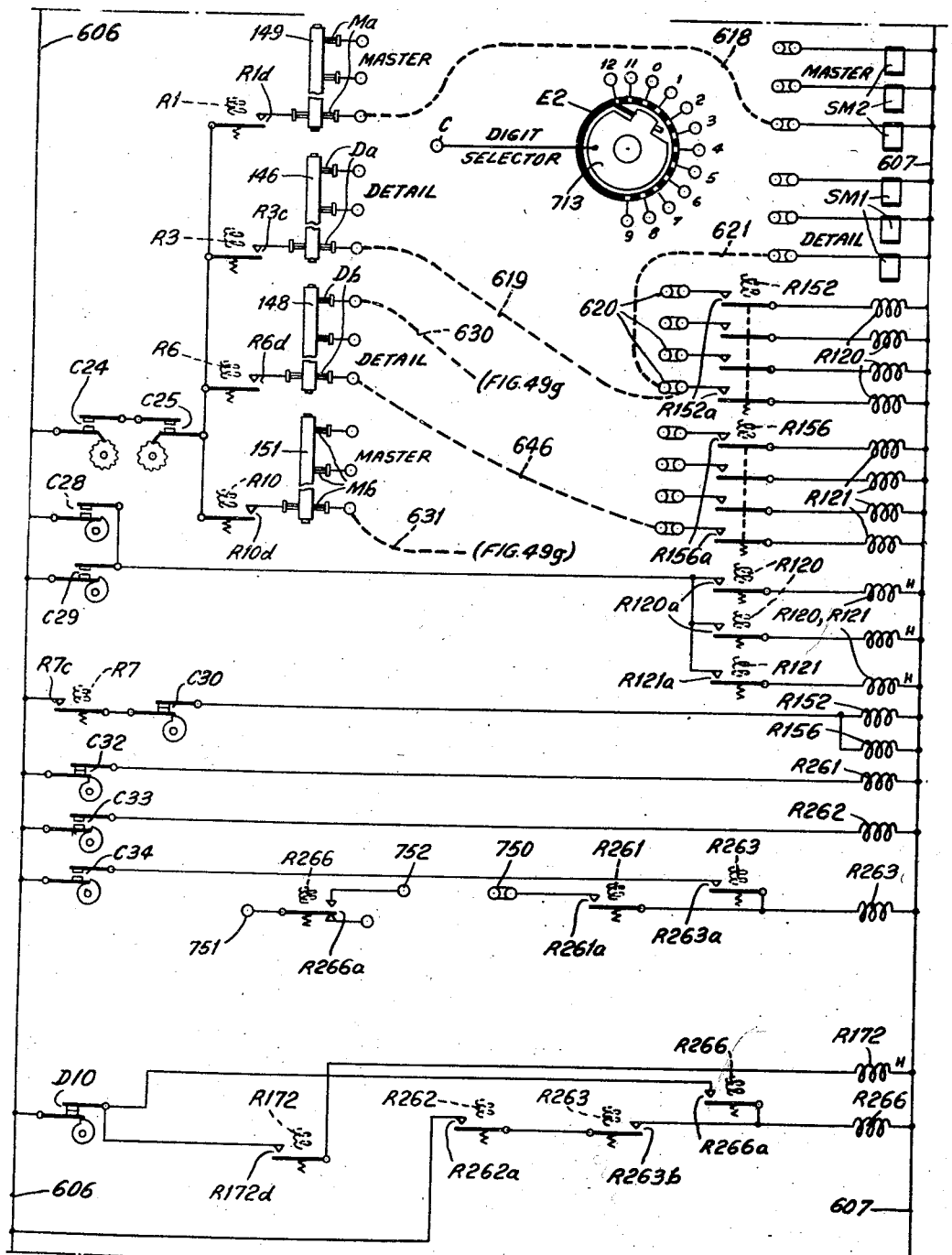

A representative one of these connections is shown in Fig. 49d and for the master card the circuit is traceable from line 606, contacts C24, C25, R1d (now closed) contact roller 149, perforation in the card, brush Ma, connection 618, magnet SM2 to line 607. For the detail card, the circuit is traceable from line 606, contacts C24, C25, R3c (now closed), contact roller 146, perforation in the card, brush Da, connection 619, socket 620, connection 621 and magnet SM1 to line 607.

In this manner the comparing unit is set in accordance with the account numbers of the first master and detail cards of Fig. 50 and, since in the example chosen these numbers are alike, the several comparing links 584 (Fig. 47) hold their pins 585 in their "equal" position, so that the contacts 590 to 593 in each order are not distributed from their relative settings as shown in Fig. 47. These contacts are interwired as shown in Fig. 49b, where three sets are shown. When cam contacts C14 now close after the cards have been sensed, a circuit is traceable from line 606, switch connection 622 between sockets 11A and 11B, contacts C14, R41a, R43a, contacts 592 related to the highest order of the master account number, contacts 590 related to the highest order of the detail account number, and then in series through the contacts 592 and 590 in lower orders to wire 623, connection 624 between switch sockets designated ERA and ERB (Fig. 51), pickup winding of relay R29 to line 607. Energization of relay R29 is a signal that the master and detail cards are related and that printing operations may take place under control of sensing brushes Mb and Db.

It may be pointed out at this time that, if the master account number were greater than the detail account number, one of the contacts 593 (Fig. 49b) would be closed in a position farther to the left than any closed contacts 591 and the circuit from contacts R43a would run through contacts 593, wire 625, connection 626, between switch sockets LTA and LTB to energize a relay R28. Conversely, if the detail account number were greater than the master account number, one of the contacts 591 would be closed in a position farther to the left than any closed contacts 593 and the circuit from contacts R43a would run through contacts 591, wire 627, connection 628 between switch sockets LRA and LRB to energize a relay R30. Thus, the three possible conditions of comparison will be denoted by energization of one of the relays R28, R29 and R30.

*Master card equals detail card.*—The equal relay R29 closes its contacts R29a to energize its holding winding H through cam contacts D3. It also closes a pair of contacts R29b (Fig. 49a) and a pair of contacts R29d. The closure of contacts R29b together with contacts R3d (closed by relay R3 due to feeding of the detail card up to brushes Db) bridges contacts R10c (now open) to enable reenergization of the master clutch magnet MFa. The closure of contacts R29d bridges contacts R6c (now open) to enable reenergization of the detail clutch magnets DFa and DFb. The comparing unit restoring magnets PR1 and PR2 are also energized therewith, so that as a result the comparing unit is restored and the cards continue to feed with the first master card now passing brushes Mb, while the first detail card passes brushes Db. Concurrently, the second master card passes brushes Ma and the second detail card passes brushes Da and the account numbers (which are now different) are entered into the comparison unit as explained.

The circuits to the clutch magnets DMa and DFa go through contacts R18b (Fig. 49a) as previously explained, and these contacts are now held closed as follows. Energization of card lever relay R7 (Fig. 49) closes contacts R7b before contacts C3 open and establish a supplementary holding circuit for relay R17 from line 606, stop key contacts 610, contacts R16a, R7b, hopper contacts 629 (closed by presence of cards in the master card magazine), contacts R22c, R17a and relay R17 to line 607. Relay R17 closes its contacts R17b to hold relay R18 energized through a circuit from line 606, contacts 610, R16a, R24a, R17b, R3b, R6b, R10b, R18a, relay R18 (H) to line 607.

The circuit for clutch magnet MFa is now traceable from line 606, contacts C9 (Fig. 49a), switch 611, contacts R12c, R15c, R18b, R20a, R44a, R42c, R29b, R3d, connection 612 to magnet MFa and in parallel through connection 614 to magnet PR2. The circuit for clutch magnet DFa is now traceable from line 606, contacts C9, switch 611, contacts R12c, R15c, R18b, connection 613, contacts R29d, R30c to magnet DFa and in parallel through contacts R2b to magnet PR1.

The circuit for clutch magnet DFb is now traceable from line 606, contacts C9, switch 611, contacts R12c, R15c, R18b, connection 613, contacts R29d, R30c, R4b, to magnet DFb. The print clutch circuit is traceable as above to contacts R4b and thence through connection 616 and upper contacts R43c to magnet MFb.

*Dispatch roll clutch circuits.*—In Fig. 49a there is a pickup winding of relay R26 in parallel with both clutch magnets MFa and MFb, so that when either magnet is energized relay R26 is also energized to close its contacts R26a (Fig. 49c) to provide a holding circuit for the relay through contacts C19. A second pair of contacts R26c (Fig. 49a) close to enable contacts C85 to complete a circuit through the dispatch roll clutch magnet 181 which, when energized, causes the rollers 170 of Fig. 3b to advance the master card from brushes Mb to a selected stopping position, while the detail card advances to hopper 49 (Fig. 33) after it passes the brushes Db.

*Circuits to print detail card data.*—As the first detail card passes brushes Db, circuits are completed in synchronism with the operation of the printing mechanism of Fig. 16 to set up on the wheels 225, the data perforated in the name field 603 of the card. A representative circuit is traceable from line 606 (Fig. 49d), contacts C24, C25, R6d (now closed), contact roller 148, brush Db, connection 630 (see Fig. 51, where connections between brushes 1—30 are represented as made to printing columns 8—37) extending to Fig. 49g, lower contacts R101a, R201a, print magnet 361 to line 607. As explained in the mechanical description, magnet 361 may receive one or two impulses according to whether the connected detail card column has a single or double perforation therein, so that the wheel 225 is set up according to the character sensed. In this way the name on the first card DC1 of Fig. 50 is set up for printing on the master card.

*Circuits to print master card data.*—As the first master card passes brushes Mb, circuits are completed concurrently with the completion of circuits through the first detail card passing brushes Db to set up on other wheels 225 the data perforated in the amount field 601 of the card MC1 of Fig. 50. A representative circuit is traceable from line 606 (Fig. 49d), contacts C24, C25, R10d, contact roller 151, brush Mb, connection 631 (see Fig. 51, where connections between brushes 74—80 are represented as made to printing columns 54—60) extending to Fig. 49g, lower contacts R101a, R201a, print magnet 361 to line 607. Thus, the print wheels are concurrently set under control of data in both cards and, after the master card has been positioned, the printing hammer will be first to print such data on a single line of the master card.

Figure 49E:
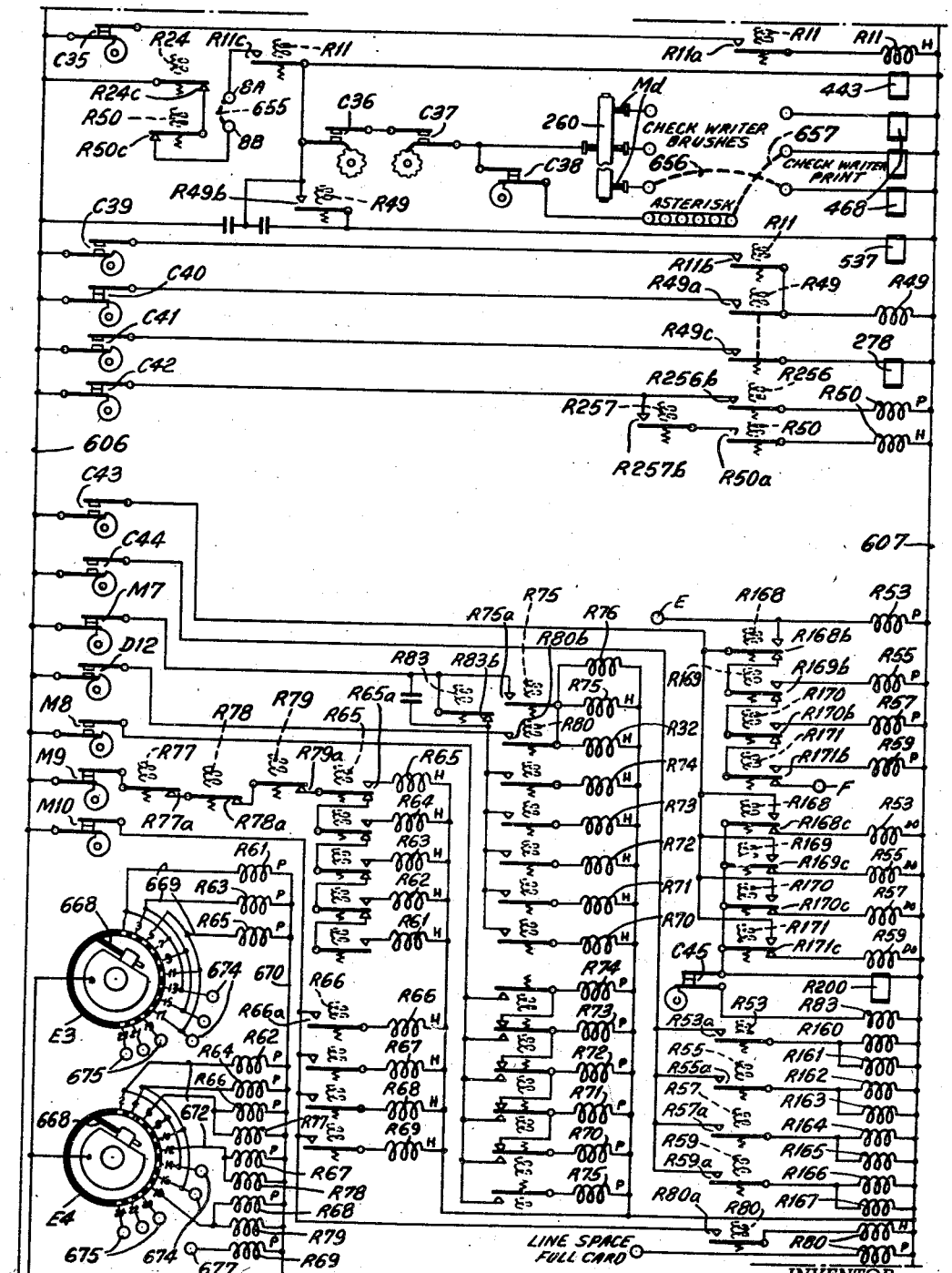
Figure 49F:
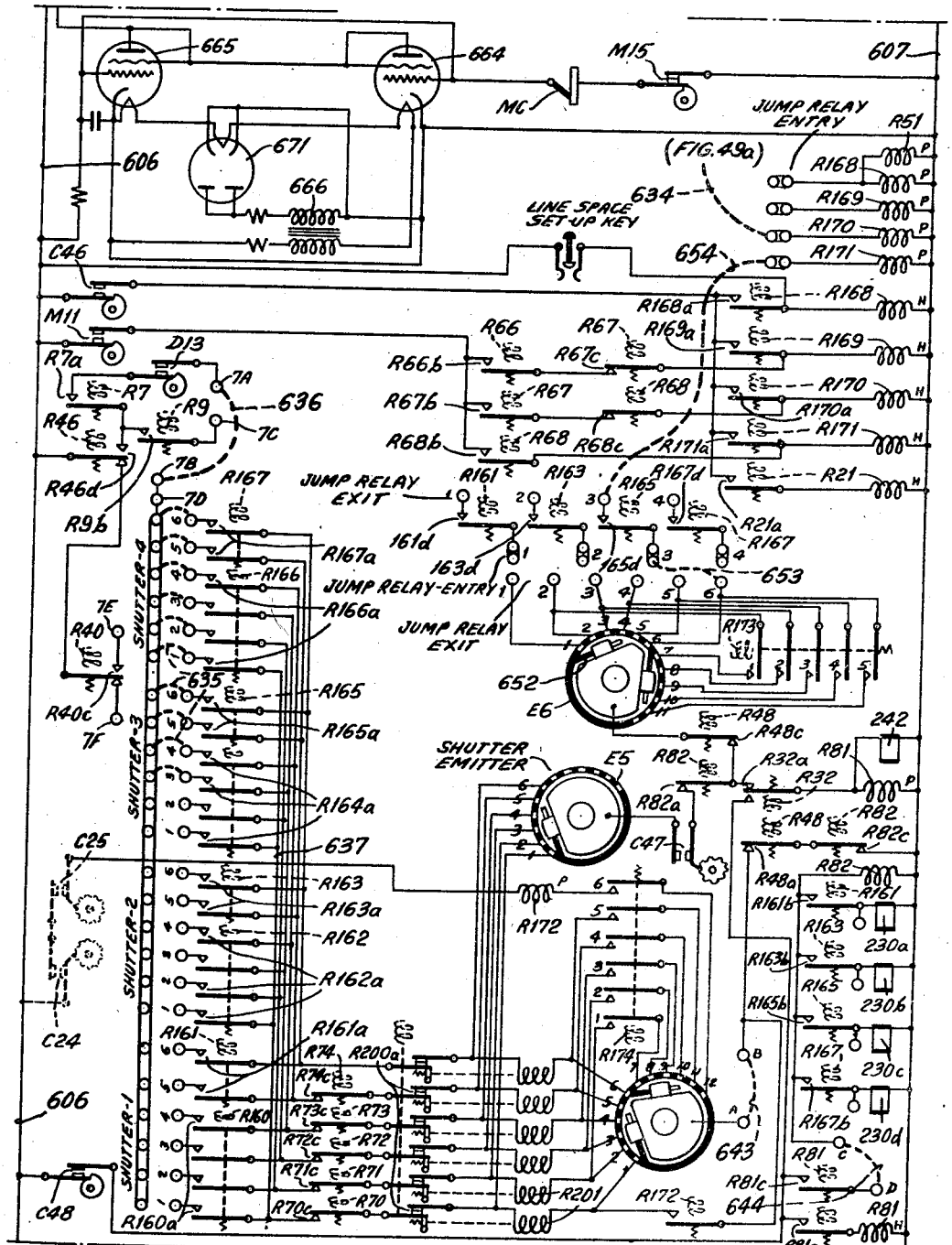

*Master card positioning circuits.*—As a preliminary operation of the machine, to insure restoration of any prior line setting the line space restore key (Fig. 49a) is depressed to close contacts 632 which will complete a circuit from line 606 (Fig. 49), contacts C7, wire 633 (Fig. 49b), contacts 632, connection 634 (see Fig. 51) to Fig. 49f, relay R170 to line 607. Relay R170 closes its contacts R170a to provide a holding circuit through contacts C46.

Relay R170 will also shift its contacts R170b (Fig. 49e) to energize relay R57 (P) through contacts C43, lower contacts R168b and R169b. Relay R57 is of the type which, when energized, mechanically latches its contacts closed. Shifting of contacts R170c (Fig. 49e) also completes a circuit from line 606, contacts C43, upper contacts R170c, and thence in parallel through lower contacts R168c, R169c, and R171c to energize dropout (DO) relays 53, 55, and 59 which function to unlatch the contacts of these relays if they had previously been latched, so that only the contacts of relay R57 are now latched.

A further circuit is completed from line 606, contacts C43, upper contacts R170c, to energize trip relay setup magnet R200 and in parallel through contacts C45 to energize a relay R83. The magnet R200 as shown in Fig. 49f closes a set of six contacts R200a, each of which is individually latched closed and will remain so until individual unlatching relays R201 are energized.

In Fig. 49e energization of relay R57 closes contacts R57a to energize relays R164 and R165, through contacts C44, each of which relays in turn closes a set of numbered contacts generally designated R164a and R165a in Fig. 49f.

Referring to Fig. 50, the name data is to be printed on the fifteenth line of the master card which, as already stated, may be positioned by the stop mechanism to present any one of twenty-four horizontal lines to the printing position. These twenty-four horizontal lines are grouped in sets of six and, as explained in connection with Fig. 3b, four solenoids 230a to d operate to each control the selection of a set of six lines. Thus, solenoid 230a selects the first six lines as a group, the solenoid 230b selects the second six lines as a group, etc. Selection of a line within a group is controlled by the timed energization of magnet 242 (Fig. 3b). To select the fifteenth line, as for the present example, the connection 634 is made to the 3 "Jump relay entry" socket (Fig. 51), as line 15 lines in the third group of lines 13 to 18 and, as will be explained, this connection will result in energization of the solenoid 230c. A further connection 635 is made to a common set of sockets designated "Shutter" 1, 2, 3, and 4 and the 3 socket of a set designated "Line" in the space beneath shutter 3. This 3 socket is the fifteenth from the left and serves to select the fifteenth line for printing by causing energization of magnet 242 (Fig. 3b) at the appropriate time to adjust the stop 226c. Further connections 635 are also made in all remaining sockets related to higher valued lines.

It will be apparent from the foregoing that to preselect any of the twenty-four printing lines a connection 634 is made to the "Jump relay entry" socket of the group containing such line, and further connections 635 are made in positions related to the exact line and higher lines. Thus, if the line selected were line 10, connection 634 would be made to the 2 "Jump relay entry" socket and connections 635 would be made to the tenth and higher sockets designated "Line."

Referring now to Fig. 49f, as the master card is passing the brushes Mb and the print magnets are being energized in accordance with the perforations sensed, a circuit is completed by the shutter emitter E5 traceable as follows: From line 606, upper contacts R46d, R7a, now closed, contacts D13, connection 636 between switch sockets 7A and 7B (see Fig. 51), the lowermost connection 635, the 3 contacts R164a, the related one of a group of wires 637, contacts R72c, the 3 contacts R200a, a wire 638, the 3 segment of emitter E5, its brush 639, contacts C47, R82a, R32a, magnet 242 and relay R81 in parallel to line 607. This circuit is timed to trip pawl 241 (Fig. 3b) into engagement with the third tooth 240 from the bottom in this figure.

A further circuit is traceable from line 606, contacts R46d, R7a, D13, connection 636, the 3 contacts 164a, R72c, the 3 contacts R200a, the 3 relay R201, the 3 segment of trip emitter E7, its brush 641, connection 643 between "Direct line selection" sockets A and B (Fig. 51), contacts R48a, R82c to line 607. The energization of the 3 relay R201 will cause unlatching of the related contacts R200a designated 3, so that these contacts now open.

Relay R81 closes its contacts R81a (Fig. 49f) to provide a holding circuit and also closes its contact R81c to complete a circuit from line 606, contacts C48, R81c, connection 644 between "Direct line selection" sockets C and D (Fig. 51), contacts R165b (now closed), solenoid 230c to line 607. Relay R82 is energized through this circuit in parallel with solenoid 230c and will open its contacts R82c and R82b, the circuit being held for the duration of closure of contacts C48 (Fig. 45). The relay R201 is a quick acting relay and functions before contacts R82c in series therewith open. The period of operation of relay R82 in turn is sufficient to cause opening of its contacts R82b and R82c before the emitter brushes 639, 641 contact the next segments 4, so that no further circuits can be completed by the emitters during the current revolution.

Accordingly, the master card will be stopped with the selected line in printing position. In advancing to such position, the master card acting against slip roller 171 (Fig. 4) rocks rod 187 which in Fig. 1a enables contacts 196 to close. Closure of contacts 196 (Fig. 49b) completes a circuit for line 606, contacts 196, C13 and relay R27 to line 607, which closes its contacts R27a (Fig. 49a) to provide a holding circuit through contacts C10.

*Print bail clutch circuit.*—Relay R27 closes a pair of contacts R27b to complete a circuit traceable from line 606, contacts D2, R75c, connection 645 between switch sockets 5A and 5B (Fig. 51), R23c, R27b, and magnets 430 and 403 in parallel. Magnet 403 operates the mechanism shown in Fig. 4 to cause the print platen 399 to operate and print on the selected line of the master card and magnet 430 will cause the ribbon 415 to shift after the impression is made.

*Automatic control circuits.*—Thus, the first detail card DC1 of Fig. 50 has been sensed and its data printed on the master card, accompanied by further data derived from the master card itself. The second detail card is now to be sensed and its data printed on the next or sixteenth line of the master card. A determination is first made that another detail card of the same account number follows and this is effected by so-called automatic control devices which compare the account number perforations in successive detail cards.

It will be recalled that, as the first detail card passes brushes Db, the second detail card passes brushes Da, so that the account number perforations in field 602 of these two cards are concurrently sensed. Through circuits now to be traced, a relay R35 (Fig. 49b) will be energized if the two account numbers are not in agreement and will remain deenergized if they agree. Disagreement indicates that the last detail card of the group related to a master card is being sensed by brushes Db. For the detail card passing brushes Da, a representative circuit is traceable from line 606 (Fig. 49d), contacts C24, C25, R3c, roller 146, brush Da, connection 619 to socket 620, thence through contacts R152a (closed) to pickup winding of a relay R120. For the detail card passing brushes Db, a representative circuit is traceable from line 606, contacts C24, C25, R6d, roller 148, brush Db, connection 646 (Fig. 51), contacts R156a and pickup winding P, relay R121 to line 607. Contacts R152a and R156a are closed at this period through energization of their relays R152 and R156 in parallel through contacts R7c and C30 in series therewith. From Fig. 45, it is to be noted that contacts C30 are closed during the sensing of all index point positions on the cards, except 0, so that where a 0 hole occurs in either card, no circuit is completed therethrough.

Relays R120 and R121 close contacts R120a and R121a to energize their hold windings through contacts C28 and C29. Again, referring to Fig. 45, contacts C28 hold any circuits set up as a result of sensing the 12 and 11 card positions and break such circuits before the sensing of the 0 position, so that the relays may again be energized in response to holes in the 1 to 9 positions and any circuits set up as a result will be held by contacts C29.

In Fig. 49b, relays R120 and R121 control contacts R120b and R121b, respectively, which are interconnected as shown. The machine is provided with ten sets of such contacts (only three being shown in Fig. 49b) with the lowermost set related to the highest denominational position of the card columns being sensed. The central blade of each contact R121b is wired to a socket designated "Unequal impulses" (Fig. 51) and connections 647 are made between these sockets as shown in four positions corresponding to the four highest positions of the account numbers being compared in columns 61 to 65. From the socket in the next lower position a connection 648 is made to a socket designated MI. The center blades of contacts R120b are common to circuit breaker contacts C15, C16 which make repeatedly just after each hole position is sensed and break just before the next hole position is sensed. Thus, for example, if in the highest order of the two account numbers a 12 hole is sensed, both lowest contacts R120b and R121b will be shifted so that, when contacts C15, C16 close, no circuit can be completed. If either contact R120b or R121b shifted without accompanying shifting of its mate, a circuit would be traceable, for example, from line 606, contacts C16, C15, upper contact R120b (shifted), lower contact R121b (not shifted), connections 647 and 648 to socket MI and pickup winding of relay R35 to line 607. Inspection will show that such circuit will be completed through any pair of related contacts R120b and R121b, so that at any point in the sensing of the account numbers the failure to find corresponding holes will be immediately followed by energization of relay R35, which will close its contacts R35b (Fig. 49c) and provide a holding circuit through cam contacts D6.

For the example under consideration, relay R35 will not be energized as the two compared detail cards have like account numbers and the machine will proceed to print the "Street" data on the next line (16) of the master card in a manner now to be explained.

*Second line printing.*—Since relay R35 remains deenergized, its contacts R35a (Fig. 49c) are closed when cam contacts D8 (Fig. 46) close and a circuit is completed from line 606, contacts D8, R8b (now closed), R35a, parallel connections 649 and 650 to energize relays R41 and R42 which close their contacts R41b and R42b to provide a holding circuit through contacts D7. Relay R42 opens its contacts R42c (Fig. 49a) in the master clutch magnet MFa circuit, so that the master card feed stops with the second master card about to pass brushes Mb and with the account number of such second master card set in the comparing unit whose restoring circuit is also disconnected by opening of contacts R42c.

Relay R41 opens its contacts R41a (Fig. 49b) so that the master and detail comparison circuits now become ineffective until the account number on successive detail cards changes. Accordingly, relay R29 remains deenergized. The detail clutch magnets DFa and DFb and the restoring magnet PR1 (Fig. 49a) are now energized through the same circuits as before, when contacts C9 close with contacts R41c bridging the now open contacts R29d.

As the second detail card now passes brushes Db, the print magnets 361 (Fig. 49g) are energized as before to set up the "Street" data. Concurrently, a circuit is completed (Fig. 49f) from line 606, contacts R46d, R7a, D13, connection 636, contacts R164a numbered 4, wire 637, contacts R73c, the 4 contacts R200a, wire 638, 4 segment of emitter E5, contacts C47, R82a, R32a and magnet 242 to line 607. This circuit also branches as before through the 4 relay R201, the 4 segment of emitter E7, connection 643, contacts R48a and R82c to line 607. In addition, magnet 230c is energized as before, so that the card stop device is positioned to locate the master card one line farther down to present the sixteenth line for printing.

It will be noted that relay R26 (Fig. 49a) is energized along with clutch magnet MFb and closes its contacts R26c, so that when contacts C85 close after the stops are positioned, the master card is driven down to the next stopping position with the dispatch roller slipping on the card after it is stopped.

The energization of the 4 relay R201 has also opened its related 4 contacts R200a, so that on the next cycle circuits for stop selection will go through the 5 segments of the emitters E5 and E7 to select the seventeenth line of the master card.

Printing takes place as before when contacts D2 (Fig. 49a) close and ribbon feeding also takes place while the second detail card advances to the discharge hopper.

*Third, fourth and fifth line printing.*—The machine continues to operate as explained with the master feed mechanism idle and the detail cards passing the brushes Db in succession, where the data is sensed in fields 603 and set up on the print wheels. Each succeeding cycle the shutter circuits are completed through a successively higher segment of emitters E5 and E7, so that for the third card the circuit is through the 5 segments, and for the fourth card the circuit is through the 6 segments to stop the master card on the eighteenth line.

When the circuit passes through the 6 segment of emitter E5, it branches from contacts C47 and R82a through contacts R48c, brush 652 of emitter E6, the 6 segment of this emitter to "Jump emitter exit" socket number 6, thence through a connection 653 to "Jump emitter entry" socket number 3, thence through contacts R165b (now closed), a connection 654 between "Jump relay exit" socket 3 and "Jump relay entry" socket 4, relay R171 to line 607. Relay R171 closes its contacts R171a to provide a holding circuit and also shifts its contacts R171c (Fig. 49e) to complete parallel circuits to the dropout windings of relays R53, R55 and R57, the contacts of the last of which are in latched condition at this time, so that now its contacts R57a open to deenergize relays R164, R165. Contacts R171b cause energization of relay R59 whose contacts R59a now become latched closed and in turn energize relays R166, R167. The contacts R171c also enable contacts C45 to reenergize the trip relay setup magnet R200, so that all the contacts R200a (Fig. 49f) are reclosed.

The above circuit changing takes place while printing and line setting are effected for the fourth detail car, and now when the fifth card passes brushes Db and sets up the print wheels in accordance with the data to be printed on the nineteenth line, the shutter circuit will be traceable as follows: from line 606 (Fig. 49f), contacts R46d, R7a, D13, connection 636, connection 635 (fifteenth from the bottom), the 1 contacts R166a (now closed), wire 637, contacts R70c, the 1 contacts R200a, wire 638, the 1 segment of emitter E5, contacts C47, R82a, R32a, and magnet 242 to stop the shutter mechanism at its lowermost tooth 240 (Fig. 3b). This circuit branches at the 1 contacts R200a, through relay R201, the 1 segment of emitter E7, connection 643, contacts R48a and R82c to line, to effect opening of the 1 contacts R200a. Closure of contacts C48 will complete a circuit from line 606, contacts C48, R81c, connection 644, contacts R167b (now closed), and magnet 230d to line 607. As a result, the master card will be positioned by the lowermost stop 226d (Fig. 3b) at the uppermost position of such stop which will position the card to receive the printing from the fifth detail card on its nineteenth line.

*Detail account number change.*—While the last or fifth detail card related to the first master card MC1 (Fig. 50) is passing brushes Db, the detail card DC2 having a different account number is passing brushes Da and there will be effected a setting of the control contacts R120b and R121b (Fig. 49b) to permit a circuit path to be completed therethrough as explained to energize relay R35. As a result, its contacts R35a open so that the relay R42 is not reenergized when contacts D8 close. Contacts R42a (Fig. 49a) will accordingly be closed when contacts C10 close near the end of the cycle and at the beginning of the next cycle a circuit is traceable from line 606, contacts C10, R27c (closed), R44c, R42a, contacts C11, "Line space restore" socket, connection 634 (Fig. 49f), the 3 "Jump relay entry" socket and relay R170 to line 607. Energization of relay R170 as already explained will cause the shutter mechanism to stop the master card MC2 at its fifteenth line printing position when it is advanced.

This circuit branches at contacts R42a (Fig. 49a) to energize dispatch roller clutch magnet 181 at a time when the shutters are out of the master card path so that the master card now advances to the aligning stop 209 (Fig. 3b) under control of the constantly running feed rollers 205. When stopped by shutter 209, the mechanism of Fig. 10 will centralize the master card so that, when stop 209 is retracted, rollers 259, 260 (Fig. 3c) will advance the card past brushes Md and down to stop 262, in which position the card will be located to receive printing of the check amount on line 605 thereof (Fig. 50) as well as the preset date and signature.

*Printing check amount.*—As the card MC1 passes brushes Md, it operates card lever 267 (Fig. 3c) to close contacts MCL3 (Figs. 1a and 49) to complete a circuit from line 606, contacts C2, MCL3, lower contacts R14a, and relay R11 to line 607. Relay R11 closes its contacts R11a (Fig. 49e) to hold the relay circuit through contacts C35. It also closes its contacts R11c to complete a circuit from line 606, contacts R24c, R50c, connection 655 between switch sockets 8A and 8B (Fig. 51) to energize the check writer clutch magnet 443. The check writer print wheels are accordingly in operation as the card passes brushes Md and will be adjusted under control of circuits, of which the following is representative. From line 606, contacts R24c, R50c, connection 655, contacts R11c, C36, C37, contact roller 260, brush Md, connection 656 (Fig. 51), print magnet 468 to line 607.

Connections 656 cause the amount perforation in field 601 of the master card to set a number of print wheels equal to the number of columns in the field. In columns of the print mechanism to the left, the wheels are set to print asterisks through circuits from contacts C36, C37, C38, asterisk control sockets, connection 657 (Fig. 51) and print magnet 468. As explained in the mechanical description, the wheels on which no significant digits are set, initially present zeros to the printing line, and in orders to the left of the highest significant figure the wheels are shifted to bring the asterisk type to the printing line.

Relay R11 closes a pair of contacts R11b (Fig. 49e) to energize relay R49 through contacts C39, and such circuit is held through contacts C40 and contacts R49a. The closure of contacts R49b energize the print hammer solenoid 537 (Fig. 3c) to cause concurrent printing of the amount, date and signature on the master card. Thereafter, stop 262 is withdrawn and rollers 265 advance the card to stacker 272. A pair of contacts R49c energize the stacker clutch magnet 278 (Fig. 49e) through contacts C41, so that the card is urged into position in the stacker.

A master card and its related set of detail cards have now been passed through the machine and several lines of data have been printed on the master card under control of perforations in the several detail cards and in the master card itself. In the example given it was assumed that five detail cards accompanied the master card and that the change in account number between the fifth and sixth detail cards caused energization of relay R35 to bring about further advance of the master card to the check writing position.

If the detail cards are less in number than five, the account number change will be evidenced by energization of relay R35 at an earlier time and the master card would be released after a number of lines of printing from wheels 225 equal to the number of detail cards.

As the first detail card DC2 of the next group passes the brushes Da to control the account number control relays R120, it also controls the comparing unit magnets SM2 so that the new detail account number from card DC2 and the master account number from card MC3 are both set up in the comparing unit. When contacts R41a (Fig. 49b) which were open as long as successive detail cards agree, now close, the test circuit initiated by contacts C14 will make a comparison between the two new account numbers. If they are in agreement, relay R29 is energized as already explained and operations continue as for the first master card and its accompanying detail cards.

*Master greater than detail.*—For the example of Fig. 50, the master card MC3 is greater in value than the compared detail card DC2. In other words, there is no master card for these detail cards and the latter are to pass through the machine without having any effect.

For this high master condition, relay R28 (Fig. 49b) will become energized and close its contacts R28a to set up a holding circuit through contacts M5 which are closed (as the master card feed is still idle), so that the relay R28 remains energized until the master feed resumes operation as a result of a subsequent "Equal" or "High detail" condition.

Relay R28 closes its contacts R28b (Fig. 49a) to maintain the detail card feed clutch circuit to magnets DFa and DFb, so that the detail cards continue to feed in uninterrupted succession. The circuit is traceable from line 606, contact C9, switch 611, contacts R12c, R15c, R18c, connection 613, R28b, R30c, to magnet DFa, and from R30c, R4b to magnet DFb; also, from contacts R4b, connection 616, upper contacts R43c to the print unit clutch magnet MFb and dispatch clutch relay R26. The master feed clutch will not be energized since relay R29 is deenergized. The dispatch rollers will operate for each detail card, but there is no master card at the rollers so this operation is idle as is also the operation of the print mechanism. Since no card is passing the dispatch rollers, the contacts 196 (Fig. 49b) operated thereby are open and will not trip the print bail clutch nor the ribbon feed.

The detail comparing unit restoring magnet PR1 will be energized in parallel with magnet DFa, so that the account number of the next detail card will be set up for comparison. The group control relays R120 and R121 controlled by the successive detail cards now take over control and, if there are several DC2 cards (of like account number), relay R35 remains deenergized and relay R41 becomes energized as before to disable the comparing unit circuits.

When contacts D4 (Fig. 49b) close, relay R33 becomes energized and closes contacts R33b to set up a holding circuit through contacts D5. Contacts R33a (Fig. 49i) close to energize the offset stacker magnet 310D, so that the detail cards DC2 will be offset in the hopper 49 to identify them as detail cards with no accompanying master card. The line spacing stops continue to function idly as no master card is at the dispatch rollers.

When the last detail card DC2 is passing the brushes Db, the first detail card DC4 of the next group is passing the brushes Da and control relay R35 will become energized. Concurrently, the account number of the DC4 card is entered into the comparing unit so that, when contacts R41a (Fig. 49b) reclose as a result of energization of relay R35, the comparison circuit will compare cards MC3 and DC4 and find a condition of high detail card evidenced by completion of the comparing circuit through relay R30, which closes its contacts R30a to provide a holding circuit through contacts M4 and R29c. For this condition the master card is to feed and the detail card feed is to stop.

*Detail greater than master.*—Closure of contacts R30a also energizes relay R32 from line 606, contacts M4, R29c, R30a, connection 658 (Fig. 51) between switch sockets 10A and 10B, relay R32 to line 607. Relay R30 closes its contacts R30b to complete a circuit from line 606 (Fig. 49a), contacts C9, switch 611, contacts R12c, R15c, R18b, R30b, connection 612, master clutch magnet MFa and relay R26 in parallel and also the restoring magnet PR2, so that the master card MC3 is now fed past brushes Mb and the following master card is fed past brushes Ma. Relay R30 operates its contacts R30c to break the circuits through the magnets DFa, DFb, PR1 and MFb.

The master card in its passage through the machine will be idly stopped by one of the four shutters 226 and then by the print stop shutter 262. Contacts R32a (Fig. 49f) shift upon energization of relay R32 to complete a circuit from line 606, contacts C48, lower contacts R32a, relay R81 and shutter unit stop pawl magnet 242 to cause engagement of the pawl 241 (Fig. 3b) with the 1 tooth 240. Relay R81 closes its contacts R81c, so that there is a parallel circuit from line 606, contacts C48, R81c, connection 644, contacts R165b and shutter solenoid 230c to line 607. It will be recalled that the account number change between successive detail cards occurred just before the lower master card MC3 began passing brushes Mb, so that at such time the relay R165 would be energized to control stopping of the master card on the fifteenth printing line.

Figure 49I:
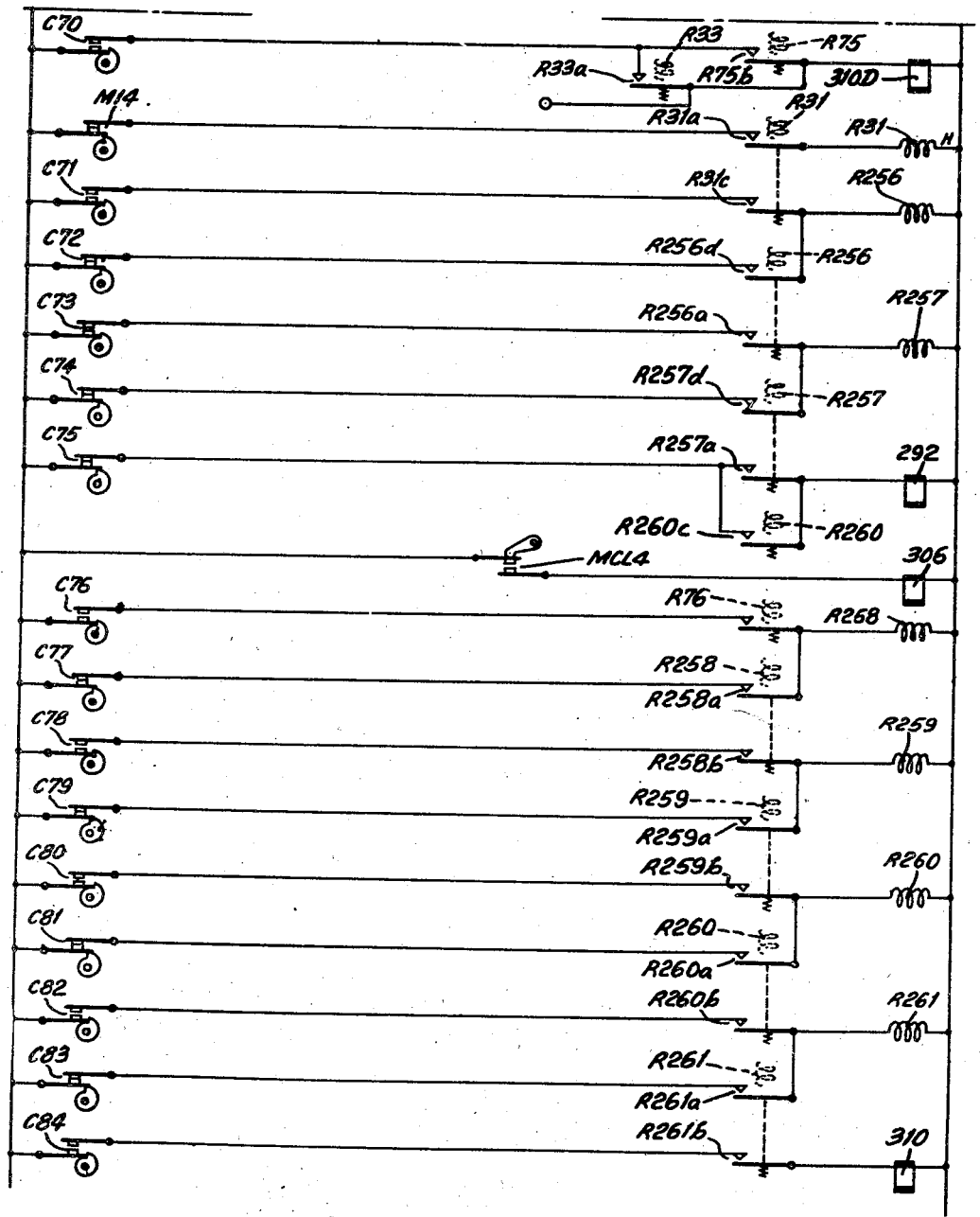

Since the detail feed is now idle, contacts D13 (Fig. 49f) remain open, so that no subsequent line spacing circuits are completed and, when the dispatch rollers operate, the master card advances to the check writing position and passes brushes Md. No circuits are completed through the brushes at this time, however, since contacts R50c (Fig. 49e) will be open under the following conditions. The initial energization of the "High detail" relay R30 (Fig. 49b) caused closure of its contacts R30a so that, when contacts M3 closed, relay R31 became energized and in turn closed contacts R31a (Fig. 49i) to establish a holding circuit through contacts M14 and closed contacts R31c to energize relay R256 which in turn closed contacts R256d to establish a holding circuit through contact C72. Relay R256 also closed contacts R256b (Fig. 49e) to energize relay R50. In Fig. 49i, relay R256 closed contacts R256a to energize relay R257 which holds through contact R257d and closes contacts R257b in Fig. 49e, which in series with contacts R50a hold relay R50 energized.

Inspection of the timing of the cam contacts in the several above traced circuits will show that contacts C14 energize relay R30 during the cycle in which the card passes brushes Mb and the relay is held by contacts M4 through the next following or second cycle until contacts M3 close to energize relay R31. This relay is then held through contacts M14 into the next or third cycle and energizes relay R256 when C71 closes in such third cycle, and it in turn is held through contacts C72 into the fourth cycle, wherein, when contacts C73 close relay R257 becomes energized and is held through contacts C74, which hold the relay energized into the fifth cycle. At the end of the fourth cycle when contacts C75 close a circuit is completed from line 606, contacts C75 (Fig. 49i), contacts R257a, deflector magnet 292 to line 607. By this time the master card will have been advanced to the rollers 265 (Fig. 13) and energization of magnet 292 will shift deflector rod 286 to direct the card between rollers 285, 283, and the stacker card lever contacts MCL4 will close to energize clutch magnet 306 to cause rollers 294 and 299 to feed the card into stacker 298.

In the meantime, the detail card feed is inactive, no detail passes brushes Db, but the card lever contacts DCL3 (Fig. 49) are closed, and relays R5, R6, R7 and R8 are energized and relay R41 (Fig. 49c) will not be energized. As a result, contacts R41a (Fig. 49b) are closed when contacts C14 close during the cycle in which the master card MC3 is passing brushes Mb and, since the comparing unit now contains an equal setting of cards MC4 and DC4, relay R29 will become energized and operations will now follow as explained under the heading "Master card equals detail card" above.

*Summary.*—Briefly reviewing the operations involved in handling the problem of Fig. 50, whenever there is agreement between the master and detail cards, the master card is fed to the first printing station and the detail cards are read in succession and print on successive lines of the master card as long as successive detail cards are in agreement as to account numbers punched therein. In the meantime, a new master account number has been set up and retained in the comparing unit, so that upon a change in the detail account number, the next detail account number is compared with the next master account number, the first master card feeds to the check writing position and has the money value printed thereon and then passes to the discharge hopper.

Whenever the master account number is greater than the detail account number, the master card is held and the detail cards are advanced through the machine and offset in their discharge hopper, such feeding continuing as long as low detail cards are alike.

Whenever the detail account number is greater than the master account number, the detail card is held and the master card is advanced through the machine to the auxiliary discharge hopper. Thus, only master cards for which there are corresponding detail cards will receive the printing as they pass through the machine.

Safety interlocks

In a machine of this kind where checks for money values are prepared, it is desirable to provide interlocks to insure that the cards continue to feed uninterruptedly and that the operator be apprised of any failure of cards to feed properly either due to exhausted supply in the magazines or jamming of cards that may have become damaged in their handling. The several interlocks will be separately explained at this time.

*Detail card supply exhausted.*—When the last detail card leaves magazine 44 (Fig. 1), the hopper contacts 629 (Fig. 49) will open but contacts C5 will be bridging such contacts 629 to hold relay R17 energized until a later time. Contacts R17b will then open but contacts C6 will continue to hold relay R18 energized for a further time (Fig. 45) in the cycle. When contacts C6 open, the relay R18 becomes deenergized and its contacts R18b (Fig. 49a) open to break both the master and detail feed clutch circuits and the machine stops with the last detail card about to pass brushes D$b$.

If a detail card fails to advance from the hopper, the card lever contacts DCL3 will not be closed and relays R2, R3 and R4 will not become energized. Contacts R3$b$ (Fig. 49) accordingly reopen when contacts C6 open, so that relay R18 becomes deenergized to stop the machine as before.

After the machine has stopped and the damaged card fixed or replaced or new cards placed in the detail magazine, resumption of operation is effected by depression of the start key to close contacts 608 which will reenergize relay R18. The open condition of detail card lever relay contacts R3$d$ (Fig. 49$a$) will prevent energization of the master card feed clutch until the card lever contacts DCL1 close. Open contacts R4$b$ also prevent clutch DF$b$ from operating, so that only clutch magnet DF$a$ is energized and the detail card is advanced up to brushes D$b$, at which time the parts will be again in proper relationship for continued operation under automatic control.

This is a particularly useful feature in that in accounting machines employing so-called successive automatic or group control, the control mechanism operates as though a change in group occurred if a card failed to feed from the hopper. This made it necessary to remove all cards of the group and run them through the machine a second time. With the present arrangement the machine stops before a change is manifested and only the part of the detail card feed which advances the cards from the hopper functions, to bring a new card into proper time relationship.

*Master card supply exhausted.*—The master card magazine is not provided with hopper contacts so that any failure to feed a card from the hopper will react the same as exhaustion of cards therein. There are four conditions that may prevail when the last master card leaves the magazine. First, the detail feed may be stopped with cards in the feed while the master feed is feeding out low master cards. As the last master card passes card lever contacts MCL2, relay R10 will be deenergized and its contacts R10$b$ (Fig. 49) will open the circuit to relay R18, resulting in opening all the feed clutch magnet circuits. The last master card will have passed brushes M$b$ and entered the dispatch rollers from where it will continue to the discharge hopper by means of the continually running part of the feed.

Second, the last master card may be equal to the detail group of cards passing through the detail feed. In this case opening of contacts MCL2 will cause deenergization of relay R18 as before, but relay R41 will be energized as a result of the succession of like detail cards and its contacts R41$d$ and R41$c$ will be closed. Contacts R17$d$ (Fig. 49$a$) will be closed as will also be contacts R4$d$ and R4$b$. Therefore, the detail clutches DF$a$ and DF$b$ will be energized and the detail cards will continue to feed until an account number change deenergizes relay R41 or until the detail feed runs out of cards. The circuit involved is traceable from line 606, contacts C9, switch 611, contacts R12$c$, R15$c$, R17$d$, connection 660 between switch sockets 11A and 17B (Fig. 51), contacts R4$d$, R41$d$, connection 613, contacts R41$c$, R30$c$, to magnet DF$a$, from contacts R30$c$, R4$b$ to magnet DF$b$ and also in parallel therewith through print clutch magnet MF$b$.

Third, the master feed may run out of cards at the same time that the detail feed runs out and the master card is equal to the last detail card which is a single card group. In this case the feeds will stop with the last master card and the last detail card about to pass the brushes M$b$ and D$b$, respectively. This stopping will be due to the deenergization of relay R18 through opening of card lever contacts DCL1.

Fourth, both feeds run out of cards and stop with equal cards about to feed through the brushes M$b$ and D$b$ and one or more additional master cards in the feed. In this case the opening of card lever contacts DCL1 deenergizes relays R2, R3 and R4, relay R18 becomes deenergized and the machine stops as before with the detail card about to pass brushes D$b$ and the master card about to pass brushes M$b$ and a following master card about to pass brushes M$a$. If no more detail cards are to be placed in the hopper, operations are resumed by closing the "Last card" key contacts 640 (Fig. 49). This results in energization of relay R19 which closes its contacts R19$a$ (Fig. 49$a$) to provide a holding circuit through contacts C8. Contacts R19$b$ complete a circuit from line 606, contacts C9, switch 611, contacts R12$c$, R15$c$, R19$b$, R28$b$ (closed by a "low detail" condition) or R29$d$ (closed by an "equal" condition), R30$c$, R17$c$, magnet DF$b$ to line. Also from R17$c$, socket 14B, connection 616 to socket 14A, contacts R43$c$ (upper) and magnet MF$b$ and relay R26 to line 607.

Contacts R19$b$ will also complete a circuit from line 606, contacts C9, switch 611, contacts R12$c$, R15$c$, R19$b$, socket 18A, connection 613, socket 18B, contacts R20$a$, R44$a$, R42$c$, R29$b$, R18$c$, socket 18D, connection 612, socket 18C, magnet MF$a$ to line 607. Thus, the last detail card and a master card will be fed to their respective stackers. The error key is now operated to close contacts 661 (Fig. 49$b$) to energize relays R24 and R25 of which the latter closes contacts R25$a$ and R25$b$, and these relays are held through the restoring key contacts 617.

The start key is now operated (Fig. 49) to energize relay R18 which closes contacts R18$b$ (Fig. 49$a$) to complete the circuit to magnet MF$a$ to feed out the master card. Repeated operation of the start key will feed out any further master cards in the same way.

*Signal lights*

To aid the operator in ascertaining the reason for stoppage of the machine, a number of signal lights 615 are provided, of which the "Master feed stop" and "Detail feed stop" lights (Fig. 49) become illuminated if their respective cards fail to feed from the magazine, so that contacts R1$a$ or R2$c$ or both close. Relay R13 is energized each cycle of the master feed through contacts M1 to shift its contacts R13$a$, so that if contacts MCL1 are closed at such time (due to retardation of the master card), relay R1 is deenergized and relay R15 is energized. Likewise, contacts R13$c$ shift so that, if contacts MCL2 are closed at such time, relays R9 and R10 are deenergized and relay R15 is energized. Thus, if either of contacts MCL1 or MCL2 is closed, when contacts M1 close, relay R15 becomes energized and will hold through its contacts R15$a$ and restoring key contacts 617 (Fig. 49$b$). Contacts R15$b$ (Fig. 49) will thus close to light the "Master non-jam stop" light 615. Contacts R15$c$ (Fig. 49$a$) will also open to break the feed clutch circuits.

In Fig. 49 relay R14 is energized each cycle through contacts C1 and shifts its contacts R14$a$ so that, if at such time the card lever contacts MCL3 are closed (due to failure of the master card to feed to the check printing wheels), relay R15 will also be energized to light its lamp and stop the feeds.

If the detail card fails to feed past card lever contacts DCL2, when cam contacts D1 (Fig. 49) close, relay R12 will become energized and held through its contacts R12a (Fig. 49b) and the contacts 617 and will open contacts R12e (Fig. 49a) to stop the feeds. It will also close its contacts R12b (Fig. 49) to light the "Detail non-jam stop" light 615.

When any of the three discharge hoppers become full, one of the contacts 59, 315 or 313 will close to energize its respective lamp 615 and will energize a multiple wound relay R16 to open contacts R16a in the holding circuit of relays R17 and R18, so that these will in turn stop the feeds as already explained.

In Fig. 49a, whenever contacts C11 close to send the initial impulse for first line selection through connection 634, it also energizes relay R21 with energization of the dispatch roll clutch magnet 181 and closes its contacts R21a (Fig. 49f) to provide a holding circuit through contacts C46. This impulse occurs to feed the master card out of the first printing station. If the card fails to feed out, the dispatch roller contacts 196 (Fig. 49b) will still be closed when contacts C12 close and a circuit will be completed from line 606, contacts 196, C12, R21c to energize relays R23, R24, R25 and R32 in parallel. Contacts R23b will thereafter keep them energized through contacts 617. Contacts R23a break the circuit (Fig. 49) to the card lever contacts MCL1, DCL1, DCL3 and MCL2. Contacts R23c break the circuit (Fig. 49a) to the ribbon feed and print bail magnets 430 and 403. Contacts R24b (Fig. 49) close to light the "Error stop" lamp 615. Contacts R24a open the holding circuit to relay R18 (Fig. 49) and it in turn prevents the operation of the feed clutch magnets. Contacts R24c (Fig. 49e) break the circuits to the sensing brushes Md. Contacts R25d close to complete a circuit from line 606, contacts C10, R27c, R44c, R25d and dispatch clutch magnet 181 to feed out the master card. Contacts R32a shift to complete a circuit from line 606, contacts C48 (Fig. 49f), lower contacts R32a, relay R81 and magnet 242 to stop the card at its fifteenth line.

Ledger posting operation

For this operation there is a group of detail cards for each master or ledger card and they are arranged in sequence in their respective magazines just as for the check writing operation. The operations of comparing, group controlling and printing are substantially the same as already described so that the explanation following will be restricted to the differences in operation. In Fig. 53 is shown a ledger card which may receive posting or printing upon any one of twenty-four lines designated 662 and such card has a perforation receiving column at its right hand end, in which a perforation 663 is made on a line 662 concurrently with the printing of data on the line. Thus, the card of Fig. 53 has three lines of printing thereon with three accompanying holes 663. It also has an account number field 602 comprising columns 61—65. The ledger cards when placed in their supply magazine may have varying numbers of lines thereon printed and perforated as a result of some prior operation and, when now fed through the machine, printing and punching will be effected on the next available line 662. Thus, for the card of Fig. 53 the first of a group of detail cards corresponding thereto will print on line 4, the next on line 5 and so on.

Figure 52:
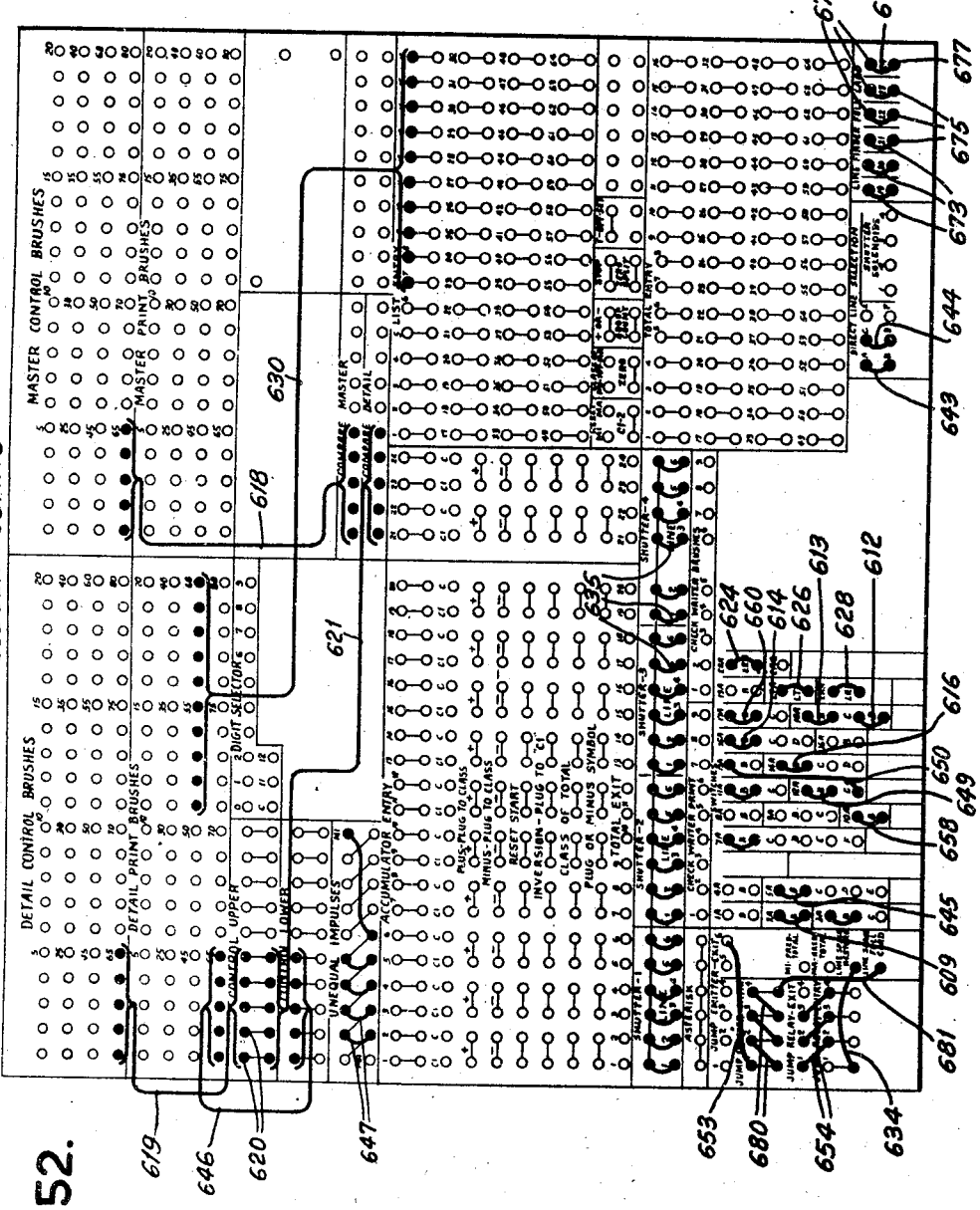

Plugging connections for this operation are made as represented in the diagram Fig. 52, where it will be observed that the connections 619, 646, 618, 621, 648 and 647 for account number comparison between ledger and detail cards and between successive detail cards is the same as for the check writing operation. The print magnet controlling connections 630 are made between the detail print brush sockets of columns 51—60 and the list entry sockets of columns 7—16.

Plug connections at the bottom of Fig. 52 are altered as shown, and the circuits controlled therethrough will be explained where they bring about a difference in operation.

*Start circuits.*—Closure of start key contacts 608 (Fig. 49) will energize relays R17 and R18 as before, and as a result the master clutch circuit is completed to energize clutch magnet MFa (Fig. 49a) and the detail clutch circuits are completed to energize clutch magnets DFa and DFb. The comparing mechanism is also restored at this time as explained. Through the card lever circuits these clutch magnets are held energized, so that the leading cards of the two groups now pass the sensing brushes Ma and Da which sense the account number perforations and enter them into the comparing mechanism. Since it is assumed that the account numbers are in agreement, the equal relay R29 will become energized as explained and, as a result, the master clutch circuit is reestablished to continue feeding of the master card, which will now pass the line sensing brush Mc and continue on to its printing position. The detail clutch magnets DFa and DFb are also reenergized, so that the first detail card continues on to pass brushes Db which sense the data in columns 51—60 and cause positioning of the type wheels for printing this data on the first master card.

In the meantime, as before, the comparing mechanism is restored and the second master card passes brushes Ma while the second detail card passes brushes Da and the account numbers of these second cards (which are now different) are entered into the comparison unit.

The operation of the machine up to this point is the same as explained for the previous problem to which reference may be made for explanation of the specific circuits involved. The first difference in operation occurs upon the preliminary operation of the line space restore key (Fig. 49a) and results from the different plugging in the lower left hand corner of Fig. 52. When the contacts 632 are closed, a circuit is completed from line 606 (Fig. 49), contacts C7, wire 633 (Fig. 49b), contacts 632, connection 634 (see Fig. 52) which is now made to the 1 "Jump relay entry" socket (Fig. 49f), relay R168 to line 607. Relay R168 closes its contacts R168a to provide a holding circuit through contacts C46. It also closes its contacts R168a (Fig. 49a) to energize relay R53 whose contacts R53a thereupon latch closed.

Relay R168 closes its contacts R168c to energize the dropout windings of magnets R55, R57 and R59 and to energize relay R200 in parallel therewith. Thus, the contacts of the first three relays are unlatched if they had previously been latched, so that now only the contacts of relay R53 are latched. Magnet R200 opens the six contacts R200a (Fig. 49f), and these become individually latched on the armatures of the relays R201.

Closure of contacts R53a (Fig. 49c) energizes relays R160 and R161 which will function to select the first printing line of the master card, if such card does not already have line finding holes 663 therein. For the example selected, this condition is not present and before relays R160 and R161 can become effective the setting will be altered under control of the line finding brush Mc to select line 4 of the master card.

Assuming that for the first ledger card there are three holes 663 and that there are four corresponding detail cards, then with the machine started as before the ledger card will advance after comparison with the first detail card to the printing wheels and in so advancing it passes the line finding brush Mc (Fig. 49f). Bearing in mind that the cards advance with their upper edges leading, the hole 663 in line 1 of the ledger card first encounters the brush, and at such time will connect the grids of electron tubes 664 and 665 of the type known as 25L6 to line 607, through contacts M15.

This causes an impulse to flow from transformer 666 to the cathodes of the tubes and from the plates thereof to the brushes 668 (Fig. 49i) of a pair of line finding emitters designated E3 and E4. At this instant the brush 668 of emitter E3 will be on its 1 segment, so that the circuit will pass through a corresponding wire 669 to relay R61. The relay R61 is connected through wire 670 to the cathode of a tube 671 of the type known as 25Z6, and the two plates of this tube are connected to transformer 666 to complete the circuit. Relay R61 closes its contacts R61a (upper) to provide a holding circuit traceable from line 606 (Fig. 49e), contacts M9, R77a, R78a, R79a, R65a (lower), R64a (lower), R63a (lower), R62a (lower), R61a (upper), holding winding of relay R61 to line 607.

As the card continues its advance, brush Mc senses the hole 663 of line 2 as the brush 668 of emitter E4 contacts its 2 segment, so that a circuit is traceable from the plates of tubes 664 and 665 to brush 668 of emitter E4, its 2 segment, corresponding wire 672, relay R62, wire 670 to transformer 666. Relay R62 shifts its contacts R62a (Fig. 49e), so that the above traced holding circuit to relay R61 is broken and a holding circuit is completed through the holding winding of relay R62. When the hole 663 of line 3 is sensed, a similar circuit as for the first hole is traceable through the 3 segment of emitter E3 to energize relay R63, which shifts its contacts R63a, so that relay R62 becomes deenergized and the holding winding of relay R63 is energized.

It is to be noted in Fig. 49e that emitter E3 controls the circuits for the odd numbered lines and emitter E4 controls the circuits for the even numbered lines so that, if more lines of the card contain holes 663, further relays will be energized in accordance with the following table:

Hole in line 4 energizes relay R64
Hole in line 5 energizes relay R65
Hole in line 6 energizes relay R66 and R77
Hole in line 7 energizes relay R61
Hole in line 8 energizes relay R62
Hole in line 9 energizes relay R63
Hole in line 10 energizes relay R64
Hole in line 11 energizes relay R65
Hole in line 12 energizes relay R67 and R78
Hole in line 13 energizes relay R61
Hole in line 14 energizes relay R62
Hole in line 15 energizes relay R63
Hole in line 16 energizes relay R64
Hole in line 17 energizes relay R65
Hole in line 18 energizes relay R68 and R79
Hole in line 19 energizes relay R61
Hole in line 20 energizes relay R62
Hole in line 21 energizes relay R63
Hole in line 22 energizes relay R64
Hole in line 23 energizes relay R65
Hole in line 24 energizes relay R69

It is to be further noted that the 1, 7, 13 and 19 segments of emitter E3 are connected together, the 3, 9, 15, and 21 segments and the 5, 11, 17 and 23 segments are connected together, and that for emitter E4 the 2, 8, 14 and 20, and the 4, 10, 16 and 22 segments are connected together, and the 6, 12 and 18 segments have independent wires 672 extending therefrom. The segments related to the lower numbered lines have fixed parallel wiring, while the others have pluggable connections made by connections 673 between sockets 674 and 675 (see Fig. 52). A connection 676 is made from the socket 675 wired to the 24 segment of emitter E4 to a socket 677, and through this connection relay R69 is energized if all twenty-four lines of the card have entries denoting a "full master card."

In cases where a lesser number of lines are to be utilized for recording, for example, nineteen lines, the connection 676 is made between the socket 675 wired to the 19 segment of emitter E4 and socket 677, so that relay R69 will become energized if the master card sensed has entries on nineteen lines. The operations initiated by the "full card" relay R69 will be explained later.

Referring back to the problem under consideration, the sensing of holes 663 in the first three lines of the master card has energized relay R63, and as the master card continues its travel (see Fig. 13) to printing position, contacts M8 which close in the next cycle (see Fig. 46) will complete a circuit from line 606 (Fig. 49e), contacts M8, contacts R63b (lower) now closed, relay R72 to line 607. In parallel therewith the relays R71 and R70 are also energized through normally closed upper contacts R62b and R61b, and these close their respective contacts R72a, R71a and R70a to provide holding circuits through their holding windings, and contacts R83b and M7 to line 606 which will keep these relays energized until the beginning of the next following cycle. Shortly after these relays R72–R70 have been energized, contacts M9 open (see Fig. 46) to deenergize the relay R63 so that, while the first master card passes to printing position and the second master card now following passes brush Mc, a new setup of relays through emitters E3 and E4 may be made in accordance with the number of line holes in such second card.

Referring now to Fig. 49f, energization of relays R72 to R70 has opened contacts R72c, R71c and R70c so that, as emitter E7 rotates, a circuit is completed when its brush 641 is at its 4 segment which is traceable from line 607, contacts R82c, R48a, plug connection 643 (Fig. 52), brush 641, the 4 segment, the 4 relay R201, the 4 contacts R200a, R73c, the 4 contacts R160a (closed as above explained), plug connection 635 (see Fig. 52 where all positions are shown plugged), socket 7B, connection 636, contacts D13, R7a, R46d (upper) to line 606. Contacts R7a are closed by the presence of a detail card at card lever contacts DCL3 (see Fig. 49).

As brush 639 of emitter E5 (Fig. 49f) operates during movement of the master card to printing position, a circuit is completed through the 4 segment traceable from line 606, contacts R46d, R7a, D13, connections 636, 635, the 4 contacts R160a, contacts R73c, the 4 contacts R200a, wire 638, the 4 emitter segment, brush 639, contacts C47, R82a, R32a (upper), relay 81 and magnet 242 to line 607. Energization of magnet 242 at this time will cause its pawl 241 (see Fig. 3b) to engage the 4 notch 240 of the shutter mechanism to locate it in its 4 position. Relay R81 closes its contacts R81a to provide a holding circuit through its holding winding and also closes its contacts R81c, so that when contacts C48 close, a circuit is traceable from line 606, contacts C48, R81c, connection 644, contacts R161b (now closed as explained), solenoid 230a to line 607. As a result, the shutter 226b of Fig. 3b is rocked into the path of the master card, so that the card is interrupted with its fourth printing line in position to receive the data sensed in the first detail card.

Thus, it is apparent that as the master card advances from the supply hopper 147 (Fig. 13), it first passes brushes Mc which sense the line holes 663 and effect an appropriate relay setting, so that the card is ultimately stopped with the next unprinted line in printing position.

To illustrate the manner of positioning the card for some other line, let it be assumed that all but the last or twenty-fourth line have been perforated. In such case the operation is as follows: Sensing of the hole on line 1 energizes relay R61 which is then held. Sensing of the hole on line 2 energizes relay R62 which is then held and de-energizes relay R61. Next, the hole on line 3 energizes R63 and drops out relay R62 and so on until the hole on line 5 energizes relay R65 which drops out relay R64. When the 6 hole is sensed, relays R66 and R77 are energized, the latter opening its contacts R77a to drop out relay R65 and the relay R66 closing its contacts R66a to provide a holding circuit therefor through contacts M10.

Sensing of the 7 hole energizes relay R61 again and in turn relays R62, R63, R64 and R65 are picked up for lines 8, 9, 10 and 11 in succession with each dropping out previously set ones of these relays. When line 12 is sensed, relays R67 and R78 are energized, the latter opening its contacts R78a to drop out relay R65 and relay R67 closing its contacts to provide a holding circuit so that now both relays R66 and R67 are held.

Again during sensing of lines 13, 14, 15, 16 and 17, relays R61 to R65 are again energized in succession and, when line 18 is sensed, relays R68 and R79 are energized to drop out relay R65 and hold relay R68. The sensing of lines 19, 20, 21, 22 and 23 results in ultimate energization of relay R65 again, so that when all lines having holes have been sensed, relay R65 and relays R66, R67 and R68 will be in energized condition.

Relay R65 through its lower contacts R67b will later, under control of contacts M8 energize relays R74 to R70, so that contacts R74c to R70c (Fig. 49f) will be open during rotation of brushes of emitters E5 and E7 and in the now familiar manner, when brush 639 of emitter E5 energizes its 6 segment, a circuit is completed through the 6 contacts R200a to energize the magnet 242 to position the shutters in their 6 positions. It remains then to rock the lowermost shutter to stop the card in its twenty-fourth printing line. This is done as follows: The relay R68 has closed contacts R68b (Fig. 49f) so that, when contacts M11 close, relay R171 will be energized and held through its contacts R171a and C46. Relay R171 also shifts contacts R171b to energize relay R59 (Fig. 49e) and as a result contacts R59a are latched closed and in turn energize relays R166 and R167, the latter of which closes its contacts R167b (Fig. 49f) so that solenoid 230d will become energized through a circuit completed when contacts C48 close.

It will be recalled that, as the first master card passes brushes Mb (Fig. 13) after having passed line sensing brush Mc and is traveling to its selected stopping position, the first detail card is advancing past brushes Db which sense the data perforations in such card and complete circuits to control the positioning of the alphabetic type wheels, so that when the print hammer is operated printing takes place on the selected line. In the meantime, the second detail card has passed brushes Da and, since its account number is the same as that of the preceding card, the automatic control circuit will not be completed and relay R35 (Fig. 49b) will remain deenergized.

As explained under the heading "Automatic control circuits" and "Second line printing," the result of the agreement between the two successive detail cards is to continue feeding the detail cards and stop feeding of further master cards, leaving the second master card about to pass brushes Mb after the comparing unit has received the new account number and a relay setting has been made for the next line finding operation.

As the second, third and fourth detail cards now pass brushes Db, the data sensed thereon will be entered into the print wheels in order in successive cycles, and for each of these cards the fifth, sixth and seventh lines of the master card will be positioned in turn to receive the data. This positioning is effected as follows: As the second detail card passes brushes Db, a circuit is completed from line 606 (Fig. 49f), contacts R46d, R7a, D13, connection 636, connection 635, the 1 contacts R161a (now closed), contacts R74c, the 5 contacts R200a and thence through the 5 segment of emitter E5 as already traced, to energize magnet 242 at the 5 time to locate the master card down one step.

As the third detail card passes brushes Db, this circuit is completed at the 6 time through the 2 contacts R161a and the 6 contacts R200a to locate the master card for printing on line 6. Since the fourth detail card is to print on line 7, which is the first line of the second group of six, it is necessary to energize magnet 242 at the 1 time and to also energize the 2 solenoid 230b. This is effected as follows:

Referring to Fig. 49f, when the circuit is completed at the 6 time to magnet 242, a parallel circuit branches through contacts R48c, brush 652 of emitter E6, and through its 6 segment to the 6 socket labaled "Jump emitter-exit" (see Fig. 52) which has connection 653 to the 1 socket of the "Jump emitter entry" group and through this connection the circuit continues (Fig. 49f) through closed contacts R161d, the 1 socket of the group "Jump relay-exit," connection 654 (Fig. 52), to the 2 socket of the "Jump relay-entry" group, relay R169 to line 607. Relay R169 shifts its contacts R169b (Fig. 49e) to energize relay R55 which in turn closes its latch contacts R55a to energize relays R162 and R163. Contacts R169c also close to energize the dropout winding of relay R53 and the magnet R200 through which the six contacts R200a are again closed, so that the next line finding circuit will pass through the 1 contacts R162a (Fig. 49f), wire 637, contacts R70c, 1 contact R200a and the 1 segments of emitters E5 and E7, the energization of magnet 242 being accompanied by the energization of relay R81 to close contact R81c to energize the solenoid 230b through the now closed contacts R163b.

Relay R83 (Fig. 49e) was energized in parallel with relay R200 through contacts C46 and opened its contacts R83b in the holding circuit of relays R74 to R70, so these relays become deenergized and close their contacts R74c to R70c (Fig. 49f) during the operation of emitters E5 and E7, so that the above traced circuit may be completed.

It will be understood, of course, that as each line on the master card is presented, there will be an accompanying line finding hole 663 (Fig. 53) punched along one edge of the card for locating purposes in any subsequent passage of such card through the machine.

At this point in the operation of the machine, the automatic control devices have detected a change in account number as the first detail card of a new group passes brushes Da and as a result, relay R35 (Fig. 49b) will be energized as explained with the heating "Detail account number change." Assuming that the second master card bears the same account number as the new detail cards, the comparing unit will register agreement and relay 29 (Fig. 49b) will be energized as explained under the heading "Comparing setup circuits."

As explained under the heading "Master card equals details card," the comparing unit is restored and the cards continue to feed with the second master card now passing brushes Mb (Fig. 13), while the first detail card of the new group passes brushes Db (Fig. 33). Concurrently, the third master card passes brushes Ma and the next detail card passes brushes Da and the account numbers (which are now different) are entered into the comparing unit as before. The line finding relays previously set and held through emitters E3 and E4 (Fig. 49e) under control of the second master card are now effective to select the first printing line for the new master card.

Referring to Figs. 51 and 52, it will be noted that for the present problem there is no plug connection 655 and no entering connection 656 to the check writing print wheels. Accordingly, the mechanism of Fig. 3c remains ineffective and the master card passes by without receiving any recording from the print wheels 457 and enters the hopper 272.

*Full card condition.*—If all twenty-four or a predetermined lesser number down to nineteen lines contain holes 663, the relay R69 will be energized as explained (see Fig. 49e) and will close its contacts R69a to energize the holding winding through contacts M10. Then, as this card advances to printing position, a circuit is completed from line 606, contacts M8, R69b and a relay R75 whose contacts R75a close to provide a holding circuit through contacts M7 and concurrently energize relays R76 and R32. Relay R32 will shift its contacts R32a (Fig. 49f) so that the shutter unit stop pawl magnet 242 will not be energized through emitter E5. The lower contacts R32a will enable contacts C48 to energize magnet 242 and relay R81 to stop the card on its first printing line, but as will now be explained the print mechanism is rendered ineffective and subsequent printing operations will be idle for this master card and its related group of detail cards.

Relay R75 opens its contacts R75c (Fig. 49a), so that the circuit to the platen bail clutch magnet 403 is broken and no printing or punching will take place. It also closes its contacts R75d (Fig. 49a) which complete a circuit from line 606, through contacts C10, R27c (closed) and R75d to dispatch roller clutch magnet 181 to hold this magnet energized for continuous rotation of the dispatch roller 184 (Fig. 1a). It will be noted in Fig. 45 that contacts C10 are closed during the period that contacts C48 are open and from Fig. 49f it will be noted that, when contacts C48 are open, the shutter solenoids 230a to 230d are deenergized and accordingly the shutters are out of the path of the card when the rollers 184 rotate to now uninterruptedly advance the card. This card is to be ejected into the auxiliary stacker 298 (Fig. 1c) which is done, as explained, by shifting rod 286 (Fig. 3c) to the right under control of magnet 292 (Fig. 2c). The card, however, requires several cycles to advance from its printing position to rod 286, so that the energization of magnet 292 is delayed through a series of relays in the following manner.

Relay R76 closed its contacts R76a (Fig. 49i) during the cycle in which the master card was moving to its first line stopping position and near the end of this cycle cam contacts C76 close (Fig. 45) to energize relay R258 which is held through its contacts R258a and contacts C77 until near the end of the second cycle when contacts C78 close to energize relay R259 through contacts R258b. This relay is in turn held through contacts R259a and C79 until near the end of the third cycle when contacts C80 close to energize relay R260 through contacts R259b. Relay R260 also closes contacts R260c through which later in the third cycle contacts C75 complete a circuit to energize the deflector magnet 292 (at which time the master card is opposite rod 286) and the card now advances into the auxiliary hopper 298 (Fig. 3d.)

The relay R260 is now held through contacts R260a and C81 until near the end of the fourth cycle, when contacts C82 close to energize relay R261 which now holds through contacts R261a and C83. In the fifth cycle when contacts C84 close (at which time the card is in the auxiliary hopper) and energize the offset magnet 310 through contacts R261b.

In this manner a "full card" is advanced through the machine without being recorded upon and is deflected into the auxiliary stacker and is also offset in the hopper.

Contacts R75b (Fig. 49i) energized the detail card offset magnet 310D repeatedly under control of contacts C70 so that the detail cards are offset in their stacker 49 until a change occurs in the group control number of the detail cards which will occasion operation of the M cams of which M7 (Fig. 49e) will open to deenergize relay R75.

*More detail cards than printing lines.*—Where the group of detail cards related to a master card has more cards than there are available printing lines, the operation proceeds as first explained with each of the detail cards in turn printing on the next available line up to the last or twenty-fourth line. It will be recalled that in positioning the shutters for the last line relay R167 is energized and the impulse from emitter E5 is through its 6 segment to magnet 242 (see Fig. 49f). Parallel with the completion of this circuit a branch is completed from emitter E5, through contacts C47, R82a, R48c, brush 652 and 6 segment of emitter E6 to the 6 socket of the "Jump emitter exit" group, thence through plug connection 653 (Fig. 52) and serially through plug connections 680 to the 4 socket of the "Jump relay exit" group, a plug connection 681 to a socket designated "Line space full card" (see Fig. 49e) and through relay R80 to line 607.

Relay R80 closes its contacts R80a to provide a holding circuit through contacts M10. A second pair of contacts R80b are closed, so that in the next cycle when contacts D12 close relays R76, R75 and R32 will become energized. As explained just above, these relays will cause the master card to be advanced to and offset in the auxiliary stacker, will suspend printing and will cause the remaining detail cards to be offset in their discharge hopper.

Thus, after all cards have passed through the machine the "full" master cards will be readily discernible in their hopper and the detail cards from which posting was not effected will also be easily noted.

In the event that a master card when compared with the first detail card of a group is not in agreement therewith, the machine functions as explained under the headings "Master greater than detail" and "Detail greater than master." In the first case, the master card is held and the detail cards are fed through the machine and offset in their discharge hopper, whereas in the second case the detail card is held and the master card is fed to the auxiliary hopper without offsetting.

*Interpreting operation*

For this operation, only the master card feeding mechanism is utilized and the detail card feeding mechanism remains idle. Perforated cards are placed in the master feed hopper and, as these cards pass through the machine, the brushes Mb will sense the perforations and print its interpretation upon the same one of twenty-four selected lines of the card. Plugging connections are first made as shown in Fig. 54, where it is indicated by connection 631 that columns 1—14 of the cards are to be sensed and printed in columns 1—14 of the card. In other words, for each column the character will be printed in the same column.

A single plug connection 635 is made as shown for selecting line 7 of the card as the line upon which printing is to occur. The plug connection 634 is made to the 2 "Jump relay entry" socket to initially condition the line finding relays as will be explained presently. Other connections are made as shown, and the circuits controlled through these will be traced.

The preliminary closure of the line space restore contacts 632 (Fig. 49a) will complete a circuit from line 606 (Fig. 49), wire 633 (Fig. 49a), contacts 632, "Line space restore" socket (Fig. 54), connection 634 to the 2 "Jump relay entry" socket (Fig. 49f), relay R169 to line 607. Relay R169 shifts its contacts R169b (Fig. 49e) to energize the pickup winding relay R55 and also shifts its contacts R169c to energize the dropout windings of relays R53, R57 and R59 and to energize the trip setup relay R200. Relay R55 latches its contacts R55a closed so that relays R162 and R163 are now closed. As a result, in Fig. 49f the contacts R200a, R163b, and the 1 contacts R162a are now closed.

The start key is now operated and the master feed clutch magnet MFa will be energized through a circuit from line 606 (Fig. 49a), contacts C9, switch 611, contacts R12c, R15c, R18b, socket 18B (Fig. 54), plug connection 682 to socket 18C (Fig. 49a), magnet MFa to line 607. As before, the start key is held for two cycles so the first card advances to the brushes Mb, closing the card lever contacts MCL2 (Fig. 49) to energize relays R9 and R10 which will then remain energized as long as cards continue to feed. For this operation the master start key contacts 687 (Fig. 49) are used and relay R18 is energized alone so that, when relay R10 is energized, a holding circuit is traceable for relay R18 from line 606, through contacts C10, R16a, R24a, socket 4A (Fig. 54), connection 686, socket 4B (Fig. 49), contacts R10b, R18a, holding winding of relay R18 to line 607. Thus, relay R18 will remain energized and its contacts R18b (Fig. 49a) will keep the clutch magnet MFa energized.

The print unit clutch magnet MFb is energized through a circuit from line 606 (Fig. 49a), contacts C9, switch 611, contacts R12c, R15c, R18b, socket 14D (Fig. 54), connection 683, socket 14A (Fig. 49a), contacts R43c and magnet MFb to line 607, the dispatch roll clutch control relay R26 being concurrently energized to close its contacts R26c so that the clutch magnet 181 is energized as before.

The platen ball clutch magnet is energized through a circuit from line 606 (Fig. 49a), contacts M2, socket 5D (Fig. 54), connection 685, socket 5A (Fig. 49a), contacts R23c, R27b (closed when the card has advanced far enough to close the dispatch roll contacts 196, Fig. 49b) and magnet 403 to line 607. Thus, the feed, print and platen operating devices function continuously and as the cards pass brushes Mb the now familiar print circuits are completed to differentially position the print wheels.

As each card approaches the printing position, a circuit is completed (Fig. 49f) from line 606, contacts R46d, R9b (now closed), socket 7C (Fig. 54), connection 684, socket 7B (Fig. 49f), connection 635 (see Fig. 54) to the 1 contacts R162a, wire 637, contacts R70c, the 1 contacts R200a, wire 638, the 1 segment of emitter E5, brush 639, contacts C47, R82a, R32a, shutter magnet 242 and relay R81 in parallel to line 607. Relay R81 closes its contacts R81c so that there is the further circuit from line 606, contacts C48, R81c, socket D of the "Direct line selection" group (Fig. 54), socket C (Fig. 49f), contacts R163b, the 2 solenoid 230b to line 607. As a result, the stop mechanism is adjusted to interrupt each card for printing on its seventh line, and thereafter the cards pass to the discharge hopper.

It will be appreciated, of course, that by suitable setting of the connections 634 and 635 of Fig. 54 any other of the twenty-four lines will be selected to receive the printed data.

*Multi-card printing operation*

Figure 55:
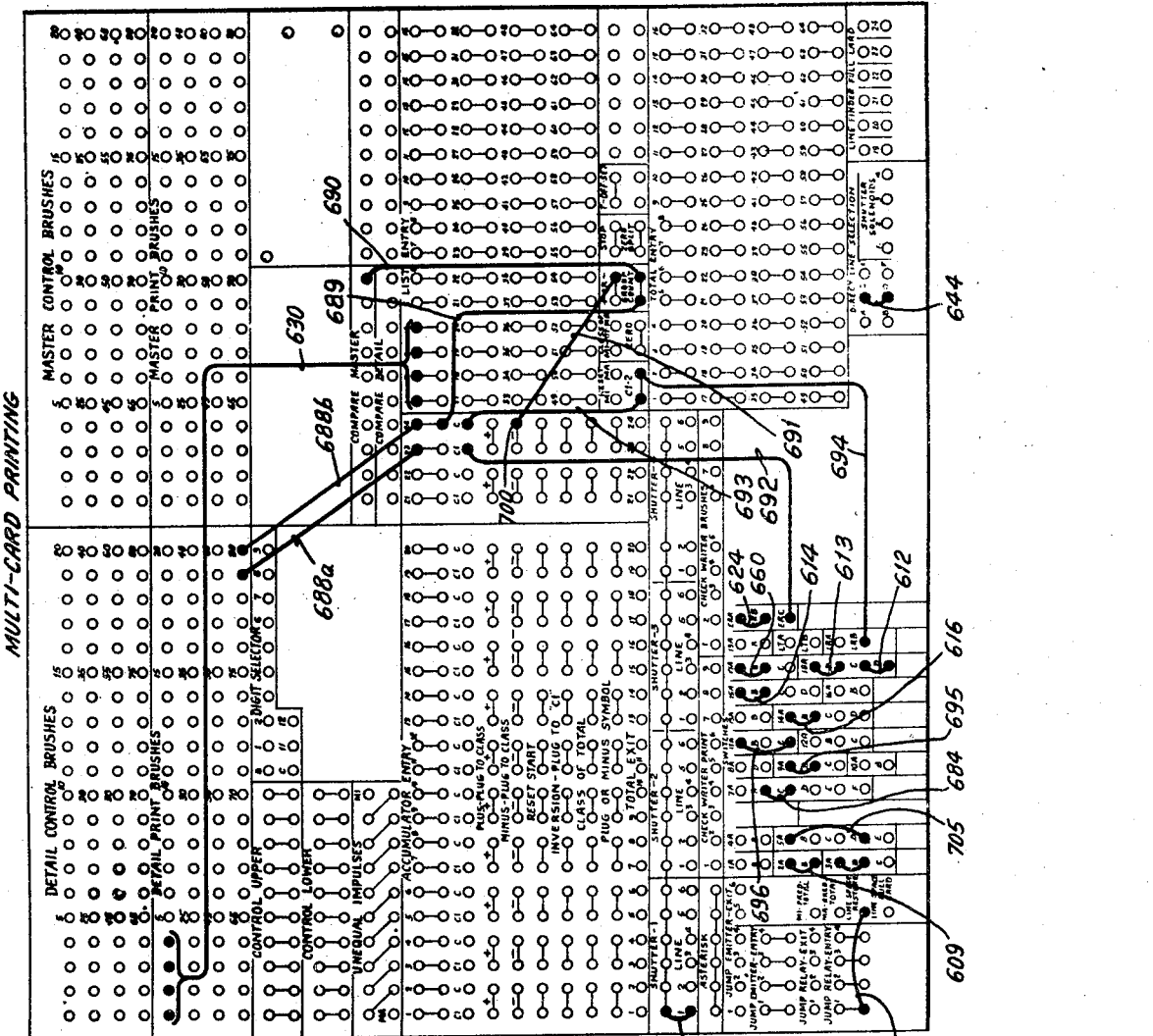

In this operation data is sensed in each detail card and printed repeatedly on a predetermined line of each of a number of successive master cards, with the number of such master cards being determined by additional punching in the detail cards. Fig. 55 shows the plugging for this operation where connections 635, 634, 644 in the now familiar manner will cause the master cards to each be stopped with their first lines in printing position. Columns 1—4 of the detail cards are connected to columns 1—4 of the printing mechanism through the connections 630.

Each detail card has perforations in columns 79—80 denoting the quantity of master cards that are to receive the data of columns 1—4, and from the detail print brush socket connections 688a and 688b are made to the sockets 23—24 designated "Accumulator entry" from one of which connection 689 is made to a "Group count" socket and from here a further connection 690 is made to one of the "Compare master" sockets. Other connections 691—696 are made as shown and the purpose of these will be explained in connection with the tracing of circuits therethrough.

In commencing operations, the detail cards are placed in their feed hopper with a blank card containing only a 0 perforation in the units order column (column 80) of the quantity field, as the first card to be fed. The record cards are placed in the hopper and it will be noted that no data is to be read from these cards. After the preliminary line space restoring operation, the start key is operated to energize relays R17 and R18 (Fig. 49) and their usual holding circuits are established. As a result, and as before, the clutch magnets MFa, DFa and DFb are energized (Fig. 49a) to advance the first master and detail cards.

As the first detail card (containing only a 0 hole in column 80) passes brushes Db, a circuit is completed from line 606 (Fig. 49f), contacts C24, C25, R6d (now closed), common 151, a hole in column 80, brush Db, connections 688 (Fig. 55), 689 and 690 to a "Compare-master" socket (Fig. 49d) and thence to a comparing unit magnet SM2 and line 607. Since no impulse is sent to any magnets SM1 on the detail side of the comparing unit, this side will register 9 and a disagreement or high detail condition will be indicated. Since the "High master" condition is not connected (see Fig. 55 where no connection is made between sockets LRA and LRB), this comparison is of no effect.

Under control of the plug connection 691 (Fig. 55) a circuit is completed (Fig. 49h) from line 606, contacts D18, R28c, R28d (now closed), socket designated "+ or —" (see Fig. 55), connection 691, a — socket 700, which in Fig. 49h is wired to relay R244 and thence to line 607. Relay R244 is thus energized each detail card cycle and closes its contacts R244c to energize relay R207, when contacts C68 close later in the cycle. In Fig. 49g contacts R207a and R244a will accordingly close to control circuits to be presently traced.

It may be pointed out at this time, that the accumulators are normally set with all orders registering nines and the operations now about to be described are to advance such settings to zero. Upon sensing the 0 hole, a circuit is traceable from line 606 (Fig. 49d), contacts C24, C25, R6d, common 148, the 0 hole, brush Mb, connections 688b and 689 to the "Group count" socket (see Fig. 49b), contacts C57 and relay R176 to line 607. Relay R176 closes its contacts R176d to provide a holding circuit through contacts C58 and also closes a pair of contacts R176a (Fig. 49g).

The 0 hole completes a further circuit from brush Mb and connection 688b (Fig. 55) to the 24 "Accumulator entry" socket (Fig. 49g), contacts R244a, R184a and magnet AM related to the lowest or units order of the accumulator. This energization of magnet AM causes the accumulator wheel to be driven, and after nine steps the wheel will be declutched through a circuit to magnet SM as follows: from line 606 (Fig. 49g), contacts C55, C54, C53, wire 701, contacts R207a, magnet SM to line 607. From Fig. 45 it will be seen that contacts C53 make at three different times in a cycle and that the second closure occurs nine points or steps after the zero hole is sensed, so that the units wheel of the accumulator is advanced from 9 to 8, and in so moving it shifts its tens carry contacts to closed position. The tens order wheel remains at 9, so the setting at this point is 98 in the units and tens orders.

The units order will now be advanced two steps and the tens order one step to register 00. For the units order a circuit is completed from line 606, contacts C55, C54, D14, R176a, wire 702, socket CI2 (Fig. 55), connection 693 to socket C of column 24, contacts R177a (now closed), R184a, start magnet AM to line 607. Contacts R177a are closed by a circuit through relay R177 in Fig. 49h from line 606, contacts D17, socket 9B (Fig. 55), connection 695, socket 9A and relay R177 to line 607. The circuit is completed through the magnet AM, two steps before magnet SM, which latter is now energized through the same circuit as traced above through cam contacts C53, this time, however, at the time indicated in Fig. 45 at 270°. Thus, by energizing the start magnet AM two steps before the stop magnet SM is energized, the units wheel of the accumulator is advanced two steps from its 8 setting to 0.

In normal adding operations, a tens carry would take place to carry a 1 into the tens order and advance the 9 in that order to 0. This is prevented at this time, however, by the opening of contacts D16 in the tens carry circuit during this cycle. This circuit will be completed and traced in the next cycle, during which the detail feed is stopped with contacts D16 closed.

The stop magnet circuit branches from wire 701 (Fig. 49g), through contacts R207b to also energize the SM magnet in the tens order, and one step before this occurs there will have been completed the tens carry circuit to the tens order start magnet AM traceable from line 606, contacts C55, C54, D14, R176a, wire 702, socket CI2, connection 695 (Fig. 55), C socket (Fig. 49g), contacts R177a of the units order, the 9 contacts 119 (now closed as the units order has advanced to 9), contacts D16, R177b, R184b, magnet AM in the tens order to line 607. Thus, the two wheels now stand at 00 as a result of adding a 9 to the initial 99 in one cycle, during which tens carry is suppressed to obtain 98 and then adding a 2 with a tens carry. The contacts R176a (Fig. 49g) will also have completed a circuit from line 606, contacts C55, C54, D14, R176a, wire 702, socket CI2, plug connection 695 (Fig. 55) to socket C of units column 24 (Fig. 49g), contacts R177a, contacts 119, D16, R177b, contacts 119 in the tens order, R182a, socket C1 in the tens column 23 (Fig. 55), connection 692, to socket ERC which in Fig. 49b is wired to relay R29 and line 607. A further circuit is also completed by contacts R176a traceable from line 606 (Fig. 49g), contacts C55, C54, D14, R176a, wire 702, socket CI2, plug connection 694 (Fig. 55) to socket LRB (Fig. 49b), and thence through relay R30 to line 607.

Relay R29 will close its contacts R29a to establish the holding circuit therefor and will open the contacts R29c to prevent establishment of the holding circuit of relay R30, so that energization of the latter is of no effect. Closure of contacts R29b (Fig. 49a) will cause energization of the clutch magnet MFa and dispatch relay R26, and closure of contacts R29d will cause energization of the clutch magnets DFa and DFb through familiar circuits, so that both feeds continue to advance cards with the first master card continuing on to its stacker and the first detail card to its stacker. The comparing units will also be restored as an accompaniment of the card feeding.

The foregoing operations have been a preliminary to set the accumulator at 0, and it will be noted that it requires the punching of a 0 in the first detail card and the passage of a master card, which may be blank, through its feed.

The second detail card is now about to pass brushes Db, while the second master card is about to pass brushes Mb. The former contains data perforations in columns 1–4 which through connections 630 (Fig. 55) will set the print wheels to print in columns 1–4 of the master card. Columns 79–80 will also be sensed concurrently by brushes Db and the amount, say 15, for example, will be entered through connections 688b and 688a into the units and tens orders of the accumulator, which will accordingly then register 84 before tens carry operations, since inasmuch as the cards feed with the hole positions in the order 0, 1, 2, 3, etc., the 5 hole will complete a circuit to the units order magnet AM four steps before its magnet SM is energized and the 1 hole will complete a circuit to the tens order magnet AM eight steps before its magnet SM is energized. Tracing of these circuits is through a path parallel to that traced for the 0 hole of the first detail card. The circuit for the 5 hole, as for the prior 0 hole, will branch through connections 689 and 690 (Fig. 55) to the socket of the "Compare master" group, so that this side of the comparing unit is set at 5 while the companion setting of the detail side moves uninterruptedly to the extreme 0 or 9 setting. During the tens carry period a 2 will be entered in the units order just as explained for the initial 0 entry from the first detail card, but this impulse will not branch through the units contacts 119 as before, since with a 5 setting they will be open, and as a further result the other branch which energized relay R29 will also not be completed. The third branch traced through connection 694 to socket LRB (Fig. 49b) will, however, be completed as before to energize relay R30 which closes its contacts R30a to hold through contacts M4 and R29c. As a result of the entry of a 2, the accumulator advances to represent 86. Also, during this tens carry, when contacts C14 close (Fig. 49b) the comparing circuit is partially completed from line 606, contacts D5, socket 11C, connection 696 (Fig. 55), socket 11A (Fig. 49b), contacts C14, R41a and R43a (now closed since their relays are not connected for energization for this problem), contacts 592, 590 in higher orders of the comparing unit, contacts 591 in the lowest order of the detail side (since there is a high detail condition) to wire 704. The socket LRA is not connected, however, so that this circuit is not completed.

Relay R30 opens its contacts R30c (Fig. 49a) in the detail clutch magnet circuit, so that magnets DFA and DFB become deenergized and along with them the print clutch magnet MFb. The master clutch magnet MFa remains energized to feed master cards, magnet PR2 is energized to restore the master side of the comparing unit, and the relay R26 is energized to operate the dispatch clutch. This condition will now continue until fifteen master cards have passed the printing wheels and have received printing thereon on a line selected by the plug connections 635, 644 (Fig. 55) in the now familiar manner.

Particular attention is directed to Fig. 44 where it is shown that the printer drive clutch designated as MFb uncouples at about 306° in the cycle, and at such point as indicated by line 322 the type wheels have not yet begun to restore so that stopping of the print unit will leave the wheels in position with the data of card columns 1–4 set on the printing line to which the succession of master cards is now to be presented. As each master card is stopped in printing position, the print bail is operated in the familiar manner, namely, when a master card causes contacts 196 (Fig. 49b) to close, relay R27 is energized to close its contacts R27b (Fig. 49a) to complete the circuit from line 606 (Fig. 49a), contacts M2, socket 5D, connection 705 (Fig. 55), socket 5A (Fig. 49a), contacts R23c, R27b, magnets 403 and 430 to line 607.

With the detail card feed stopped, relay R176 (Fig. 49b) becomes deenergized and is not reenergized, since it will be recalled its initial energization was through a hole sensed in the units column of the detail card. Accordingly, contacts R176a (Fig. 49g) are open during the following cycles, and no further entries of 2 are made in these cycles. Near the end of the cycle in which the first of the group of fifteen master cards is printed upon, the accumulator still stands at 86, and for each subsequent cycle thereafter it will be advanced one unit (as will be presently explained), until just prior to printing the fourteenth card it will have been advanced to 99 and just prior to printing the fifteenth card it will have been advanced to 00.

To advance the accumulator, a circuit is completed for each of these cycles traceable from line 606 (Fig. 49g), contacts C55, C54, C51 (closed at the 1 time), D15, M12, wire 702, socket CI2 (Fig. 55), connection 695, socket C of column 24 (Fig. 49g), contacts R177a, R184a, and magnet AM to line 607. The stop magnet SM is energized one step later as explained. The circuit also branches as before from socket CI2, through connection 694, to socket LRB (Fig. 49b) to energize relay R30, which keeps the master feed running. As usual, when the units order stands at 9, the carry circuit branches through contacts 119 to step the tens order one unit, and, when both orders stand at 9, the circuit continues from contacts R177b (Fig. 49g), contacts 119 of the tens order, contacts R182a, socket C1 (Fig. 55), connection 692, socket ERC (Fig. 49b), and relay R29 to line 607. As a result, the detail feed magnets are energized and a new detail card is advanced past brushes Db, the print wheels are restored and set with the new data and the new quantity is entered in the accumulator as before, and operations repeat in the same manner as described. The machine will continue to run as long as cards are in the feed hoppers and printing will take place for each detail card on as many master cards as are called for by the quantity punched in columns 79—80 of the detail cards.

*Posting on detail card-selected line*

Under the heading "Ledger posting operation" it was explained how posting from detail cards took place on the next available line of the master card. In the following it will be pointed out how by means of punching in the detail cards any selected line of the master card may be selected. For this operation a selected column (preferably the last or eightieth column) of the detail card is punched with a code arrangement as follows:

```
To select line 1 of the master card, punch a 4 hole
To select line 2 of the master card, punch a 5 hole
To select line 3 of the master card, punch a 6 hole
To select line 4 of the master card, punch a 7 hole
To select line 5 of the master card, punch a 8 hole
To select line 6 of the master card, punch a 9 hole
To select line 7 of the master card, punch a 4 and 12 hole—D
To select line 8 of the master card, punch a 5 and 12 hole—E
To select line 9 of the master card, punch a 6 and 12 hole—F
To select line 10 of the master card, punch a 7 and 12 hole—G
To select line 11 of the master card, punch a 8 and 12 hole—H
To select line 12 of the master card, punch a 9 and 12 hole—I
To select line 13 of the master card, punch a 4 and 11 hole—M
To select line 14 of the master card, punch a 5 and 11 hole—N
To select line 15 of the master card, punch a 6 and 11 hole—O
To select line 16 of the master card, punch a 7 and 11 hole—P
To select line 17 of the master card, punch a 8 and 11 hole—Q
To select line 18 of the master card, punch a 9 and 11 hole—R
To select line 19 of the master card, punch a 4 and 0 hole—U
To select line 20 of the master card, punch a 5 and 0 hole—V
To select line 21 of the master card, punch a 6 and 0 hole—W
To select line 22 of the master card, punch a 7 and 0 hole—X
To select line 23 of the master card, punch a 8 and 0 hole—Y
To select line 24 of the master card, punch a 9 and 0 hole—Z
```

The column at the right indicates the letter corresponding to the double punching which facilitates the punching of these holes on standard key operated punches. Plug connections for this operation are made as in Fig. 52, with the exception of connections 653, 680, 654, 634, 681, 643, 673, 675 and 677 and with the connection shown in Fig. 56 made in their stead.

Operations take place as to type wheel operation and comparison as before, the only limitation being that in any group of detail cards that are to print on the same master card the line selected by successive detail cards of the same group must be a higher valued line than that selected by the preceding detail card, so that the master card advances from any line to the next, inasmuch as the nature of the mechanism does not permit retrograde movement of the master card to select any lower valued line.

Figure 56:
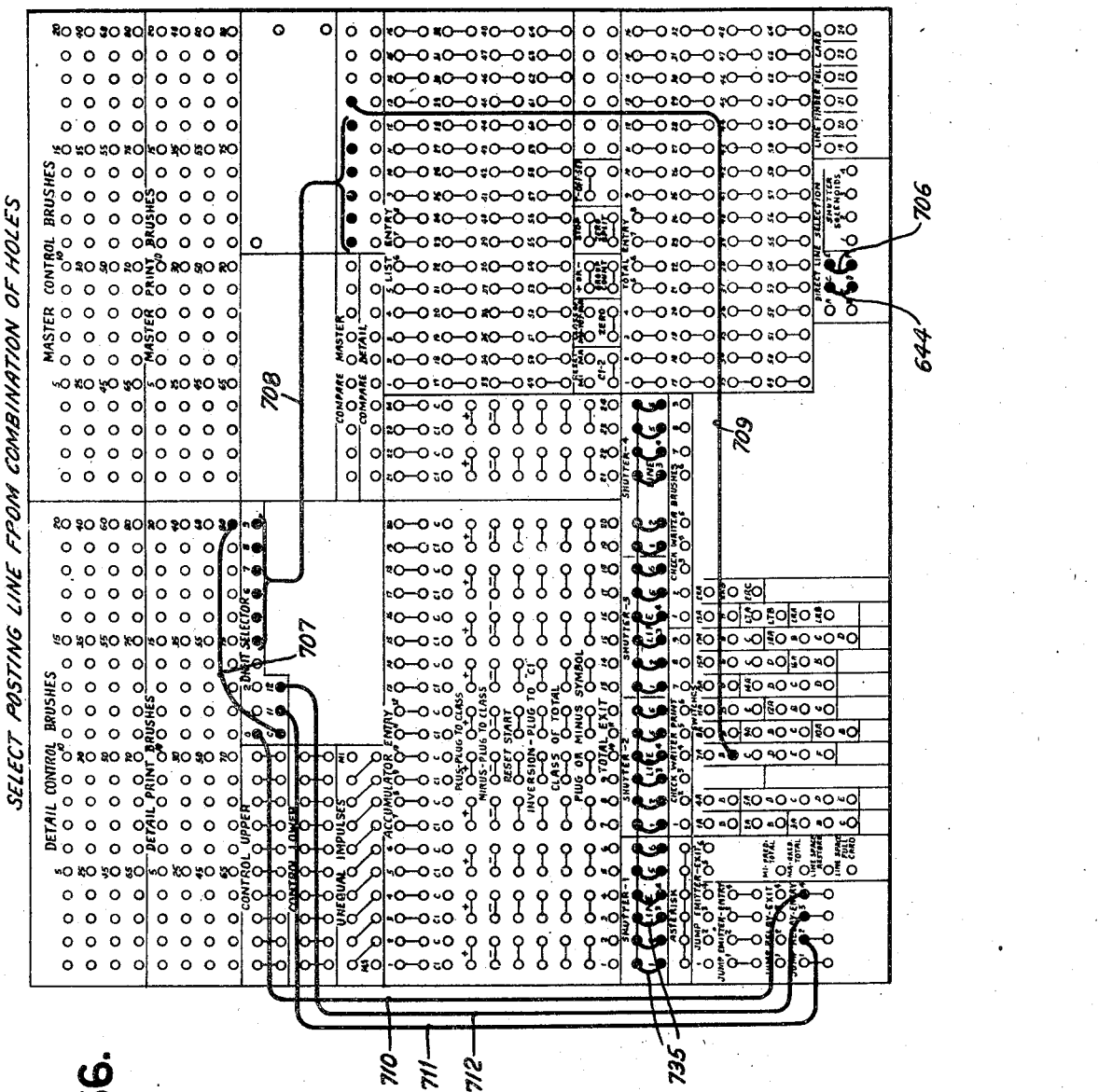

Considering the plugging of Fig. 56, as column 80 of the detail card passes brushes Db, a circuit is traceable from line 606 (Fig. 49d), contacts C24, C25, R10d, R6d, common 148, code perforation in column 80, brush Db to the "Detail print brush" socket 80 (Fig. 56), connection 707 to socket C of the group designated "Digit selector." From this socket (Fig. 49d) the circuit continues to a brush 713 of an emitter E2, which brush contacts segments 12, 11, 0, 1, 2, etc., synchronously with the sensing of like valued holes in the card column. Assuming a 4 hole in the card column, the circuit continues to the 4 socket of the digit selector group (Fig. 56), a connection 708 to a bus, from which the circuit continues through connection 709 to socket 7B (Fig. 49f), and thence through contacts R160a in the 1 position (now closed), contacts R70c, R200a in the 1 position, wire 638, the 1 segment of emitter E5 which is contacted by its brush 639 at this time (see Fig. 46), contacts C47, R82a, R32a, magnets R81 and 242 to line 607. As a result, the shutter mechanism is stopped at its first step.

The contacts R160a in the circuit just traced were closed as a result of the usual printing operation, wherein a circuit is completed from line 606 (Fig. 49e), contact C43, lower contacts R168b, R169b, R170b, R171b, socket F of the "Line selection" group (Fig. 56), connection 706, socket E and relay R53 to line 607. Relay R53 latches its contacts R53a to energize relays R160 and R161.

When contacts C48 close, the familiar circuit is completed through now closed contacts R81c (Fig. 49f), socket C, connection 644 (Fig. 56), socket D, contacts R16lb and the upper shutter magnet 230a. Thus, line 1 is selected. If the hole had been 5, 6, 7, 8 or 9, lines 2, 3, 4, 5 or 6 would have been respectively selected in the same manner through the 2, 3, 4, 5 or 6 segments of emitter E5.

Assume now a double perforation, say, for the letter D which is a 4 and 12 combination. The 12 hole being sensed first will complete a circuit from socket 80 (Fig. 56), connection 707, to the C socket of the "Digit selector" group (Fig. 49d), brush 713 of emitter E2, the 12 socket (Fig. 56), connection 711 to the 2 "Jump relay entry" socket (Fig. 49f) and relay R169 to line 607. In like manner holes in the 11 and 0 positions will energize relays R170 and R171 through connections 712 and 710. Relay R169 shifts its contacts R169b (Fig. 49e) so that, when contacts C43 close, relay R55 is energized and R53 deenergized as a result. Contacts R55a energize relays R162 and R163, so that after the second hole 4 has energized the magnets 242 and R81 at the 1 time of emitter E5 (Fig. 49f), closure of contacts C48 will energize shutter magnet 230b through contacts R163b and R81c to select line 7 for printing.

Thus, for a detail group of, say, three cards, the first may print on line 1 of the related master card, the next on line 12 and the third on line 24, if these detail cards are provided with the appropriate punching.

A slight apparent variation of the code punching may be employed where the digit holes 4 to 9 could be made in one card column (80), and the zone holes 12, 11 and 0 in another column (79). In such case column 80 could be directly connected (Fig. 56) to socket 7B, omitting connections 708 and 709 and the "Detail print brush" socket 79 would be connected to the C socket of the "digit selector" group.

Ledger posting of totals

Under the heading "Ledger posting operation" it was explained how each detail card of a related group effected posting on a successive line of an agreeing master card. The present operation is substantially the same with the exception that, in addition to each of the detail cards printing on a different line of the master card, a total is obtained of the amounts on the group of detail cards and such total is printed on the next line of the master card.

Figure 57:
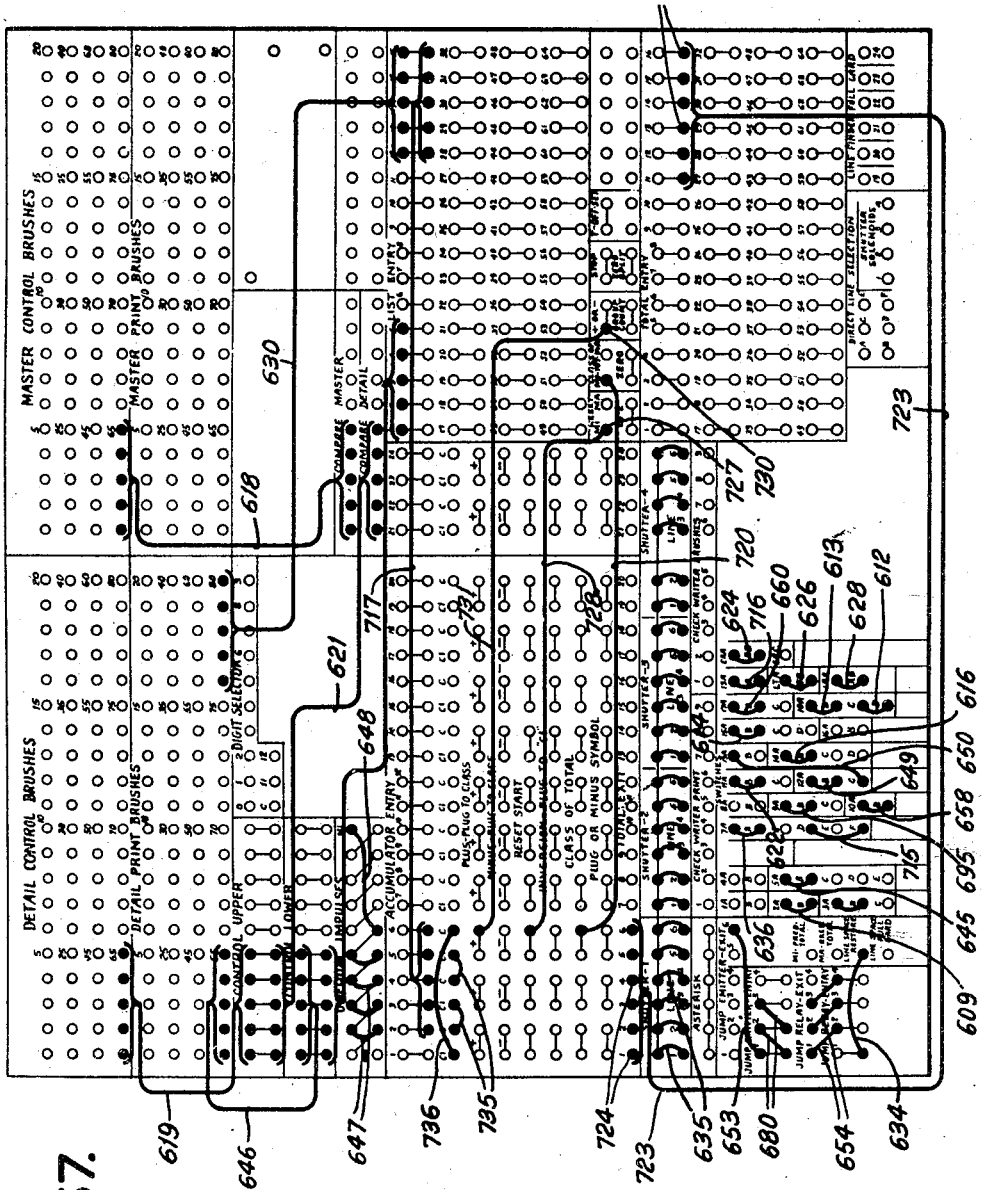

Fig. 57 shows the plugging arrangement for this problem and comparison with Fig. 52 will show the control number comparison connections 619, 646, the comparing connections 618, 621 and the print connections 630 are the same. The line finding connections 635, 653, 680, 654 and 634 are also alike, and the full card connection 681 is omitted. All the switch connections are duplicated and three additional ones are made which are designated 695, 715 and 716. In the lower right hand corner the connections 643, 644 and 673 to 677 are not used.

Connections 717 are made between the "List entry" sockets 12—16 and the "Accumulator entry" sockets 2—6, so that the amount sensed in the detail cards is entered into the accumulator. In the central section are shown several other new connections which serve to condition the accumulator for adding operations, and these will be explained in connection with the circuit diagram.

The detail cards will have control numbers punched in columns 61—65 and amounts punched in columns 76—80. Where an amount is smaller than five column capacity, zeros will be punched to the left as, for example, amount 25 is punched as 00025 in columns 76—80. The master cards will have the control number punched in columns 61—65 the same as for the detail cards.

As before, the cards are placed in their respective hoppers and the start key is depressed to close contacts 608 (Fig. 49) to energize relays R17 and R18. Relay R18 will close its contacts R18b (Fig. 49a) to complete the clutch magnet circuits and comparing unit restoring magnet circuits as before. These circuits are traceable as follows: From line 606, contacts C9, switch 611, contacts R12c, R15c, R18b, R20a, R44a, R42c, R10c, socket 180 (Fig. 57), connection 612, socket 18c (Fig. 49a), magnet MFa to line 607. In parallel through socket 15B, connection 615, and socket 15A the magnet PR2 is also energized.

For the detail feed, the circuit is traceable from line 606, contacts C9, switch 611, contacts R12c, R15c, R18b, socket 18B, connection 613 (Fig. 57), socket 18A, contacts R6c, R30c and magnet DFa to line 607. As a result, both cards feed up to their first sensing brushes Ma and Da respectively and operate their card levers to energize the card lever relays R1 to R4 (Fig. 49). By holding the start key contacts closed, a repetition of the above circuits takes place and the cards feed past their brushes Ma and Da and at this time, since relay R2 is energized, the magnet PR1 (Fig. 49a) is energized through contacts R2b to restore the detail side of the comparing unit. The further card lever relays R3, R5, R6, R9 and R10 (Fig. 49) will be energized during this second cycle and holding circuits set up as before.

As the cards pass brushes Ma and Da, the control numbers are set up in the comparing unit and, since it is assumed that there is a master card present for each detail group, there will be an agreement in such comparison setting.

Further, in the detail feed mechanism, no card is passing brushes Db as the first card passes brushes Da, so that the control relays will detect a group change and the circuit in Fig. 49b will be completed through contacts R120b and R121b to energize the relay R35, which will be held through its contacts R35b and D6 (Fig. 49c). Closure of contacts R35d (Fig. 49c) will then complete a circuit from line 606, contacts D9, R33c, R35d, socket 19A, connection 719 (Fig. 57), socket 19B (Fig. 49c) and relays R43, R44 and R45 to line 607. As a result, contacts R43a (Fig. 49c) open to prevent completion of the comparison circuit. Contacts R44a (Fig. 49c) open to prevent reenergiaztion of the master feed clutch magnet MFa and contacts R41c are open to prevent reenergization of the detail feed clutch magnets. Thus, both feeds stop. It will be recalled that, when relay R35 is energized, its contacts R35a (Fig. 49c) open to deenergize relay R41.

The machine will now pass through an idle total and reset cycle, but will not print because, there being no card in the dispatch rolls, the dispatch roll contacts 196 (Fig. 49b) are open and prevent operation of the print bail clutch magnet.

A holding circuit is established for relays R43 and R44 from line 606 (Fig. 49c), contacts C21, R43b, and R44b to the holding coils of these relays and to line 607. Relays R46 and R47 in parallel with R44 will thereupon be also energized. With relay R43 held energized, a circuit is completed when contacts C9 (Fig. 49a) close which is traceable from line 606, contacts C9, switch 611, contacts R12c, R15c, contacts R43c (lower), print clutch magnet DFb and relay R26 in parallel, to line 607. Relay R26 closes its contacts R26a (Fig. 49c) so that, through contacts C19, relay R26 will remain energized during the next following cycle. Contacts R26c (Fig. 49a) will cause the dispatch clutch magnet 181 to be energized for line spacing but without effect, since no master card has as yet been fed to the dispatch rollers.

In the same manner as explained under "Ledger posting operation," the line finding mechanism under control of the brush MC will operate the proper shutter to select the line of the master card to receive the printed total. In the following the operation will be idle, but let it be assumed that a master card is present and that there is an amount standing on the accumulator which is to be printed on the selected line.

The circuit which energized relays R43, R55 branches as follows: from line 606 (Fig. 49c), contacts C21, R43b, C22, R39c to socket designated MI (see Fig. 57), thence through a plug connection 720 to a socket designated "Class of total" to which in Fig. 49c relay R108 is connected, so that relay R108 is now energized and closes its contacts R108a (Fig. 49g).

As emitter E8 now operates, circuits will be completed through contacts R109a to energize the print magnets in accordance with the amount standing in the accumulator. A representative circuit is traceable as follows: from line 606 (Fig. 49g), contacts C55, C54, brush 721 of emitter E8, wire 722, right hand contacts R219a to the segments 118, brushes 115, 116, conductors 118c, the impulses being transmitted thereto in the order 0, 1, 2, 3, etc., thence through contacts R108a to "Total exit" socket 724, plug connection 723 (Fig. 57) to a "Total entry" socket 725 (Fig. 49g), upper contact R101a (now closed), R201a and print magnet 361 to line 607. Contacts R101a were closed by energization of relay R101 (Fig. 49c), through contacts C22 when relay R108 was energized.

The print wheels are, of course, operating in synchronism with the emitter E8, so that for each of the six orders of the accumulator that are plug connected, a similar circuit is traceable to position the print wheels in accordance with the amount standing in the accumulator. As will be recalled in connection with the explanation of the printing mechanism, a zero impulse effects a zone setting and it is necessary to send a second impulse to the print magnets in positions where zeros are to be printed. This is now done as follows: After emitter E8 has sent impulses through all digital positions of the accumulator, relay magnet R201 (Fig. 49h) is energized through a circuit from line 606, contacts C63, R46c to relay R201 which holds through its contacts R201c and C64. Relay R201 shifts its contacts R201a (Fig. 49g) so that, when contacts C50 close, a circuit is completed from line 606, contacts C24, C25, C50, R201a to all the magnets 361. Those that have been already tripped for a significant digit will not be effective but the remainder will set their related wheels to print zero.

Following the total printing operation, the accumulator is reset. This is effected by adding to each order an amount that will advance it to 9. Contacts R46a (Fig. 49h) have energized relay R196 which closes its contacts R196d to provide a holding circuit through contacts C62 and closes its contacts R196e to energize relay R219. The latter in turn closes its contacts R219a to provide a holding circuit through contacts C67 to keep this relay energized through the reset part of the cycle.

Contacts R196d also complete a circuit from line 606, contacts C62, R196d, socket 727 (Fig. 57), connection 728, socket 729 (Fig. 49h), relay R184 to line 607. Relay R184 closes its contacts R184a and R184b (upper). Assume, for example, that there is a 3 standing in one order of the accumulator, then as emitter E8 continues to rotate a circuit will be completed when one of its two brushes 721 contacts the 6 segment, traceable from line 606 (Fig. 49g), contacts C55, C54, brush 721, the 6 emitter segment, wire 722 to the 7 contacts R219a (now shifted), the 3 common segments 118, brush 115, 116, conductor 118c, contacts R184a (upper) to start magnet AM and line 607. In similar manner for other digital settings the related AM magnet will be energized at a time representing the 9's complement of the digit. Energization of magnets AM will start the accumulator wheels turning and, when all reach 9, the stop magnets SM are concurrently energized to declutch the wheels, leaving them set at 9's. This stop circuit is traceable from line 606, contacts C55, C54, C53, wire 701, contacts R207a, R207b, and magnets SM to line 607. Contacts R207a and R207b were closed as follows: When relay R198 was energized, it closed contacts R196f to energize relay R198 (Fig. 49h) which in turn closed its contacts R198a to energize relay R207. It will be noted that the stop circuit through contacts C53 occurs when contacts C53 close early in the following cycle (see Fig. 45) which is the first of the three times in a cycle that these contacts close. Thus, total printing takes place in the first half of a cycle and resetting takes place in the latter part of the cycle with an overlap into the beginning of the next cycle.

During the total printing operation, when contacts C21 (Fig. 49c) opened, relays R43, R44 and R45 become deenergized and shortly thereafter contacts C14 close to test the comparison circuit. It will be recalled that the first detail and master cards containing the same account number set up the comparing mechanism, so it is now in an "equal condition" and, when contacts C14 close, the "equal" circuit is completed through contacts R41a and R43a to energize the relay R29. As a result, in the now familiar manner both feeds are brought into operation so that the first detail card now passes its brushes Db while the first master card passes its brushes Mb. Also the master feed will stop after one cycle and advance its card to the selected printing position, while the detail feed continues to feed cards in succession until a group change is detected, resulting in energization of relay R35.

Energization of relay R35 will result in repetition of the operations just described, namely, total printing will take place to print the total on the master card, to reset the accumulator to 9's in all orders, and resume feeding of a card in each feed.

As each detail card passes brushes Db, circuits are completed as explained under "Ledger posting operation" to post the data from the successive detail cards of the same group on successive lines of the master card. For this operation the data will also be entered into the accumulator.

It will be recalled that the digits in the card are sensed in the order 0, 1, 2, 3 and adding is effected by energizing all the start magnets AM at 0 and declutching the wheels when a hole is sensed. The initial circuit is traceable from line 606, contacts D18 (Fig. 49h), contacts R28c, R8b, socket 730 (Fig. 57), connection 731, socket 732, relay R232 to line 607. Relay R232 closes its contacts R232a (Fig. 49g) and R232b, of which the latter complete the start circuit traceable from line 606, contacts C55, C54, C52, wire 733, contacts R232b, R184a and R184b, start magnet AM to line 607. Thus, all the wheels start to turn and will continue to do so until a hole in the card completes a circuit from line 606, contacts C24, C25 (Fig. 49d), contacts R6d, roller 148, brush Db, "Detail print brush" socket (Fig. 57), connection 638, connection 717 to "Accumulator entry" socket (Fig. 49g), contacts R232a and stop magnet SM to line 607. Thus, if a card column contained a 6 hole, the related wheel would be advanced from a 9 setting, through 0, 1, 2, 3, 4 to 5. If it contained a 0 hole, the wheel would not advance, since the impulse through the hole in the card would coincide with the impulse from contacts D52 and neither magnet AM or SM would become energized. After all the hole positions have been sensed and with the amount being 00625, for example, the wheels will have advanced from a setting of 99999 to 99514. Since the tens carry contacts have been tripped in the three left hand orders, the usual carry impulse will add 1's in all orders but the lowest to advance the wheels to read 00624.

The tens carry impulses are transmitted through plug connections 735 (Fig. 57) made between the C1 socket of the tens order (5), and the C socket of the hundreds order (4), and between the C1 socket of the thousands order (3) and the C socket of the tens of thousands order (2). The C1 socket of the highest order (1) is connected by a plug connection 736 to the C socket of the units order (6), so that with such highest order standing at 9 the tens carry circuit will extend through the 9's contacts 119 (Fig. 49g) to the C1 socket of this order, to the C socket of the units order, contacts R177a, R184a (lower) to the magnet AM in this order, to trip it one step before the magnet SM is energized. Thus, the amount 99514 is advanced to 00625 representing the value of the amount entered.

Amounts from the remaining cards of the detail group will similarly be added and, when a change in group number is detected, relay R35 is energized to initiate the total and reset cycle of operations as already explained.

*Multiple column selection*

Figure 58:
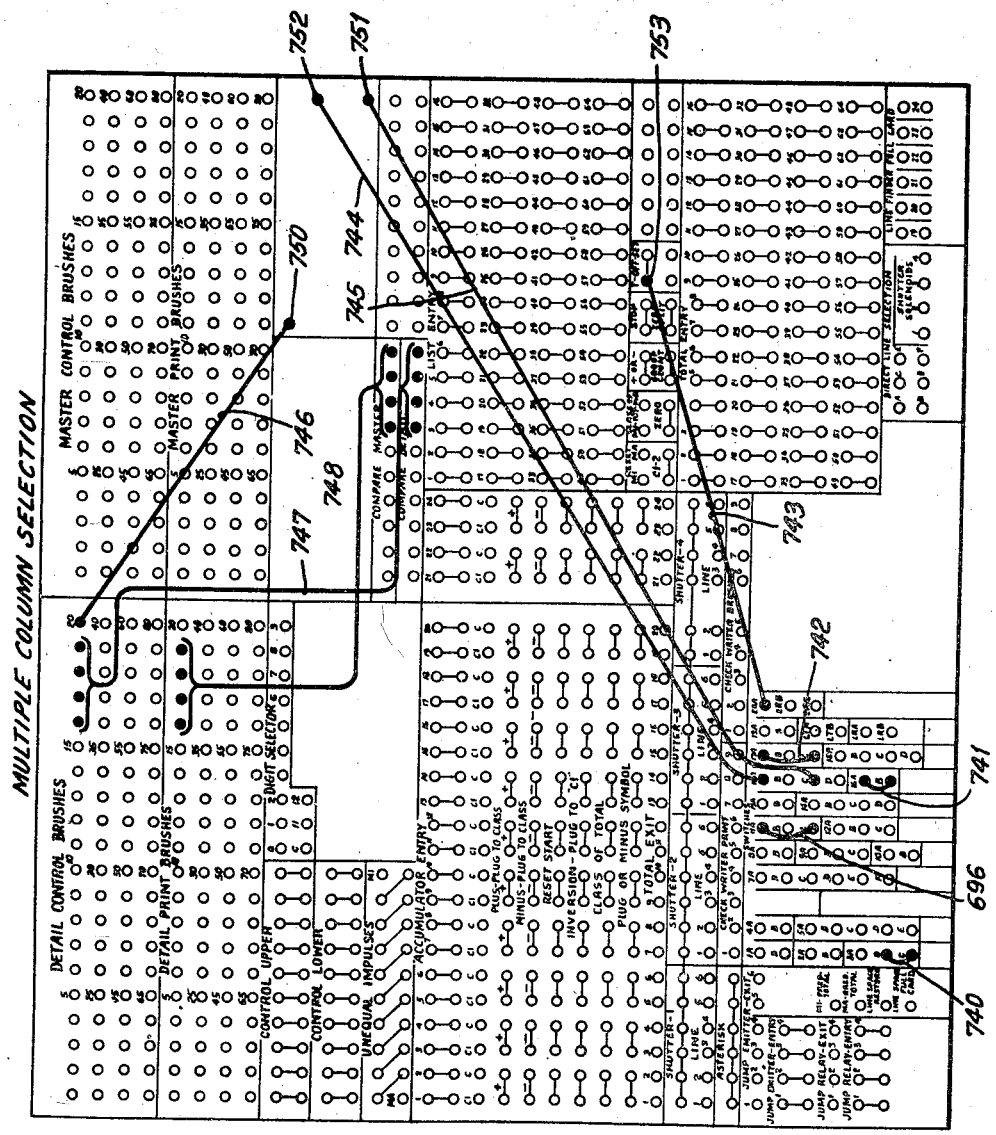

By means of the interchangeable plug connections, it will be apparent that numerous other combinations of operations may be performed by the machine. One further such problem will now be explained, and in this instance it is desired to feed a single file of cards through the machine and offset in the file all those cards having a predetermined account number. For this operation, only the detail card feed is active and plug connections are made as shown in Fig. 58. The group of cards is placed in the detail feed hopper, preceded by a special card in which is punched the account number and a special X hole. The account number is punched in columns 16 to 19 and the X hole in column 20. For the detail cards the account numbers are also punched in columns 16 to 19.

As before, operations are started by closing start key contacts 608 (Fig. 49) to energize relay R17 which holds through a circuit traceable from line 606, contacts 610, R16a, R7b, socket 3B (Fig. 59), connection 740, socket 3C (Fig. 49), contacts R22c, R17a, holding coil of relay R17 to line 607. This circuit, when established, will remain completed throughout the entire operation.

Relay R17 closes its contacts R17d (Fig. 49a)

to complete a circuit from line 607, contacts C9, switch 611, contact R12c, R15c, R17d, socket 17A (Fig. 58), connection 742, socket 17C (Fig. 49a), contacts R30c, clutch magnet DFa to line 607. The circuit branches from contacts R30c to socket 16A (Fig. 58), connection 741, socket 16B (Fig. 49a), clutch magnet DFb to line 607.

With magnets DFa and DFb energized, the first card will be advanced and, as it passes brushes Da, the X hole will be sensed and will complete a circuit from line 606 (Fig. 49d), contacts C24, C25, R3c, roller 146, X hole in column 20, brush Da, contact brush socket in column 20 (Fig. 58), connection 746 to a socket 750 (Fig. 49d), contacts R261a and relay R263 to line 607. Contacts R261a are closed at this time, since the relay R261 is energized by closure of cam contacts C32. Relay R263 closes its contacts R263a to provide a holding circuit through contacts C34, which hold while later in the cycle (see Fig. 45) contacts C33 close to energize relay R262. At such time then, a circuit will be completed from line 606 (Fig. 49d), contacts R262a, R263b and relay R266 to line 607. As a result, contacts R266a shift to electrically connect sockets 751 and 752. These sockets are plug connected as shown in Fig. 58 to sockets 15A and 15C, so that the latter sockets are in effect electrically connected.

Referring to Fig. 49a, this results in connecting the restoring magnet PR2 in parallel with clutch magnet DFa so that the master side of the comparing mechanism will be restored.

As the first card passes brushes Da, the account number will be entered into the detail side of the comparing unit through connections 747 (Fig. 58) in the familiar manner. This entry is of no effect, since as the card passes brushes Da the card levers operate to energize relay R2, which closes its contacts R2b (Fig. 49a) to connect the detail side restoring magnet PR1 in parallel with clutch magnet DFa. Thus, the effect of the movement of the special first card past brushes Da is to cause restoration of both sides of the comparing unit. As further cards continue to pass, the detail side will be repeatedly restored since contacts R2b will remain closed, but the master side will not, because the relays, picked up as a result of the X hole sensing, will drop out and magnet PR2 cannot again be energized until another X hole is sensed.

As the first card passes brushes Db, the account number thereon is entered into the master side of the comparing unit through connections 748 (Fig. 58) and, since this side is not restored, the account number so set up will be retained indefinitely and subsequent energization of the entering magnets as a result of sensing the account numbers in brushes Db in the following detail cards will not effect the setting. As the detail cards pass brushes Da, the account numbers are entered into the detail side of the comparing unit. Thus, after the first special card has passed brushes Db and the next card has passed brushes Da, the testing contacts D5 (Fig. 49b) close and, if there is agreement, a circuit is completed from line 606, contacts D5, socket 11C (Fig. 58), connection 696, socket 11A (Fig. 49b), contacts C14, R41a, R43a, serially through contacts 592 and 590, equals wire 623, socket ERA (Fig. 53), connection 743 to a socket 753 designated "D-offset" (Fig. 49i), and magnet 310D to line 607. Energization of magnet 310D at this time will trip the offsetting device in the detail discharge stacker to offset the agreeing detail card when it passes into the stacker.

If there is no agreement between the detail card account number and the setup number from the special card, no circuits are completed through the comparing unit and the detail card passes to the stacker without being offset. Thus, there will subsequently be a file of cards in the stacker in which all cards having the preselected account number are offset for ready removal.

While there have been shown and described and pointed out the fundamental novel features of the invention as applied to several modifications, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a printing machine, master and detail record card sensing devices, master and detail feeding means for feeding separate sets of master and detail cards to their respective sensing devices, means controlled by both sensing devices for comparing the master cards with the detail cards, means controlled by the detail card sensing devices for comparing each detail card with the succeeding detail card, printing mechanism settable under control of said sensing devices in response to designations on the master and detail record cards, operating means for said printing mechanism to cause printing on a succession of predetermined lines of the master cards, and means controlled by both said comparing means when the designations on a master card and a detail card are alike and successive detail cards are also alike for rendering said operating means effective to print on said succession of lines, one line for each like detail card.

2. In a printing machine, master and detail record card sensing devices, a pair of record card receiving hoppers, master and detail feeding means for feeding separate sets of master and detail cards past the related printing devices to their respective receiving hoppers, means to compare the master cards with the detail cards, means to compare each detail card with the succeeding detail card, means controlled by the first comparing means for causing the detail feeding means to operate continuously and for causing the master feeding means to stop when master and detail cards correspond, printing mechanism controlled by said sensing devices, operating means for causing said printing mechanism to print on a predetermined line of the stopped master card, and means controlled by said second comparing means when successive detail cards do not correspond following correspondence between the master card and a detail card, for causing the master feeding means to advance the master card to its related hopper.

3. In a printing machine, master and detail record card sensing devices, a pair of record card receiving hoppers, master and detail feeding means for feeding separate sets of master and detail cards past the related sensing devices to their respective receiving hoppers, printing mechanism controlled by said sensing devices to set up data sensed on both the cards, operating means therefor for printing said data on the master cards, comparing means for comparing the master cards with the detail cards, and means controlled by said comparing means when the compared cards correspond for rendering said operating means effective.

4. In a printing machine having means for feeding master cards containing data and classification designations from a supply magazine to sensing means, then to a printing station, and then to a discharge hopper, there being printing mechanism at said station, and means for feeding detail cards containing data and classification designations from a supply magazine to sensing means and thence to a discharge hopper, in combination with means for causing both feeding means to feed a master and a detail card to their respective sensing means, comparing means controlled by said sensing means in response to the sensing of the classification designations on the advanced cards, means controlled by said comparing means when the designations in the cards agree for causing feeding of the master card to said printing station and feeding of a succession of detail cards, further means controlled by said comparing means for causing the printing mechanism to receive data under control of the detail card sensing means and print the same on the advanced master card, each detail card in turn controlling said printing mechanism to print on the master card, means for comparing the classification designations on said successive detail cards, and means controlled thereby upon disagrement in the sensed designations for preventing further printing on the master card.

5. In a printing machine having means for feeding master cards containing data and classification designations from a supply magazine to sensing means, then to a printing station, and then to a discharge hopper, there being printing mechanism at said station, and means for feeding detail cards containing data and classification designations from a supply magazine to sensing means and thence to a discharge hopper, in combination with means for causing both feeding means to feed a master and a detail card to their respective sensing means, comparing means controlled by said sensing means in reponse to the sensing of the classification designations on the advance cards, means controlled by said comparing means when the designations in the cards agree for causing feeding of the master card to said printing station and feeding of a succession of detail cards, further means controlled by said comparing means for causing the printing mechanism to receive data under control of the detail card sensing means and print the same on the advanced master card, said printing mechanism being controlled by the màster card sensing means to print the data sensed in the master card concurrently with the data sensed in the first detail card, each detail card in turn controlling said printing mechanism to print on the master card, means for comparing the classification designations on said successive detail cards, and means controlled thereby upon disagreement in the sensed designations for preventing further printing on the master card .

6. In a printing machine having means for feeding master cards containing data and classification designations from a supply magazine to sensing means, then to a printing station, and then to a discharge hopper, there being printing mechanism at said station, and means for feeding detail cards containing data and classification designations from a supply magazine to sensing means and thence to a discharge hopper, in combination with means for causing both feeding means to feed a master and a detail card to their respective sensing means, comparing means controlled by said sensing means in response to the sensing of the classification designations on the advanced cards, means controlled by said comparing means when the designations in the cards agree for causing feeding of the master card to said printing station and feeding of a succession of detail cards, further means controlled by said comparing means for causing the printing mechanism to receive data under control of the detail card sensing means and print the same on the advanced master card, means for relocating the master card in a different position at said printing station for each detail card fed, each detail card in turn controlling said printing mechanism to print in a different position on the master card, means for comparing the classification designations on said successive detail cards, and means controlled thereby upon disagreement in the sensed designations for preventing further printing on the master card.

7. In a printing machine having means for feeding master cards containing data and classification designations from a supply magazine to sensing means, then to a printing station, and then to a discharge hopper, there being printing mechanism at said station, and means for feeding detail cards containing data and classification designations from a supply magazine to sensing means and thence to a discharge hopper, in combination with means for causing both feeding means to feed a master and a detail card to their respective sensing means, comparing means controlled by said sensing means in response to the sensing of the classification designations on the advanced cards, means controlled by said comparing means when the designations in the cards agree for causing feeding of the master card to said printing station and feeding of a succession of detail cards, further means controlled by said comparing means for causing the printing mechanism to receive data under control of the detail card sensing means and print the same on the advanced master card, each detail card in turn controlling said printing mechanism to print on the master card, means for comparing the classification designations on said successive detail cards, means controlled thereby upon disagreement in the sensed designations for preventing further printing on the master card, and further means controlled by said last named comparing means for rendering the first named comparing means effective to compare the second master card with the detail card that disagreed with the preceding detail card.

8. In a printing machine having means for feeding master cards containing data and classification designations from a supply magazine to sensing means, then to a printing station, and then to a discharge hopper, there being printing mechanism at said station, and having means for feeding detail cards containing data and classification designations from a supply magazine to sensing means, and thence to a discharge hopper, in combination with means for causing both feeding means to feed a master and a detail card to their respective sensing means, comparing means controlled by said sensing means in response to the sensing of the classification designations on the advanced cards, means controlled by said comparing means when the designations in the cards agree for causing feeding of the master card to said printing station and feeding of a succession of detail cards, further means controlled by the comparing means for causing the printing mechanism to receive data under control of the detail card sensing means and print the same on the advanced master card, each detail card in turn controlling said printing mechanism to print on the master card, card locating devices at said station operative to initially locate the master card to receive the printing from the first card on a predetermined line, means for causing said devices to relocate the master card for each subsequent detail card to effect printing on successive lines, means for comparing the classification designations on said successive detail cards, and means controlled thereby upon disagreement in the sensed designations for preventing further printing on the master card and for causing the master card to advance from the printing station to its discharge hopper.

9. In a machine of the class described, means to feed a set of detail cards arranged in groups, means to feed a set of master cards, means to compare a master card with the first card of a detail card group, means to compare successive detail cards to detect a change in group designation, means controlled by the first comparing means when the master card agrees with the first detail card for rendering the second comparing means effective, printing mechanism, means for causing an operation of said printing mechanism for each detail card of a group whose first card agrees with the compared master card, and means controlled by the second named comparing means upon a change in group designations in the detail cards for causing the first named comparing means to compare the next master card with the first card of the next detail card group.

10. In a machine of the class described, means to feed a set of detail cards arranged in groups, means to feed a set of master cards, means to compare a master card with the first card of a detail card group, means to compare successive detail cards to detect a change in group designation, means controlled by the first comparing means when the master card agrees with the first detail card for rendering the second comparing means effective, printing mechanism for printing on the master card under control of the detail cards, means for causing an operation of said printing mechanism for each detail card of a group whose first card agrees with the compared master card, and means controlled by the second named comparing means upon a change in group designations in the detail cards for causing the first named comparing means to compare the next master card with the first card of the next detail card group.

11. In a machine of the class described, means to feed a set of detail cards arranged in groups, means to feed a set of master cards, printing mechanism operable for each detail card fed, means to compare a master card with the first card of a detail card group to ascertain whether the compared cards are alike in control designations or which of two unequal relationships exists, means to compare successive detail cards to detect a change in group designation, means controlled by the first comparing means when a predetermined one of said unequal relationships exists for rendering said printing mechanism ineffective, and means controlled by said second comparing means upon a change in group designations in the detail cards for causing the first named comparing means to compare said first master card with the first card of the next detail group.

12. In a machine of the class described, a discharge hopper having offsetting devices, means to feed a set of detail cards arranged in groups to said hopper, means to feed a set of differently designated master cards, means to compare a master card with the first card of a detail card group for a condition of equality or two types of inequality, means to compare successive detail cards to detect a change in group designation, means controlled by the first comparing means upon detection of a certain one of said types of inequality for causing the compared detail card and subsequent detail cards to feed to said hopper and for causing said offsetting device to offset such cards in the hopper, and means controlled by the second comparing means upon a change in group designations in the detail cards for causing the first comparing means to compare the first master card with the first detail card of the next group.

13. In a machine of the class described, means to feed a set of detail cards arranged in groups, means to feed a set of master cards, there being a group of detail cards for each master card, means to compare each master card with the first detail card of the related group, printing mechanism, means controlled by said comparing means to cause the master card to present a predetermined line thereon to said printing mechanism and to thereafter present a succession of subsequent lines, means controlled by each detail card of the related group to operate said printing mechanism to print a different one of said lines for each detail card, means for comparing successive detail cards to detect a change in group designation, and means controlled thereby upon a change in group designation for causing said first comparing means to compare the next master card with the first detail card of the following group.

14. In a machine of the class described, a printing mechanism, means for feeding a master card to said printing mechanism, a plurality of stops selectively movable into position to stop the card in different printing positions, means for differentially adjusting the stops in the direction of movement of the card to select further stopping positions, means for sensing a succession of detail cards, means controlled thereby for causing an operation of the printing mechanism for each detail card sensed, settable means for initially controlling said stops and said adjusting means to cause printing from the first detail card to occur on a predetermined line of the master card, and means operative to thereafter control said stops and adjusting means to position the master card to present successive lines, one line for each successive detail card.

15. In a machine of the class described, a printing mechanism, means for feeding a master card to said printing mechanism, a plurality of stops selectively movable into position to stop the card in different printing positions, means for differentially adjusting the stops in the direction of movement of the card to select further stopping positions, means for sensing a succession of detail cards, means controlled thereby for causing an operation of the printing mechanism for each detail card sensed, settable means for initially controlling said stops and said adjusting means to cause printing from the first detail card to occur on a predetermined line of the master card, means operative to thereafter control said stops and adjusting means to position the master card to present successive lines, one line for each successive detail card, means to compare successive detail records to detect a change in group designation, and means controlled thereby upon a change in group designation to cause said stops and adjusting means to select the initial printing line.

16. In a machine of the class described, a printing mechanism, means for feeding a master card to said printing mechanism, a stop movable into position to stop the card in printing position, means for differentially adjusting said stop in the direction of movement of the card to select further stopping positions, means for sensing a succession of detail cards arranged in groups, means controlled thereby for causing an operation of said printing mechanism for each detail card sensed, settable means for initially controlling said adjusting means to cause printing from the first detail card to occur on a predetermined line of the master card, and means operative to thereafter control said adjusting means to position the master card to present successive lines, one line for each successive detail card.

17. In a machine of the class described, printing mechanism, means for feeding a succession of master cards to said printing mechanism, a stop at said printing mechanism differentially positionable to select a plurality of different printing lines on the master card, settable means to cause the stop to be positioned to select a predetermined line, means for operating the printing mechanism to print on said line, means operative after each printing operation to position the stop to select the next line and to cause the feeding means to advance the card to said repositioned stop, and means effective after a predetermined number of lines have been printed for causing positioning of the stop in its initially selected position and for causing the feeding means to advance the next card to said position.

18. In a machine having printing mechanism, means for positioning a record card adjacent to said printing mechanism, comparing means for advancing a record card along a path adjacent to the printing mechanism, a plurality of stops spaced in the direction of travel of the card normally set out of the path of the card and movable into said path to intercept the card, supporting means for the stops, means for differentially adjusting said supporting means in the direction of travel of the card, and means for selectively moving one of the stops into the path of the card, whereby the card will be intercepted in a position relative to the printing mechanism determined jointly by the selected stop and the differential adjustment of the supporting means.

19. The invention set forth in claim 18, in which means is provided for sequentially and repeatedly adjusting the supporting means in each of its differential positions and for sequentially moving the stops into the path of the card, one stop during each repeated sequence of adjustments of the supporting means, whereby the card will be adjusted repeatedly in a number of positions equal to the number of stops multiplied by the number of differential positions of the supporting means.

20. A device for effecting relative positioning between a printing member and a record card, comprising a pivoted stop, a supporting member therefor, actuating means for rocking the stop into the path of a record card, means for moving a card into position against said stop, and means for differentially adjusting the supporting member to select the position of said stop in the path of the card.

21. In a printing machine, means for sensing a column of a record card for combinational designations representing alphabetic characters, said designations being arranged in groups of zone and subzone designations, means differentially positionable under control of said sensing means in response to the sensing of zone designations, further means differentially positionable under control of said sensing means in response to the sensing of subzone designations, a plurality of type elements, and means jointly controlled by both said differentially positionable means after both have been initially positioned for selecting one of said type elements for printing.

22. In a printing machine, means for sensing a record card for combinational designations, said designations being arranged in zone and subzone groups, a type member having type elements thereon, one for each possible subzone designation and each possible combination of a zone and a subzone designation, means for moving said type member, stopping means controlled by said sensing means in response to the sensing of said subzone designations for interrupting the movement of said member to select the related subzone element for printing, a second stopping means differentially positionable under control of said sensing means in response to the sensing of said zone designations in accordance with the sensed zone designation, means for moving the first stopping means and the type member therewith after both stopping means have been controlled by the sensing means, said second stopping means causing differential positioning of the first stopping means and of said type element to select the type element related to the character designations sensed.

23. In a printing machine controlled by record cards having combinational designations arranged thereon in zone and subzone groups, means for sensing the zone and subzone designations in succession, a magnet controlled by said sensing means, a first stop element positioned under control of said magnet to effect a differential setting thereof in accordance with the sensed zone designations, a printing wheel, means for moving said wheel, a stop for the wheel controlled by said magnet to effect a differential setting of said wheel in accordance with the sensed subzone designations, means effective after said stops have been actuated for moving the wheel and said second named stop, said first stop causing differential interruption of said movement to position the wheel for printing the character corresponding to the zone and subzone designations sensed.

24. In a printing machine controlled by record cards having combinational designations arranged thereon in zone and subzone groups, means for sensing the zone and subzone designations in succession, a magnet controlled by said sensing means, a first stop element positioned under control of said magnet to effect a differential setting thereof in accordance with the sensed zone designations, a printing wheel, means for moving said wheel, a stop for the wheel controlled by said magnet to effect a differential setting of said wheel in accordance with the sensed subzone designations, a supporting slide for said second named stop, means effective after said stops have been actuated for moving the wheel and slide, said first stop causing differential interruption of said movement to position the wheel for printing the character corresponding to the zone and subzone designations sensed.

25. In a printing machine, a plurality of denominationally ordered printing wheels, each having digital type elements and an asterisk type element thereon, means for moving the wheels, pawl mechanism for positioning the wheels with each presenting a digital type element to the printing position, means effective after said positioning for causing the pawl mechanism to shift any wheels having a zero setting to the left of the first significant digit to present the asterisk type to the printing line.

26. In a record posting machine, printing mechanism, means for feeding a master record to said printing mechanism, said record having a plurality of printing lines upon which printing is effected successively, each printed line having a special designation thereon, means for sensing each of said special designations, stopping mechanism controlled thereby for stopping the record in position to present the next available printing line to said printing mechanism, means effective thereafter, for causing the feeding and stopping means to present the remaining lines in succession, means for repeatedly operating the printing mechanism to print on each line presented, and means operative when printing is effected upon a predetermined line for rendering the printing mechanism ineffective.

27. In a record posting machine, a supply hopper, a discharge hopper and an eject hopper, means for feeding a master record from said supply hopper to said discharge hopper, printing mechanism intermediate said supply and discharge hoppers, said record having a plurality of printing lines upon which printing is effected successively, each printed line having a special designation thereon, means for sensing each of said special designations, stopping mechanism controlled thereby for stopping the record in position to present the next available printing line to said printing mechanism, means effective thereafter, for causing the feeding and stopping means to present the remaining lines in succession, means for repeatedly operating the printing mechanism to print on each line presented and means operative when printing is effected upon a predetermined line for rendering the printing mechanism ineffective, and for causing the record to be fed into said eject hopper.

28. In a record posting machine, a printing mechanism, means for feeding a master card having a plurality of printing lines thereon to said printing mechanism, a plurality of stops selectively movable into position to stop the card in different printing positions, means for sensing special designations on the master card representative of the number of lines of printing therein, means controlled thereby to cause the stopping means to stop the card in position to receive printing on the next available line, means thereafter effective to cause the stopping means to stop the card with each successive line in printing position, means for sensing a succession of detail cards, means controlled thereby for causing an operation of the printing mechanism for each detail card sensed, one operation for each successive line of the master card presented, a control device operative as an incident to the stopping of the master card in its last line printing position and means controlled thereby for preventing further operation of the printing mechanism and for causing separation of the detail cards from which printing has not been effected from those from which printing has been effected.

29. In a record posting machine, a printing mechanism, means for feeding a master card having a plurality of printing lines thereon to said printing mechanism, a plurality of stops selectively movable into position to stop the card in each of its printing positions in succession, means for sensing a succession of detail cards, means controlled thereby for causing an operation of the printing mechanism for each detail card sensed, said stops being operated to cause printing from the successive detail cards to occur on successively presented lines of the master card, means settable in accordance with a predetermined master card printing line and means controlled thereby when printing occurs on said predetermined line for preventing further operation of the printing mechanism and for causing separation of the detail cards from which printing has not been effected from those from which printing has been effected.

30. In a printing machine, means for feeding a series of individual master cards, each having a plurality of printing lines and a number of special designations thereon, one designation for each of such lines that have already been printed upon, printing mechanism, control means therefor for causing printing on further lines of the cards, means for sensing the said designations on each card fed, means settable in accordance with the total number of lines that are to receive printing, and means jointly controlled by said sensing means and said settable means for rendering said control means ineffective after said total number of lines have been printed or when a card sensed already has a number of designations equal to the said total number of lines.

31. In a printing machine having means for feeding a record card to a printing mechanism, said card having a series of printing lines divided into groups, each comprising a plurality of lines, in combination with means for sensing designations on the card representative of a group and line upon which printing is to be effected, a pair of relay devices settable under control of said sensing means, one device in accordance with the group and the other in accordance with the individual line of the group, an impulse emitter, card positioning mechanism responsive to said relay devices and said emitter for interrupting the card with the selected line in printing position, said positioning mechanism being responsive to repeated operation of said emitter to effect subsequent positioning of the card to present the next succeeding lines thereof to said printing mechanism in succession, and means for operating said printing mechanism repeatedly, to print on each line presented thereto.

32. The invention set forth in claim 31 in which there is provided means for rendering the print operating means ineffective, and a device controlled by said emitter when it causes positioning of the card on a predetermined line for operating said last named means.

33. In a machine of the class described, master and detail record card sensing devices, master and detail record card feeding means for feeding master and detail cards to their respective sensing devices, means controlled by both sensing devices for comparing the master cards with the detail cards, means controlled by the detail card sensing devices for comparing each detail card with the succeeding detail card, recording mechanism controlled by the said sensing devices in response to designations on the record cards, operating means for said recording mechanism to cause recording on a succession of predetermined lines of the master cards, and means controlled by both said comparing means when the designations on a master card and detail card are alike and successive detail cards are also alike for rendering said operating means effective to record on said succession of lines, one line for each like detail card.

34. In a machine of the class described, means for feeding a succession of master cards to a printing position, means for sensing a detail card for designations representing data to be printed and data representing an amount, printing mechanism settable under control of said sensing means in accordance with the data to be printed, a device settable under control of said sensing means in accordance with the amount means for repeatedly operating said printing mechanism to print on the master cards, successive master cards being fed to printing position one for each operation of the printing mechanism, and means controlled by said settable device for controlling the operation of said operating means to cause printing of the data on a number of master cards equal to the amount set in said device.

35. The invention set forth in claim 34 in which the settable device comprises a mechanism displaceable from a start position, a distance proportional to the amount, means is provided for returning the mechanism to start position step by step, one step for each printing operation, and means operative when the settable device is returned to start position for interrupting further printing operations.

36. In a machine of the class described, master card feeding mechanism, detail card feeding mechanism, a printing station, sensing means for sensing amount designations in successive detail cards, settable means controlled by said sensing means for causing said settable means to receive the amount of each detail card sensed, means controlled by said settable means after each amount entry for causing the master card feeding mechanism to feed a number of master cards, equal in number to the amount entry, to said printing station, and means operative during said master card feeding operation for restoring said settable means when the selected number of master cards have been fed, said settable means being effective upon restoration for causing feeding of a further detail card.

37. In a machine of the class described, a printing mechanism, means for feeding a master card to said printing mechanism, a plurality of stops selectively movable into position to stop the card in different printing positions, means for sensing a succession of detail cards, means controlled thereby for causing an operation of the printing mechanism for each detail card sensed, and further means controlled thereby for controlling said stops, to cause printing from each detail card to occur on a line of the master card determined by designations in the detail card.

38. In a machine of the class described, a printing mechanism, means for feeding a master card to said printing mechanism, a plurality of stops selectively movable into position to stop the card in different printing positions, means for differentially adjusting the stops in direction of movement of the card to select further stopping positions, means for sensing a detail card for data designations and coded line selecting designations, means controlled thereby in response to the data designations for causing an operation of the printing mechanism, means controlled thereby in response to the coded designations for controlling said stops and said adjusting means to cause printing to occur on a line of the master card selected in accordance with said coded designations on the detail card.

EUGEN BUHLER.

REFERENCES CITED

The following references are of record in the file of this patent:

UNITED STATES PATENTS

| Number | Name | Date |
| --- | --- | --- |
| 1,761,741 | Peirce | June 3, 1930 |
| 1,862,032 | Peirce | June 7, 1932 |
| 1,946,915 | Peirce | Feb. 12, 1934 |
| 1,978,893 | Carroll et al. | Oct. 30, 1934 |
| 2,056,391 | Daly | Oct. 7, 1936 |
| 2,111,119 | McDowell et al. | Mar. 15, 1938 |
| 2,157,980 | Daubmeyer | May 9, 1939 |
| 2,213,571 | Simpson et al. | Sept. 3, 1940 |
| 2,234,291 | Torkelson | Mar. 11, 1941 |
| 2,240,667 | Paris | May 6, 1941 |
| 2,335,945 | Keough | Dec. 7, 1943 |